United States Patent
Cuk (12)

(10) Patent No.: US 6,462,962 B1
(45) Date of Patent: Oct. 8, 2002

(54) LOSSLESS SWITCHING DC-TO-DC CONVERTER

(76) Inventor: Slobodan Cuk, 27682 Gold Dust, Laguna Hills, CA (US) 92653

( * ) Notice: Subject to any disclaimer, the term of this patent is extended or adjusted under 35 U.S.C. 154(b) by 81 days.

(21) Appl. No.: 09/658,676

(22) Filed: Sep. 8, 2000

(51) Int. Cl.$^7$ ............................................. H02M 3/335
(52) U.S. Cl. .......................... 363/16; 363/131; 363/41; 363/55
(58) Field of Search .............................. 363/16, 41, 55, 363/131, 95, 97

(56) References Cited

U.S. PATENT DOCUMENTS

| | | |
|---|---|---|
| 4,415,959 A | 11/1983 | Vinciarelli |
| 4,441,146 A | 4/1984 | Vinciarelli |
| 5,066,900 A | 11/1991 | Bassett |
| 5,291,382 A | 3/1994 | Cohen |
| 6,304,460 B1 * | 10/2001 | Cuk ........................... 363/131 |

OTHER PUBLICATIONS

R.D. Middlebrookand Slobodan Cuk, Ageneral Unified Approach to Medeling Switching Converter Power Stages, PESC 76 Record , pp. 18–34, No month.

* cited by examiner

*Primary Examiner*—Shawn Riley
(74) *Attorney, Agent, or Firm*—A. M. Fernandez

(57) ABSTRACT

A new lossless switching DC-to-DC converter with novel lossless switching time control for up to four controllable switches, with each switch meeting the specific current-voltage switching characteristics, operates at ultra high efficiency in a very compact size and offers additional performance advantages, such as low EMI noise, low switching ripple currents, and improved reliability.

53 Claims, 107 Drawing Sheets

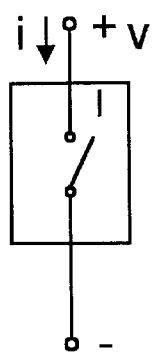
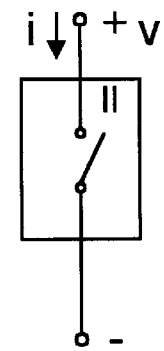
Fig. 9a (Prior art)  Fig. 10a (Prior art)
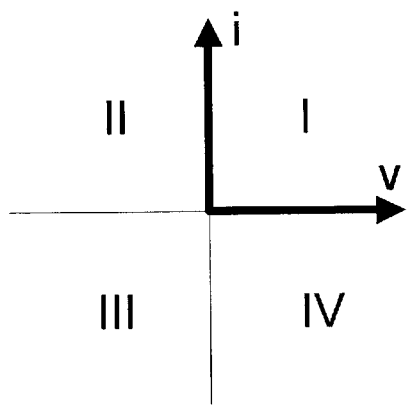
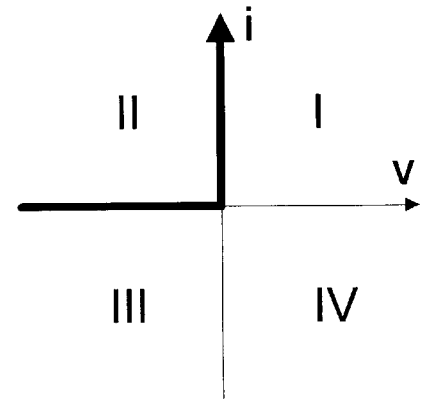
Fig. 9b (Prior art)  Fig. 10b (Prior art)
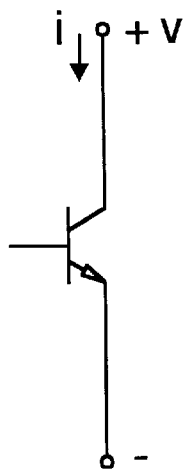
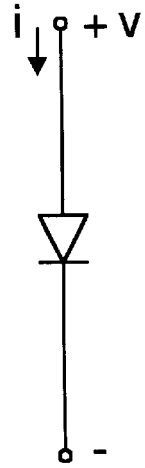
Fig. 9c (Prior art)  Fig. 10c (Prior art)

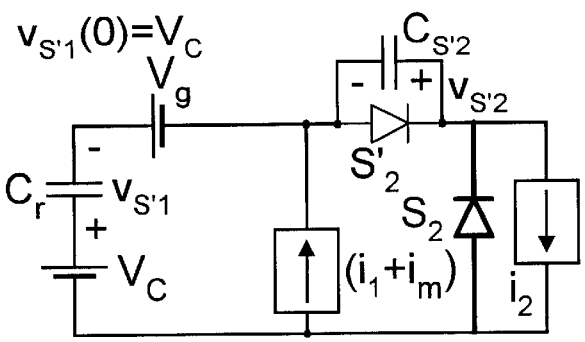
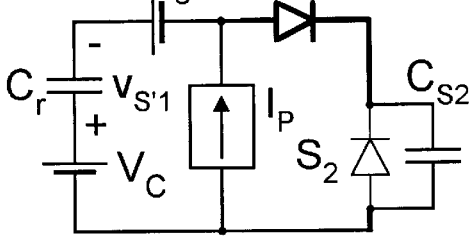
Fig. 65a  Fig. 65b
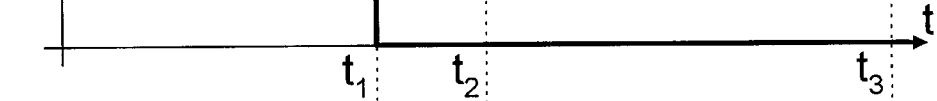
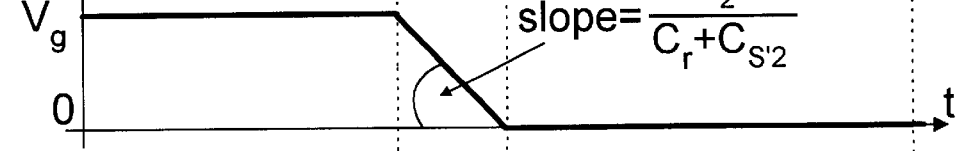
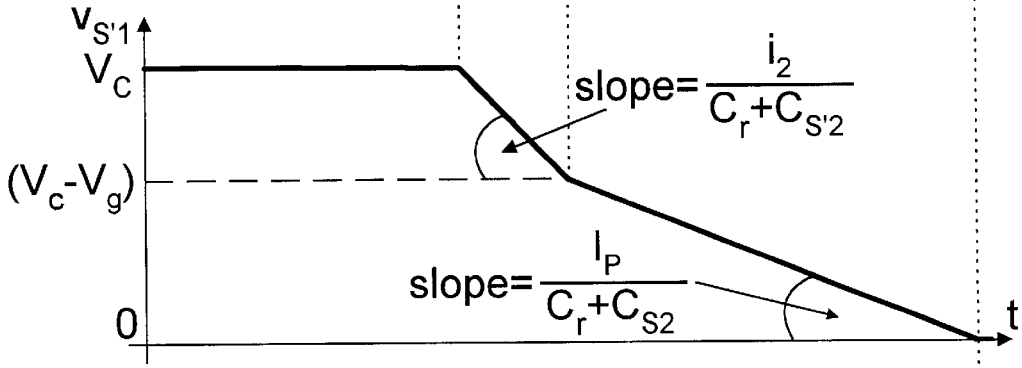
Fig. 65c

LOSSLESS SWITCHING DC-TO-DC CONVERTER

FIELD OF THE INVENTION

This invention relates to the field of switching DC-to-DC power conversion and in particular to the new class of switching converters employing novel type of lossless switching which provides simultaneously the ultra high efficiency in a very compact size and additional performance advantages, such as much reduced EMI noise and much improved reliability.

BACKGROUND OF THE INVENTION

Definitions and Classifications

The following notation is consistently used throughout this text in order to facilitate easier delineation between various quantities:

1. DC—Shorthand notation historically referring to Direct Current but by now has acquired wider meaning and refers generically to circuits with DC quantities;
2. AC—Shorthand notation historically referring to Alternating Current but by now has acquired wider meaning and refers to all Alternating electrical quantities (current and voltage);
3. $i_1$, $v_2$—The instantaneous time domain quantities are marked with lower case letters, such as $i_1$ and $v_2$ for current and voltage;
4. $I_1$, $V_2$—The DC components of the instantaneous periodic time domain quantities are designated with corresponding capital letters, such as $I_1$ and $V_2$;
5. $\Delta i_1$—The difference between instantaneous and DC components is designated with $\Delta$, hence $\Delta i_1$ designates the ripple component or AC component of current $i_1$;
6. D—The duty ratio of the input switch $S_1$ is defined as $D=t_{ON}/T_S$ where $t_{ON}$ is ON time of the input switch, and $T_S$ is the switching period defined as $T_S=1/f_S$ where $f_S$ is a constant switching frequency. Switch $S_1$ is closed and conducts current (turned ON) during $DT_S$ interval;
7. D'—The complementary duty ratio D' of the input switch $S_1$ is defined as D'=1−D and $D'T_S$ is interval during which input switch $S_1$ is open (turned OFF);
8. $S_1$, $S_2$, $S'_1$, $S'_2$—Switch designations respectively for input switch, output switch, complementary input switch, and complementary output switch and, at the same time, designate the switching states of the respective active, controllable switches as follows: high level indicates that active switch is turned ON, low (zero) level that it is turned OFF;
9. $CR_1$—Designation for the current rectifier (CR) diode and its corresponding switching time diagram. Since diode is a two-terminal passive switch, switching time diagram represents also the state of diode switch as follows: high level indicates that the diode is ON and low level that it is OFF;
10. I—One quadrant switch is designated by Roman number (I through IV) within a rectangular box around ideal switch signifying its limitation to particular one-quadrant operation;
11. CBS—Designates the Current Bi-directional Switch as a three-terminal controllable semiconductor switching device, which conducts the current in either direction in an ON-state, but blocks the voltage of only one polarity in an OFF-state between two power terminals and has a third controlling terminal to independently control the state of the switch between two power terminals;
12. VBS—Designates the Voltage Bi-directional Switch as a three-terminal controllable semiconductor switching device, which conducts the current in only one direction in the ON-state, but blocks the voltage of either polarity in an OFF-state between the two power terminals and has a third controlling terminal to independently control the state of the switch between two power terminals;
13. CBS/VBS—Designates that either Current Bi-directional Switch (CBS) or Voltage Bi-directional Switch (VBS) can be used.

The demand for reduced size and weight of electronic power processing equipment to make it compatible with ever shrinking size of electronic signal processing equipment resulted in the continuous push toward increasing the switching frequency at which DC-to-DC switching converters operate: from initial 20 kHz level to 200 kHz and higher switching frequencies. This, in turn, results in proportionally increased switching power losses. Hence, in the past, a number of converter topologies have emerged, which belong to two broad categories:

1. Hard-switching converter category in which no attempts were made to reduce the switching losses;
2. Soft-switching converter category in which measures were taken to reduce the switching losses.

Unfortunately, in most cases, the reduction of switching losses was accompanied with the increase of other losses, such as conduction losses of the switching devices or losses associated with energy stored in transformer leakage inductance and other additional losses, which resulted only in small to moderate improvements in efficiency.

The switching converters can also be classified into three classes relative to a number of switches employed:

1. Two-Switch Converter class, example of which is the prior-art buck converter.
2. Three-Switch Converter class such as prior-art forward converter;
3. Four-Switch Converter class such as the present invention and a number of other prior-art converters.

Prior-Art Soft-Switching Converters

One of the first soft-switching methods which provided reduction of switching losses was introduced by C. Henze, H. C. Martin and D. W. Parsley in "Zero-Voltage Switching in High-Frequency Power Converters Using Pulse-Width Modulation", *IEEE Applied Power Electronics Conference*, (IEEE Publication 88CH2504-9) pp33–40, 1988 record on a basic buck converter which belongs to Two-Switch Converter class and is shown in prior-art of FIGS. 1(*a–g*).

In order to obtain zero-voltage switching at a constant switching frequency, the usual transistor-diode implementation of two switches is replaced with two MOSFET transistors, each of which is modeled as a parallel connection of an ideal switch with an anti-parallel "body" diode and a parasitic drain-to-source capacitor, resulting in circuit models of FIGS. 1(*c–f*). The total switching cycle $T_S$ is broken down into 4 intervals by proper drive timing of the two switches S and S' as shown in FIG. 2*e*. Note that with two controllable switches, two well defined transition intervals are introduced during which both switches are OFF. The first transition interval ($t_N$ in FIG. 2*e*), starts when switch S is turned OFF (as in FIG. 2*e*) and is also known as the "natural" transition ($DT_S$ to $D'T_S$ transition, or simply D to D' transition). By turning OFF the switch S, the inductor current $I_P$ is flowing naturally in a needed direction (represented by the current source $I_P$ on FIG. 2*a–f*). This current source $I_P$ charges the parasitic capacitor $C_S$ of switch S and discharges parasitic capacitor $C'_S$ of switch S' until capacitor $C'_S$ is fully discharged at which instant the body-diode of switch S' clamps the voltage at zero and prevents reverse charging of capacitor $C'_S$ of switch S'. At that instance, the switch S' can be turned ON with zero switching losses (FIG. 2e), since the charge of $C'_S$ was already relocated to capacitance $C_S$ of the switch S (charged to $V_g$). In order to perform the reverse process during the D' to D transition, a negative inductor current $I_N$ is needed. The simplest method to accomplish this is to design the output inductor to have a large ripple current, such that its peak-to-peak ripple current is at least 3 times the maximum DC load current. As seen in the inductor current waveform in FIG. 2e, the instantaneous inductor current $i_L$ will at some point during D'T$_S$ interval reverse direction and become negative with magnitude $I_N$. Just before the end of complementary interval D'T$_S$ the switch S' is turned OFF initiating the so-called "forced" transition (since the inductor current is now intentionally forced to become negative by the converter circuit designed for large ripple). During this forced transition interval ($t_F$ in FIG. 2e), the opposite to $t_N$ interval occurs: this negative inductor current $I_N$ charges parasitic capacitor $C'_S$ of switch S' and discharges parasitic capacitor $C_S$ of switch S until voltage $V_S$ of S reaches zero. At that instant body-diode clamps the voltage on switch S to zero forcing switch S to turn-ON at zero voltage in a lossless manner. Hence recycling of the charge stored in the parasitic capacitors $C_S$ and $C'_S$ is provided instead of being dissipated each cycle as in "hard-switching".

Even though soft-switching can be achieved on both active switches S and S' in this very simple manner, and the voltage stresses on the switches are low, the big disadvantage is that the magnitude of the output inductor ripple current must be more than two times higher than the maximum DC load current in order to achieve the soft-switching for all operating conditions. Clearly, this soft-switching method suffers from the need to have a large inductor ripple current so that a negative instantaneous inductor current is obtained before the end of D'T$_S$ interval in order to accomplish the forced D' to D transition. This, in turn, increases the conduction losses significantly and thus diminishes to a large extent the savings obtained by reduced switching losses. In addition, an increased size of output capacitor is needed to absorb this large ripple current and to reduce the output AC ripple voltage to acceptable level.

Another prior-art method of reduction of switching losses belongs to the Three-Switch Converter class, as disclosed by U.S. Pat. No. 4,415,959 issued to P. Vinciarelli, for "Forward Converter Switching at Zero Current". To force the main input power switch to switch at zero current in this quasi-resonant converter, the reactive components, small resonant inductor and small resonant capacitor are used to distort the main switch square-wave like current waveform into a sinusoidal-like current waveform. This makes possible turning ON and OFF of the main switch at zero current and reduces its switching losses caused by switch current and switch voltage overlap and by finite switching time characteristic of the semiconductor switching devices. Unfortunately, the increased RMS value of the switch current increases the conduction losses, thereby diminishing some of the switching loss reduction gained by zero current switching. More serious, however, is the fact that the dominant switching loss due to $\frac{1}{2}CV^2$ energy stored on the parasitic capacitance of the main switch still remains and is dissipated when that switch is turned ON. This switching loss is especially pronounced in applications operating from high input DC voltages, such as nominal 300V DC input voltage in OFF-line applications, using rectified AC line as a DC source.

The converter disclosed in U.S. Pat. No. 4,441,146 issued to P. Vinnciarelli for "Optimal resetting of the transformer's core in single-ended forward converters" belongs to the of Four-Switch Converter class. The branch comprising the auxiliary switch and storage capacitance, and placed on transformer secondary was used with a sole purpose to form a "magnetizing current mirror" to reset the transformer's magnetic core and has no other roles. On the contrary, in the present invention, the branch comprising an auxiliary switch and an auxiliary capacitor is placed on the primary side of the novel switching converter topology accomplishing not only the transformer's magnetic core reset but also more importantly the elimination of switching losses.

The converter disclosed in the U.S. Pat. No. 5,291,382 issued to Isaac Cohen for "Pulse Width Modulated DC/DC Converter With Reduced Ripple Current Component Stress and Zero Voltage Switching Capability" also belongs to the Four-Switch Converter class. In this converter, the soft-switching at zero voltage is achieved in a method analogous to the buck converter of FIGS. 1(a–g). It is based on the small magnetizing inductance of the isolation transformer which results in large magnetizing ripple current, hence with the same soft-switching and efficiency limitations as in a soft-switching buck converter. However, since soft-switching is accomplished by large magnetizing current ripple of transformer and not with a large output inductor ripple current as in a buck converter, the undesirable effect of large output inductor ripple current of the buck converter on output ripple voltage is eliminated.

Yet another example of the Four-Switch Converter class is the prior-art converter disclosed in the U.S. Pat. No. 5,066,900 issued to John Basset for "DC/DC Converter Switching at Zero Voltage". In this converter, the leakage inductance of the transformer is used as a resonant inductor to force the reduction of switching losses, However, the use of the passive rectifier diodes for the two switches on the converter's output (secondary side) instead of the controllable switches with optimum switching time control as in the present invention, severely limits the efficiency improvements which can be achieved with this soft-switching technique and especially so for the applications with moderate to high input DC voltages such as off-line converter applications.

The common to all above cited prior-art soft-switching converters is that although they employ different soft-switching methods on the members of Three-switch and Four-switch Converter class, they all utilize only the passive current rectifier switches for the two output switches. To the contrary, the present invention, which belongs to the Four-switch Converter class uses in addition to the two active switches on input side also two active and controllable switches on the output secondary side which are either of the CBS or VBS variety. Together with the very special switching time control of all four controllable switching devices this results in elimination of switching losses without any undesirable increase of other losses, such as conduction losses, leakage losses, etc., as was the case with the prior-art soft-switching methods. Thus, the present converter with its unique switching time control belongs to a new, third category of switching converters (in addition to hard-switching and soft-switching categories introduced earlier) characterized by near zero switching losses over the wide operating range, and therefore termed Lossless Switching Converter class.

From the above review, it is clear that a new lossless switching method is needed which eliminates the switching losses without introducing all the other undesirable features associated with classical prior-art soft-switching methods and thereby significantly increases the overall efficiency as confirmed both theoretically and on experimental prototypes. This invention introduces such novel lossless switching methods, which require in addition to suitable converter topology and proper semiconductor switch type also a proper drive timing of the four controllable switches and result in elimination of the switching losses. Furthermore, switching loss elimination is maintained in some cases throughout the whole duty ratio operating range.

SUMMARY OF THE INVENTION

A primary objective of this invention is to provide a lossless switching DC-to-DC converter, which, through the use of novel lossless switching methods, eliminates switching losses (without increasing other converter losses) to achieve ultra high efficiency heretofore unachievable by the prior-art soft-switching methods. The novel lossless switching allows operation at ultra high switching frequencies and thereby substantial reduction in size and weight and increased power density. The inherent additional benefits are reduced EMI noise and reduced component stress (voltage, current, and temperature) for increased reliability.

Lossless Switching Converter Categories

The new lossless switching DC-to-DC converter is comprised of a Power Processing Stage with up to four controllable switches with specific switching-quadrant characteristics depending on the switch location in the converter itself (for example current bi-directional or voltage bi-directional) and the Switching Time Control Box, which provides the needed sequence of switching via electronic drive control for at least three or for all four controllable switches to achieve lossless switching in a number of alternative ways. The invention is embodied in both non-isolated power stage and isolated power stage, with output switch implemented as either CBS/diode output switch or as VBS output switch.

The isolated Power Processing Stage is comprised of an isolation transformer, input and output inductors, series input capacitor, auxiliary capacitor and four controllable switches. The input inductor is connected in series with the DC source and provides the non-pulsating (continuous) input current, while the output inductor is connected in series with the DC load and provides non-pulsating (continuous) output current. The series input capacitor is connected in series with the input inductor and transformer primary. Input switch and complementary input switch are on the transformer's primary side, while output switch and complementary output switch are on the transformer's secondary side. The branch with auxiliary capacitor in series with the complementary input switch is positioned within converter in such a way to conduct a small AC ripple current only while the complementary input switch is closed. This AC ripple current together with the controllable output switch and the novel switching time control enables lossless switching operation, with efficiency and size performance not possible with prior-art soft-switching converters. This branch also insures that the isolation transformer is automatically volt-second balanced without a need for reset winding or other core reset means. There are many alternative ways to connect this branch to the remaining part of the new converter and still retain the above unique properties. A number of such possibilities are disclosed in detailed specifications along with the general functional criteria that such branch must satisfy. The non-isolated variant is obtained by simply replacing the isolation transformer with inductor.

Both isolated and non-isolated lossless switching converters can be implemented in two variants based on the type of the output controllable switch: CBS or VBS.

Lossless Switching With CBS Output Switch

The first lossless switching category with CBS output switch utilizes a resonance between the parasitic capacitances of the switches and the leakage inductance of the isolation transformer (or separate additional resonant inductor in case of non-isolated converter) to achieve lossless switching. The special switching time control of controllable switches gives rise to a very effective resonant current capable of producing lossless switching and providing the ultra high efficiency and small size heretofore unattainable by prior-art converters.

This category is broken down into three main subcategories as follows:

1. A non-isolated converter without resonant inductor with only switching time control adjustments of the CBS semiconductor switches, which provides a substantial switching loss reduction,
2. A non-isolated converter, which includes an additional resonant inductor and relies on its resonance with parasitic capacitances of the switches to accomplish lossless switching.
3. An isolated converter, whose leakage inductance plays the role of the resonant inductor and practically accomplishes elimination of all switching losses by use of the novel lossless switching time control of controllable CBS switches.

Lossless Switching With VBS Output Switch

The second lossless switching category with the VBS output switch does not depend on the resonant current as CBS output switch category did. Instead, it is based on the auxiliary capacitor AC ripple current and the voltage bidirectional property of the output switch to force the lossless discharge of the respective parasitic capacitances to zero voltage, at which point, appropriate controllable switches can be turned ON with zero losses. As this method does not depend on resonance, it is independent of the operating point and maintains such ideal switching performance over wide operating range including the whole input voltage range and for any load current from no load to full load.

This category is also broken down into three subcategories as follows:

1. A non-isolated switching converter without resonant inductor, which uses a very specific switching time control sequence to obtain lossless switching performance and results in symmetrical voltage waveform on the output switch, thus termed "symmetrical" lossless switching.
2. A non-isolated converter with resonant inductor, which uses another very specific switching time control sequence to obtain lossless switching performance and results in asymmetrical voltage waveform across the output switch, hence it is termed "asymmetrical" lossless switching.
3. An isolated converter, which inherently includes the leakage inductance of the isolation transformer but does not depend on it for lossless switching performance, utilizes the novel switching time control analogous to the above "asymmetrical" lossless switching time control.

Another converter improvement applicable to both CBS and VBS category is the one in which the input inductor and the isolation transformer are combined onto a common magnetic core to form an Integrated Magnetic circuit, which results in desirable zero-ripple input inductor current over the full operating range and thus reduces the conducted EMI noise as well as input ripple voltage. In non-isolated version, the input and middle inductors are combined into a Coupled-Inductor structure with the same benefits.

The novel features that are considered characteristic of this invention are set forth with particularity in the appended claims. The invention will best be understood from the following description when read in connection with the accompanying drawings.

BRIEF DESCRIPTION OF THE DRAWINGS

FIGS. 2(a–d) illustrate the four circuit models of the prior-art, soft-switching buck converter and FIG. 2e is a timing diagram illustrating the need for a high ripple current $i_L$ with a required negative peak value $I_N$ to accomplish the soft-switching in the buck converter of FIG. 1a.

FIG. 3a is a simplified circuit diagram of the present invention using ideal switches as an input switch $S_1$, a complementary input switch $S'_1$, an output switch $S_2$ and a complementary output switch $S'_2$, the operation of which is shown in FIG. 3b with switching time diagram waveforms defining drive signals and the ON and OFF states of the ideal switches of the converter of FIG. 3a.

FIG. 4b illustrates the hard-switching switching time control of the two controllable active MOSFET switches of FIG. 4a.

FIG. 9a shows a symbol for the single-quadrant, active switch, which blocks the voltage of one polarity and conducts the current in only one direction (quadrant I in FIG. 9b), and FIG. 9c shows one possible realization of this switch using a single NPN bipolar transistor.

FIG. 10a shows a symbol for the single-quadrant, passive switch, which blocks the voltage of only one polarity and conducts the current in only one direction (quadrant II in FIG. 10b), and FIG. 10c shows one possible realization of this switch using a single current rectifier (diode).

FIG. 12b shows one possible specific realization of the lossless switching time control for D' to D transition for converter in FIG. 12a.

FIG. 14b shows the lossless switching time control for the converters in FIG. 13b and FIG. 14a.

FIG. 17a shows the switched network obtained for an interval DTS for the converter of FIG. 3a, and FIG. 17b shows the switched network obtained for a complementary interval $D'T_S$ for the converter of FIG. 3a.

FIG. 18 shows a graph of the linear DC voltage conversion ratio of the converter of FIG. 3a.

FIG. 20 illustrates the switched network for a complementary interval $D'T_S$ used to establish the fundamental relation among the currents of the three inductors of the present invention of FIG. 3a.

FIG. 27f illustrates an all-MOSFET transistor implementation of the present invention of FIG. 11c with the high-side driver configuration of two N-channel MOSFET transistors $S_1$ and $S'_1$ using a composite OUTPUT switch $S_2$ consisting of two MOSFET devices as in FIG. 9a.

FIG. 39d shows a time domain waveform of the three combined ripple currents, while FIG. 39e shows a graph of the current in auxiliary capacitor C of the converter in FIG. 21a, which is only present during the $D'T_S$ time interval and consist only of an AC ripple component with a positive peak $I_P$ at the beginning of $D'T_S$ time interval and negative peak $I_N$ at the end of $D'T_S$ time interval.

FIG. 47b illustrates a number of different D' to D transition cases (1–6), which can take place depending on both the implemented type of output switch (CBS, diode, or VBS) and the particular time during transition interval when the output switch $S_2$ is turned ON.

FIG. 51a illustrates a circuit model for the current-reversal subinterval during D' to D transition. FIG. 51b illustrates the circuit model describing oscillations at the beginning of the follow on steady-state $DT_S$ interval.

FIG. 53c illustrates that at duty ratio higher than 0.5, the complete discharge is also taking place but with resonant current not reduced to zero as in the case of FIG. 53a.

FIG. 58a illustrates the equivalent circuit model of converter in FIG. 57a for the linear discharge subinterval, FIG. 58b illustrates the equivalent circuit model of converter in FIG. 57a for the current-reversal subinterval, FIG. 58c illustrates equivalent circuit model of converter in FIG. 57a to predict the oscillations at the beginning of the steady-state $DT_S$ interval.

FIG. 60a illustrates the isolated converter with CBS output switch and n:1 step-down turns ratio of Case II displayed by waveforms in FIG. 60b which show that the hard-switching voltage of output switch is reduced by turns ratio n in the isolated converter of FIG. 60a.

FIG. 65a illustrates the equivalent circuit for D to D' transition and asymmetrical lossless switching and for subinterval in which output switch is ON. FIG. 65b illustrates the equivalent circuit for subinterval in which the output switch is OFF. FIG. 65c illustrates the characteristic waveforms during the two subintervals modeled by equivalent circuits of FIG. 65a and FIG. 65b.

FIG. 67a illustrates the equivalent circuit for D to D' transition with resonant inductor included and for subinterval in which the complementary output switch is turned OFF. FIG. 67b illustrates the equivalent circuit for the subinterval in which the complementary output switch is turned ON.

FIG. 80 illustrates the graph of the characteristic switching time control waveforms, respective switch voltages, and the input capacitor current during the D' to D transition modeled by five converter circuits states of FIGS. 79(a–e) for the converter in FIG. 54a.

FIG. 84a illustrates the graph of the inductors' currents relation relevant to the D to D' transition and FIG. 84b shows the graph of the characteristic switching time control waveforms and respective switch voltages during the D to D' transition modeled by four converter circuits states of FIGS. 83(a–d) for the converter in FIG. 43a.

FIG. 86a illustrates the graph of the inductors' currents relation relevant to the D' to D transition and FIG. 86b shows the graph of the characteristic switching time control waveforms and respective switch voltages during the D' to D transition modeled by four converter circuits states of FIGS. 85(a–d) for the converter in FIG. 43a.

FIG. 88a illustrates the graph of the inductors' currents relation relevant to the D to D' transition and FIG. 88b shows the graph of the characteristic switching time control waveforms and respective switch voltages during the D to D' transition modeled by four converter circuits states of FIGS. 87(a–d) for the converter in FIG. 43a.

FIG. 90 illustrates the graph of the characteristic switching time control waveforms, respective switch voltages and input capacitor current during the D to D' transition modeled by five converter circuits states of FIGS. 89(a–e) for the converter in FIG. 57a.

FIG. 92 is the graph of the characteristic switching time control waveforms, respective switch voltages and input capacitor current during the D' to D transition modeled by five converter circuits states of FIGS. 91(a–e) for the converter in FIG. 57a.

98b shows the expanded view of the D to D' transition of FIG. 98a. FIG. 98c shows the expanded view of the D' to D transition of FIG. 98a.

FIG. 99b displays the expanded view of the D to D' transition of FIG. 99a FIG. 99c displays the expanded view of the D' to D transition of FIG. 99a.

DETAILED DESCRIPTION OF THE INVENTION

Hard-Switching Converter Topology

The novel lossless switching features of the present invention provide a switching DC-to-DC converter, which overcomes the problems of the prior-art converters and results in high efficiency and high power density. However, for purposes of easier understanding, the basic operation of the switching converter is first introduced in FIG. 3a in its most rudimentary "hard-switching" configuration with four ideal single-pole, single-throw switches: input switch $S_1$, complementary input switch $S'_1$, output switch $S_2$, and complementary output switch $S'_2$, where "prime" designates the complementary switch. As seen in FIG. 3b, the $S_1$ and $S_2$ switches are operated in-phase, that is, in this idealized version, they are operated so that both are turned ON at the same time and kept ON for time interval $DT_S$ where D is a duty ratio and $T_S$ is the switching cycle, and then turned OFF at the same time and kept OFF for the complementary interval $D'T_S$, where $D'=1−D$ is the complementary duty ratio. The complementary switches $S'_1$ and $S'_2$, as the name suggests, are operated in a complementary way, that is exactly out-of-phase with respect to their counter-parts, switches $S_1$ and $S_2$ respectively. The timing diagram of FIG. 3b shows both the driving signals and the state of respective switches (ON or OFF). Note that the following switch convention is adopted throughout this text. The switch timing diagrams such as the one in FIG. 3b represent both, the switch drive signals and conduction state, so when the drive signal $S_1$ is high, for example, switch $S_1$ is ON, and when the drive signal $S_1$ is low, switch $S_1$ is OFF.

Figure 3A:
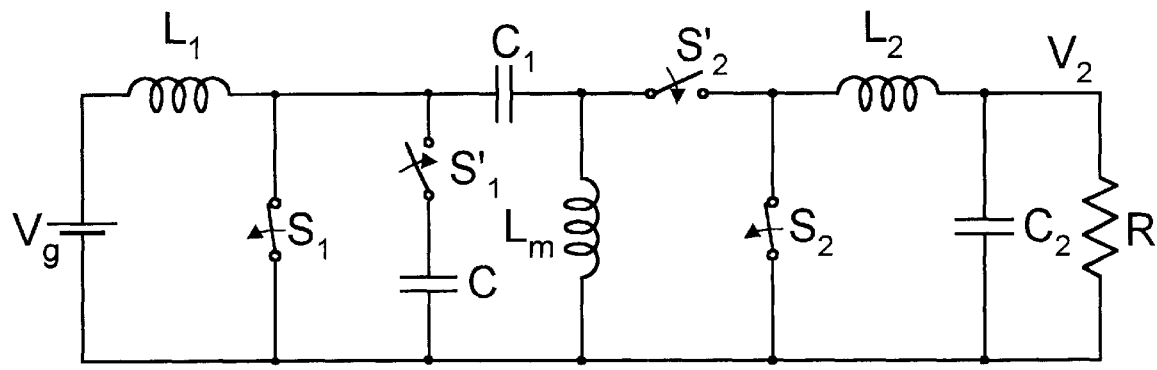
Figure 3B:
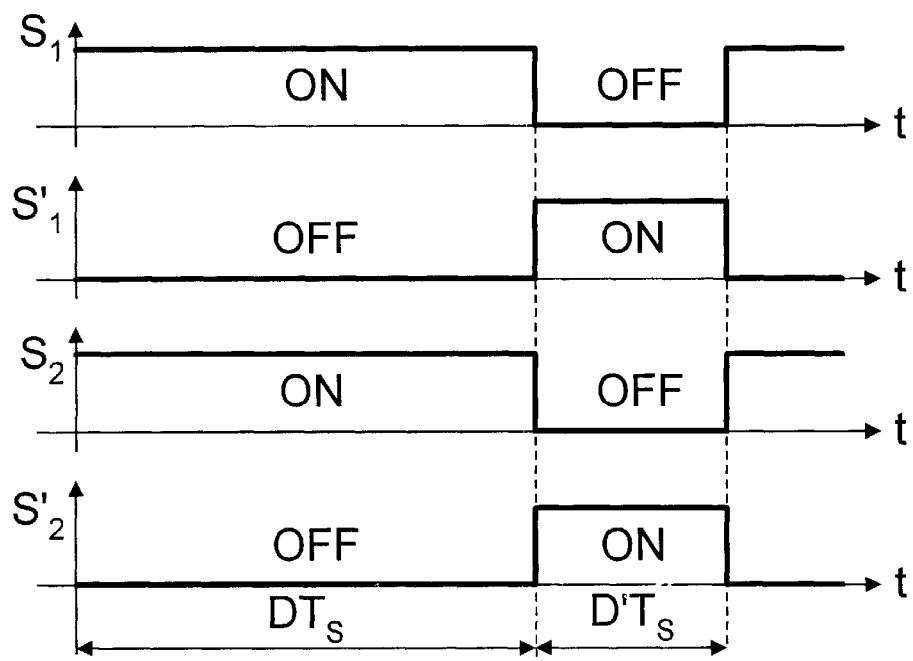

The new converter of FIG. 3a has an input inductor $L_1$ and an output inductor $L_2$ which maintain the continuity of the input and output currents at all operating conditions. In addition, in the middle of the converter, there is a third, hereafter called middle inductor $L_m$. The converter also has three capacitors, a series input capacitor $C_1$, an auxiliary capacitor C, and an output filtering capacitor $C_2$. Note that the output filtering capacitor $C_2$ does not take part in switching process, hence it is not essential for the converter switching operation and is therefore left out from this analysis and in further discussions.

Figure 4A:
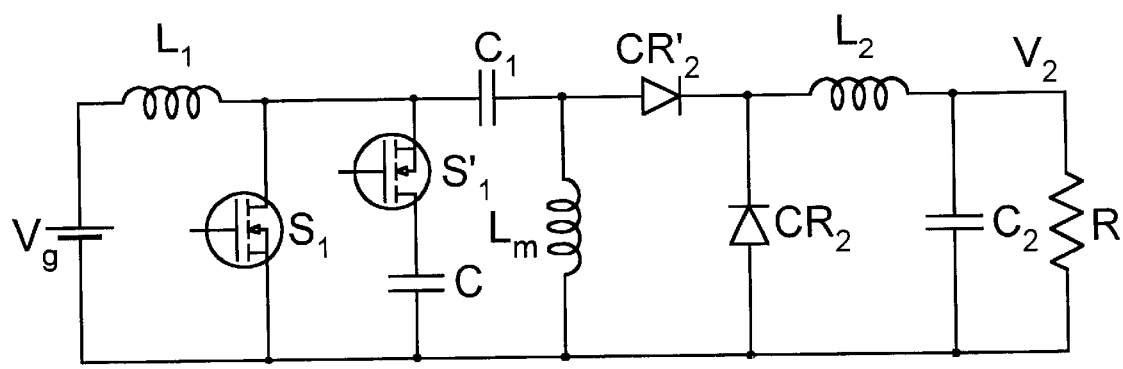
FIG. 4a illustrates the converter version of the present invention with diode rectifier implementation for output switch and complementary output switch.
Figure 4B:
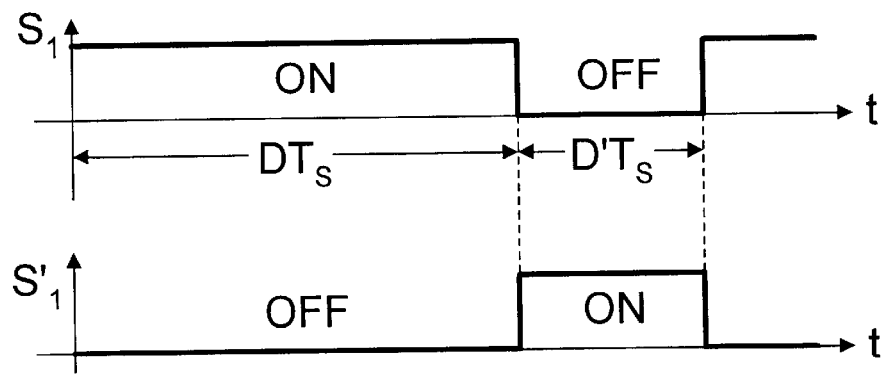

The switching time diagram of FIG. 3b will result in "hard-switching" operation of the converter and substantial switching losses when all four ideal switches are replaced with actual semiconductor switching devices as in FIG. 4a and with switching time control of FIG. 4b:

1. The input switch and complementary input switch are three-terminal, active switching devices (MOSFETs), which can be externally controlled by proper gate drive signals such as those in FIG. 4b.
2. The output switch and complementary output switch are two-terminal, passive switching devices (diodes), which are turned ON and OFF only when particular conditions are imposed on its two-terminals by the converter circuit operation: when the voltage across diode switch terminals becomes higher than its threshold voltage, diode turns ON, and when the current through diode terminals becomes zero, diode turns OFF.

Hard-switching Losses

Figure 5:
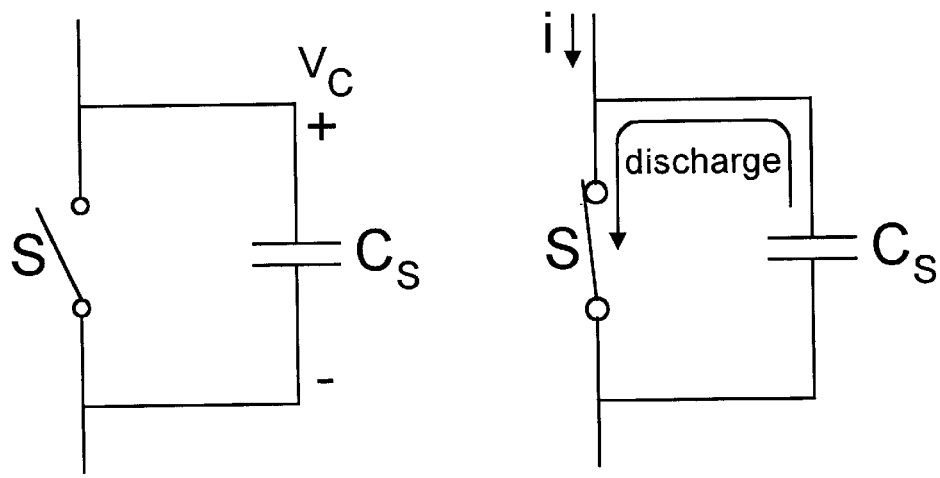
FIG. 5 shows how the energy stored on parasitic capacitance of the switch when switch is open is all dissipated in a hard-switching manner when switch is closed.

Each semiconductor switching device in FIG. 4a, whether it is a MOSFET transistor, or a diode, can be in its OFF state represented with an equivalent lump parasitic capacitance $C_S$ as shown in FIG. 5, which is charged to the OFF voltage $V_C$ of the device. The energy E stored in this parasitic capacitance is all dissipated once the switch S is closed as seen in FIG. 5 and results in the hard-switching power loss $P_L$, which is directly proportional to switching frequency:

$$E=C_S V_C^2/2; P_L=f_S E=f_S C_S V_C^2/2 \qquad (1)$$

For typical high voltage switches, $V_C$=595V and for $C_S$=237 pF (see experimental waveforms of FIG. 15b), we get stored energy E=42 W/MHz and $P_L$=8.4 W loss for $f_S$=200 kHz. Even if just only one out of four switches is operating in a hard-switching mode the resulting 8.4 W switching losses represent more than 7.8% efficiency loss in a case of 100 W converter. Prior-art soft-switching methods provide only a moderate reduction of the total losses. Thus, new lossless switching methods are needed, which will eliminate switching losses without the increase of other losses and result in highest efficiency possible.

Switch Quadrant Classification and Optimum Switch Implementation

Figure 6A:
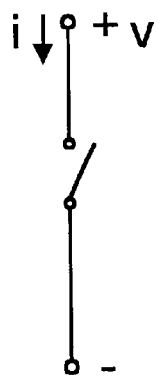
FIG. 6a shows a symbol for the four-quadrant switch, which is both current bi-directional and voltage bi-directional as illustrated in FIG. 6b.
Figure 6B:
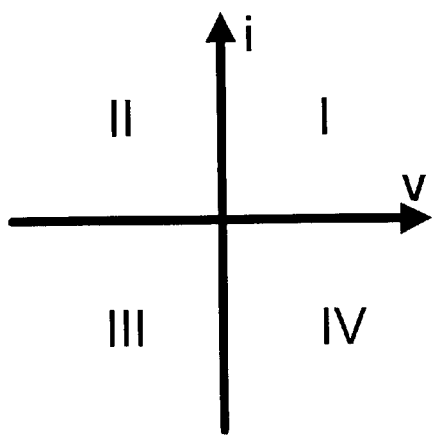
FIG. 6c shows one possible realization of this switch with two MOSFET devices.

When the ideal switch (FIG. 6a) is closed (turned-ON) it is capable of conducting current of either direction, and when the ideal switch is open (turned-OFF) it is capable of blocking voltage of either polarity, thus it operates as a four-quadrant switch as shown by thick lines of (i–v) characteristic in FIG. 6b. However, switching semiconductor devices impose limitation in either the direction of the current flow or the polarity of the voltage blocking capability. For example, the current rectifier (diode) conducts a current in only one direction (rectification direction) and blocks a voltage of only one polarity (FIG. 10c). Thus the diode is an example of an one-quadrant switch. Bipolar transistor is another example of an one-quadrant switch (FIG. 9c).

Figure 6C:
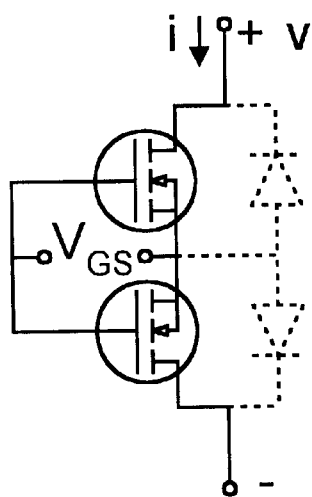

At the present state of the power semiconductor switch technology, the viable semiconductor four-quadrant switch does not exist as a single component, but instead a composite switch must be used, which is comprised of two or more semiconductor switching devices, such as MOSFET transistors and/or diodes. One such practical realization is shown in FIG. 6c, where two N-channel MOSFET devices are put back-to-back, with their source terminals connected together, and with their gate terminals connected together to form an effective four-quadrant switch. In this case, the converter of FIG. 3a would require a total of 8 MOSFET switches for its realization, with even further degradation of efficiency due to conduction losses of extra MOSFET devices. The bipolar transistor version of FIG. 6c would even require 4 devices (2 bipolar transistors and 2 diodes) to emulate the four-quadrant switching characteristic of the ideal switch. The question is whether the converter of FIG. 3a could be built without complex four-quadrant switches, but with simpler switch implementations. Such simpler realization, however, must be capable of implementing the new lossless switching methods introduced with this invention. The following two-quadrant and one-quadrant switch options remain to be investigated.

Figure 7A:
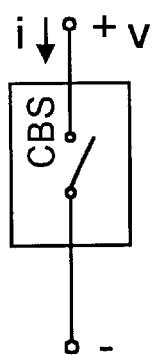
FIG. 7a shows a symbol for the two-quadrant current bi-directional switch (CBS), which conducts current in either direction but blocks the voltage of only one polarity as illustrated in FIG. 7b.
Figure 7B:
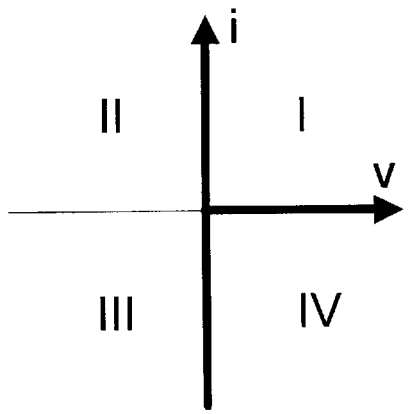
FIG. 7c shows one possible realization of this switch using a single MOSFET device.
Figure 7C:
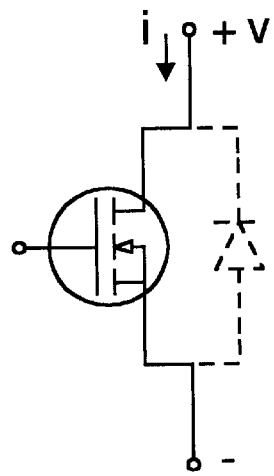

The two-quadrant switch category has two subcategories: Current Bi-directional Switches (CBS) with i–v characteristic of FIG. 7b and Voltage Bi-directional Switch (VBS) with i–v characteristic of FIG. 8b. The Current Bi-directional Switch is depicted with a symbol in FIG. 7a, with a rectangular box around an ideal switch symbol marked CBS to clearly delineate the limitation in its operation as a Current Bi-directional Switch (thick lines along boundaries of quadrants I and IV) as shown in FIG. 7b: when switch is closed it can conduct current in either direction, hence the name current bi-directional switch, and when the switch is open it can block the voltage of only one polarity. It is interesting to observe, that a single MOSFET switch shown in FIG. 7c, which is normally expected to operate as a single-quadrant switch just as its bipolar transistor counterpart would, actually operates as a two-quadrant switch for two reasons:

a) due to its particular semiconductor implementation, the MOSFET switch has a built-in parasitic (body) diode drawn in dotted lines in FIG. 7c, which provides the path for the current opposite to the Drain-to-Source current of the MOSFET;

b) a MOSFET switching device is inherently current bi-directional, since the channel can conduct the current of either direction. The second feature is, in fact, used in most low voltage applications to eliminate large conduction losses due to the body-diode, by directing the current through the low ON-resistance MOSFET conducting channel, which by-passes the body-diode conduction in this so called synchronous rectifier implementation of the MOSFET.

Figure 8A:
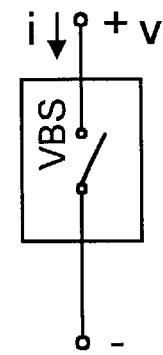
FIG. 8a shows a symbol for the two-quadrant voltage bi-directional switch (VBS), which blocks the voltage of either polarity, but conducts the current in only one direction as illustrated in FIG. 8b.
Figure 8B:
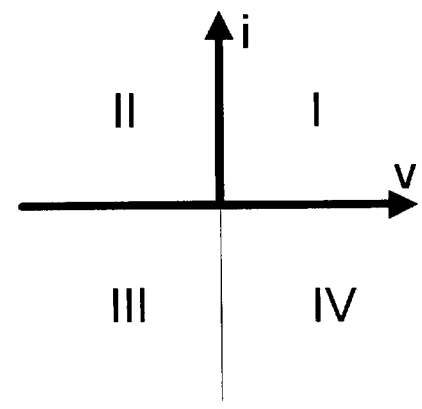
FIG. 8c shows one possible realization of this switch using a single MOSFET device in series with rectifier diode.
Figure 8C:
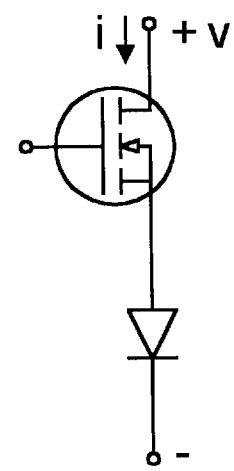

The Voltage Bi-directional Switch (VBS) is depicted with the symbol of FIG. 8a, which also operates as a two-quadrant switch as represented by thick lines, but along the boundaries of quadrants I and II as shown in FIG. 8b: when the switch is closed it can conduct current in only one direction, and when the switch is open it can block the voltage of either positive or negative polarity. In its practical implementation in FIG. 8c, it consists of a composite switch comprising a series connection of two devices: a MOSFET switch and a current rectifier (diode). Note that the addition of the diode provides now the voltage bi-directional feature of the composite switch, but at the same time limits the otherwise current bi-directional feature of the MOSFET to a single current direction. Clearly, such a Voltage Bidirectional Switch (VBS) will have higher conduction losses since it consists of a series connection of two physical devices, each one having its own conduction losses, with the diode dominating the total conduction losses.

In some practical implementations, the Voltage Bidirectional Switch can be replaced with already shown composite switch of two back-to-back MOSFETs in FIG. 6c, which is really a true four-quadrant switch since it is simultaneously a Voltage Bidirectional Switch as well as a Current Bidirectional Switch. The advantage of such implementation is in reduced conduction losses compared to VBS switch of FIG. 8c comprising MOSFET-diode series connection. This is why in the later section on Detailed Lossless Switching Operation, such two MOSFET transistor implementation was used for VBS output switch.

The one-quadrant, switch category has two basic subcategories: One-quadrant Active Switch category with i–v characteristic of FIG. 9b and the One-quadrant Pavsive Switch category with the i–v characteristic of FIG. 10b. The one-quadrant active switch is shown with the symbol of FIG. 9a with Roman numeral I inside the rectangular box. Bipolar transistor as a three-terminal active and controllable switch of FIG. 9c is example of such one-quadrant switch. One-quadrant passive switch is shown with the symbol of FIG. 10a with Roman numeral II inside the rectangular box. Simple diode rectifier of FIG. 10c is an example of such second-quadrant switch which is a two-terminal passive switch, whose state (ON or OFF) depends on the voltage and current at its terminals and not on the controlling signal as in controllable active switches, such as MOSFET or bipolar transistors.

Minimum Lossless Switching Converter Realization

In principle, each of the four switches in the converter of FIG. 3a, can, instead of complex four-quadrant switches, be implemented with any of the four available simpler options: two quadrant CBS or VBS switches and/or one-quadrant active bipolar transistor or passive diode switch implementation. This leads to 256 possible distinct converters with simplified switch implementation. Due to fundamental power conversion principles, the main input switch cannot be a passive switch, which eliminates the diode alternative and leaves only three choices for the input switch. If the same is assumed for the complementary input switch, this still leaves a large number of 144 different converter configurations depending on particular simplified physical switch implementation. However, the subsequent analysis of the operation of the converter in FIG. 3a, and, in particular, switch implementations still capable of delivering the efficiency benefits of the new lossless switching methods, results in the following minimum switch requirements:

1. Input switch $S_1$ is at minimum the one-quadrant active switch with the i–v characteristic in FIG. 9b, hence could be implemented as bipolar transistor.

2. Complementary input switch $S'_1$ is at minimum the two-quadrant CBS switch with i–v characteristic of FIG. 7b (the current through that switch is AC), hence could be implemented with single MOSFET.

3. Complementary output switch S'₂ is at minimum the one quadrant passive switch with i–v characteristic of FIG. 10b, hence a simple diode rectifier implementation is sufficient.

4. Output switch S₂ is at minimum the two-quadrant switch with i–v characteristics of either CBS switch of FIG. 7b or VBS switch of FIG. 8b, hence can be implemented as either CBS switch (single MOSFET) or as VBS switch (MOSFET in series with diode). This switch implementation as controllable two-quadrant switch is crucial for the novel lossless switching operation and high conversion efficiency.

Of course, the above minimum switch realization is not necessarily the most practical realization. For example, at high switching frequencies, the MOSFET switches are preferred, thus without adding any extra complexity, the input switch S₁ is also implemented as a single MOSFET transistor.

Although the complementary output switch S'₂ at minimum could be just a simple diode rectifier, this switch is also preferred to be implemented as a MOSFET switch operating as a synchronous rectifier and thus used also to by-pass conduction through its parasitic body-diode with the conduction through the lower conduction loss MOSFET channel. This is particularly important for the low output voltage applications, in which this will further increase overall efficiency.

Finally, the output switch is implemented as either CBS or VBS switch also with MOSFET devices. As CBS switch, this MOSFET switch unlike MOSFET for complementary output switch, will not operate with timing of synchronous rectifier switch, but subject to the unique switching time control as described later. Similarly, when implemented as a VBS switch (with either MOSFET/diode composite switch of FIG. 8c or as two-MOSFET composite switch of FIG. 6c, which reduces conduction losses) it will also be subject to unique lossless switching time control as explained in more detail later.

Practical Lossless Switching Converter Realization

Out of more than 144 distinct converter possibilities, the following two basic configurations emerged as most attractive practical alternatives featuring novel lossless switching operation:

1. The converter in FIG. 11a in which all four switches are Current Bi-directional Switches;
2. The converter in FIG. 11b in which the output switch S₂ is implemented as a Voltage Bi-directional Switch (VBS) and the remaining three switches are Current Bi-directional Switches.

Figure 11A:
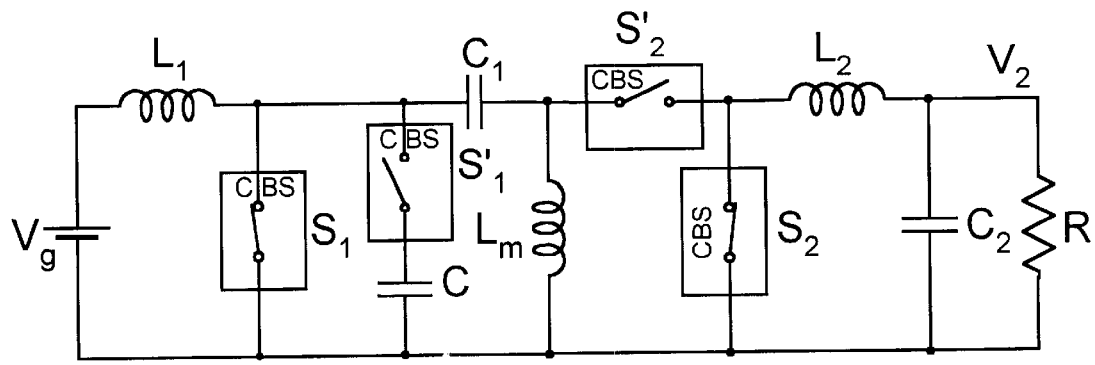
FIG. 11a shows a circuit diagram of the present invention in which, input switch $S_1$, complementary input switch $S'_1$, output switch $S_2$, and a complementary output switch $S'_2$ are implemented as Current Bi-directional Switches (CBS)
Figure 11B:
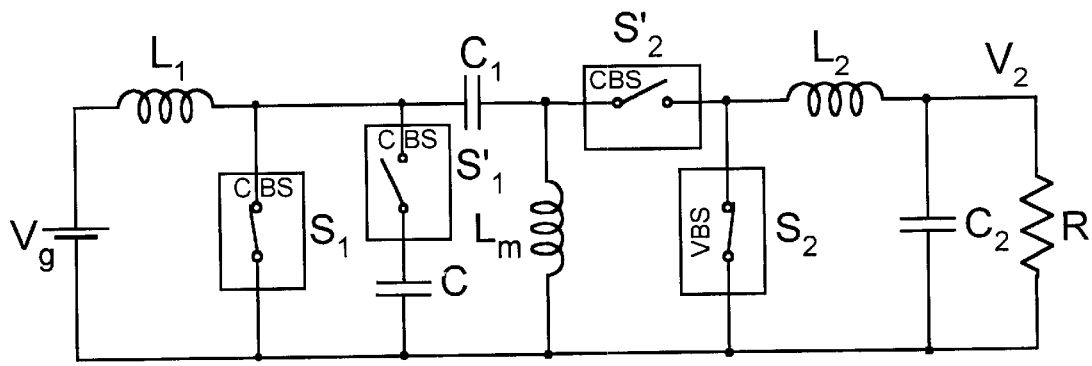
FIG. 11b shows the output switch $S_2$ of FIG. 11a implemented as a Voltage Bi-directional Switch (VBS) and FIG. 11c shows the output switch of FIG. 11a and FIG. 11b replaced with a symbol with CBS/VBS designation inside the rectangle around ideal switch meaning that either CBS or VBS switch could be used.
Figure 11C:
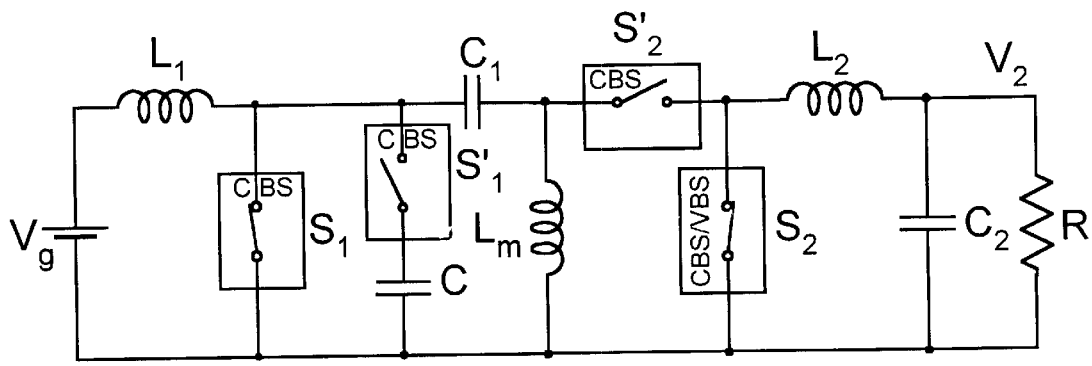

Both converters of FIG. 11a and FIG. 11b can be conveniently represented in the compact form of the converter in FIG. 11c in which the output switch S₂ represents either CBS or VBS switch. Thus, a special symbol shown in FIG. 11c is used to designate this: a rectangle around an ideal switch together with the CBS/VBS designation inside the rectangle. Hence all later variations of FIG. 11c imply that either the variant of FIG. 11a or the variant of FIG. 11b is applicable subject to appropriate switching time control as described in more detail later. All later variations of FIG. 11c also assume even simpler implementations with diode rectifier as a complementary output switch.

Figure 11D:
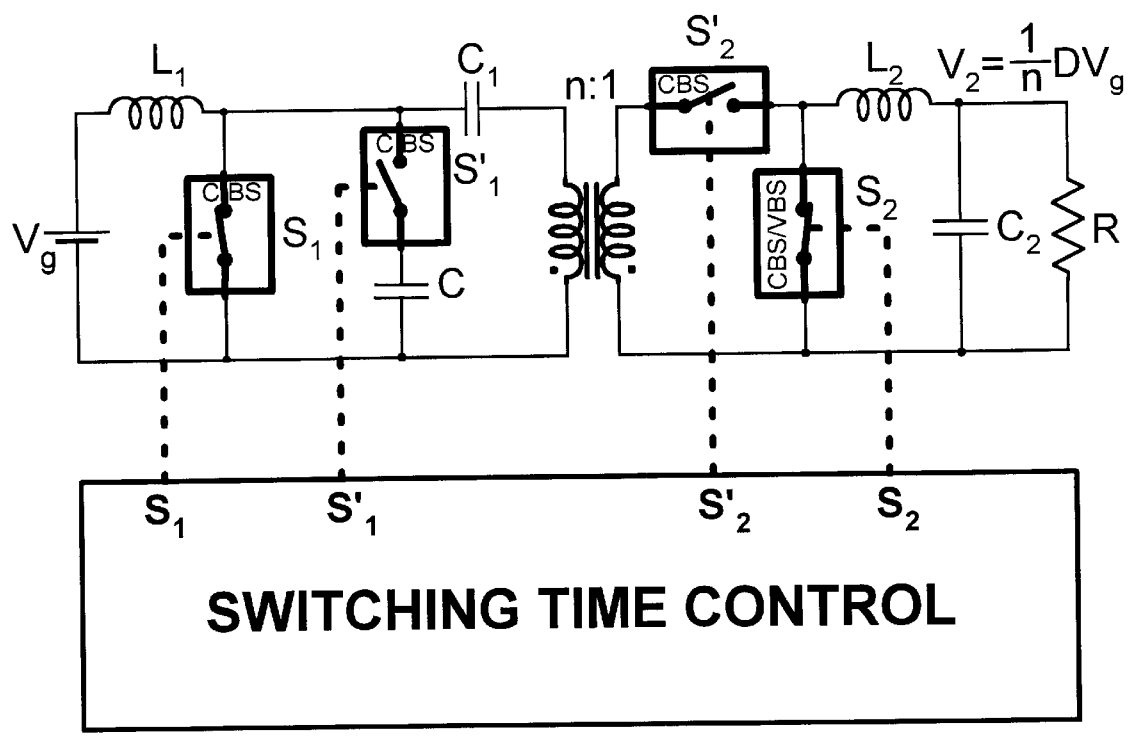
FIG. 11d illustrates the present invention with the components highlighted in thick lines: isolation transformer with its leakage inductance, active switch implementation for output switch and very specific switching time control.

In addition to the proper type of the switching device used for the output switch, the switching time control is even more important and is represented in FIG. 11d with a Switching Time Control Box, which provides the desired drive signals for all four switches. This figure also shows the isolated version obtained by simply replacing the middle inductor in FIG. 11c with an n:1 isolation transformer. The Switching Time Control Box, the output switch and the isolation transformer are thus shown in thick lines in FIG. 8 to emphasize the special role they play in the lossless switching.

Lossless Switching Configuration with CBS Switch

Figure 12A:
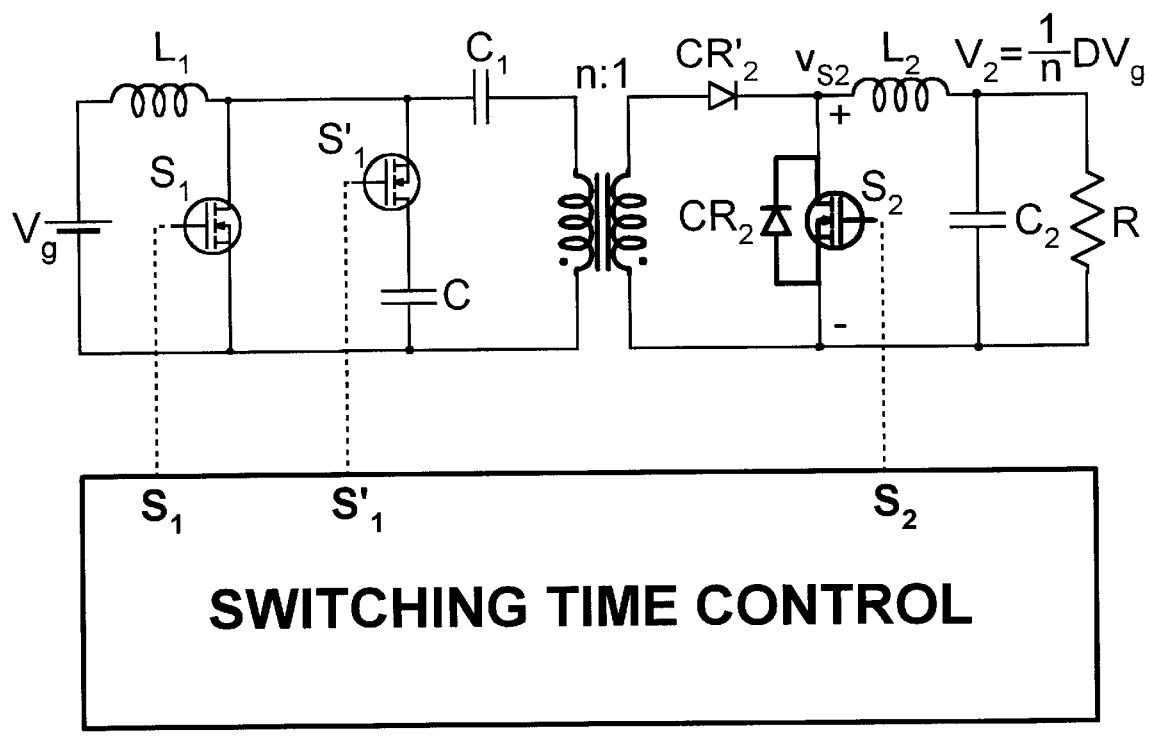
FIG. 12a shows the specific implementation of FIG. 8d with rectifier diode for complementary output switch and three CBS switches.

The general lossless switching configuration of FIG. 11d is shown in FIG. 12a in one of its simplest implementations with 3 (three) MOSFET switches and a diode. The switching time control for the switches for the difficult to achieve D' to D lossless switching transition (transition from state with complementary switches being ON to state in which complementary switches are OFF) is highlighted in FIG. 12b in thick lines to emphasize the timing pattern during the enlarged transition interval, which is only on the order of 100 ns in comparison with the total switching period of $T_S$=5,000 ns, for 200 kHz switching frequency.

Figure 12B:
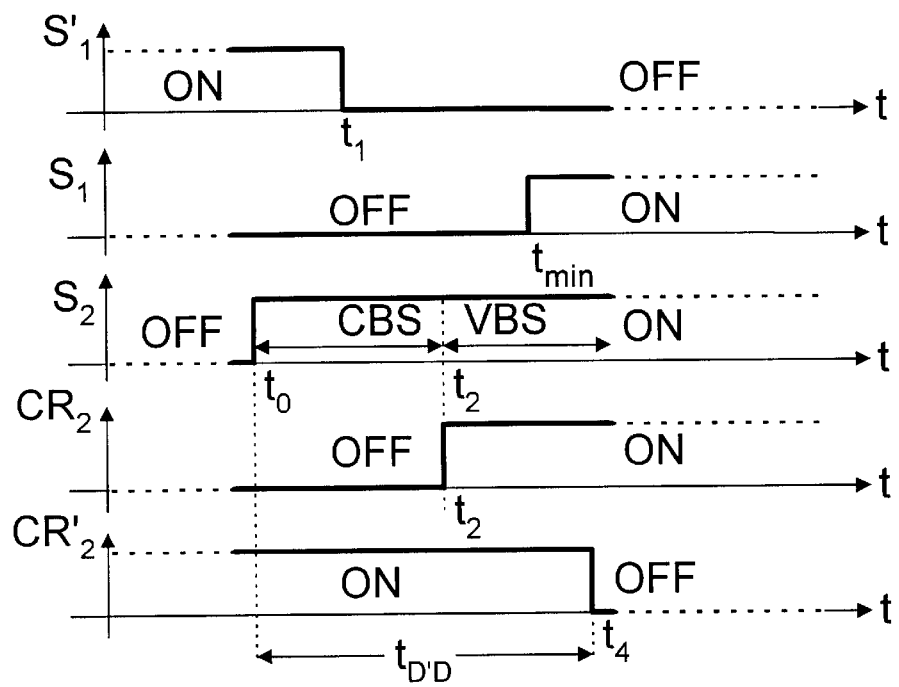

MOSFET switches are used for input switch S₁ and complementary input switch S'₁ with the switching time for D' to D transition as shown in FIG. 12b providing some "dead-time" interval during which both switches are OFF. The complementary output switch is shown implemented by a diode CR'₂ to emphasize the fact that for this switch no special switching time control is needed for proper lossless switching operation. Thus, turning ON and OFF of this diode switch will be dictated by the converter circuit states: positive voltage across the diode terminals will turn it ON, and negative voltage or zero current through the diode switch will turn it OFF. As seen in FIG. 12b this CR'₂ diode turns OFF at instant t₄ after the input switch is turned ON. Thus, if instead of diode, the MOSFET transistor is used for the complementary output switch, the MOSFET will be used solely as synchronous rectifier to bypass its own body-diode during its conduction interval with the same switching time as for CR'₂ diode in FIG. 12b. Instant t₄ will there signify the latest instant at which such MOSFET complementary output switch must be turned OFF.

Finally, the output switch is shown in thick lines in FIG. 12a as consisting of a MOSFET switch controlled by its switching time control signal S₂ in parallel with its body-diode designated CR₂. Although the body-diode is an integral part of every MOSFET as was shown in FIG. 7c, it is separately highlighted here as diode CR₂, since the timing of the switching of this diode as shown in waveform CR₂ of FIG. 12b is particularly important for the understanding of the novel lossless switching mechanism. If the diode CR₂ were used alone for the output switch as in FIG. 4a, it would be turned ON by the converter operation at instant t₂ as seen by the waveform for diode CR₂ in FIG. 12b. It is the turning-ON of the controllable output switch S₂ relative to this instant t₂ (before or after instant t₂), which is critical for the operation of the novel lossless switching methods.

When used as synchronous rectifiers, the MOSFET transistors are turned ON and OFF at the same instants at which their internal body-diodes would be turned ON and OFF in response to the converter circuit conditions. For example, when the converter operation results in a positive voltage across the body-diode, the respective body-diode will turn-ON, and when the converter operation results in a current through body-diode decreasing to zero, the body-diode will turn-OFF. Thus, it appears that nothing could be gained by turning the MOSFET switch ON or OFF at times other than those dictated by its own body-diode. This conventional wisdom has caused and limited the use of the MOSFETs in prior-art soft-switching converters as only synchronous rectifiers. While such implementation does help to lower conduction losses of the body-diodes of the MOSFET switches, this does absolutely nothing toward reduction of switching losses. Thus, a very specific switching time control of the MOSFETs relative to their body-diode switching is needed to bring about novel lossless switching operation.

It is true that turning OFF the MOSFET before its body-diode was turned OFF by the converter circuit makes no difference to the operation of the converter: that particular switch will be ON due to body-diode conduction regardless of the switching time control applied to that MOSFET switch. In fact, this is precisely why only $CR'_2$ is used for a complementary output switch since separate switching time control of the complementary output switch during the D' to D transition would not make any difference to lossless switching operation of the converter in FIG. 12a.

What has not been recognized in the prior-art switching converters is that turning ON of the MOSFET (CBS) output switch by independent switching drive control before its body-diode turns ON is crucial for effective and heretofore unachievable lossless switching performance. In a clearly distinct departure from all previous soft-switching methods, the output MOSFET switch $S_2$ of FIG. 12a is deliberately turned-ON prematurely at instant to before its body-diode would turn-ON at instant $t_2$ and in some cases as in FIG. 12b even before the complementary input switch $S'_1$ is turned-OFF at instant $t_1$. This results in extremely effective resonant discharge of the input switch parasitic capacitance during the D' to D transition, which is not attainable by prior-art soft-switching methods. Using previous numerical example, 8.4W switching losses would be eliminated and efficiency increased by 7.8%.

In the converter with two diode rectifiers as in FIG. 4a, there is only one particular instant $t_2$ at which the diode rectifier $CR_2$ is turned-ON. To the contrary, with the MOSFET as output switch $S_2$ as in FIG. 12a, there is a wide range of time between instant to and instant $t_2$ (designated as CBS in FIG. 12b) within which the MOSFET output switch $S_2$ can be turned-ON resulting in lossless switching performance and much improved efficiency. Finally, since the controllable output switch $S_2$ could be turned-ON before instant $t_2$ with such good results, it is natural to ask if it could be turned-ON after instant $t_2$ with equally beneficial lossless switching performance. The answer is affirmative, but it will require different type of the output switch, the VBS switch of FIG. 13b or FIG. 14a and the different switching time control of FIG. 14b. However, before the operation with VBS switch is discussed in next section, the bipolar transistor implementation of both versions is introduced next.

Figure 13A:
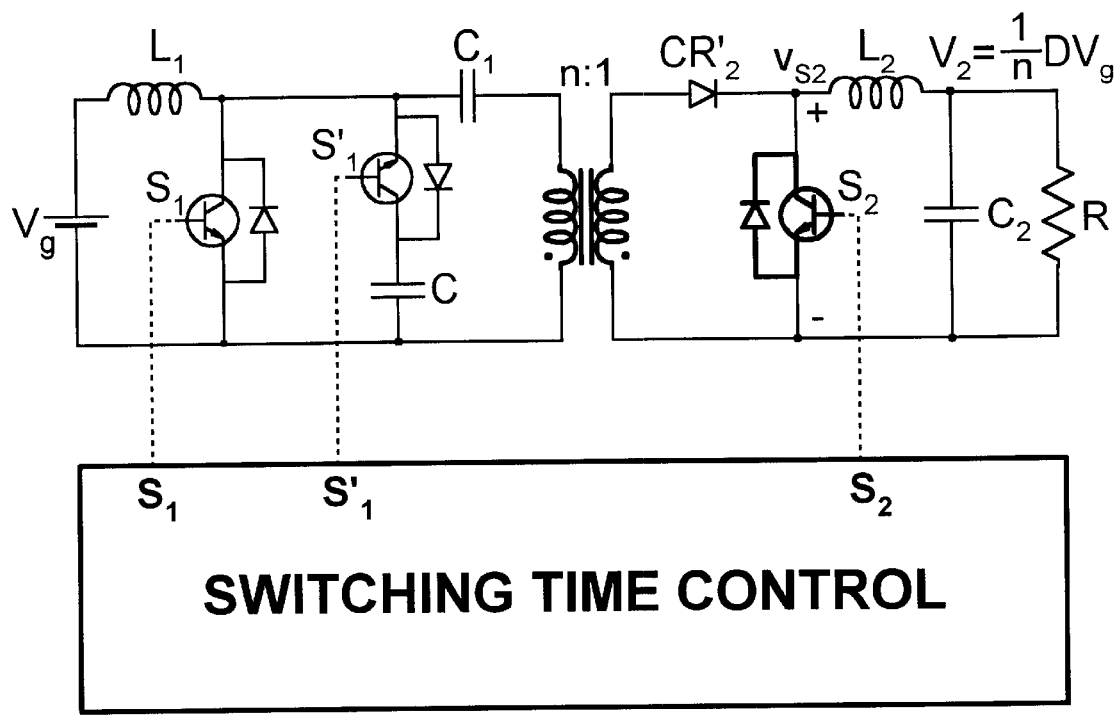
FIG. 13a shows the realization with bipolar transistors and diodes replacing the two input MOSFET transistors of FIG. 12a and with the same lossless switching time control of FIG. 12b.
Figure 13B:
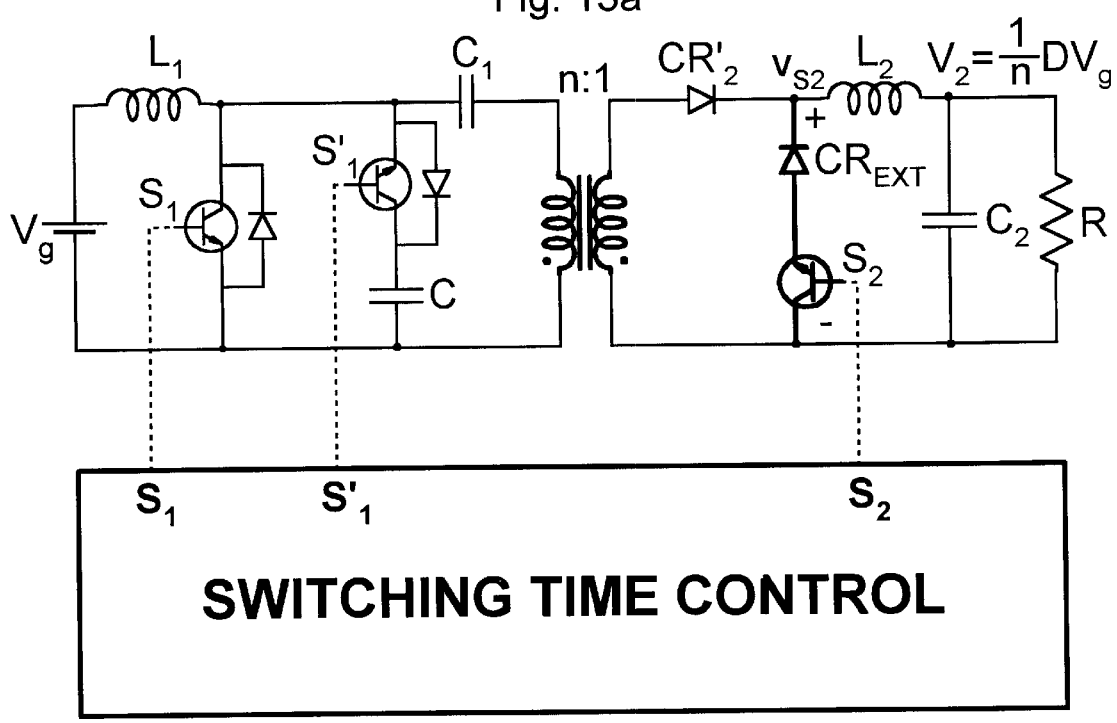
FIG. 13b shows the specific realization of the converter in FIG. 13a with the VBS output switch.

An alternative realization in which the MOSFET transistors in FIG. 12a are replaced with composite bipolar-transistor/diode switches is shown in FIG. 13a for which the same switching time control of FIG. 12b is applicable. The disadvantage of this implementation is that now each CBS switch is a composite switch consisting of bipolar transistor and an external diode (two devices) instead of a single MOSFET switch used previously. Furthermore, the beneficial feature of a MOSFET, which bypasses its body-diode to reduce further conduction losses is also lost. Nevertheless, this points out that the CBS switches of any type are the only requirement. Thus, for example, in addition to shown realization with MOSFET transistors or bipolar transistors, those skilled in the art can easily find implementation with other controllable active semiconductor or other switching devices, which are made to operate as CBS switches, such as using GTO (Gate Turn-OFF) device, IGBT (Insulated Gate Bipolar Transistor) transistor, SCRs (thyristors), or other controllable CBS switching devices.

Lossless Switching Configuration with VBS Switch

Figure 14A:
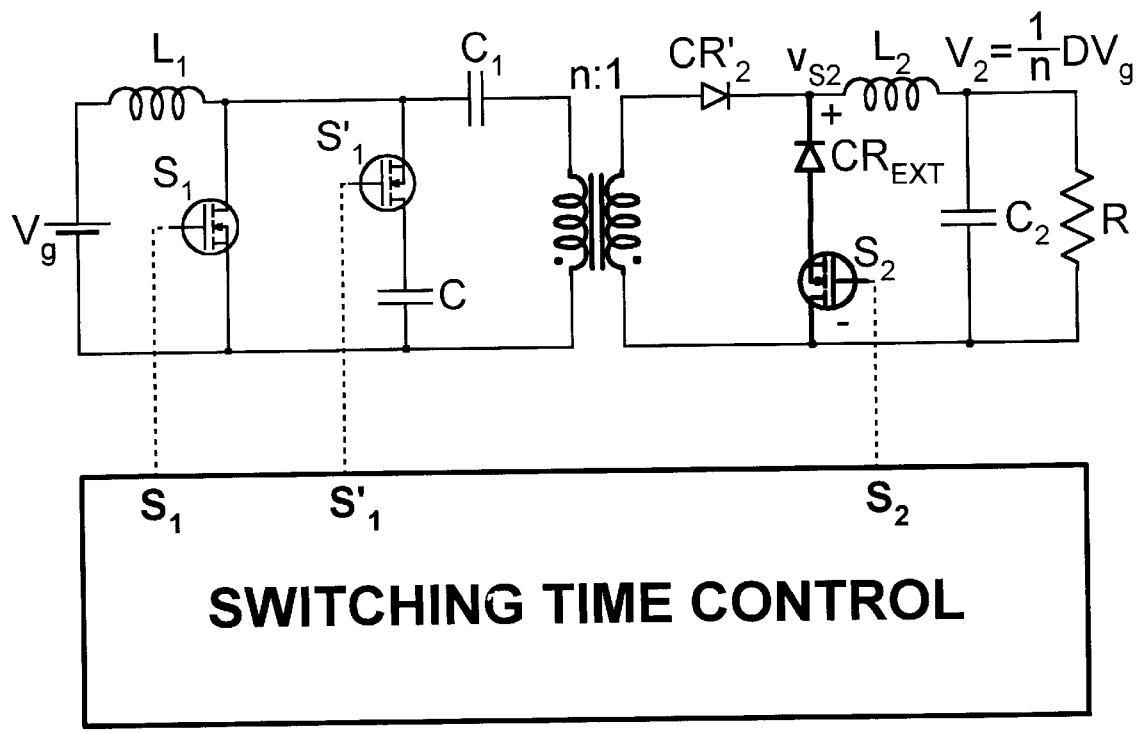
FIG. 14a shows the implementation of converter in FIG. 13b but using MOSFET transistors instead of bipolar transistors.

The proper switching time control of CBS output switch has clearly extended the range of that switch's beneficial operation to interval from instant $t_0$ to $t_2$ shown in FIG. 12b designated as CBS interval. However, beyond instant $t_2$ in FIG. 12b, the same CBS implementation with its diode in parallel prevents reversal of the voltage polarity across that switch and clamps it to zero volts, hence no further beneficial use of the switching time control of that active switch is possible. While that is true for a CBS switch this is not the case for the VBS output switch implementation with bipolar transistor in series with diode as in FIG. 13b. Note that the voltage $v_{S2}$ across output switch is not any more clamped at $t_2$ down to zero, but is in fact, allowed to go negative, so that the bipolar transistor could be turned ON after instant $t_2$ as seen in thick lines of $S_2$ waveform of FIG. 14b. The alternative output switch implementation with MOSFET transistor and diode is shown in FIG. 14a uses the same switching time of FIG. 14b and results in same additional MOSFET advantages outlined above.

The lossless switching with VBS switch has several unique advantages:

1. It is independent of the operating point;
2. It is achieved for any combination of the input DC voltage and output DC load current;
3. Does not need the addition of any extra components such as resonant inductors, thus, it is equally effective even if the isolation transformer has a very small leakage inductance (tightly coupled transformer).

Figure 14B:
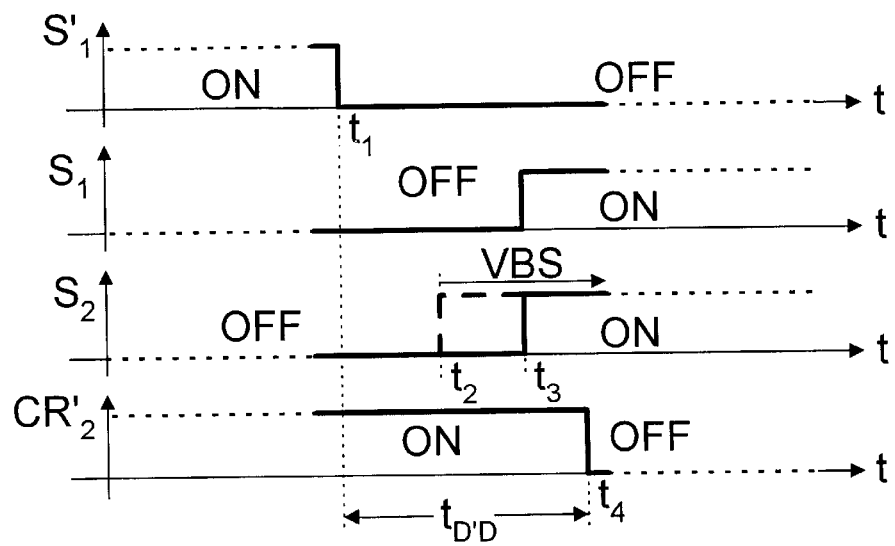

The detailed account of several variants of this lossless switching type, which relies on the VBS switch implementation for output switch and switching time control as in FIG. 14b is presented in section Elimination of Switching Losses.

Hard-switching and Lossless Switching Experimental Comparison

The conventional hard-switching and novel lossless switching performance of the D' to D transition are compared experimentally on a 400V to 5V, 20A switching DC-to-DC converter operating at a fixed 200 kHz switching frequency (5 µs switching period $T_S$) and 50% duty ratio D. In the above comparison, the D to D' transition was kept lossless by proper switching time control. On the other hand, the D' to D transition was in one case made hard-switched with the simple switching time control of FIG. 15b, and in the other case, it was made lossless with the specific switching time control of FIG. 16b.

Figure 15A:
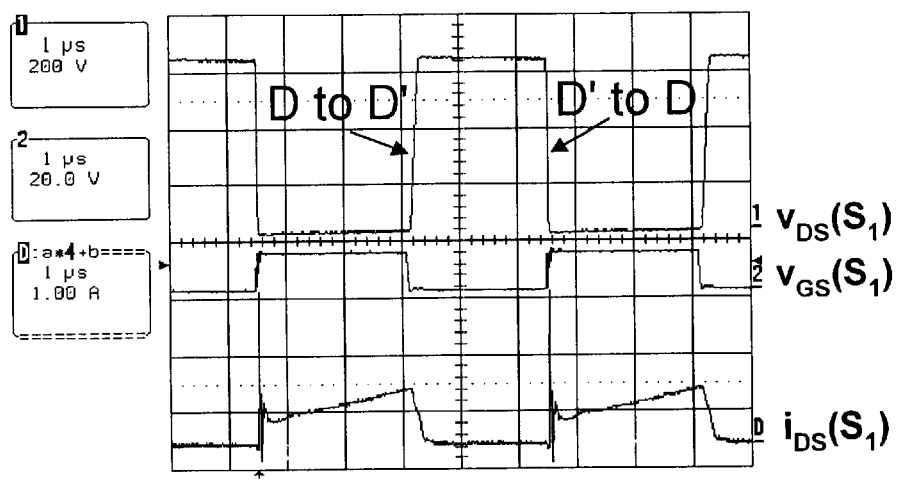
FIG. 15a shows the waveforms of the experimental converter with hard-switched D' to D transition shown at 1000 ns/div time scale.
Figure 15B:
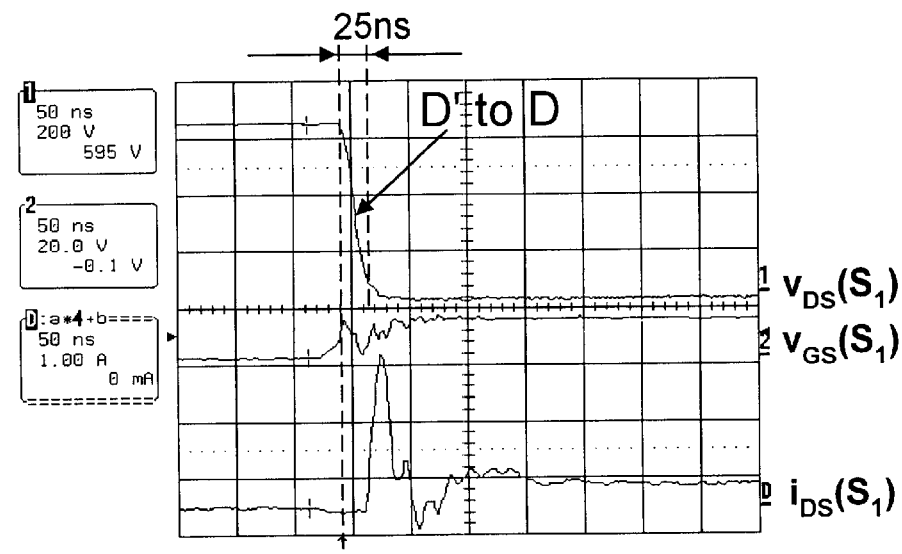
FIG. 15b shows the expanded view of the D' to D transition of the waveforms in FIG. 15a with a time scale of 50 ns/div and corresponding hard-switching time control.
Figure 15B:
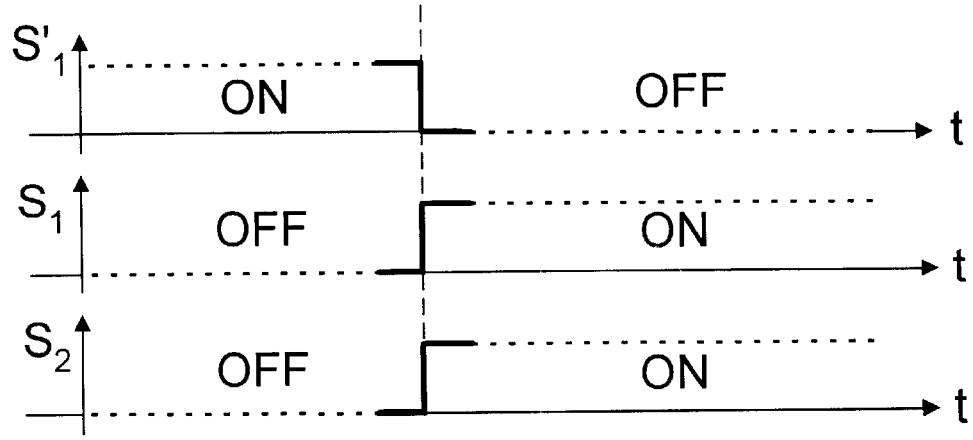
Figure 16A:
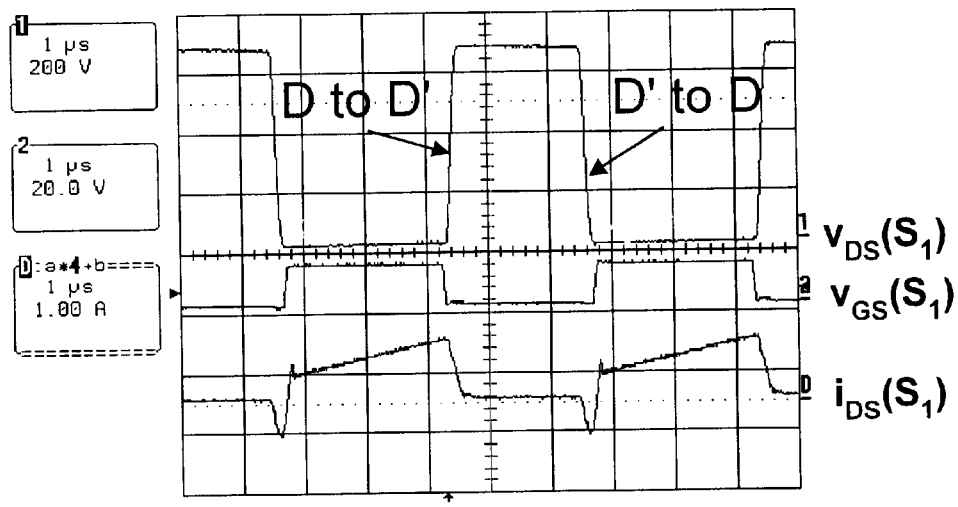
FIG. 16a shows the waveforms of the experimental converter with the novel lossless switching D' to D transition at 1000 ns/div time scale.

From the experimental voltage waveforms of the drain-to-source voltage of the input switch shown in FIG. 15a for a hard-switched version and in FIG. 16a for the novel lossless switched version of the new converter, one could hardly tell the difference between their D' to D transition intervals because of the large and coarse time scale of 1 µs per division. However, once the time scale is expanded 20 times to 50 ns per division (D' to D transitions of FIG. 15b and FIG. 16b), and the input switch gate voltage and input switch drain current are also observed, the dramatic differences are obvious. The lossless switching D' to D transition in this experimental example is made by using the CBS switch as output switch and switching time control of FIG. 16b, which results in the most effective resonant discharge of parasitic capacitors.

The hard-switching of FIG. 15b is the consequence of the simple hard-switching time control: simultaneously with turning OFF the complementary input switch (and complementary output switch), the input switch and the output switch are turned ON. For simplicity, complementary output switch timing control is not shown since turning-ON of input switch $S_1$ forces the diode rectifier $CR'_2$ to turn OFF simultaneously. The gate-to-source voltage waveform of input switch $V_{GS}(S_1)$ shows that the input switch is turned ON at its maximum blocking voltage of $V_C$=595V resulting in hard-switching losses of 8.4W. Despite high switching speed of the input switch which is completely turned ON after only 25 ns, the uncontrollable D' to D transition results in another drawback: high current spike noise which is 3 times higher than even the peak switch current at fill load as seen from input switch drain-to-source current $i_{DS}(S_1)$. This results in high EMI noise in addition to large switching losses.

Figure 16B:
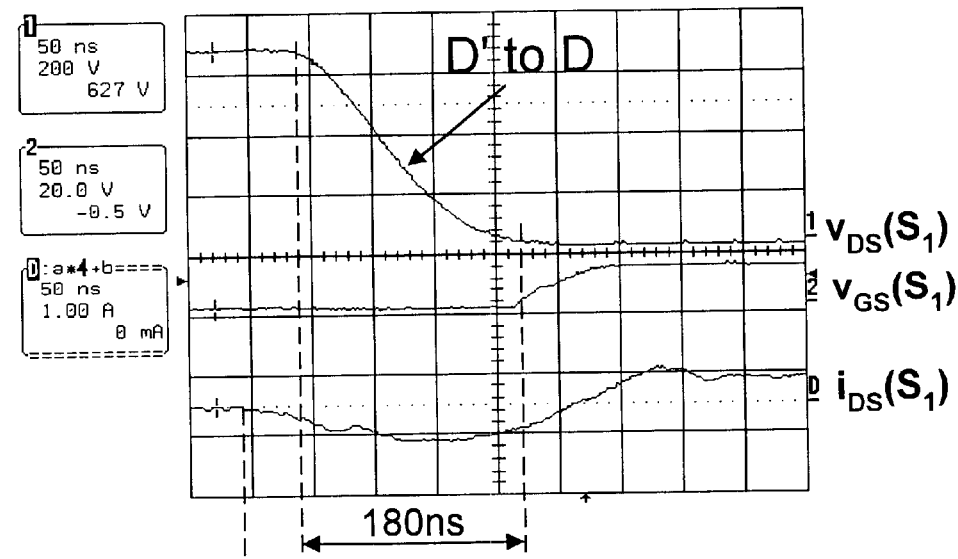
FIG. 16b shows the expended view of the D' to D transition of the waveforms in FIG. 16a at a time scale of 50 ns/div and corresponding lossless switching time control.
Figure 16B:
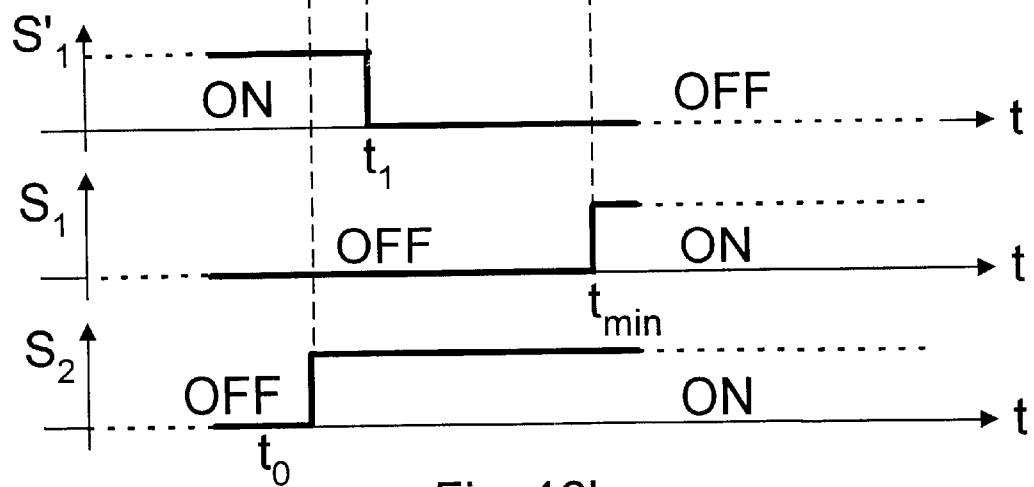

The lossless switching experimental waveforms of FIG. 16b are result of the more complex switching time control pattern of FIG. 16b. Note how the input switch gate-to-source voltage goes "high" (turning ON that MOSFET device) at the instant when the voltage across the input switch is already reduced to zero, thus resulting in complete elimination of switching losses due to parasitic capacitances. This was also confirmed by measurement of losses and corroborated with the low temperature rise on the input switch. Furthermore, the input switch current $i_{DS}(S_1)$ has now no overshoot and is very smooth with no spikes resulting in much improved EMI noise due to extended D' to D transition time from 25 ns in hard-switched case to 180 ns in a lossless switching case Thus, the uncontrolled, erratic, noisy and lossy hard-switched transition is replaced by a well-controlled, predictable, smooth and efficient lossless switching D' to D transition by use of the CBS output switch with the proper switching time control of FIG. 16b.

This example clearly points out the importance of the correct switching time control pattern of controllable MOSFET switches during short D' to D transition interval of 200 ns which is only 0.4% of the total switching period of 5 $\mu$s. It is thus, the proper sequence of switching the controllable CBS switches during the short transition interval, which results in substantial performance improvements. Similar precise switching time control is also implemented during the D to D' transition to result in the lossless switching performance of that transition as well. However, the detailed timing of that transition is left for analysis in later section.

Hard-switching vs. Lossless Switching Converter Configuration

The above experimental comparison clearly points out the critical importance of the specific switching time control pattern of controllable switching devices together with the particular type of controllable switch implementations (either CBS or VBS switch) and the proper switch location (such as VBS switch located as output switch), including existence and interconnection of the "parasitic" components such as invisible, but nevertheless present, parasitic capacitances of switching devices, the invisible but also always present parasitic leakage inductance of the isolation transformer, which, all together, enable the novel lossless switching performance.

The underlying hard-switching topology of FIG. 3a together with the hard-switching time control of FIG. 3b, ensures only the steady-state operation of the idealized converter. It is the selection of two configuration with optimum switch implementation (CBS/VBS/diode/transistor) out of 144 possible converter configurations, together with the corresponding optimum switching time control of all active switches (CBS of VBS types), which yields the performance improvements heretofore unattainable with the prior-art soft-switching converters. The built experimental prototypes have confirmed the unmatched lossless switching converter performance: efficiency increase, size and weight reduction by allowing higher operating switching frequencies, EMI noise reduction, components' temperature reduction, reduction of switching component stresses (voltage and/or current overshoots) and through these ultimately much improved reliability.

Steady-state Analysis

Figure 1A:
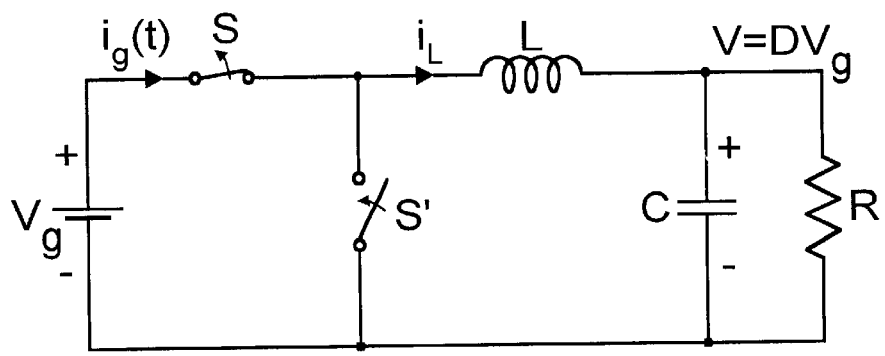
FIG. 1a illustrates prior-art buck converter topology and FIG. 1b illustrates complementary switching of S and S' switches and pulsating input current.
Figure 1B:
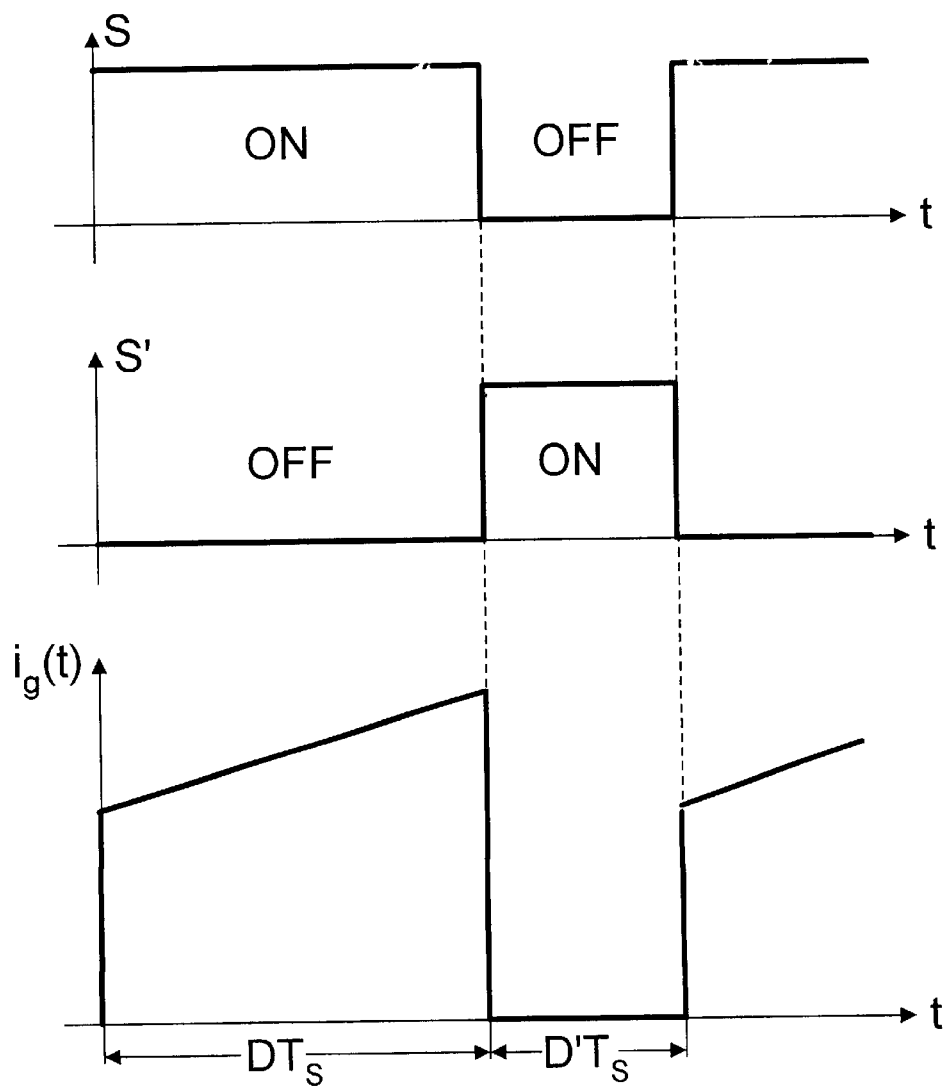

A simple switching converter such as the prior-art buck converter of FIG. 1a was easy to analyze and understand. The new converter even in its simplified form of FIG. 3a is obviously much more complex. As a first step, the existence of steady-state operation must be proved; that is after a number of repetitive switching at constant switching frequency $f_S$, all capacitors in the circuit must be charged to finite DC voltages and all inductors must conduct finite DC currents. Thus, in order to prove the existence of such a steady-state operation, and find the actual DC voltages on capacitors and DC currents in inductors as a function of the duty ratio D, the input voltage $V_g$, and DC load current $I_2$, the state-space averaging method is employed as described in more details in the book "Advances in Switched-Mode Power Conversion", vol. I, vol. II, and vol. III, by S. Cuk and R. D. Middlebrook, or in the technical paper, "A General Unified Approach to Modeling Switching Converter Power Stages", by the same authors and published in Proceedings of Power Electronics Specialists Conference (PESC), June 1976.

Figure 17A:
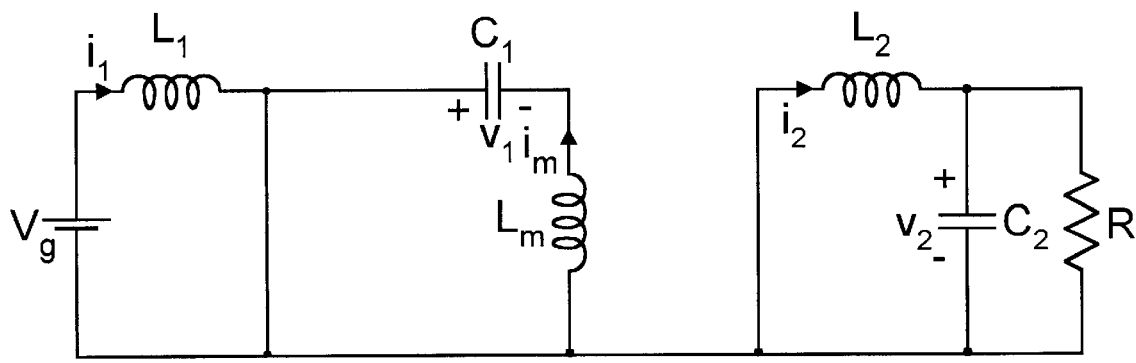
Figure 17B:
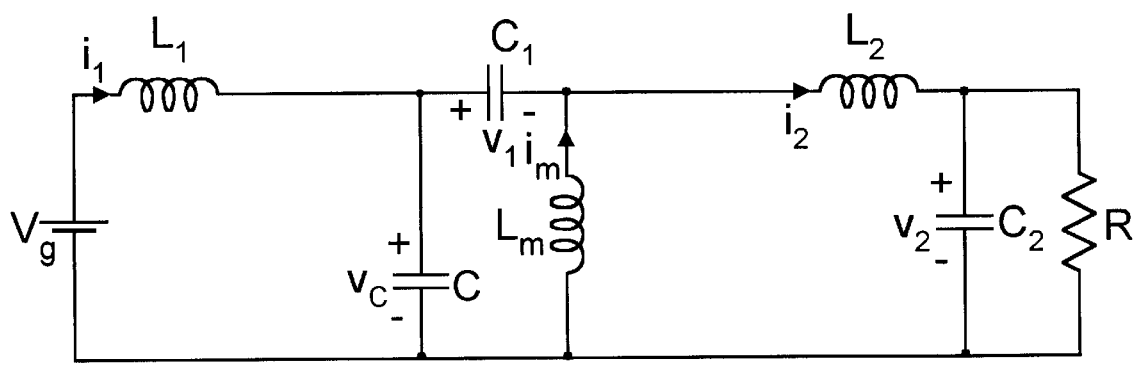

The analysis starts with writing the complete state-space equations for the two switched networks obtained: one for the ON time interval $DT_S$ as shown in FIG. 17a and another one for the OFF time interval $D'T_S$ as shown in FIG. 17b. In both switched networks of FIG. 17a and FIG. 17b, the assumed directions of the inductor currents and polarity of the DC voltages on capacitors are as marked. If the actual calculations result in, for example, DC voltages with a negative sign, then the polarity assumed above is not correct and the opposite DC voltage polarity is the actual capacitor DC voltage polarity. Following the state-space averaging method, the state-space equations are then averaged with respective duty ratios D and D' as the weighting factors and the steady-state criterion imposed equating all derivatives to zero. The resulting five algebraic equations with five unknowns, DC voltages $V_1$, $V_2$, and $V_C$ and DC currents $I_1$ and $I_m$ are then solved in terms of the known quantities, duty ratio D, input voltage $V_g$, and the load current $I_2$ to result in the following steady-state solution:

$$V_1 = V_g \quad V_C = V_g/(1-D) \quad V_2 = DV_g \quad I_1 = DI_2 \quad I_m = (1-D)I_2 \qquad (2)$$

Figure 18:
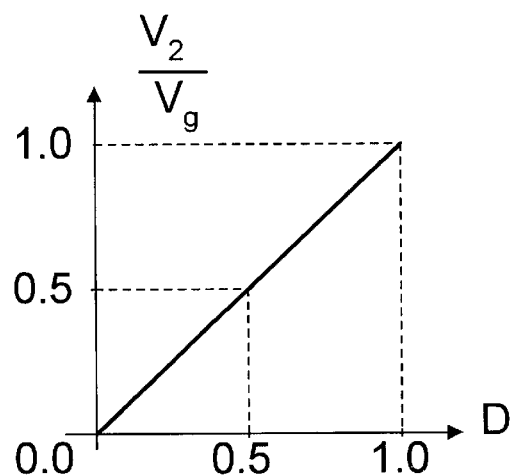

The steady-state solution given by equations (2) also confirms that this converter does have a finite steady-state, as it was also confirmed by building experimental prototypes and verifying the above steady-state conditions. Note also that since all solutions in (2) came out with the positive sign, the directions of the inductor currents and positive polarity of the capacitor DC voltages assumed as in FIG. 17a and FIG. 17b also correspond to their actual current directions and actual DC voltage polarities. Thus, the converter of FIG. 3a is polarity non-inverting and has the same DC conversion ratio as the conventional buck converter, that is $V_2/V_g$=D. This DC conversion ratio is a linear function of duty ratio D as shown in FIG. 18. In many practical applications galvanic isolation between DC input voltage source and output DC load is not required and a simpler non-isolated configuration is often preferred. Furthermore, in applications where such non-isolated converter is adequate, positive input to positive output voltage conversion is most often needed, so that the polarity non-inverting feature of the present invention is also a distinct advantage.

It appears that the present invention has the same limitation as the buck converter that the converter is only capable of the step-down conversion and could not provide a voltage higher than the input DC voltage. This is, however, not the case, and this constraint will be later removed by the introduction of the isolated extension of the present invention as well as the autotransformer extension.

Figure 19A:
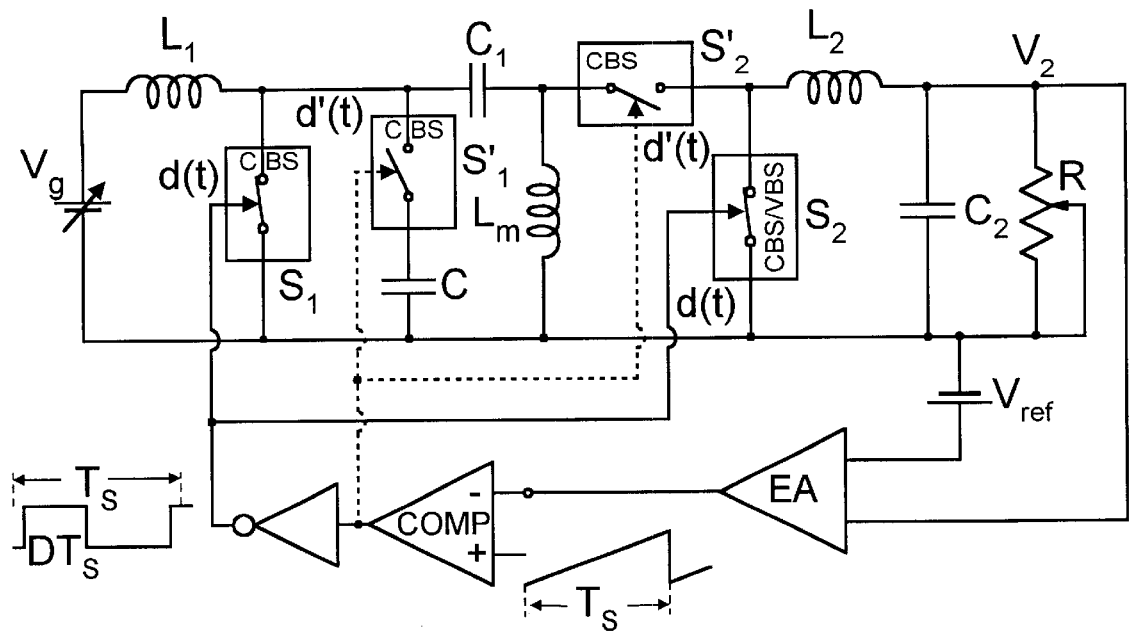
FIG. 19a illustrates a closed loop regulator for the converter of FIG. 11c.
Figure 19B:
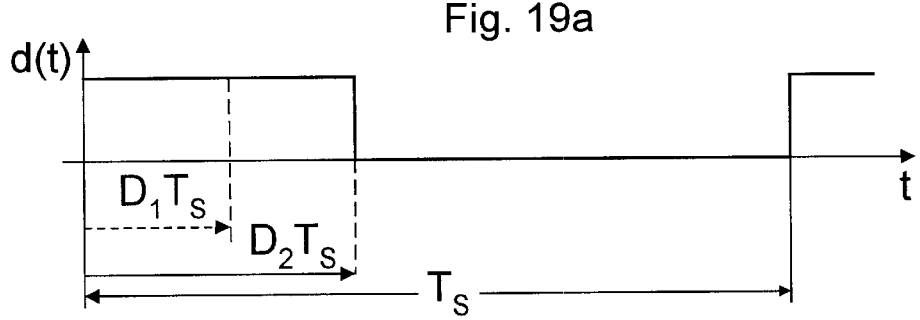
FIG. 19b shows the variable duty ratio D provided by electronic control for the regulation of the output DC voltage of the converter in FIG. 11c.

In most practical applications, the output voltage is required to be regulated and kept constant despite a large variation of the input DC source voltage and a large variation of the output DC load current. Both of these variations can be absorbed and the output voltage regulated by closing the conventional feedback control loop around the DC-to-DC converter to obtain a regulated DC supply as in FIG. 19a. The feedback control loop modulates the duty ratio D shown in FIG. 19b as needed to provide the regulated output voltage. Thus, it is important that the switching converter operation and its key features are effective over the wide range of operating duty ratio D such as, for example, from D=0.33 to D=0.66 for a 2:1 input DC voltage range.

The three fundamental properties of the present invention described below are indeed preserved over the full operating range.

Three Fundamental Properties

First Property: Relationship Among DC Currents of the Three Inductors

From the two DC current equations in (2) one can derive easily a very simple and most remarkable relationship among the three DC inductor currents, which is at the root of the unique performance of this converter. Namely by adding DC currents of the input inductor $I_1$ and the middle inductor $I_m$ from (2) we obtain this key relationship among input inductor, middle inductor and output inductor DC currents:

$$\text{First Property: } I_1 + I_m = I_2 \tag{3}$$

A quite unexpected result is obtained: the fundamental relationship (3) is independent of the operating duty ratio D, even though both the input inductor DC current $I_1$ and middle inductor DC current $I_m$ are each strongly dependent on operating duty ratio D as per (2). Note also the essential role played by the middle inductor, which provides just the needed duty ratio dependent DC current so that relationship (3) would hold true for any duty ratio D. Without the recognition of this relationship the novel lossless switching methods introduced later could not be made.

Second Property: AC Ripple Current Only in Auxiliary Capacitor

Figure 20:
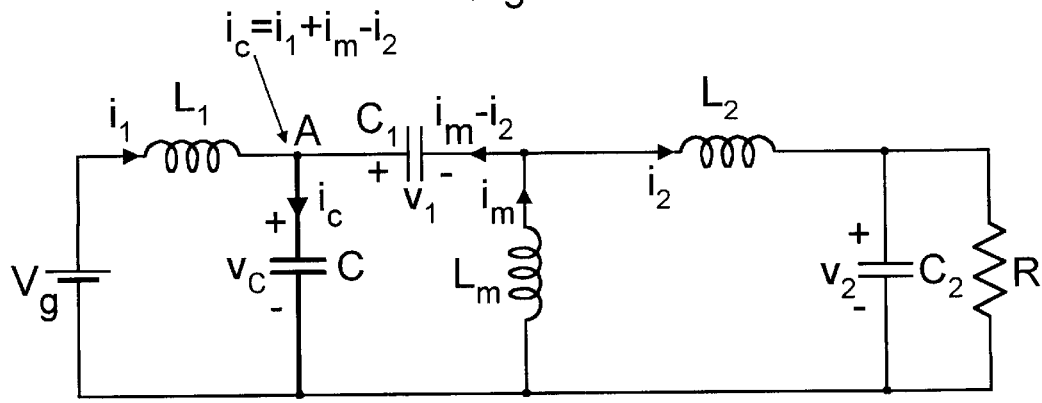

This very unique and crucial relationship can also be verified in an alternative and simple way by just inspection of the switched-network during complementary OFF time interval $D'T_S=(1-D)T_S$ displayed in FIG. 20. The summation of the instantaneous currents (both DC currents and superimposed AC ripple currents) at the node A in FIG. 20 leads to the instantaneous auxiliary capacitor current $i_C(t)$ expressed in terms of the three inductor currents $i_1$, $i_m$ and $i_2$ as:

$$i_C(t) = i_1(t) + i_m(t) - i_2(t) \tag{4}$$

This equation can be further separated into two relationships, one relating the DC components of the inductor currents (which are denoted here and elsewhere in the text with capital letters) and the AC ripple components (which are denoted here and elsewhere in the text with Δ sign). Thus we have:

$$I_C = I_1 + I_m - I_2 \tag{5}$$

$$\text{Second Property: } \Delta i_C(t) = \Delta i_1(t) + \Delta i_m(t) - \Delta i_2(t) \tag{6}$$

The time domain representation of equation (6) and AC ripple currents are shown in later section on Elimination of Switching Losses.

Note, however, that the DC component $I_C$ of the current in auxiliary capacitor C must be zero:

$$I_C = 0 \tag{7}$$

since the auxiliary capacitor C is not connected to the converter circuit during the ON time interval $DT_S$, but only during the OFF time complementary interval $D'T_S = (1-D)T_S$ through the complementary input switch $S'_1$. Thus, the auxiliary capacitor during OFF time interval $D'T_S$ must have a net zero DC current $I_C=0$. Otherwise, a positive DC current $I_C$, for example, would every cycle charge this capacitor and thereby would keep increasing its DC voltage $V_C$ up to infinity. Hence, only the AC ripple current of (6) exists in auxiliary capacitor, since the state-space averaging confirms that this capacitor will have a finite DC voltage given by $V_C=V_g/(1-D)$ as in (2). Thus, with (7), equation (5) reduces to the same result as equation (3). The actual directions of all DC inductor currents are as in FIG. 21a, which is confirmed by equations (2).

Third Property: Input and Middle Inductor AC Voltages Relationship

Figure 21A:
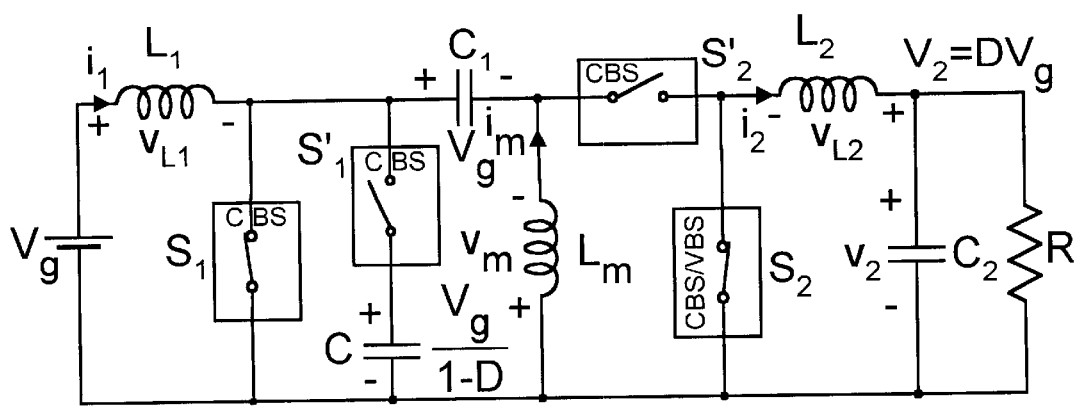
FIG. 21a illustrates the converter of FIG. 11c with positive directions of the inductor currents and positive polarities of the capacitor voltages during interval $DT_S$ and FIG. 21b shows the AC voltages present on the two inductors of FIG. 21a during a complete cycle of $T_S$.
Figure 21B:
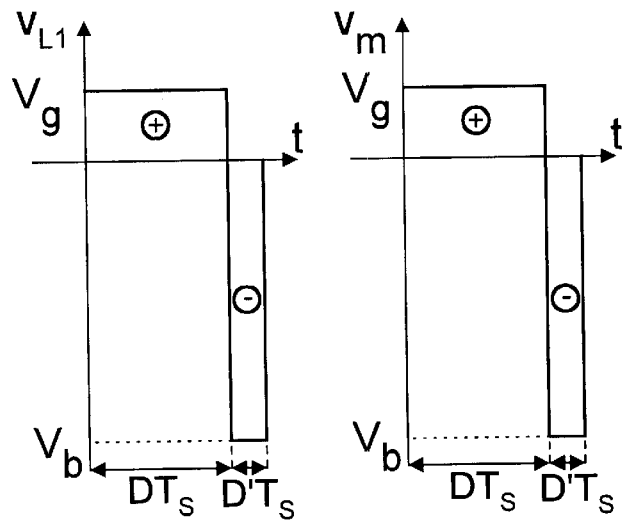

To further facilitate a full understanding of the unique performance features of this converter, the DC voltages of all three capacitors are explicitly shown in terms of $V_g$ and duty ratio D in FIG. 21a. The AC voltages on the input inductor and the middle inductor are designated as $v_{L1}$ and $v_m$ and their positive polarity marked with positive (+) sign as shown in FIG. 21a. The actual time domain voltage waveforms on these inductors are deduced as in FIG. 21b, by simply looking at inductor voltage levels during the time when input switch $S_1$ and output switch $S_2$ are closed ($DT_S$ interval) and when they are open (complementary $D'T_S$ interval) in the schematic of FIG. 21a. Thus, one can easily establish that the two inductors AC voltages are identical, i.e., in-phase relative to the positive polarity designations marked in FIG. 21a and of equal magnitude:

$$v_{L1} = v_m \tag{8}$$

This relationship (8) is also easily seen from the loop consisting of $V_g$, $L_1$, $C_1$, and $L_m$, in which input capacitor $C_1$ and DC voltage source $V_g$ are short for alternating current, which AC-wise puts input inductor $L_1$ in parallel with middle inductor $L_m$ hence they have the identical AC voltages. Furthermore, it is important to observe that relationship (8) also holds true for any operating duty ratio D, since it is independent of D.

Coupled-Inductor Improvement

Figure 22:
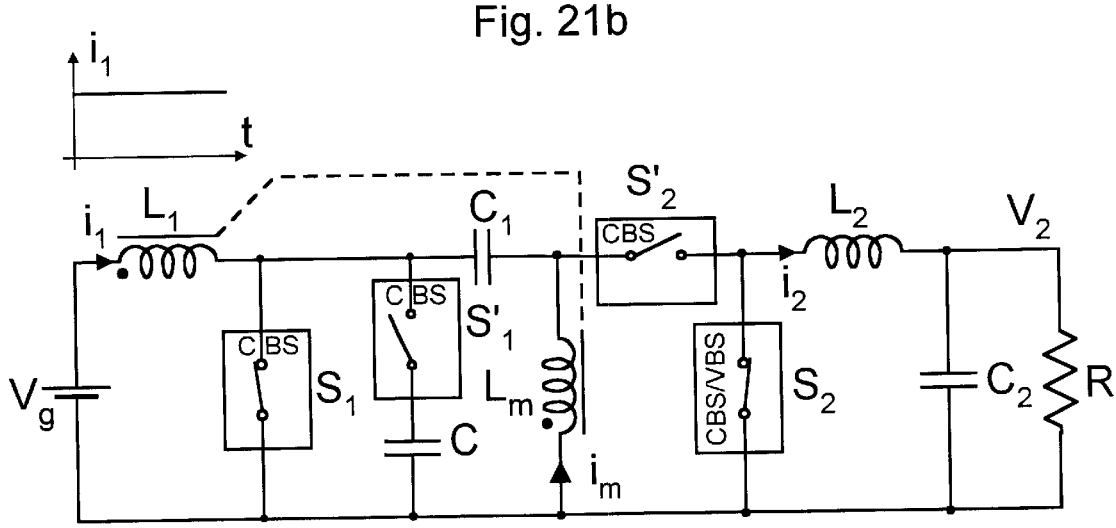
FIG. 22 shows a circuit diagram of the present invention in which input and middle inductors are coupled on a single magnetic core into a Coupled-Inductors structure.
Figure 23A:
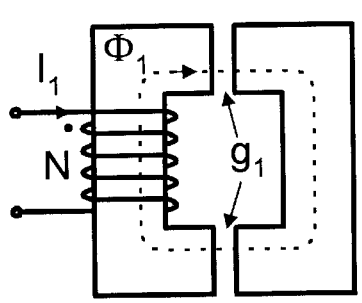
FIG. 23a shows that input inductor, when used separately, must have appropriate air-gap and FIG. 23b reflects the inductance value degradation where permeance $P_g$ is inductance per single turn of input inductor due to the air-gap.
Figure 23B:
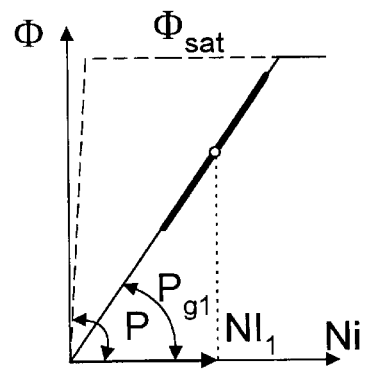
FIG. 23c shows that middle inductor, when used separately, must have appropriate air-gap and FIG. 23d reflects the inductance value degradation of middle inductor due to the air-gap.
Figure 23C:
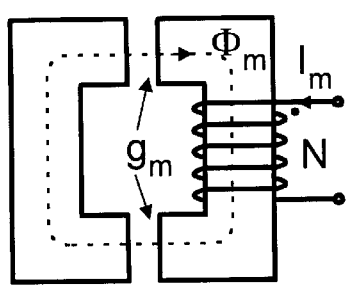
Figure 23D:
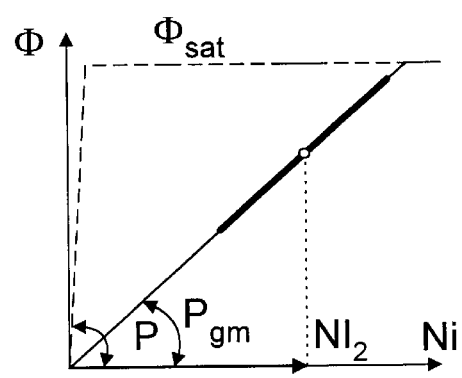
Figure 24A:
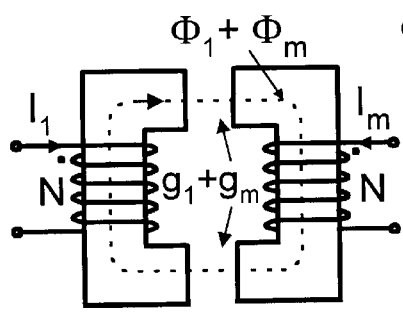
FIG. 24a demonstrates that the coupled-inductor implementation must have an air-gap, which is the sum of the two air-gaps of the original separate inductors of FIG. 23a and FIG. 23c
Figure 24B:
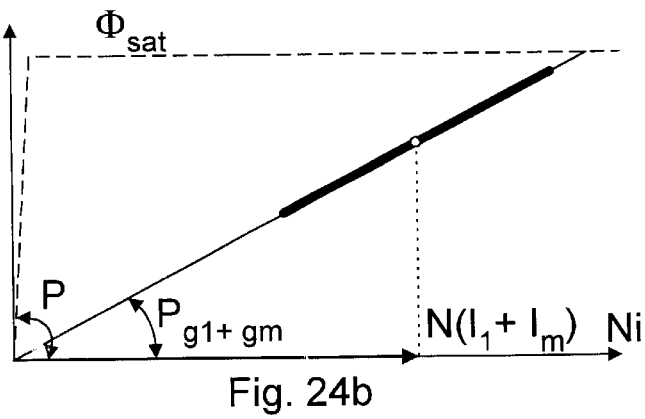
FIG. 24b shows combined flux vs. ampere-turns characteristic, which has an even higher inductance value degradation due to the increased air-gap.
Figure 25A:
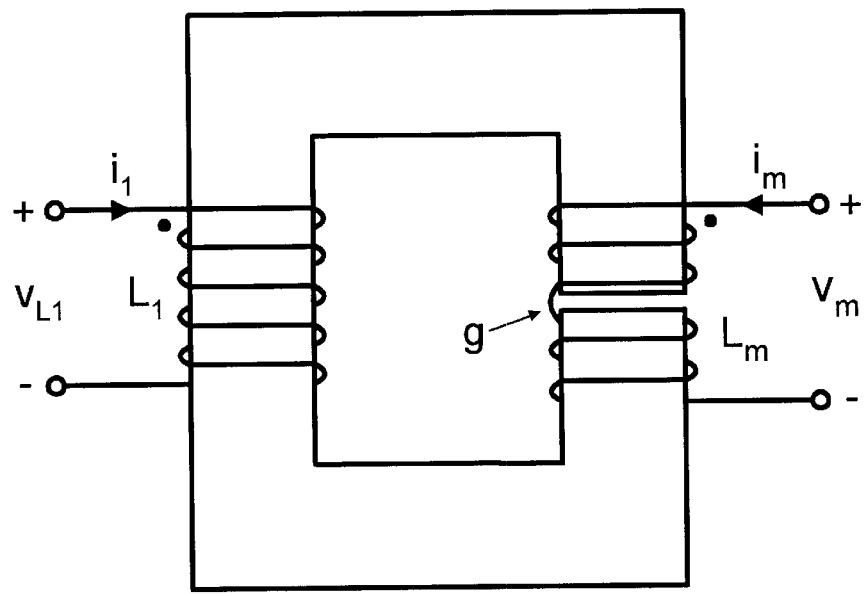
FIG. 25a shows a coupled-inductor implementation with the air-gap concentrated on the side with the middle inductor winding, which leads to the circuit model of FIG. 25b with leakage inductance concentrated entirely on the input inductor winding side, thus demonstrating the zero-ripple current in the input inductor winding.
Figure 25B:
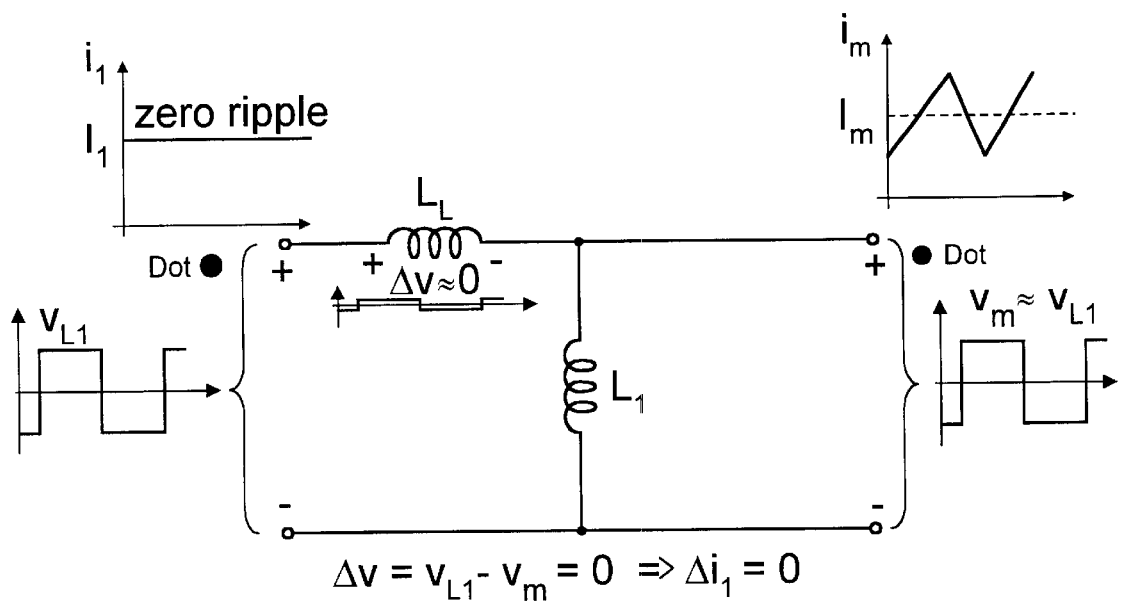

Since from (8), the input inductor and middle inductor have identical voltage waveforms for any operating point, they can be coupled onto a common magnetic core as indicated in Coupled-Inductor extension of FIG. 22. The separate input inductor of FIG. 23a has air-gap $g_1$ to support DC current $I_1$ as seen from FIG. 23b, while the separate middle inductor of FIG. 23c has air-gap $g_m$ to support DC current $I_m$ as seen in FIG. 23d. The combined coupled inductor structure of FIG. 24a has the air-gap, which is sum of the two air-gaps ($g_1+g_m$) to support total DC current of ($I_1+I_m$). Thus, the corresponding effective inductance is still further reduced as seen by the Flux vs. Ampere-turn characteristic of FIG. 24b of the combined Coupled-Inductors core. For optimum performance benefits, the Coupled-Inductors magnetics is implemented with the input inductor placed on the un-gapped leg of the UU-like magnetic core, while middle-inductor is placed on the magnetic leg with air-gap in it as displayed in FIG. 25a. Such positioning of the air-gap in the magnetic core and with identical number of turns for both windings, will result in the circuit model of FIG. 25b in which almost all leakage inductance is on the input inductor side and negligible leakage inductance on the middle inductor side. From the identity of the AC voltage waveforms, the net AC voltage across leakage inductance on the input inductor side is practically zero leading to a zero-ripple current in the input inductor for any operating duty ratio D.

Alternative Configurations

Figure 26A:
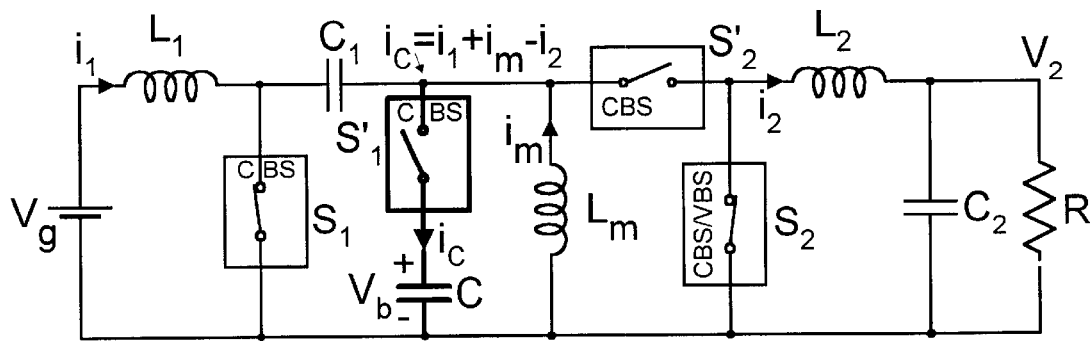
FIGS. 26(a–l) illustrate twelve equivalent transformations of the present invention shown in FIG. 11c, all of which share a common property: the current in auxiliary capacitor C always equals $i_1+i_m-i_2$, where the positive directions of the three inductor currents are designated in FIG. 21a. Note: the branch with the auxiliary capacitor and complementary input switch $S'_1$ is highlighted with thick lines in each figure.
Figure 26B:
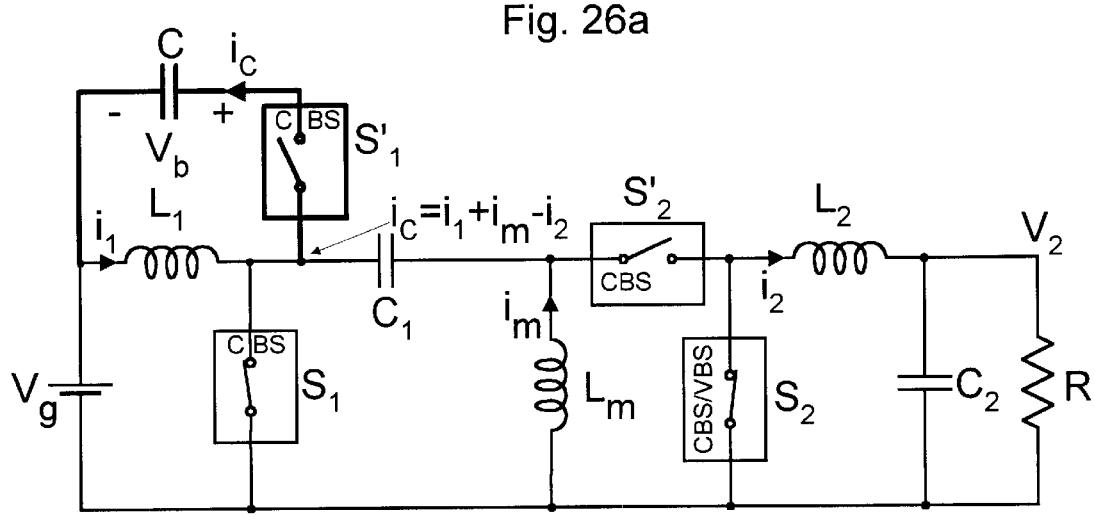
Figure 26C:
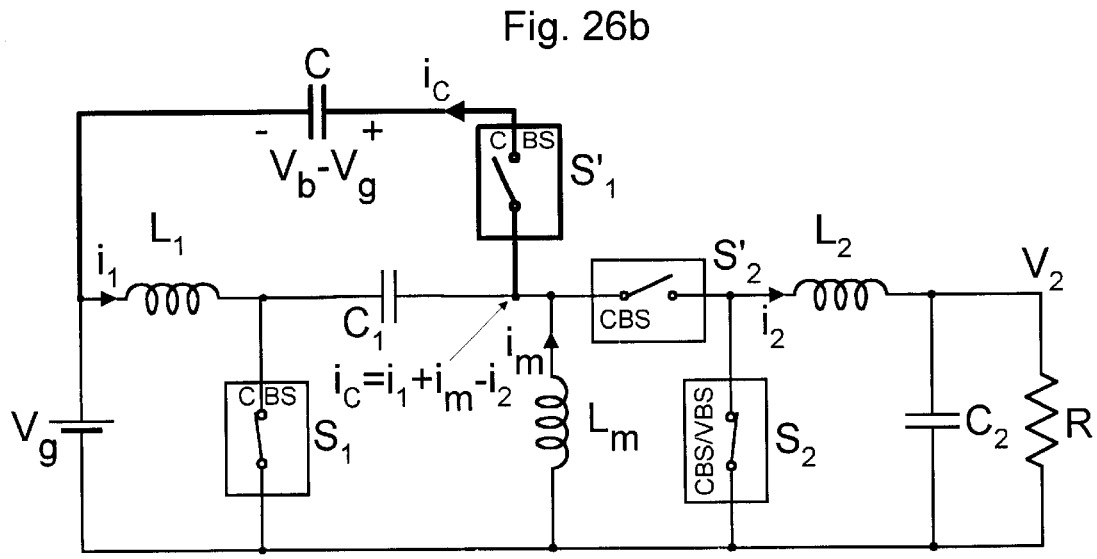
Figure 26D:
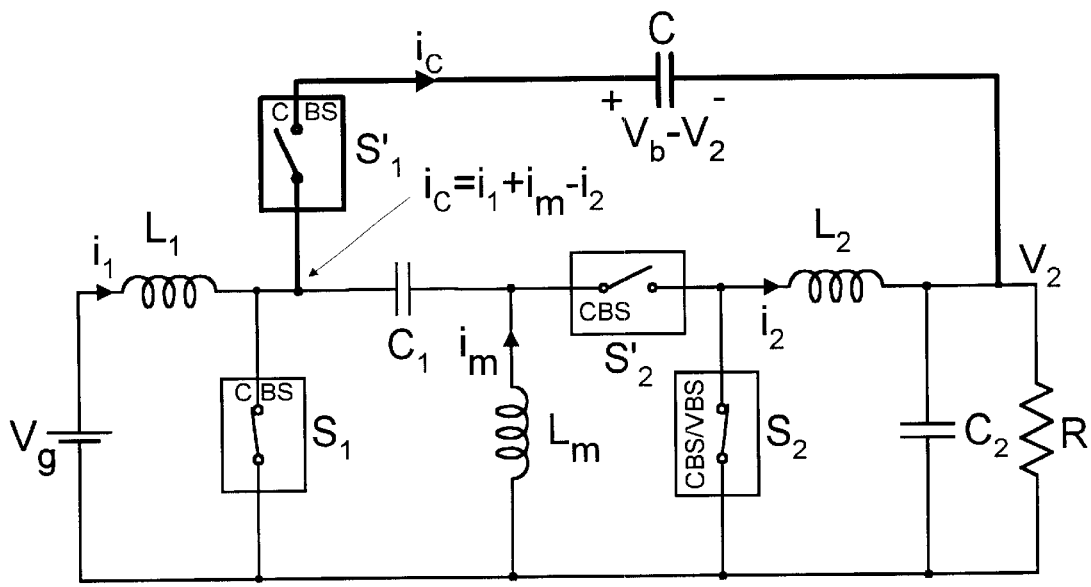
Figure 26E:
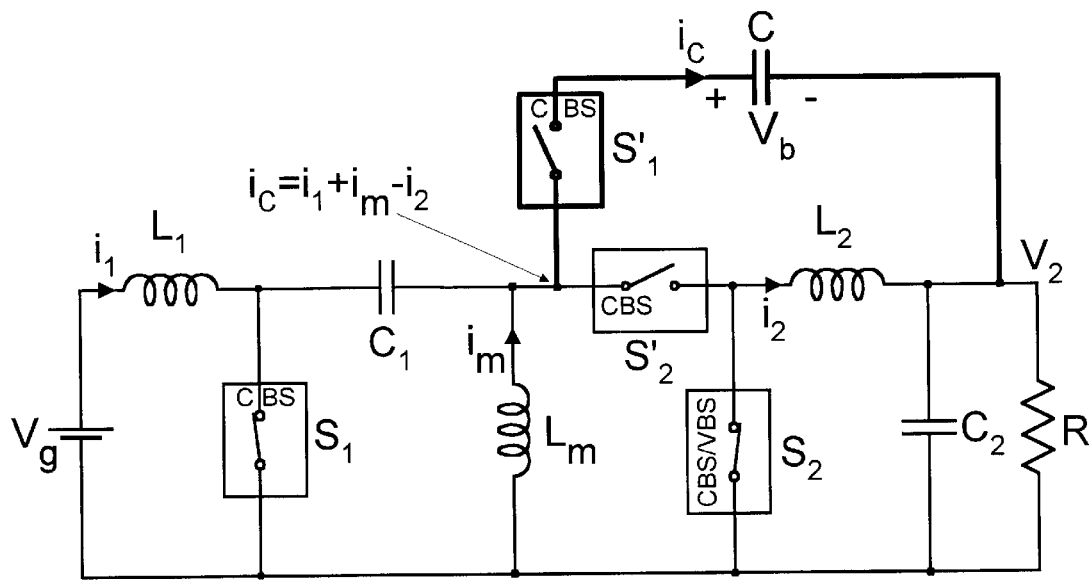

Note that the fundamental relationships (3) and (4) will all be maintained even if numerous configuration rearrangements are made to the original converter of FIG. 11c. The branch with the series connection of the auxiliary capacitor C and complementary input switch $S'_1$, shown highlighted with thick lines, can be connected in many different ways as illustrated in FIGS. 26(a–l) without altering the fundamental properties (3) and (4) and hence having same converter operation. For example, this branch can be connected in parallel with the middle inductor $L_m$ as in FIG. 26a or in parallel with the input inductor $L_1$, as in FIG. 26b. In the case of FIG. 26a, the DC voltage on the auxiliary capacitor C will be changed to the new steady-state value $V_b$ given by:

$$V_b = \frac{D}{1-D} V_g \qquad (9)$$

and in the case of FIG. 26b the voltage on C is the same given by (9). Another alternative is to connect this branch between the positive terminal of the input voltage source and the junction between input capacitor and the middle inductor $L_m$, as shown in FIG. 26c. Two additional possibilities are shown in FIG. 26d and FIG. 26e.

Figure 26F:
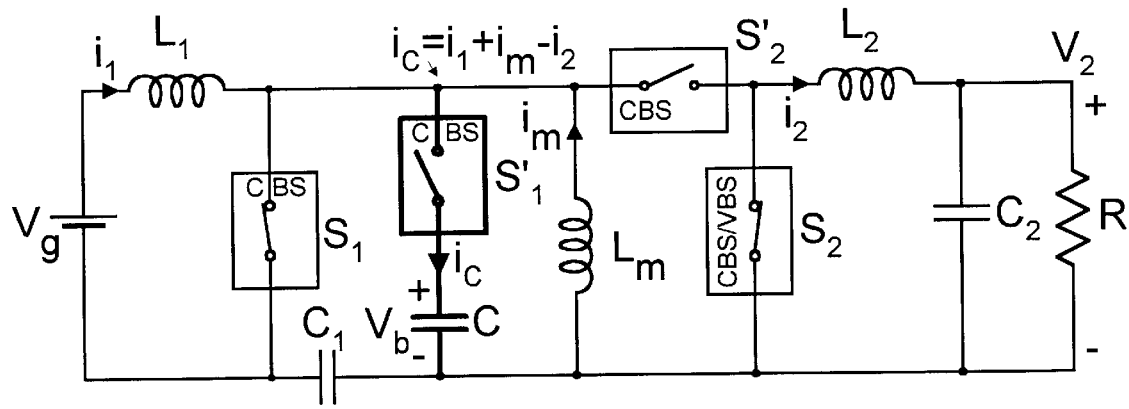

Further modifications can be obtained after moving input capacitor $C_1$ to the bottom return current path as in FIG. 26f. This would have a clear disadvantage that the common ground between input and output is lost and either the source or the load would be floating. Nevertheless, the isolated version obtained from such non-isolated converter would correct that deficiency, as seen later in section on Isolated Lossless switching Converter. Then the branch with auxiliary capacitor $C_1$ and complementary input switch $S'_1$ can be connected in parallel with middle inductor as in FIG. 26f. The advantage of this configuration is that the auxiliary capacitor has significantly reduced DC voltage $V_b$ given by (9), while at the same time, switches $S_1$ and $S'_1$ are in a preferable position for the so-called high-side driver implementation as described later. For example, for D=0.5, the blocking voltage requirement is from (9) reduced in half The disadvantage of such connection is that it may increase the parasitic inductance of the branch with the input switch and cause increase in voltage spikes on that switch. Other possible transformations of the basic converter configuration are shown in FIGS. 26(g–l). In all these equivalent transformations of the basic converter configuration, irrespective of different positions of the auxiliary capacitor C, this capacitor always has a DC voltage which is linear combination of voltages $V_g$, $V_b$, $V_C$, and $V_2$.

Besides those variants shown in FIGS. 26(a–l), there is still a large number of ways in which this branch with auxiliary capacitor C and complementary input switch $S'_1$ can be placed between other nodes of the basic converter circuit and still satisfy fundamental relationship (4). There are literally hundreds of other equivalent transformations of the basic converter configuration shown in FIG. 11c which are obtained by relocation of the other components, such as, for example, the input inductor and/or the output inductor from the top to the bottom leg (return current path) of the converter such as in FIG. 26j. Just as in the case of the relocation of the input capacitor to the bottom leg, the desirable feature of the common ground between the source and the load will be lost in this non-isolated converter case. Nevertheless, the isolated counterpart will eliminate that drawback and result in an isolated version with two separate grounds.

Figure 26G:
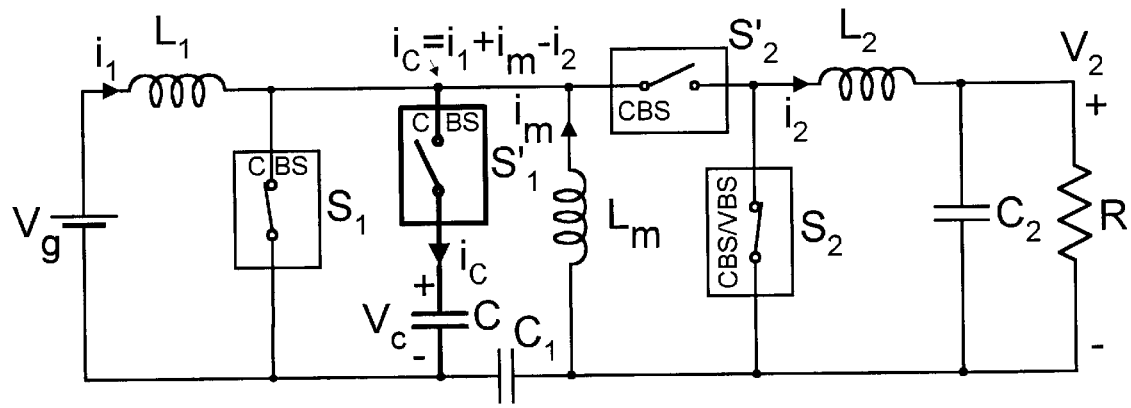
Figure 26H:
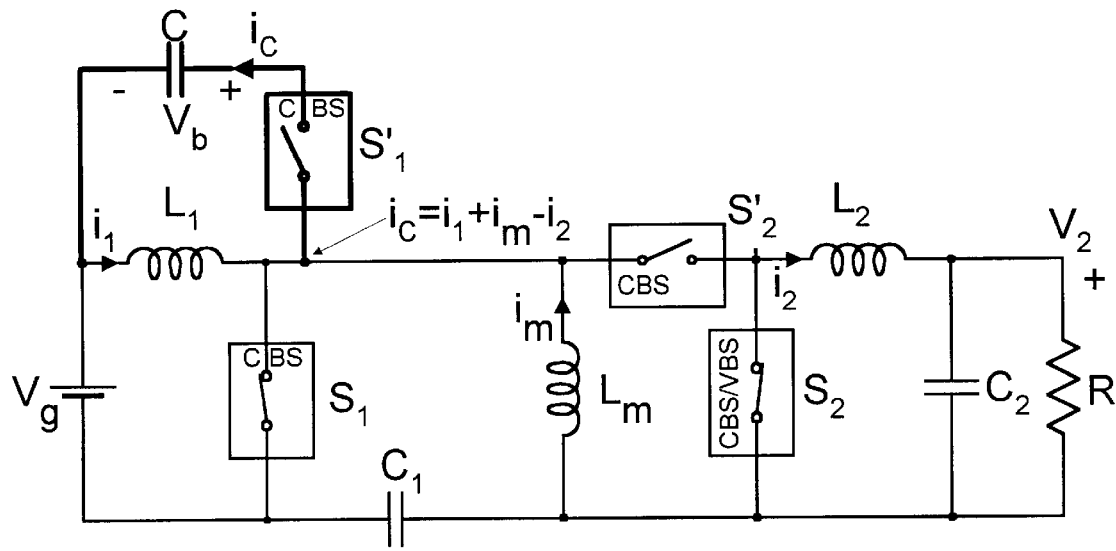
Figure 26I:
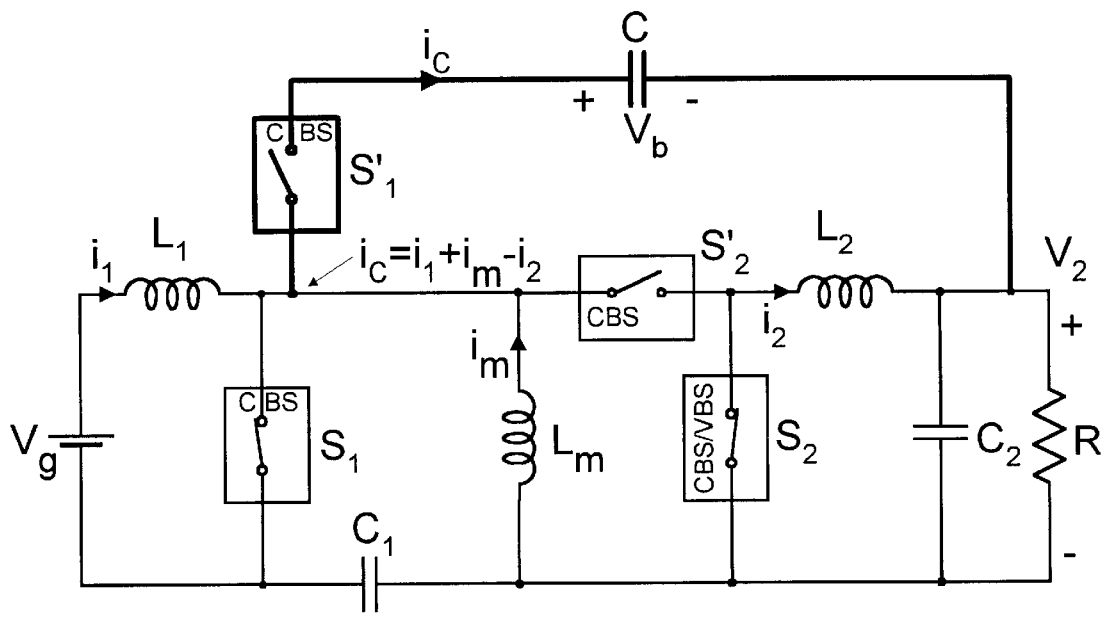
Figure 26J:
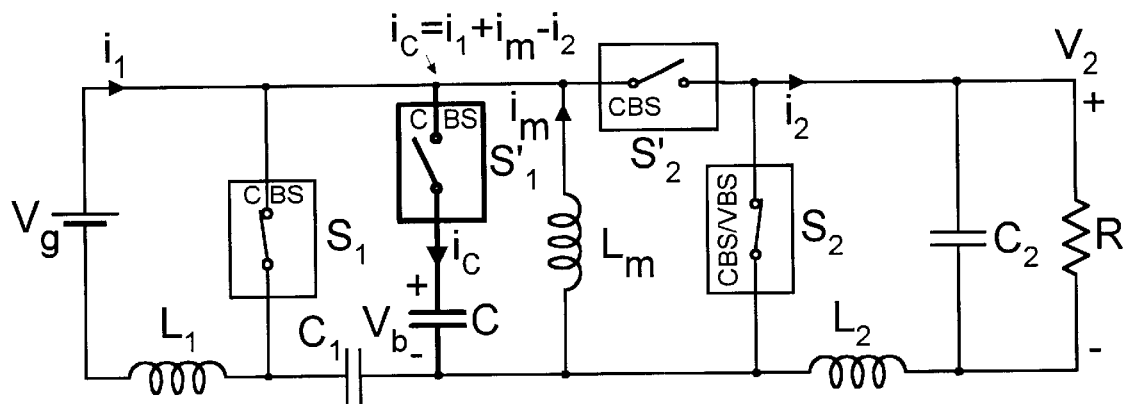
Figure 26K:
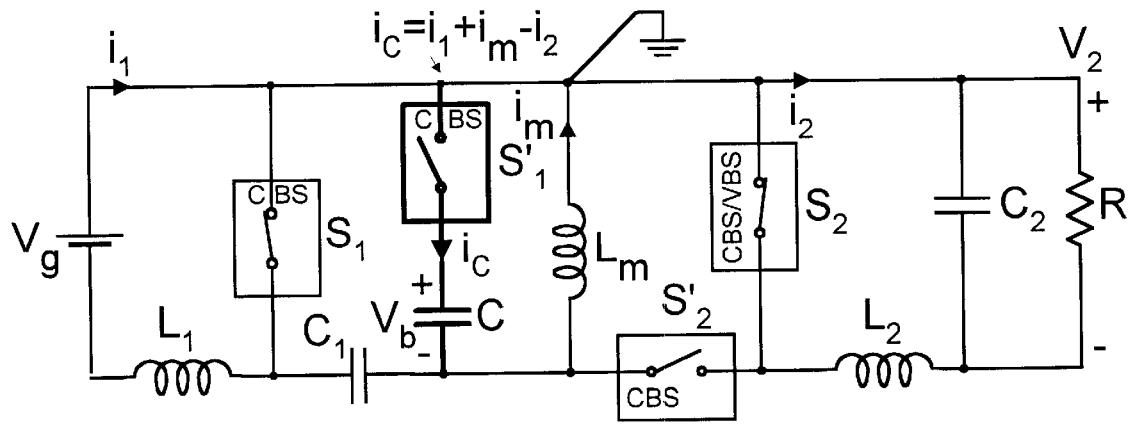
Figure 26L:
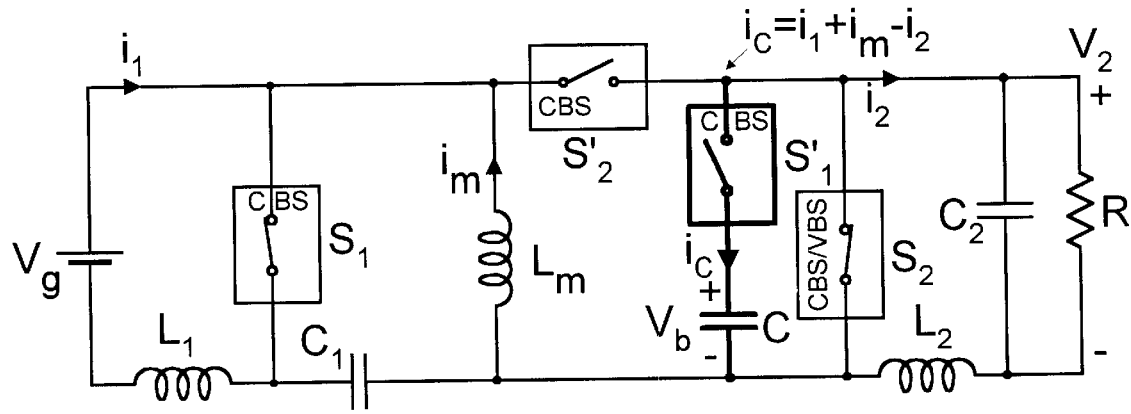

Furthermore, when the complementary output switch $S'_2$ is also relocated to the bottom leg of converter in FIG. 26j, the non-isolated converter of FIG. 26k is obtained. Note that in this converter, the positive terminals of input DC source and output DC load can have a common ground as shown in FIG. 26k, to result in a negative input to negative output converter. Yet another variant is shown in FIG. 26l in which branch with the auxiliary capacitor and complementary input switch is placed in parallel with the output switch.

Note however, that all these relocations of components are just the variants of the very same basic new switching converter of FIG. 11c. This is easily proved by the state-space averaging analysis method (introduced by Cuk as mentioned earlier). The state-space equations for all these converter variants are identical to the state-space equations of the basic new switching converter of FIG. 11c, thus, all these converter variants result in essentially same properties except for the differences in DC voltage of auxiliary capacitor C as explained above. For example, the relocation of input inductor $L_1$ to the bottom leg as in FIG. 26j and FIG. 26k, results in the same two switched network equations (for $DT_S$ and $D'T_S$ intervals) as for the basic converter of FIG. 11c.

Note that all these alternative connections of the branch with auxiliary capacitor C and complementary input switch $S'_1$ and repositioning of other components such as the input inductor, output inductor, complementary output switch, etc., as described above would all have one thing in common: the auxiliary capacitor current $i_C(t)$ during complementary interval $D'T_S$ is given by (4). Since this relationship (4) is preserved, all the unique properties of the basic new converter are preserved and present in any of its numerous equivalent transformations of FIGS. 26(a–l) as well as in many other not shown but satisfying condition (4). We will thus use equation (4) as a fundamental functional condition needed to describe in claims the means connecting the branch with auxiliary capacitor C and complementary input switch $S'_1$ to the rest of the converter in all variety of possibilities. The skilled in the art might find some other alternative converter's modifications, whose operation would encompass the same relationship (4), hence they all will be considered as other variants of this original converter configuration.

It should be emphasized that in all the above variants, the current through the branch with the complementary input switch $S'_1$ and auxiliary capacitor C is AC only, since $I_C=0$ as per (7). Thus, the complementary input switch $S'_1$ will carry only the AC ripple current component, which is small compared to DC load current. Hence the complementary input switch $S'_1$ conduction losses will be very small and negligible in comparison to the conduction losses of the input switch $S_1$ which is the power switch whose current is directly dependent on the DC load current. Just like the complementary input switch $S'_1$, the auxiliary capacitance C is also a comparatively small size and low loss component, since it also carries the same small AC ripple current component only. Hence the auxiliary capacitor has negligible losses even when it has a larger ESR. Thus, the branch with the auxiliary capacitor and complementary input switch $S'_1$ contributes very little to the total converter conduction losses but is critically important, since it enables the existence of the two fundamental properties defined by relationships (3) and (4), which are critical for lossless switching performance.

In addition, presence of this branch results in a volt-second balance on the middle inductor $L_m$. Alternatively, auxiliary capacitor C is charged to the DC voltage $V_C$ given by (2) just needed to insure volt-second balance on the middle inductor $L_m$. Therefore, when this middle inductor is replaced by an isolation transformer (see the next section on Isolated-Converter), this will also insure volt-second balance of the magnetizing inductance of that transformer. Thus, the need for separate magnetic core reset mechanisms, such as the third reset winding in the isolation transformer of the prior-art forward converter is completely eliminated. Hence, the volt-second balance on the middle inductor $L_m$ (or magnetizing inductance of an isolation transformer) is intrinsic to its operation and represents the third fundamental property of this converter.

Hard-switching Simplifications

Figure 27A:
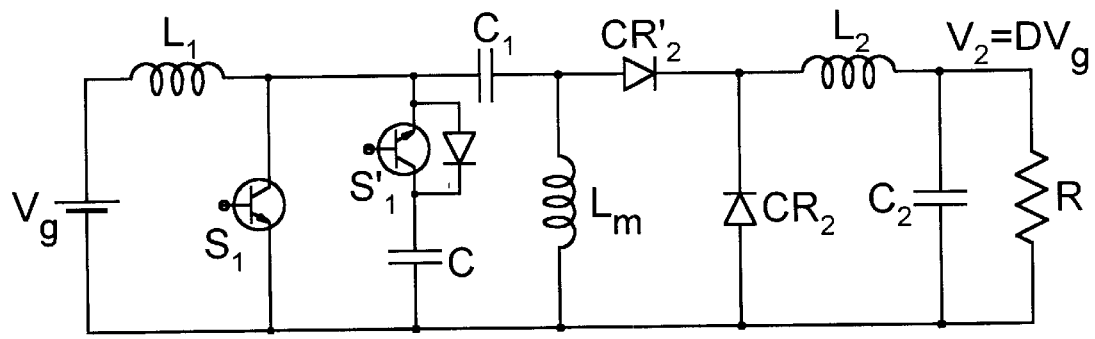
FIG. 27a illustrates the present invention converter of FIG. 3a with bipolar NPN transistors on the input side and current rectifiers on the output side. Note: the extra diode across complementary input switch $S'_1$ to provide current bi-directional flow in that switch.
Figure 27B:
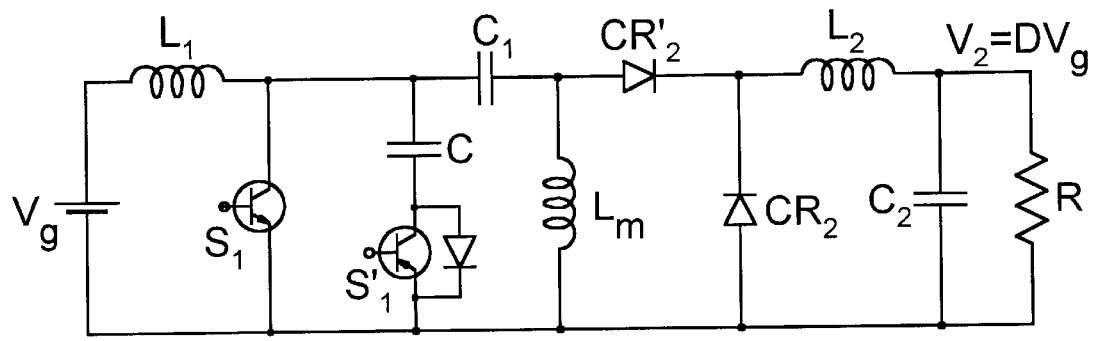
FIG. 27b illustrates implementation of the complementary input switch $S'_1$ with a PNP bipolar transistor to facilitate direct drive with grounded emitter of two bipolar transistors.

In case of the hard-switching converter, a simpler implementation with single-quadrant switches is also possible as shown in FIG. 27a. However, the complementary input switch $S'_1$ must still be implemented with a current bi-directional switch, such as, for example, an NPN bipolar transistor in parallel with a diode as in FIG. 27a, since its current is alternating and hence intrinsically bidirectional. The input switch $S_1$ does not have to be current bi-directional, and could be implemented with another NPN bipolar transistor as shown in FIG. 27a. The output switches $S_2$ and $S'_2$ can be diodes, that is current rectifiers $CR_2$ and $CR'_2$ as in FIG. 27a. The NPN bipolar transistor $S'_1$ in FIG. 27a could be replaced with a PNP transistor $S'_1$ of FIG. 27b, which is now in a preferable grounded emitter configuration for direct drive, instead of the floating drive required for the circuit of FIG. 27a. With emphasis on higher switching frequency and the simplicity of drives, the bipolar transistors can be replaced with the MOSFET transistors as in FIG. 27c. Note that the complementary input switch $S'_1$ is a P-channel MOSFET, which is in a preferable grounded source configuration suitable for direct drive. The input switch $S_1$ is also in a grounded source configuration, thus a simpler direct drive instead of a more complex floating drive could be used. The added benefit is that the diode is already built into the MOSFET device, and no external diode is needed. Furthermore, the body-diode in the input MOSFET switch $S_1$ will prevent discontinuous conduction mode at light load currents, since the front end of converter is current bi-directional as a whole.

Figure 27C:
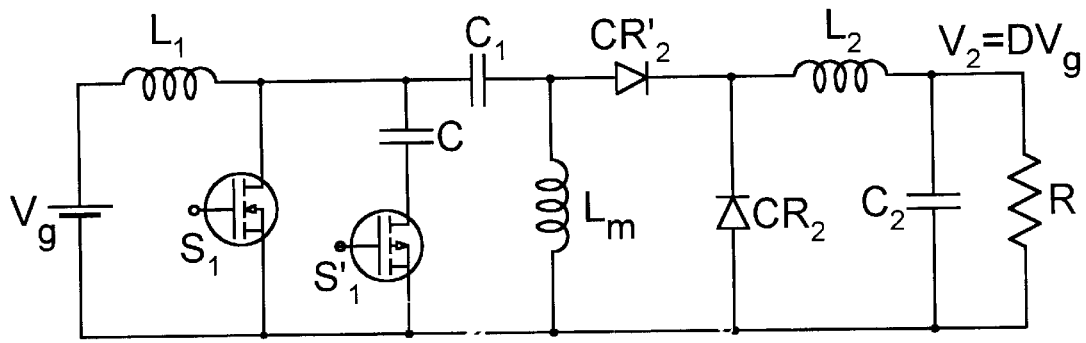
FIG. 27c illustrates the input switch and complementary input switch of FIG. 27b replaced by N-channel and P-channel MOSFET devices respectively.
Figure 27D:
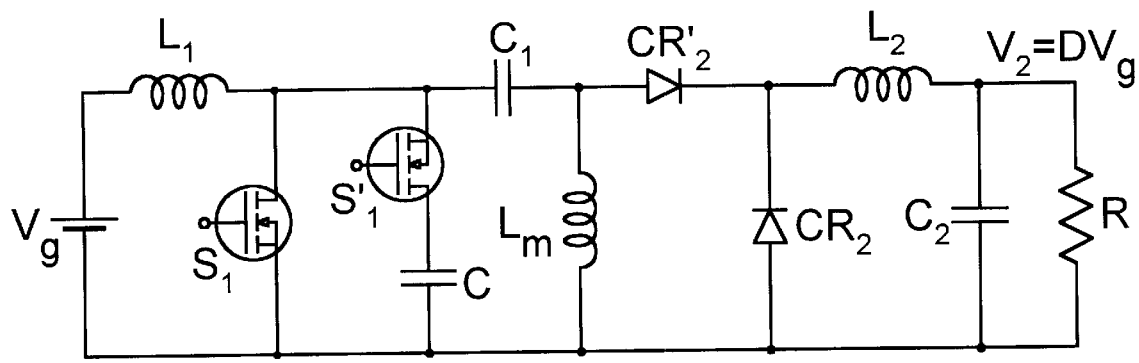
FIG. 27d illustrates the high-side driver configuration of two N-channel MOSFET transistors.

The P-channel MOSFET $S'_1$ of FIG. 27c is replaced by an N-channel MOSFET $S'_1$ in FIG. 27d. While this switch requires a floating drive as the bipolar counter-part in FIG. 27a, this is still preferred in many applications due to the availability and effectiveness of special Integrated Circuit (IC) driver chips, the so called "high-side drivers", which are designed for just such drive conditions and could even provide the proper switching time control needed for novel lossless switching implementations.

Figure 27E:
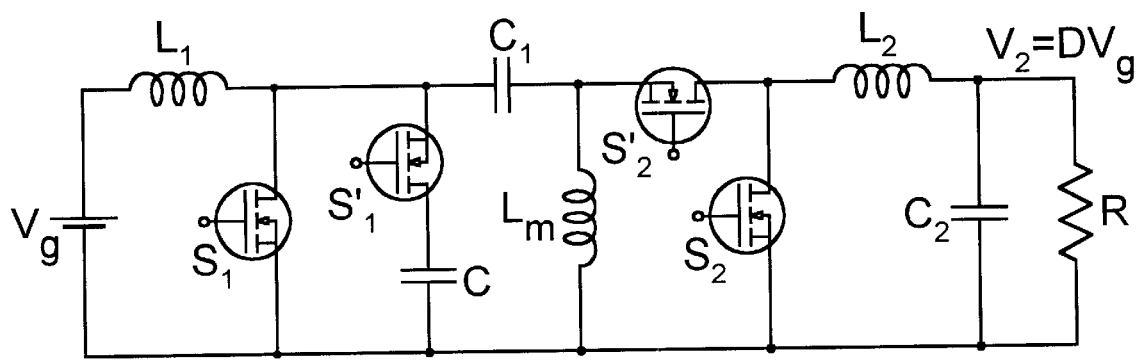
FIG. 27e illustrates an all-MOSFET transistor implementation of the converter in FIG. 11c.

For low voltage applications in which there is a need for reduction of the output conduction losses, the current rectifiers $CR_2$ and $CR'_2$ on the output side are replaced by MOSFET devices operating as synchronous rectifiers as in FIG. 27e. Furthermore, the use of all MOSFET devices enables several different implementations of the novel lossless switching methods. Some applications might favor the configurations in FIG. 26a or FIG. 26f which have a lower DC voltage on auxiliary capacitor C given by $V_b=DV_g/(1-D)$ compared to its voltage $V_C=V_g/(1-D)$ in configurations of FIG. 11c. The ratio of respective auxiliary capacitor DC voltage ratings is given by $$\frac{V_b}{V_C} = D \qquad (10)$$

Thus, at duty ratio D=0.5, the voltage rating of the auxiliary capacitor is 2 times lower when placed in position as in FIG. 26a in comparison to its position as in FIG. 11c. Later the isolating embodiment will take advantage of both: lower voltage rating of auxiliary capacitor C and high-side drive configuration. Other positions of the auxiliary capacitor may lead to even lower voltage ratings of capacitor C.

Figure 27F:
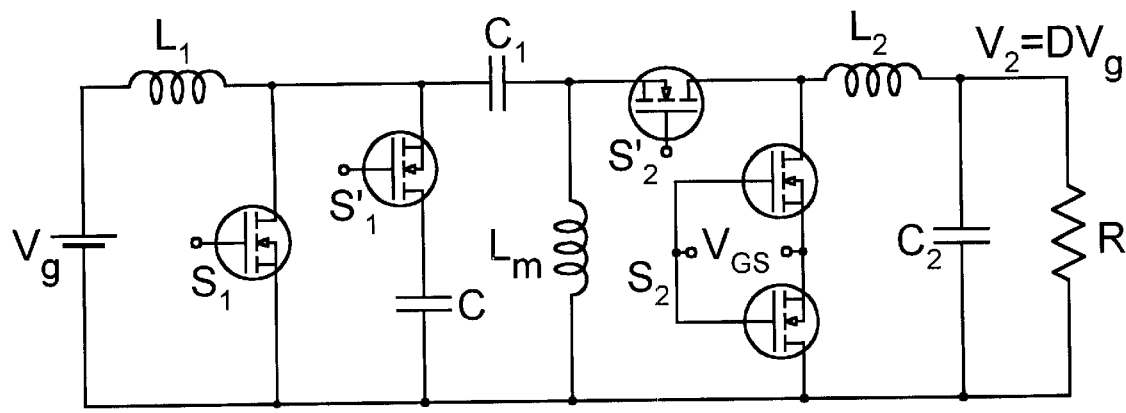
Figure 27G:
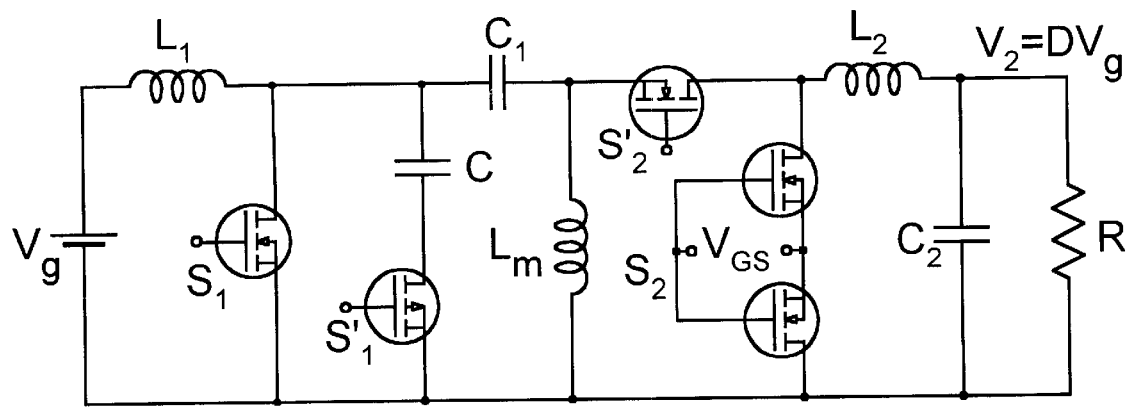
FIG. 27g illustrates converter of FIG. 27f with complementary input switch $S'_1$ implemented with a P-channel MOSFET with grounded source in a direct drive configuration.

FIG. 27f shows the output switch implemented as the composite switch with 2 back-to-back MOSFETs. Converter of FIG. 27g has also same VBS switch implementation, but P-channel MOSFET for switch $S'_1$.

Isolated Extensions with CBS Output Switch

In the majority of practical applications galvanic isolation between the input DC source and the output DC load is often required either for safety reasons or from a system point of view. Once an isolated version of the converter is obtained, additional benefits accrue such as: the output DC voltage can be scaled up or down with the transformer turns ratio, negative as well as positive DC output voltages can be provided, multiple outputs with different DC voltages and polarities can be easily obtained, etc.

However, the existence of a non-isolated DC-to-DC converter does not guarantee at all the existence of a galvanic isolated counter-part. In fact, many non-isolated converters do not have a galvanic isolated extension at all. Some, which do, actually have a rather non-obvious extension, such as the forward converter, which is derived from the prior-art buck converter of FIG. 1a and in its basic form requires a third winding to provide core reset. Yet other converters, such as the prior-art flyback converter, have straight-forward isolated versions, which are obtained simply by replacing the inductor of the non-isolated version with an isolation transformer. The present invention belongs to that category since it was already demonstrated that the middle inductor $L_m$ (and hence magnetizing inductance of the respective isolation transformer) is volt-second balanced. The non-isolated version of the present invention with three separate inductors is shown in FIG. 26a. Thus, the corresponding isolated extension of FIG. 28 is obtained by simply substituting the original middle inductor L, with an isolation transformer with the magnetizing inductance $L_m$ and secondary to primary turns ratio $N_S:N_P$, which changes voltage conversion ratio to $$V_2=DV_gN_S/N_P \qquad (11)$$

Figure 28:
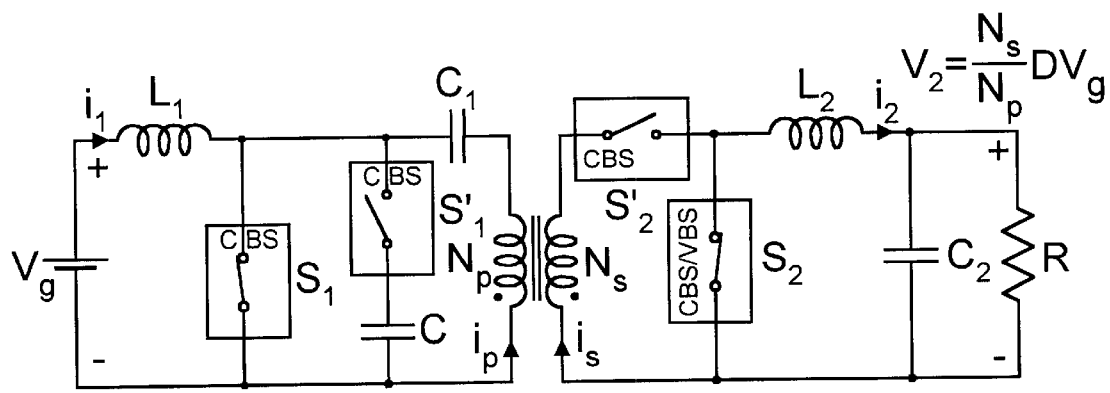
FIG. 28 shows an isolated embodiment in which the middle inductor in FIG. 11c is replaced with a $N_P:N_S$ turns ratio isolation transformer.

Thus, all properties of the non-isolated converter of FIG. 26a are carried over to the isolated counterpart of FIG. 28.

While the non-isolated converter was capable only of a voltage step-down function, the isolated extension of FIG. 28 is also capable of step-up as well as step-up/step-down function. Also in many applications a very large step-down is required, such as when the rectified AC line is used as primary DC source, and low voltage outputs such as 5V, 3.3V and lower, are required. In such applications, additional voltage step-down through the transformer turns ratio is essential, as is also the galvanic isolation feature.

Just as we have converted the non-isolated converter of FIG. 26a into its isolated counterpart in FIG. 28, we can now replace the middle inductors of converters in FIGS. 26(b–l) with an isolation transformer in order to obtain their isolated counterparts. Note, however, that not all non-isolated converter variants will have their isolated counterparts. For example, FIG. 26d and FIG. 26i after such step would still not have the galvanic isolation, since the branch comprised of auxiliary capacitor C and the complementary input switch $S'_1$ is connected between one node on the primary side and another node on the secondary side of converter. Thus, after exclusion of those converter configurations, still a large number of isolated extensions of the basic non-isolated converter of FIG. 11c is possible. Some of the isolated extensions of the basic converter are shown in FIGS. 29(a–h). Note that in the converters of FIG. 29g and FIG. 29h the branch with auxiliary capacitor C and complementary input switch $S'_1$ is completely on the secondary side. Thus, the original benefit when this branch was on the input side is lost: the energy stored in the transformer leakage inductance is not recovered but is lost resulting in reduced overall efficiency. Furthermore, this extra energy loss is exhibited as an un-damped or very lightly damped ringing of the drain-to-source voltage of the input MOSFET switch. This, in turn, leads to high voltage spikes on this device and its higher voltage rating, as well as much increased radiated EMI noise.

Figure 29A:
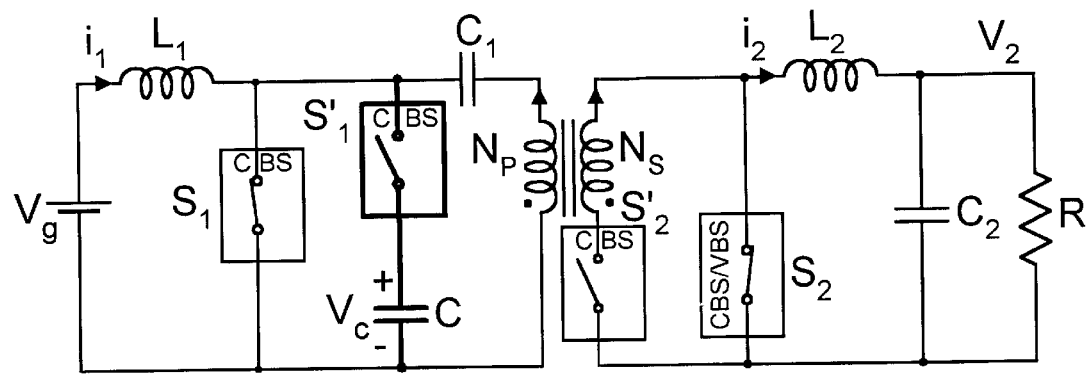
FIGS. 29(a–h) illustrate eight various isolated converter equivalents of present invention obtained from the non-isolated converters counterparts.
Figure 29B:
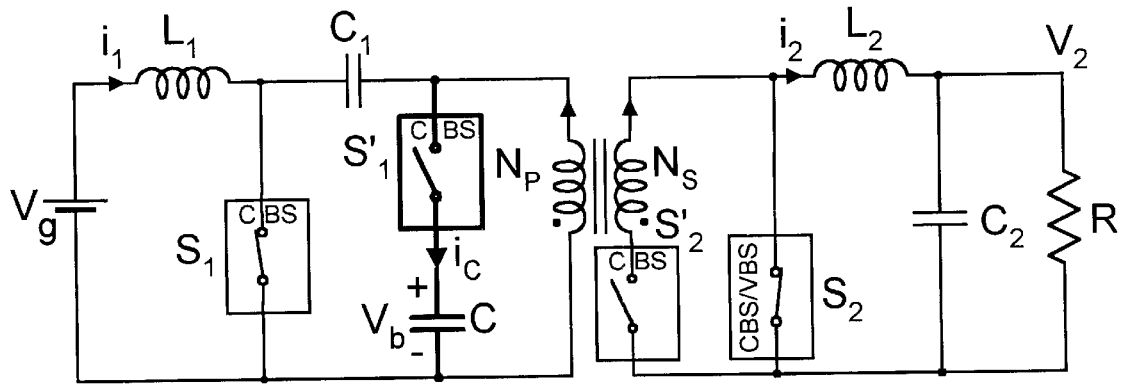
Figure 29C:
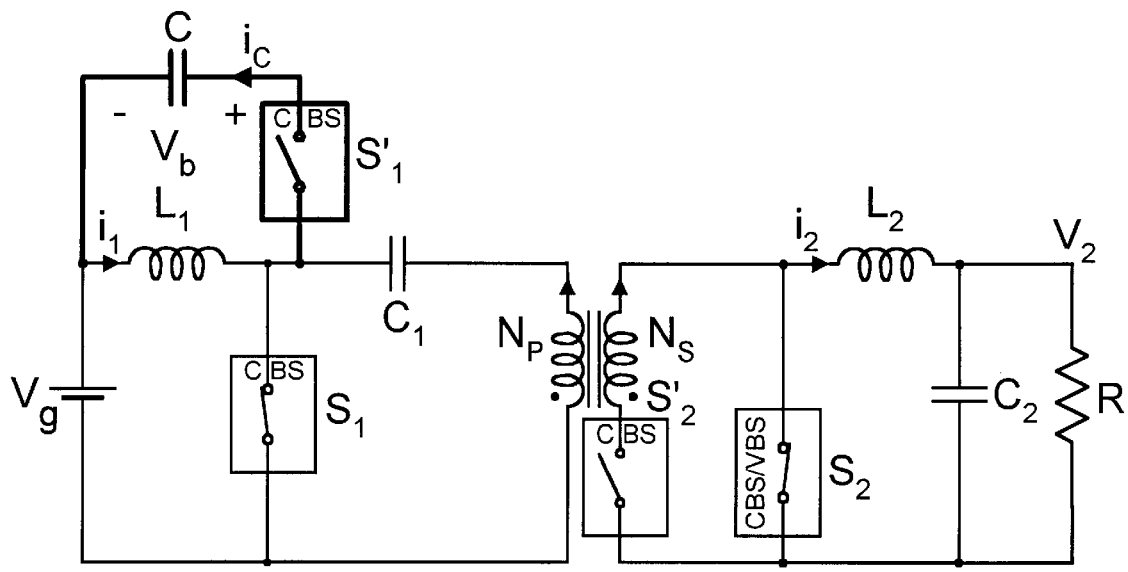
Figure 29D:
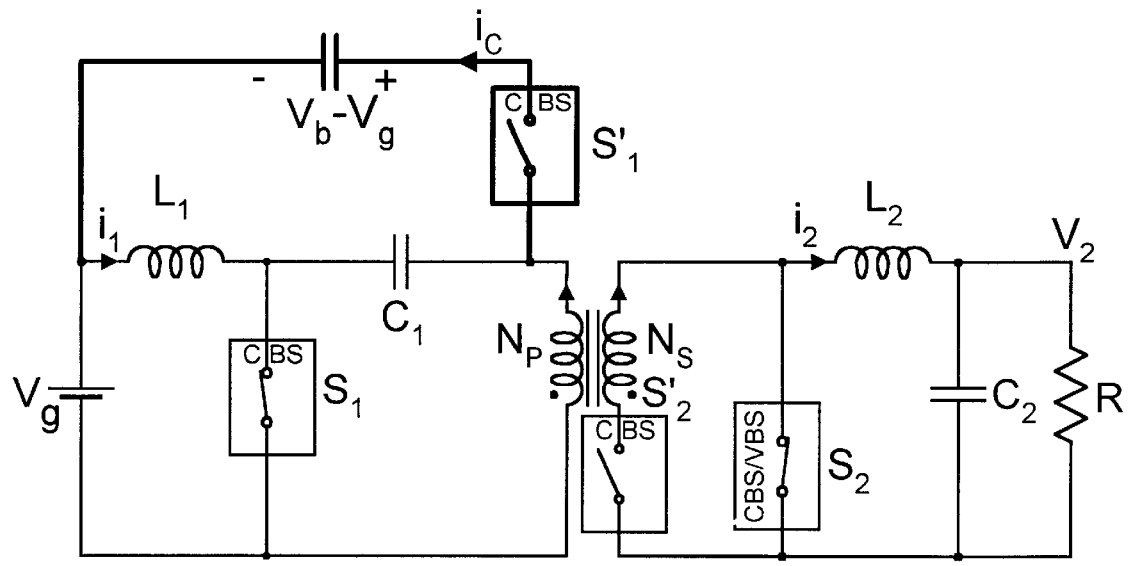
Figure 29E:
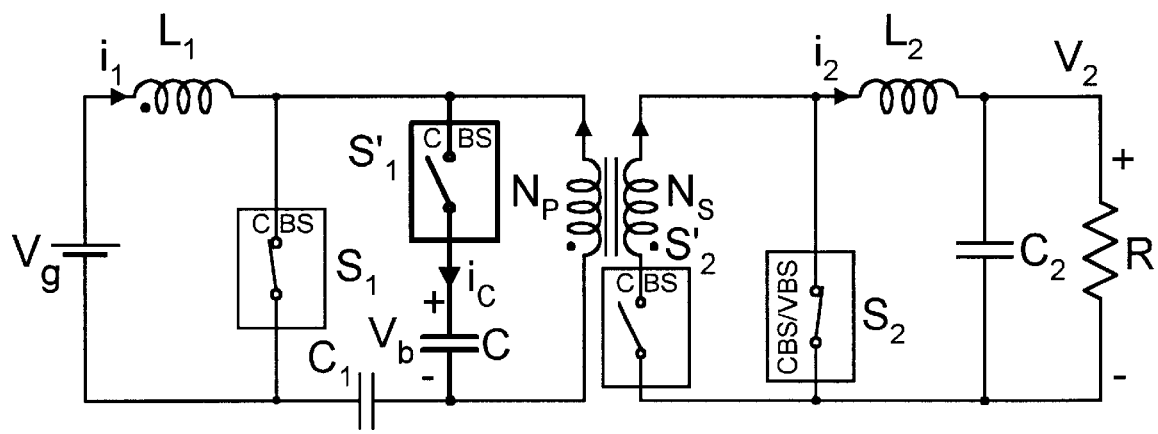
Figure 29F:
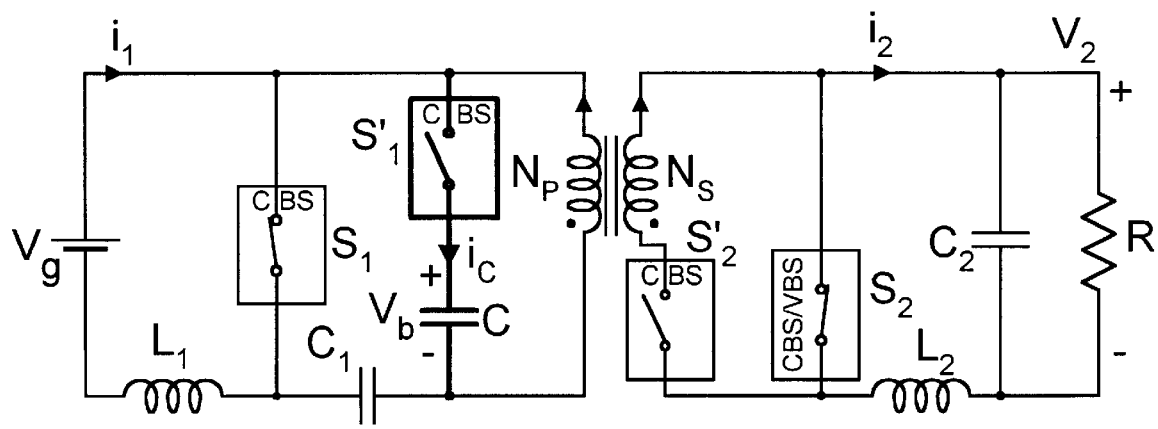
Figure 29G:
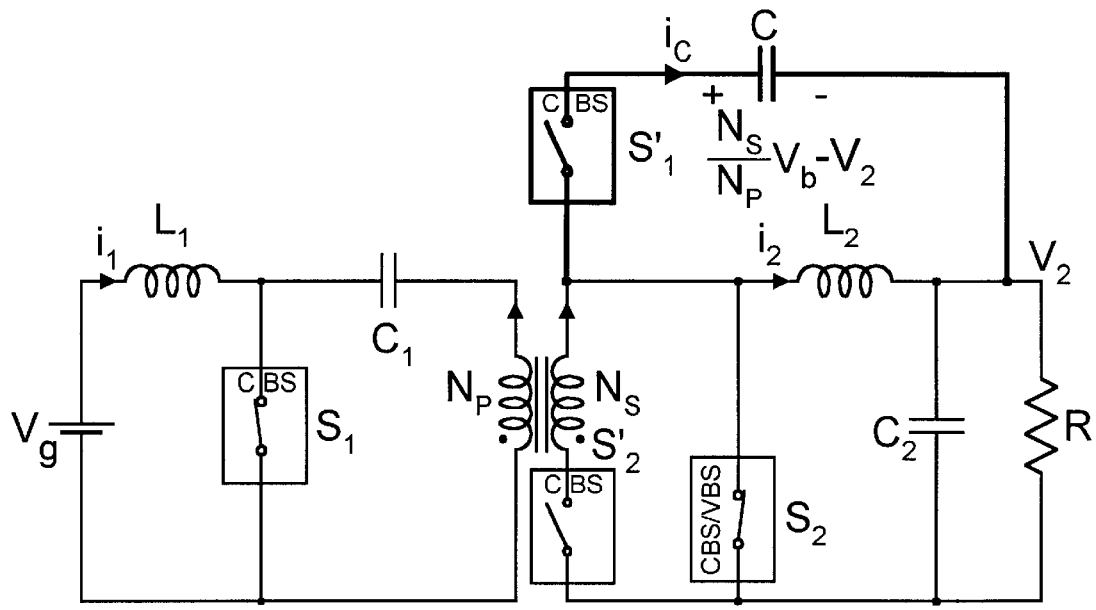
Figure 29H:
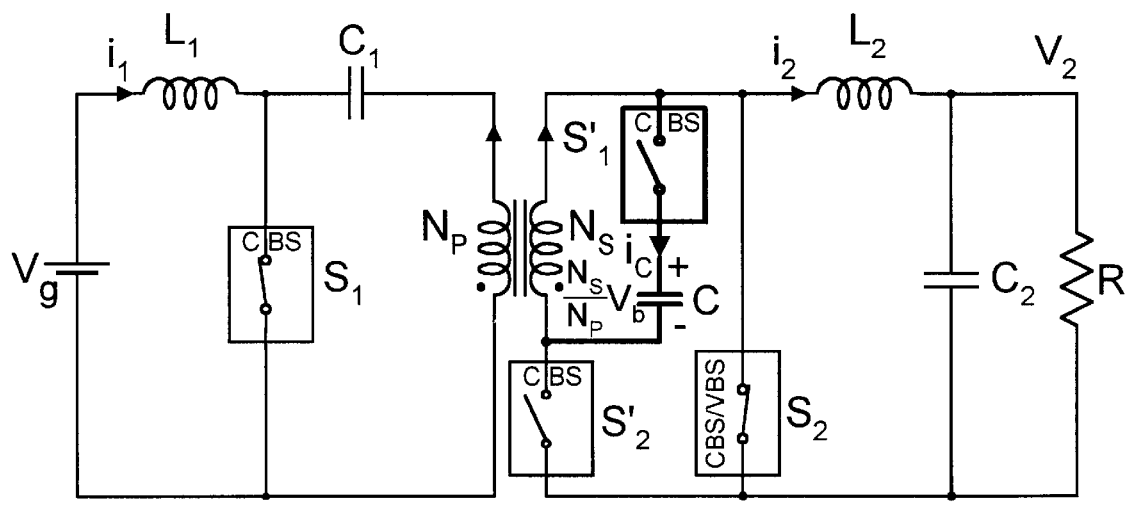
Figure 30:
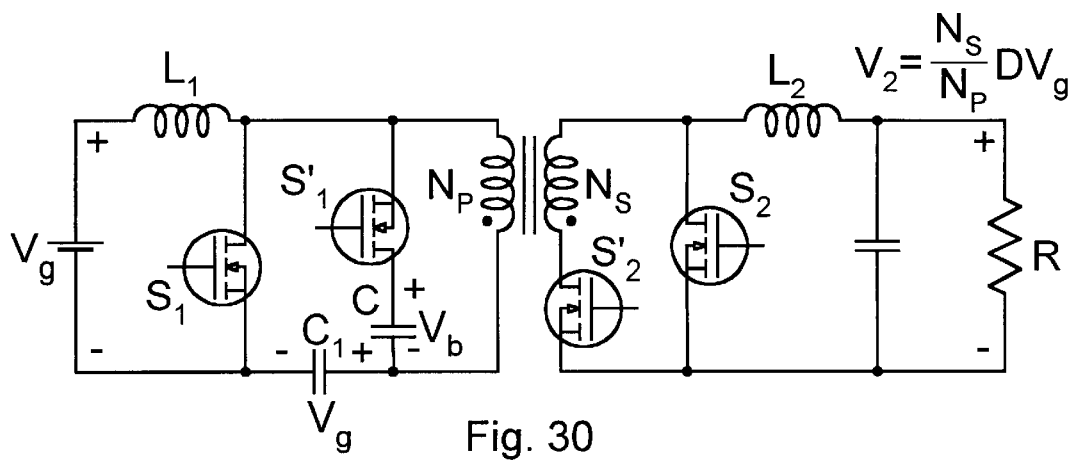
FIG. 30 illustrates another embodiment with all MOSFET implementation of the converter in FIG. 29e.

The absence of the common ground in the non-isolated configuration of FIG. 26f is resolved in its isolated counterpart of FIG. 29e in which the transformer is floating while source and load have separate grounds. This configuration has the added advantage that the primary side switches could be implemented with N-channel MOSFET devices in high-side configuration as shown in FIG. 30, while the auxiliary capacitor C has lower voltage rating $V_b$ as given by (9). The same advantage is retained in the isolated configuration of FIG. 29f, which is isolated version of its non-isolated counterpart in FIG. 26k. The isolated counterpart of the converter in FIG. 26g is the isolated converter in FIG. 29a except for the input capacitor $C_1$, which is in the top leg and complementary output switch $S'_2$ is in the output return leg. Clearly, both converters are obvious modifications of each other.

Just as the non-isolated case has literally hundreds of variants obtained using equivalent transformations, so there is equally large number of isolated converters obtained by simply replacing the middle inductor with an isolation transformer. Only a very few of those, will turn out not to have isolation as explained for the converters of FIG. 26d and FIG. 26i.

From the above discussions it is obvious that the insertion of the isolation transformer did not change the fundamental operation or the key features and performance characteristics of the new converter. However, those variants in which the branch with the auxiliary capacitor is positioned between primary and secondary side, should be excluded. Nevertheless, there are several additional embodiments of the isolated extension of the present invention of FIG. 29a, which are either not available in the non-isolated configuration or have new interesting features.

Shown in FIG. 30 is an embodiment of the isolated converter in which all four switches of FIG. 29a are replaced with N-channel semiconductor MOSFET switching devices. The primary side switches are so connected that a high-side driver IC circuit can be used, which is a distinct practical advantage. Like wise, the secondary side MOSFET switching devices are both N-channel MOSFETs with a grounded source resulting in a practical direct drive for the secondary side MOSFET switching devices. Note also that the auxiliary capacitor C is at the same time in a position in which it has a lower DC voltage rating.

Figure 31A:
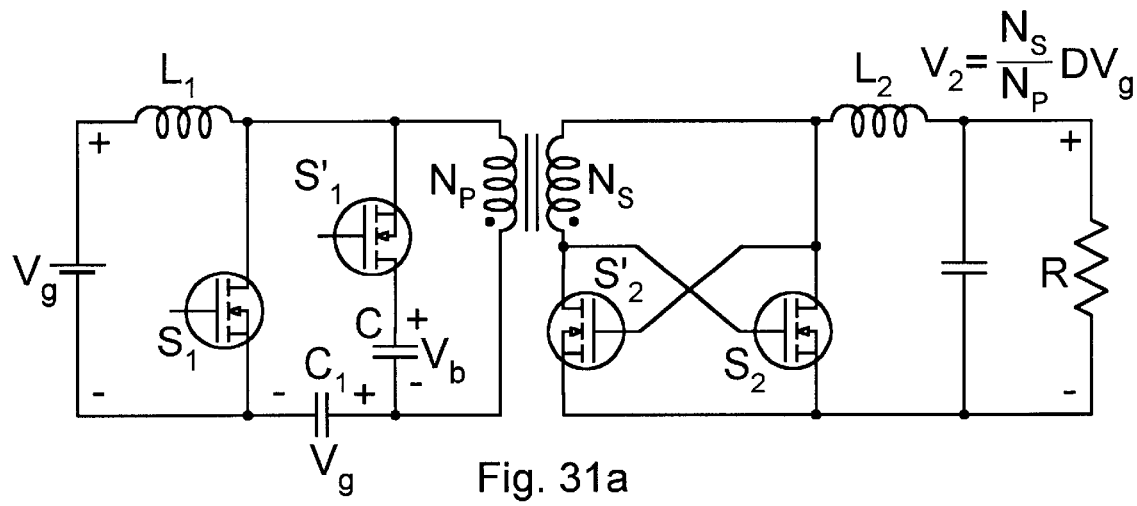
FIG. 31a illustrates a self-driven embodiment of the converter in FIG. 30

If the drive and control circuitry to modulate the duty ratio of the input switch is on the primary side, then the secondary side MOSFET switches present somewhat of a problem to drive: both corresponding drive signals must be transferred from the primary side to the secondary side and isolation in the drive control must be provided. Furthermore, once the drive signal is provided on the secondary side, drive power for the secondary side drive circuitry must also be provided, which results in a complex and costly solution. Thus, it is a distinct practical advantage if the secondary side switches can be "self-driven", so that the existing switching converter circuitry can be used to provide the correct drives without any addition of control or power circuit components. One such "self-driven" configuration is provided in another embodiment of the present invention displayed in FIG. 31a. The secondary side of the transformer already provides a right drive waveform, provided the connection is made as in FIG. 31a: the gate of output MOSFET switch $S_2$ is connected to the drain of the complementary output MOSFET switch $S'_2$, while the gate of the complementary output MOSFET switch $S'_2$ is connected to the drain of the output MOSFET switch $S_2$. Thus, turning ON and OFF of primary switching devices will automatically generate the correct drive waveforms on the transformer secondary to drive the output MOSFET switching devices. Thus, the complex drive and control circuit is eliminated.

Figure 31B:
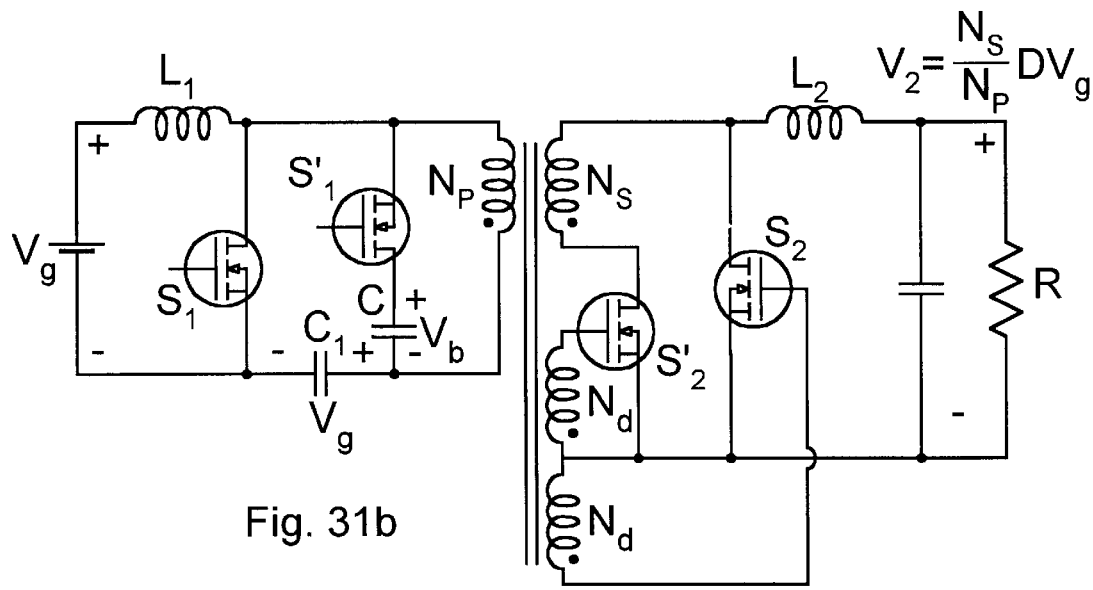
FIG. 31b illustrates a self-driven embodiment of the converter in FIG. 30 with additional drive windings $N_d$ on the isolation transformer.

Another "self-driven" embodiment of the present invention is shown in FIG. 31b in which additional drive windings are wound on the same magnetic core of the isolation transformer. Each drive winding has a number of turns $N_d$ and homologous end of the windings are connected so as to provide the optimum, out-of-phase drives for the two output MOSFET switches. Once again, the complex drive and control circuitry is eliminated and circuit is significantly simplified. In comparison with the "self-driven" configuration of FIG. 31a, the configuration of FIG. 31b is more flexible since the number of drive winding turns can be chosen to optimize the drive requirements. It should be noted, that despite the above circuit simplification, most of the lossless switching benefits discussed in the next section are still available in this simpler drive implementation.

Figure 32:
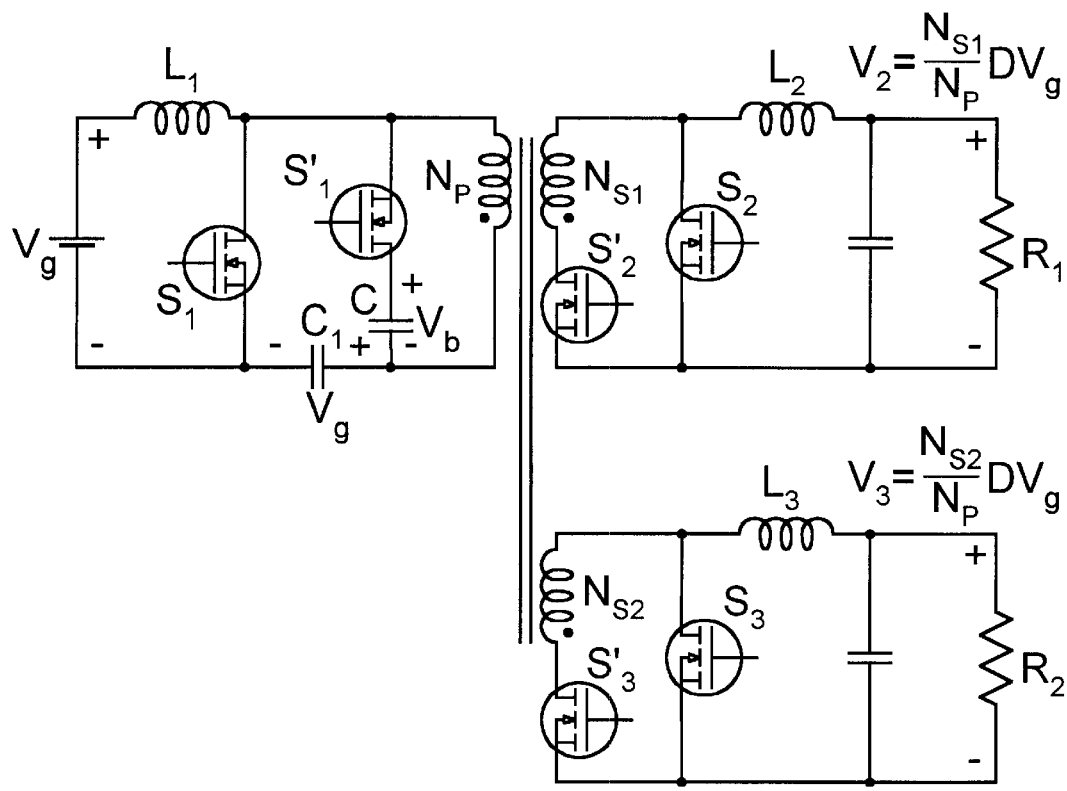
FIG. 32 illustrates a two-output embodiment of the converter in FIG. 30.

Once the isolation transformer is implemented, each separate output voltage is scaled by the corresponding transformer turns ratio, such as illustrated in FIG. 32. Since each output is isolated, by choosing appropriately the output ground for the second output, a negative polarity output voltage can be obtained as well.

Figure 33:
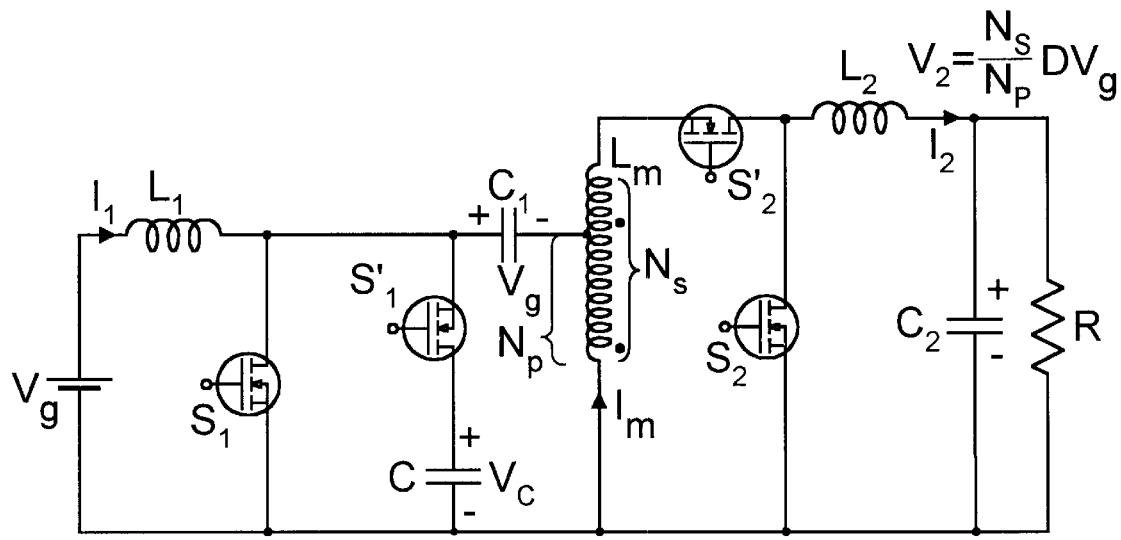
FIG. 33 illustrates another embodiment of the present invention using an autotransformer.

In some applications where isolation is not required and a positive output voltage polarity is needed from a positive input voltage source, it is beneficial to use another embodiment in which an autotransformer replaces the middle inductor, such as shown in FIG. 33. As in any autotransformer connection, primary and secondary windings share some common number of turns, such as $N_P$ in FIG. 33. This configuration is more efficient than the fully isolated version. As shown in FIG. 33, only one winding with total number of turns $N_S$ needs to be provided for the autotransformer, since the primary winding is just using a tap at $N_P$ turns. In configuration shown in FIG. 33, $N_S>N_P$ and turns ratio provides a voltage step-up. However, when $N_S<N_P$ (secondary winding uses a tap on the primary winding), an additional voltage step-down is obtained. In addition, the AC copper losses are reduced, since the single autotransformer winding has also lower RMS current. An additional voltage scaling of output DC voltage is obtained, just as in the isolation transformer case.

Isolated Extensions with VBS Output Switch

Figure 34:
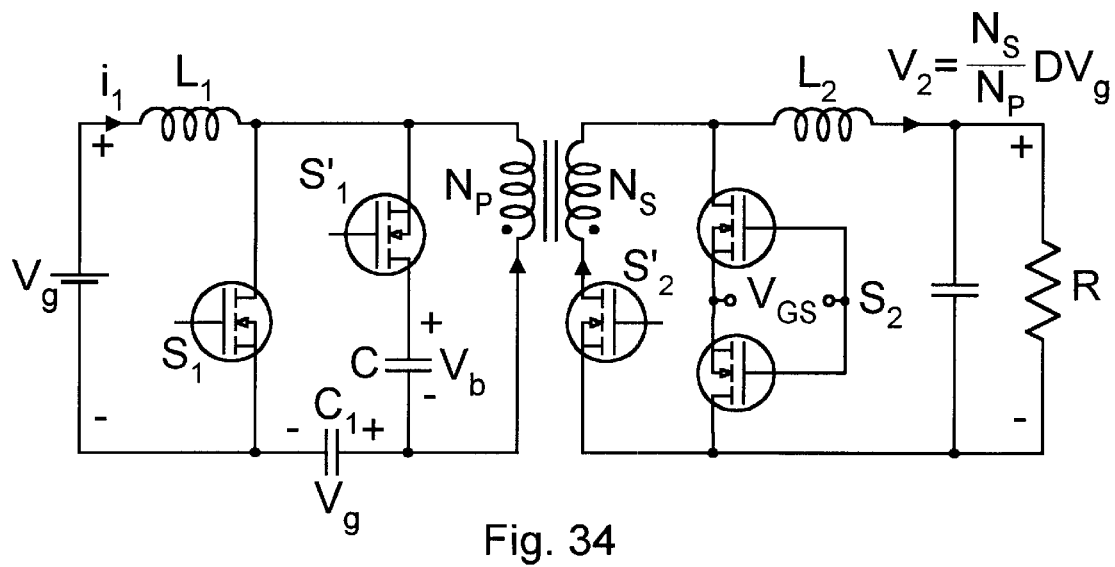
FIG. 34 illustrates another embodiment with two-MOSFET implementation of the output switch of the converter in FIG. 30.
Figure 35:
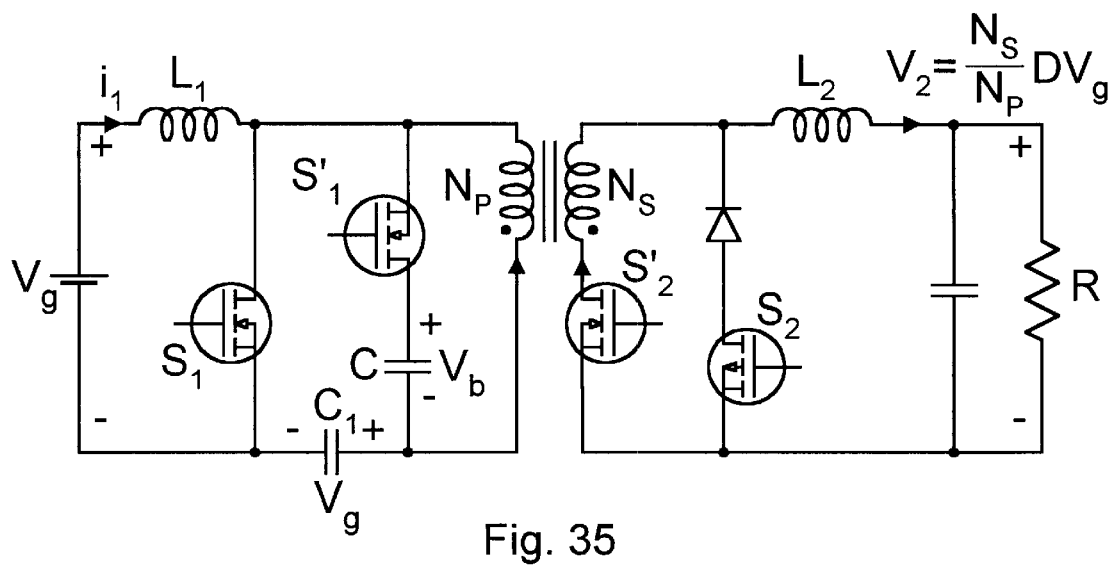
FIG. 35 illustrates another embodiment with P-channel MOSFET/diode implementation of the VBS output switch of the converter in FIG. 34.

Shown in FIG. 34 is an embodiment of the isolated converter in which all switches of FIG. 29e are replaced with N-channel semiconductor MOSFET switching devices. Note also that the output VBS switch $S_2$ is implemented by a composite four-quadrant switch consisting of two MOSFET devices. The primary side switches are again so connected that a high-side driver IC chip can be used, which is a distinct practical advantage. The complementary output switch $S'_2$ is connected with its source grounded and ready for direct drive. However, the output switch implemented by two-MOSFET four-quadrant composite switch $S_2$ in FIG. 34 requires a floating drive. In FIG. 35, the Voltage Bi-directional Switch (VBS) $S_2$ is implemented with a diode and a P-channel MOSFET with grounded source, which is a configuration suitable for a direct drive. Note also that the auxiliary capacitor C is at the same time in a position in which it has a lower DC voltage rating. The voltage on this capacitor C could be even lower if the branch consisting of switch $S'_1$ and auxiliary capacitor C is connected in parallel with the input inductor $L_1$. However, in this configuration the input current will contain the AC ripple current flowing in this branch plus the input inductor current and thus, will no longer be ripple free.

Figure 36:
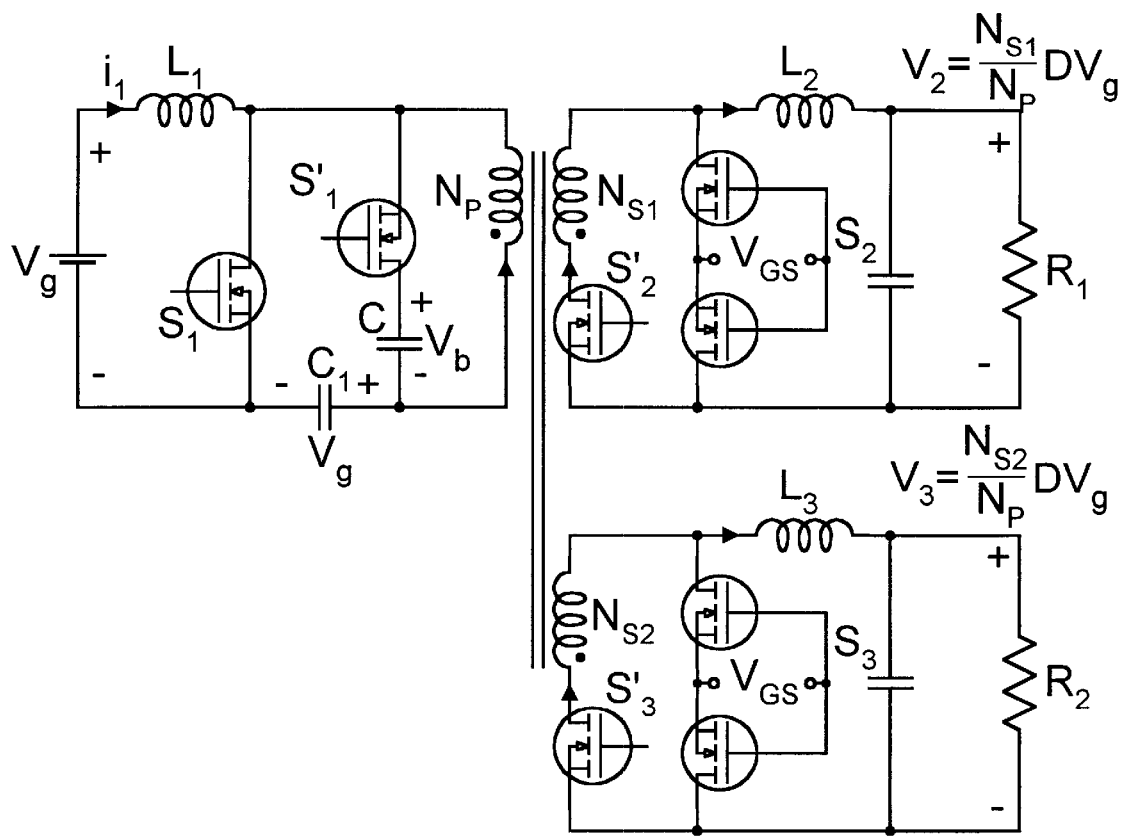
FIG. 36 illustrates a two-output embodiment of the converter in FIG. 34.

Once the isolation transformer is implemented, each separate output voltage is scaled by the corresponding transformer turns ratio, such as illustrated in FIG. 36. Finally, since each output is isolated, by choosing appropriately the output ground for the second output, a negative polarity output voltage can be obtained as well.

Figure 37:
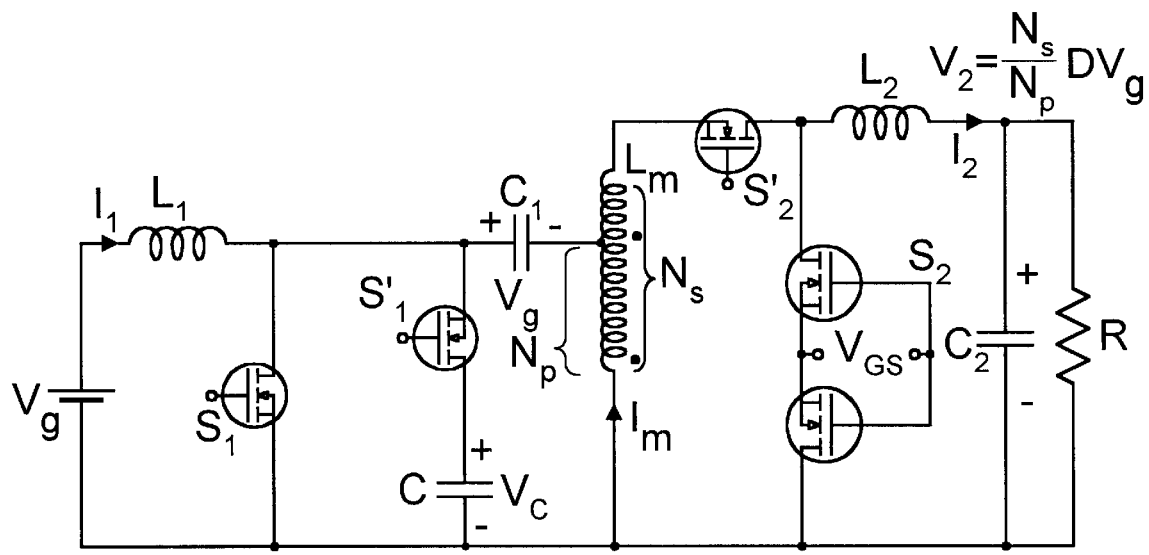
FIG. 37 illustrates another embodiment of the converter in FIG. 33 with two-MOSFET implementation for the VBS output switch.

In some application where isolation is not required and a positive output voltage polarity is needed from a positive input voltage source, it is beneficial to use another embodiment in which an autotransformer replaces isolation transformer, such as shown in FIG. 37.

In the majority of applications, such as in the operation from the rectified AC line, a rather large overall step-down is required, from 400V to 5V or lower voltage, for example. In this case, an additional step-down is provided through the isolation transformer step-down turns ratio. The isolating extensions of FIG. 30 and FIG. 34 and autotransformer extensions of FIG. 33 and FIG. 37 perform in that case also an important practical function of complete decoupling of the converter input side from the converter output side. This desirable performance is due to the output side rectification. The complete decoupling means that the input side will only "see" its low currents and no reflected DC currents from the output side, which in low voltage, high current application could represent major additional current stress on the input side devices. Likewise, the output voltages will not reflect to the input side to increase the voltage rating of the input side switching devices. Neither the voltages on the input side will reflect to the output side and increase the voltage rating of the output side components nor will the input current reflect through the isolation transformer or autotransformer turns ratio to increase the total current seen by the output devices. Thus, the switching devices on the transformer primary side will operate at low input currents, while switching devices on the transformer secondary side will operate at low output voltages, without any additional voltage and/or current overhead.

When the MOSFET switches are OFF, their parasitic drain-to-source capacitances are charged to the OFF state voltage $V_C$ storing energy which is given by $\frac{1}{2}C_S V_C^2$ where $V_C$ is the device blocking voltage and $C_S$ is the switching device parasitic capacitance as per (1). Due to quadratic dependence on the blocking voltage, the high voltage devices on the input primary side have considerably higher stored energy than the low voltage output devices on the transformer secondary side. Each time the respective MOSFET switch is turned ON the parasitic capacitor is shorted and its stored energy is dissipated as heat, unless other measures are taken to eliminate this loss. This reveals which of the MOSFET switching devices in FIG. 30 and FIG. 34 are most critical for the reduction of the switching losses in case of a large input to output step-down conversion. The input side MOSFET switches are in that case high voltage devices, while output side MOSFET devices are low voltage devices. Clearly, the high voltage devices on the input side are by far the most critical in terms of this switching loss contribution. Thus, the next section describes novel lossless switching embodiments of the present invention which completely eliminate the switching losses of the high-voltage MOSFET switches on the input side and either eliminate of substantially reduce the switching losses of the MOSFET switches on the output side.

ELIMINATION OF SWITCHING LOSSES

Second Fundamental Property

Figure 38A:
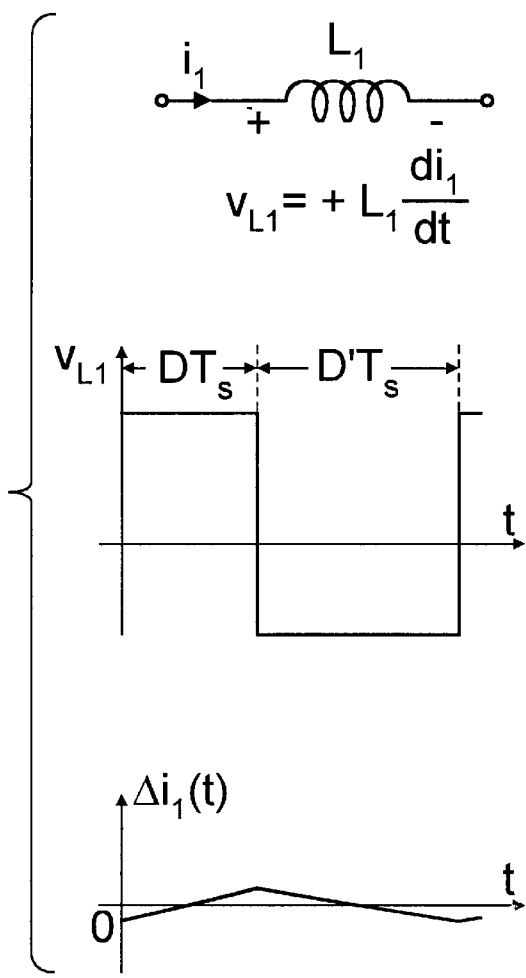
FIG. 38a illustrates the AC voltage and ripple current waveforms for inductor $L_1$ described by $v_{L1}=L_1 di_1/dt$ and FIG. 38b illustrates the AC voltage and ripple current waveforms for inductor $L_2$ described by $v_{L2}=-L_2 di_2/dt$.
Figure 38B:
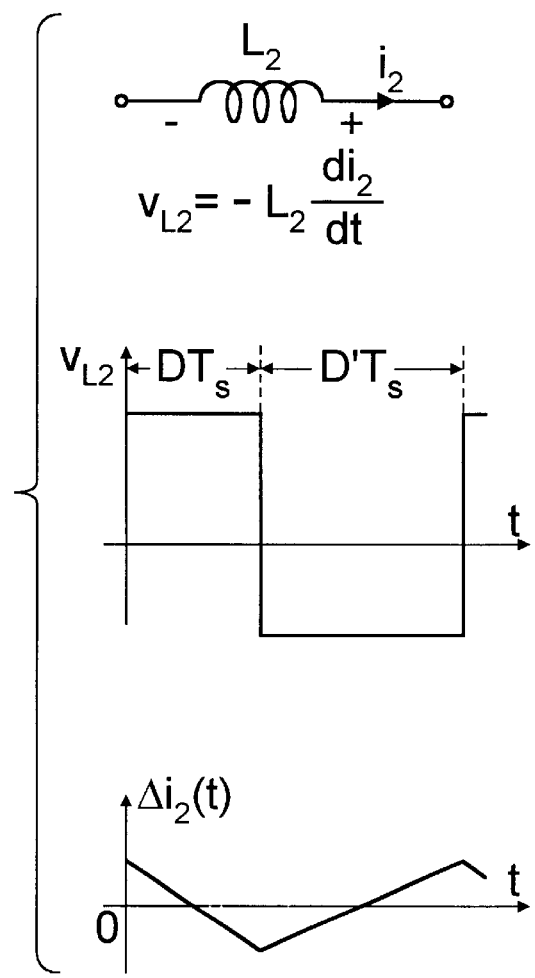

The AC ripple current components of the input inductor and output inductor in the converter of FIG. 11c are displayed in FIG. 38a and FIG. 38b. Note that for the given chosen direction of the two inductors currents and for the positive AC voltage polarity of the windings chosen as per FIG. 38a and FIG. 38b, the following equations apply:

$$v_{L1}=L_1 di_1/dt \text{ and } v_{L2}=-L_2 di_2/dt \quad (12)$$

The difference in sign of these two equations shows that output inductor ripple current is out of phase in comparison with input inductor ripple current as seen in FIG. 38a and FIG. 38b.

Figures 39A, 39B:
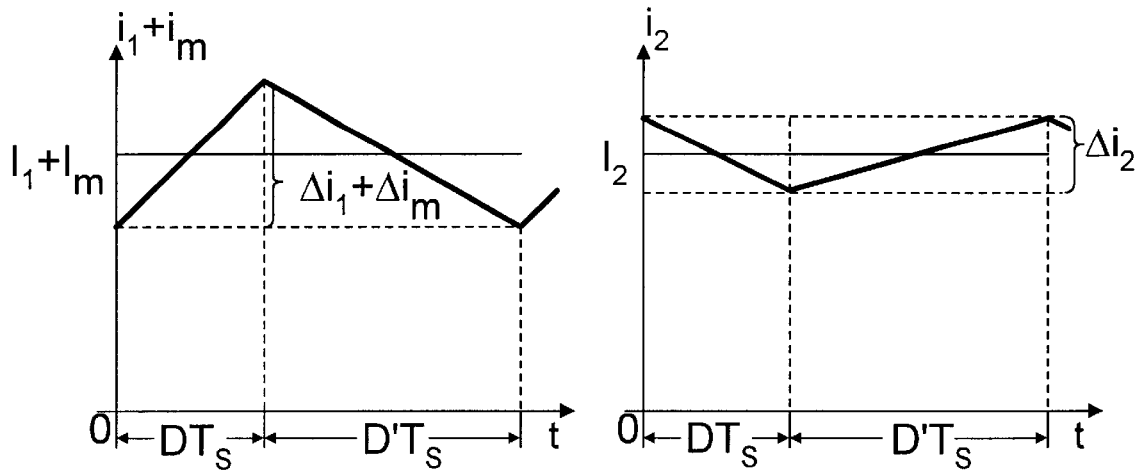
FIG. 39a illustrates the time domain waveform of the sum of input and middle inductor currents of the converter in FIG. 21a, FIG. 39b illustrates the time domain waveform of the output inductor current of the converter in FIG. 21a, FIG. 39c illustrates the total of the three inductors' DC currents of the converter in FIG. 21a, which is equal to zero.
Figure 39C:
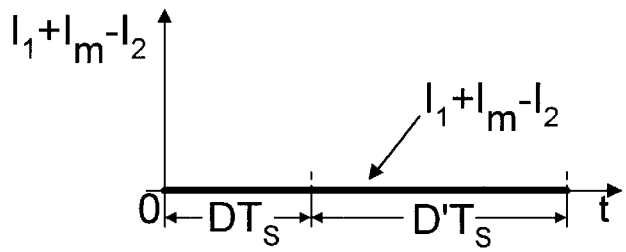
Figures 39D, 39E:
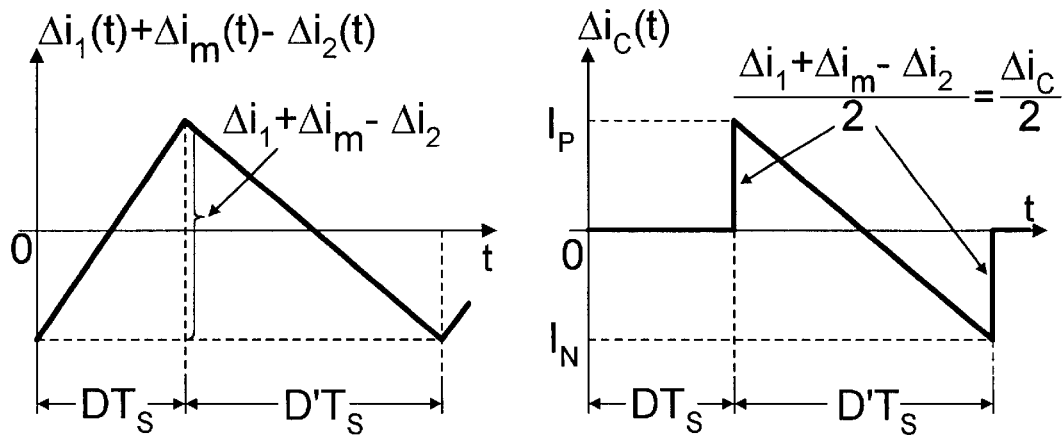

Let us now fully explore the time domain interpretation of equations (4), (5), (6), and (7). The sum of inductor currents $i_1(t)+i_m(t)$ is displayed in FIG. 39a, showing its DC current level $I_1+I_m$ and AC ripple current component $\Delta i_1+\Delta i_m$. The output inductor current $i_2(t)$ is shown in FIG. 39b. The output inductor DC current level $I_2$ is of equal magnitude as $I_1+I_m$, thus after subtraction the net DC current shown in FIG. 39c is zero at all times, demonstrating the relationship (5). The subtraction of the ripple current $\Delta i_2(t)$ of FIG. 39b from the ripple current $\Delta i_1(t)+\Delta i_m(t)$ of FIG. 39a results in the time domain representation of the total ripple current waveform of FIG. 39d. Note that since the output inductor ripple current is out of phase relative to the input inductor and middle inductor ripple currents, and since we are looking at the difference $\Delta i_1(t)+\Delta i_m(t)-\Delta i_2(t)$, this will result in actual addition of the magnitudes of all three ripple currents as shown in FIG. 39d. The time domain waveform of current $i_C(t)$ in FIG. 39e in auxiliary capacitor C coincides with the waveform of FIG. 39d during the complementary time interval $D'T_S$ and is obviously zero during the time interval $DT_S$. This auxiliary capacitor current $i_C(t)$ has zero DC current component thus verifying the original assumption. While the presence of the AC ripple current only in the auxiliary capacitor could have been deduced easily from the fact that auxiliary capacitor must be both charged and discharged within the same complementary interval $D'T_S$, the above detailed analysis confirms that this AC ripple current is identical to that in FIG. 39e during the complementary interval $DT_S$, that is equal to positive value $I_P$ at D to D' transition and negative value $I_N$ at D' to D transition.

Thus, at the end of the complementary interval $D'T_S$ the auxiliary capacitor instantaneous current will always have just the desired direction which discharges auxiliary capacitor C with a peak current of magnitude $I_N$.

Figure 2A:
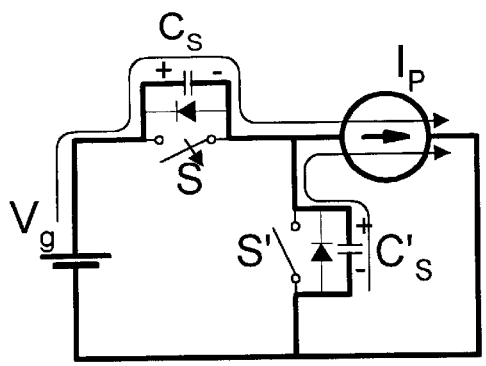
Figure 2B:
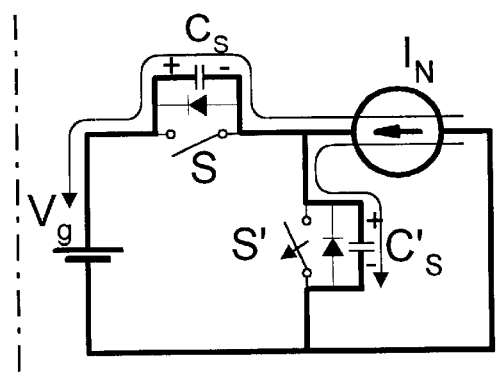
Figure 2C:
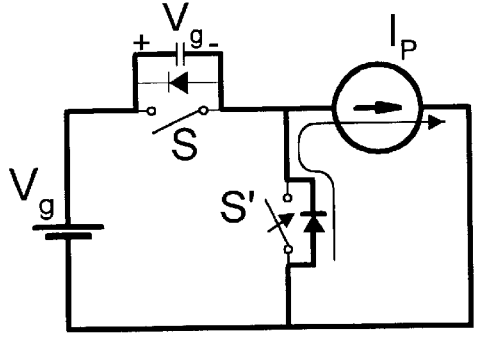
Figure 2D:
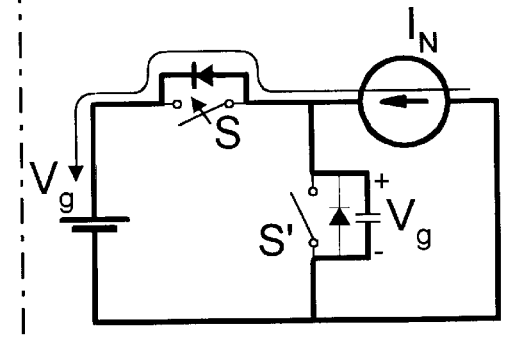
Figure 2E:
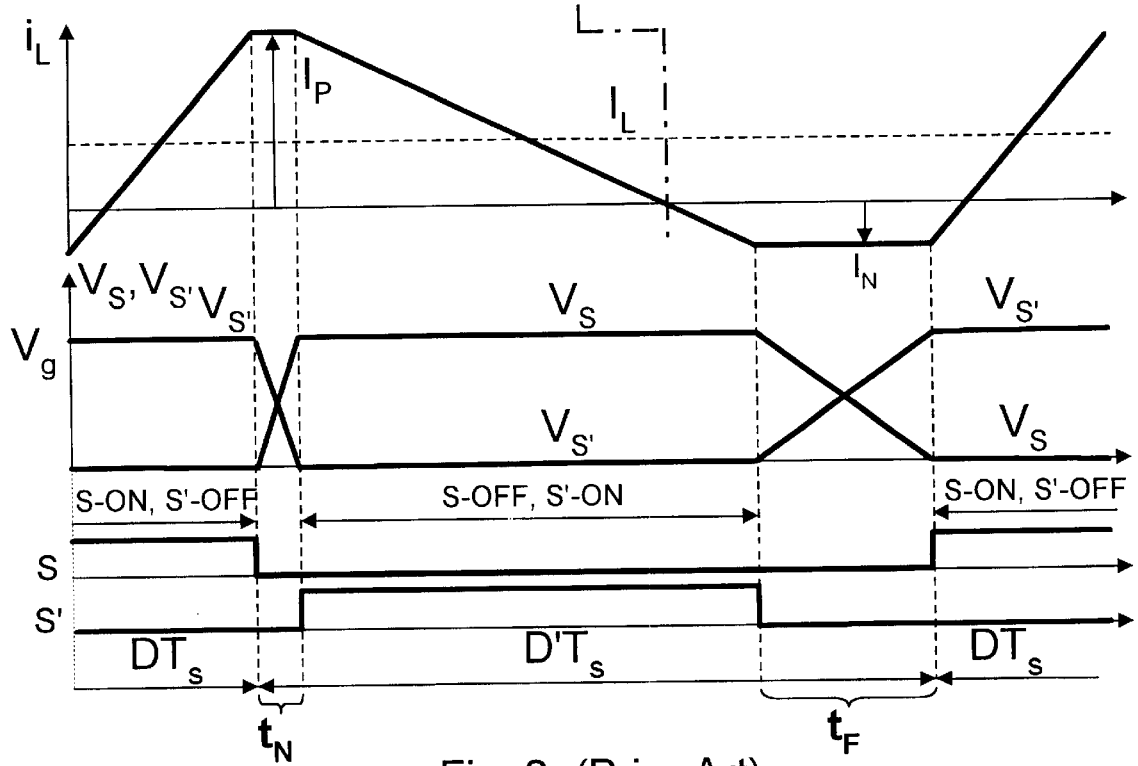

From the above detailed analysis, it follows that regardless of the magnitudes of the ripple currents in the three inductors, the auxiliary capacitor time domain current will always be of the same shape as shown in FIG. 39e: positive peak value $I_P$ at the transition from $DT_S$ to $D'T_S$ time interval and negative peak $I_N$ at the transition from $D'T_S$ to $DT_S$, where $I_P=|I_N|=\Delta i_C/2$. Thus, for any duty ratio D, auxiliary capacitor current in FIG. 39e will always have a negative peak $I_N$ enabling the lossless switching operation. Clearly, the same holds true when the middle inductor is replaced with an isolation transformer in the isolated converter version. In either case, note how this already provides automatically the negative peak current $I_N$ required for the difficult to implement forced transition (D' to D transition) for lossless switching. Common soft-switching techniques, until present invention, had to somehow forcefully generate the negative instantaneous output inductor current at the end of complementary interval by, for example, an inordinate increase of the output inductor ripple current as described and shown in prior-art soft-switching in the buck converter of FIG. 2e.

Prior-art soft-switching methods were limited in its effectiveness by the use of the passive semiconductor switching devices, such as diode rectifiers, for both output switch and complementary output switch. These devices are turned ON automatically but only in response to the particular state reached by converter circuit operation at one very special instant in time (near-zero positive threshold voltage across diode switch terminals), and not as needed to maximize benefits of lossless switching. A number of novel lossless switching converter circuits are presented here with much improved effectiveness of the lossless switching and substantial increase in efficiency, which came as a result of the use of the controllable and two-quadrant semiconductor switching devices, such as MOSFET transistors for both output switch and complementary output switch, which could be turned ON independently of the state of the converter. Clearly, a large number of possibilities exist in controlling the actual switching timing of these controllable switches so as to optimize the lossless switching performance with or without inclusion of resonant inductor. Here, some of the most effective ways will be introduced and explained. Those skilled in the art could from those deduce the variations or combination of the disclosed lossless switching methods, which would be most effective for specific application on hand.

The following lossless switching presentation is broken down into two major parts:

1. Classification and analysis of Novel Lossless switching Methods in which novel lossless switching methods are introduced first and their operation explained through simplified equivalent circuit models representing various transition subintervals correlated to salient waveforms. For each lossless switching method the critical analytical equations are given and their use in the design explained so that effective lossless switching could be devised for a broad range of practical applications from low voltage through medium voltage to high input DC voltage requirements, non-isolated or isolated converter applications, wide input voltage range requirements, etc., and through that the best use of each method could be contemplated.

2. Detailed Description of the Lossless switching in which the detailed operation of each of the lossless switching methods is described using complete converter circuit states for each transition subinterval of the two transitions (D to D' and D' to D), along with detailed description of operation.

Classification and Analysis of Novel Lossless Switching Methods

The presentation is broken down in the following way. The most important and much more difficult D' to D (so called "forced") transition is analyzed first in the following three categories and in this order:

1. Non-isolated converter without resonant inductor;
2. Non-isolated converter with resonant inductor;
3. Isolated converter with its leakage inductance as resonant inductor.

Each of these categories will then lead to a different lossless switching category based on the output switch implementation as CBS switch, diode or VBS switch, which, in turn, will be shown to depend on the actual instant in time during the transition interval at which the output switch is turned ON.

The same above format is then used to verify the lossless switching performance during the easier to achieve D to D' transition, also called "natural" lossless switching transition.

The various possibilities for each of the two separate transitions, D to D' and D' to D are then combined together in section on Detailed Description of Lossless switching into a number of novel lossless switching alternatives. Clearly, the main division in that section will start from the opposite end, that is with the two main categories, while depend on particular output switch implementation: CBS/diode switch category and VBS switch category with both transitions included, and then follow with the other variants, such as non-isolated converter with or without resonant inductors and finally isolated converter. The same organization as in Detailed Description of Lossless switching is then followed in the section on Experimental Verification.

Note that in the case of the isolated converters, there is no need for a separate resonant inductor since its role is played by the already built-in leakage inductance of the isolation transformer. Furthermore, unlike in other soft-switching methods, in which leakage inductance of the isolation transformer was purposely made large by loosely coupling the primary and secondary windings in order to make soft-switching effective, no such requirement is needed here. Thus, the transformer is made with tightly coupled windings to minimize the leakage inductance and corresponding losses.

In order to easier follow the multitude of lossless switching possibilities, the following nomenclature is adopted:

1. The lossless switching cases for non-isolated converter without resonant inductor are enumerated with capital letters, such as A, B, C, etc;
2. The lossless switching cases for non-isolated converter with resonant inductor are enumerated with Arabic numbers, such as 1, 2, 3, etc;
3. The lossless switching cases for isolated converter (leakage inductance included) are enumerated with Roman numerals, such as I, II, III, etc;

Definition of Steady-state and Transition Intervals

The hard-switching represented with a timing diagram of FIG. 3b clearly distinguished only two intervals, $DT_S$ interval and complementary interval $D'T_S$ with corresponding switch states as either ON or OFF. The two transitions from $DT_S$ interval to $D'T_S$ interval (called D to D' transition) and $D'T_S$ interval to $DT_S$ interval (called D' to D transition) also exist since real semiconductor switches are not infinitely fast. In the lossless switching operation of the new converter of FIG. 11d, the lossy and stressful hard-switching operation of the switches is replaced with a lossless and smooth operation with well-controlled transition time intervals owing to the precise and optimally timed switching time control of all switches. Switching time control box in FIG. 11d and corresponding precise control of switch drive timing is, then, an integral, critical and inseparable part of the lossless switching converter operation. Without it, the converter operation will revert back to the hard-switching operation with resultant large reduction of efficiency, increase of size and other performance degradation, such as EMI noise, increased device voltage, current and temperature stresses and therefore much reduced reliability. Thus, as will the following analysis and experiments confirm, the hard-switching converter topology is of secondary importance, since it is the underlying lossless switching converter topology and precise switching time control of all switches and corresponding beneficial operation of the converter circuit during respective transition subintervals which is of the primary reason for converters ultra high efficiency performance and small size.

Note a rather large number of the switching time control possibilities of each of the four switches in FIG. 11d for either of the two transition intervals. However, only a few of the very specific drive timing will in conjunction with converter operation (with or without additional resonant inductor) and appropriate switch implementation for output switch (such as CBS or VBS switch) result in superior lossless switching operation. This rather large number of possible switching time control for four controllable two-quadrant switches of FIG. 11d requires more precise definition of the two steady-state intervals and two transitions intervals. Thus, the steady-state intervals, $DT_S$ and $D'T_S$ and the steady-state duty ratio D and complementary duty ratio D' are now defined only with respect to the input switch $S_1$: interval $DT_S$ lasts as long as the switch $S_1$ is closed (conducts current) and complementary interval $D'T_S$ lasts as long as the switch 51 is open. In this way, the steady-state properties (DC voltages on capacitors and DC currents in inductors) can be uniquely determined with respect to so defined steady-state duty ratio D.

The two transition intervals are then defined as follows: During the first transition interval (often also called "natural" transition), termed hereafter D to D' transition, the state of the switches is changed from initial state in which $S_1$ and $S_2$ are ON and $S'_1$ and $S'_2$ are OFF to the final state in which $S_1$ and $S_2$ are OFF and $S'_1$ and $S'_2$ are ON. During the second transition (often called "forced" transition), the state of the switches is changed opposite to the above, from initial state in which $S_1$ and $S_2$ are OFF and $S'_1$ and $S'_2$ are ON to the final state in which $S_1$ and $S_2$ are ON and $S'_1$ and $S'_2$ are OFF.

Prior-art soft-switching converters such as the buck converter of Two-Switch Converter Class or any of the prior-art soft-switching converters belonging to the Four-Switch Converter Class have very simple definition of the two transitions owing to the presence of only two controllable switches: both controllable switches are OFF during each transition since other switching devices are implemented with passive diode rectifier switches and thus are not controllable by switching time control box. Each transition is, therefore, initiated by turning OFF whichever switch of the two controllable switches was ON the moment before. Thus, the D to D' transition is initiated by turning OFF the one controllable switch, and D' to D transition is initiated by turning OFF the other controllable (complementary) switch. The novel lossless switching method, however, is not any more as simple as prior-art soft-switching because:

1. Four controllable switches with two-quadrant switching characteristics offer many more switching time control possibilities;
2. As the consequence of I above, the optimum switching time control of the input switch and complementary input switch is in many cases entirely different from the switching time control of the switches in the prior-art soft-switching converters,
3. The switching time control depends on the actual type of the two-quadrant switches used (CBS or VBS type).

Thus, the beginning of the first transition interval (D to D' transition) will not any more necessarily coincide with turning OFF of the input switch $S_1$ at the end of $DT_S$ interval. Due to the presence of the additional two active and controllable switches, the output switch $S_2$ and the complementary output switch $S'_2$, the lossless switching D to D' transition could start with whichever switch is designated to initiate such transition. For example, in one lossless switching case termed "symmetrical" lossless switching (with VBS output switch and without resonant inductor), the first transition will start quite unexpectedly with turning OFF of the output switch $S_2$, while the input switch $S_1$ will be turned OFF only later during same D to D' transition to initiate the second part of the same transition. Similarly, the difficult D' to D transition in isolated converter (hence with leakage inductance and with CBS output switch), in the case of very high input DC voltage is started by turning ON of CBS output switch $S_2$ first even before complementary input switch $S'_1$ is turned OFF.

The converter circuit models applicable during transition subintervals are depicting the MOSFET or diode switches which are ON in thick lines, and those, which are OFF in thin lines.

Assumptions

Unless mentioned specifically otherwise the following assumptions apply:

1. All switches are controllable two-quadrant switches, that is MOSFET transistors, which are modeled as ideal switches in parallel with the parasitic capacitances and their body-diodes;
2. The inductance values of $L_1$, $L_2$, and $L_m$ are sufficiently large such that their respective instantaneous currents $i_1$, $i_2$, and $i_m$ can be considered constant during the relatively short lossless switching transition intervals;
3. The capacitors C, $C_1$, and $C_2$ are sufficiently large such that their respective voltages can be considered constant during the whole switching cycle and equal to their DC voltage values.

Parameters of Equivalent Resonant Circuits

Parasitic capacitance $C_{S1}$ of the input switch and $C_{S'1}$ of complementary input switch are combined into a resonant capacitance $C_r$ given by $$C_r = C_{S1} + C_{S'1} \tag{13}$$

since they operate during transition interval as capacitors connected in parallel.

For the analysis of the isolated converter, all quantities are assumed to be reflected to the primary side. Specifically, the parasitic capacitance of the output switch $S_2$ is reflected through the isolation transformer turns ratio to the primary side as an equivalent capacitance $C_{S2p}$, such that $$C_{S2p} = C_{S2}(N_2/N_1)^2 \tag{14}$$

In the subsequent analysis for the cases where resonant inductor is included, it is also assumed that this reflected capacitance $C_{S2p}$ is much smaller and negligible in comparison with resonant capacitance $C_r$ of the input switches defined in (13), that is $$C_{S2p} \ll C_r \quad (15)$$

This assumption is not needed for cases without resonant inductor. Note that this assumption (15) is satisfied in most practical cases of interest with relatively large step-down turns ratio of the isolation transformer. For example, even though the secondary side low voltage switches do have higher capacitance than primary side high voltage switches, when reflected to the primary side with even modest 5:1 step-down turns ratio or an effective 0.04 reflection coefficient, the reflected capacitance does become negligible in comparison to resonant capacitance of primary side high voltage switching devices. The case when (15) is not fulfilled is also analyzed and shown that it can lead to complete lossless switching although with a significantly more complex model and requiring larger peak of auxiliary capacitor AC ripple current $I_N$ to overcome the effect of the extra capacitance of the output switch.

Without any loss of generality, the leakage inductance $L_l$ of the isolation transformer is also considered to be concentrated on the primary side and equal to resonant inductor $L_r$ of the non-isolated converter. Thus, for both non-isolated and isolated converters and under assumption (15), the characteristic resistance $R_0$ of the series resonant circuit formed by the resonant capacitance $C_r$ and resonant inductor $L_r$ (or leakage inductance $L_l$=$L_r$) is given by $$R_0 = \sqrt{L_r/C_r} \quad (16)$$

whereas the resonant frequency of the same series resonant circuit is given by $$\omega_r = 1/\sqrt{L_r/C_r} \quad (17)$$

The actual physical resistance of the series resonant circuit due to the parasitic resistances of the resonant inductor and capacitors and their interconnection resistances is in practice very small. Thus, in the following analysis it is neglected and only the undamped oscillation case is assumed.

The characteristic resistance $R_0$ plays the critical role in lossless switching performance of the converter and together with the peak current $I_N$ of the auxiliary capacitor at the D' to D transition (FIG. 39e) is used to evaluate quantitatively relative effectiveness of three resonant voltage components responsible for the lossless switching of the hard to do D' to D transition.

In the present invention, the auxiliary capacitor negative current $I_N$ at the end of the D'$T_S$ time interval already exists as proved earlier in FIG. 39e. Thus, the large output inductor ripple current is not needed, contrary to prior-art soft-switching schemes such as one in FIG. 2e. In fact, as shown below, the special switching time control of the present invention, which takes advantage of the recognition of the key relationship (4) is in itself sufficient to provide significantly reduced switching losses.

In this converter just as in many other switching converters, the "natural" D to D' transition is easily accomplished, since the current direction during this transition is such to naturally discharge the parasitic capacitor of complementary input switch. It is the second D' to D transition which requires reversal of current direction such as in the buck example of FIG. 2(a–e) justifying its name "forced" transition. Therefore, how the novel lossless switching methods are accomplishing this difficult D' to D forced transition is explained first followed by D to D' transition using simplified equivalent circuit models and proper switching time control together with or without added resonant inductor. This is then followed by detailed description of converter operation during both transitions supported by detailed circuit diagrams of various transition states and detailed waveforms.

In the circuit diagrams used below the actual switching time of the complementary output switch S'$_2$ for either transition is often omitted since the body-diode of this switch will dictate when it will be turned ON or OFF. Hence, the MOSFET is just used to bypass the conduction of its body-diode and reduce conduction losses. On the other hand, the switching time of the output switch $S_2$ is especially critical for the difficult to achieve D' to D lossless switching transition. Depending on particular instant of turning ON the output switch and presence or absence of resonant inductor a number of very effective lossless switching alternatives are obtained by use of either CBS or VBS switch. First the more difficult D' to D transition is analyzed below in details followed by the analysis of D to D' transition.

LOSSLESS SWITCHING DURING D' TO D TRANSITION

Non-isolated DC-to-DC Converter without Resonant Inductor

Figure 40A:
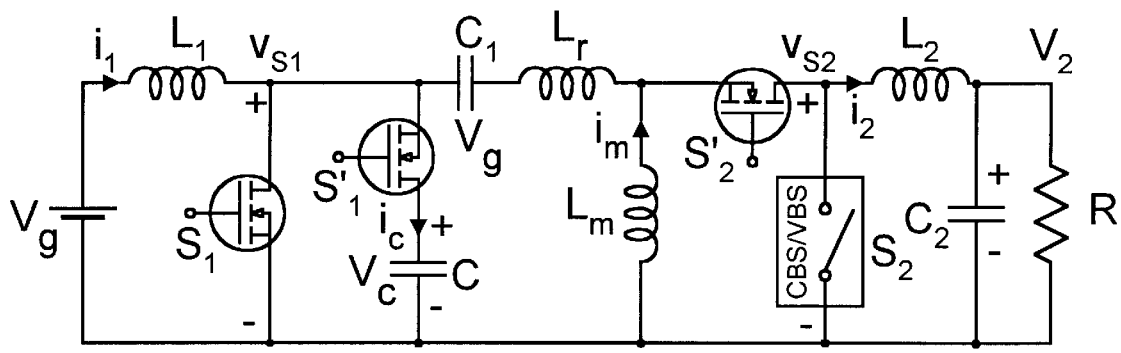
FIG. 40a illustrates another embodiment of the present invention with an added resonant inductor $L_r$.
Figure 40B:
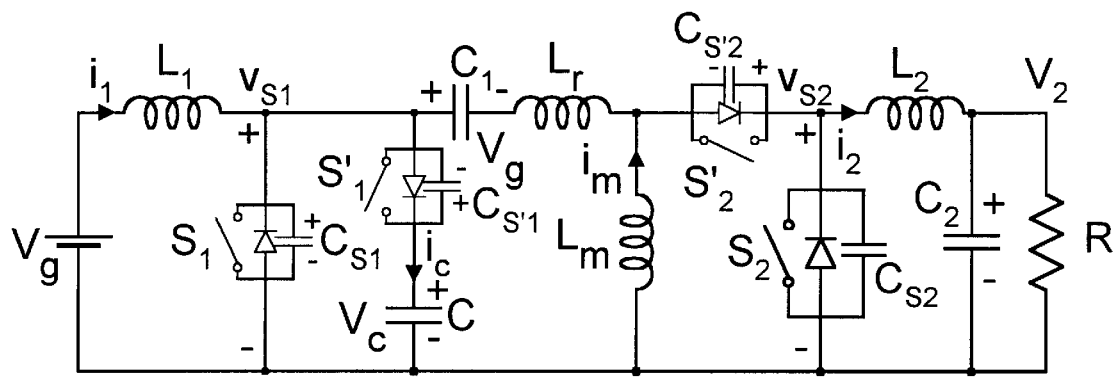
FIG. 40b illustrates the converter of FIG. 40a when all switches are current bidirectional and represented with their equivalent models.
Figure 40C:
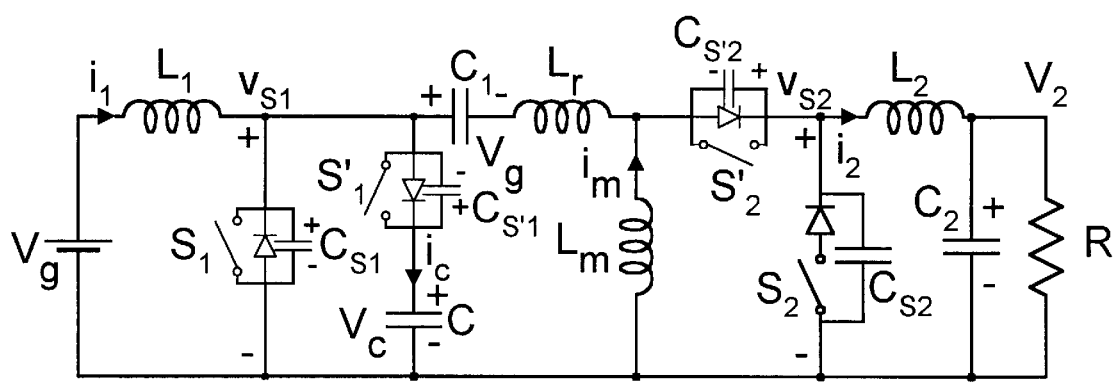
FIG. 40c illustrates the converter of FIG. 40b with VBS output switch represented with its equivalent model.

Two major lossless switching alternatives are considered. The first one is based on using only the appropriate gate drive timing of the four switches and does not depend on the addition of any external component, hence $L_r$=0 in FIG. 40a is assumed. The second alternative is based on using a resonant inductor $L_r$ added in series with input capacitor C, as shown in FIG. 40a. Note that the input switch, complementary input switch, and complementary output switch are implemented as CBS switches, which are, in turn, modeled in FIG. 40b as composite switches consisting of the parallel connection of an ideal switch, a parasitic body-diode, and a parasitic drain-to-source capacitor. The output switch $S_2$, however, is implemented as either CBS switch and modeled as in FIG. 40b or as a VBS switch and modeled as in FIG. 40c.

Figure 41A:
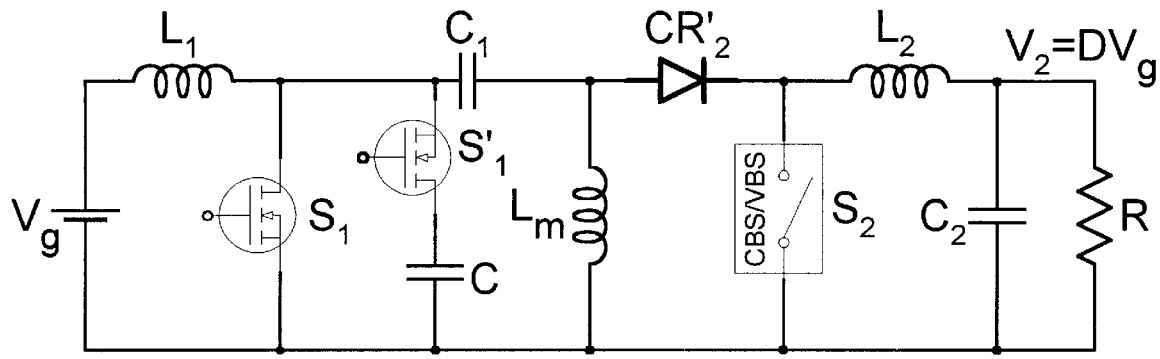
FIGS. 41(a–c) illustrates the converter of FIG. 11c with diode rectifier in place of the complementary output switch and immediately after complementary input switch was open at the beginning of the D' to D transition.
FIG. 41b illustrates the equivalent circuit model of the converter in FIG. 41a valid for D' to D transition.
FIG. 41c shows the simplified equivalent circuit model of the model in FIG. 41b.
Figure 42A:
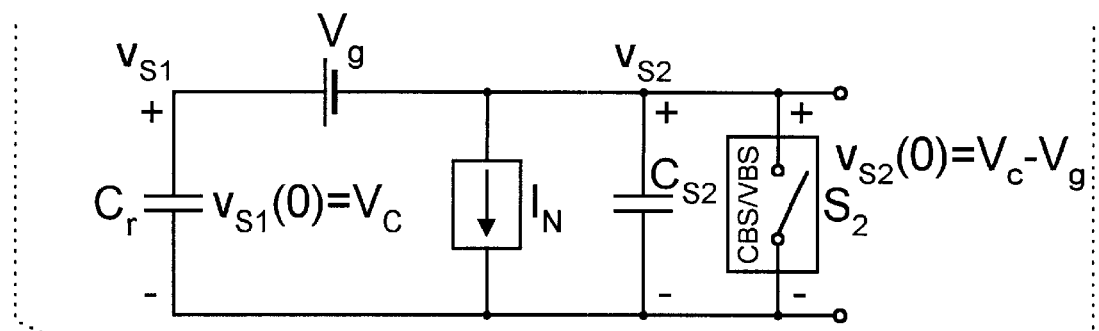
FIG. 42a illustrates the final equivalent circuit model for the converter of FIG. 41a for D' to D transition.
Figure 42B:
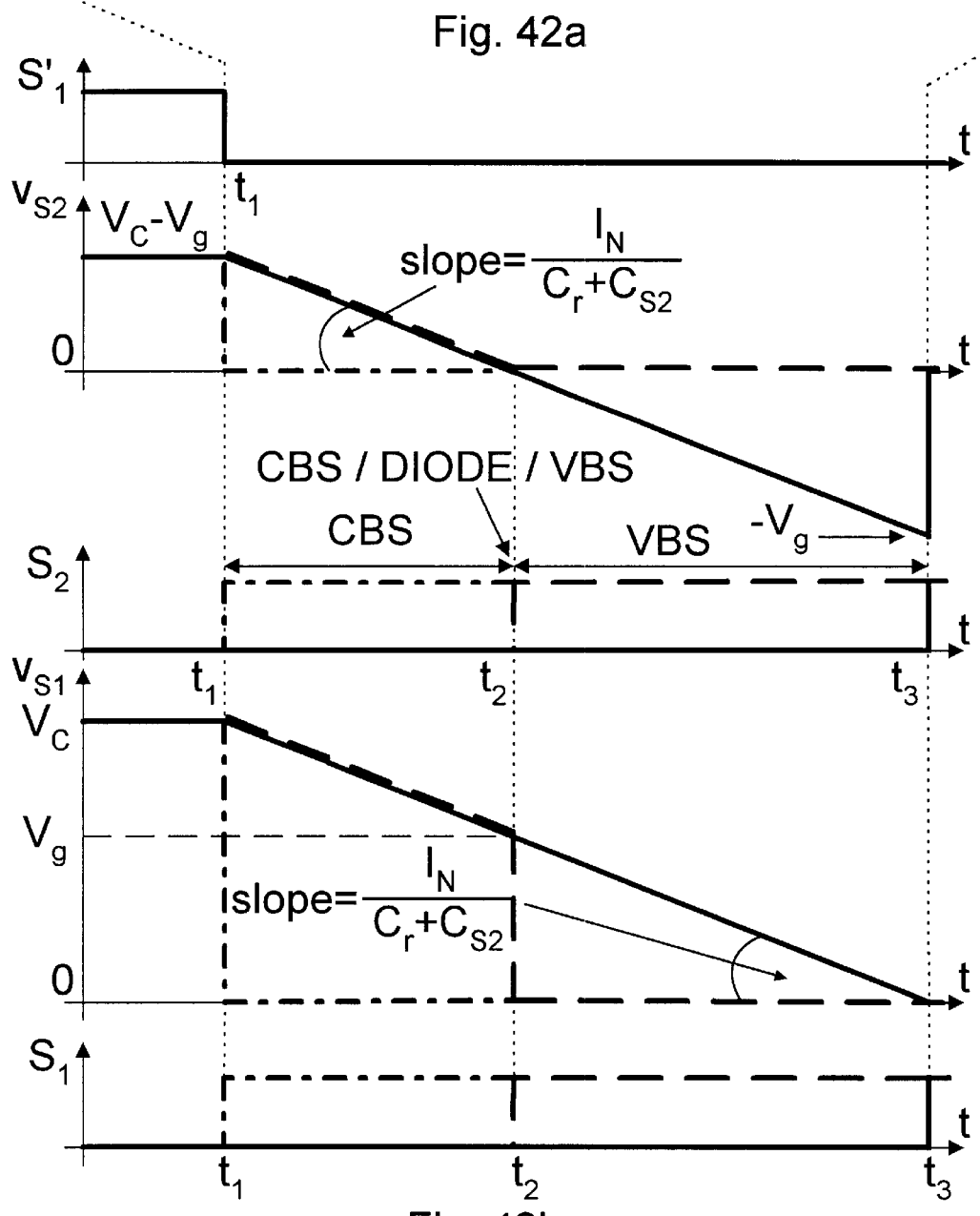
FIG. 42b shows from the voltage $v_{S2}$ that the type of output switch depends on the particular instant at which the output switch is turned ON: a) CBS switch from $t_1$ to $t_2$ (dotted lines); b) CBS, VBS or diode switch at $t_2$ (dashed lines); c) VBS switch from $t_2$ to $t_3$ (thick lines)

To easier follow the converter operation in the two transition intervals, the switches which are shown in light outlines are OFF during the respective transition. Thus, circuit in FIG. 41a displays the converter just at the start of the D' to D transition, which is initiated by turning complementary input switch S'$_1$ OFF at instant $t_1$ as seen in FIG. 42b. Unlike prior-art soft-switching in which output switch is an uncontrollable passive diode switch, here the output switch $S_2$ is an active switch whose actual time of turning ON is critical to the operation. As seen in FIG. 42b turning ON the output switch $S_2$ at different instances $t_1$, $t_2$, or $t_3$, leads to a number of qualitatively and quantitatively different cases as well as corresponding different implementation of output switch:

1. Time $t_1$ results in full hard-switching, with full blocking voltage across both input switch and output switch, with CBS output switch (waveforms in FIG. 42b drawn with dot-and-bar lines), since positive blocking voltage is needed;
2. At time $t_2$, the voltage across output switch is zero, while the voltage across input switch is reduced from voltage $V_C$ to $V_g$; output switch could be either diode, CBS, or even VBS switch (waveforms in FIG. 42b drawn with doted lines);
3. At time $t_3$, the voltage across output switch is of reversed polarity, hence only VBS switch implementation is possible for output switch (waveforms in FIG. 42b drawn with thick lines) while the voltage across input switch is reduced all the way to zero voltage.

In each of the above cases, once the output switch $S_2$ was turned ON, the input switch needs to be turned ON as well at the same time.

Note how the reversal of the voltage across the output switch demands its different implementation:

a) for the time interval between $t_1$ and $t_2$ CBS switch is needed;

b) for the time interval between $t_2$ and $t_3$ the VBS switch is needed;

c) at the boundary between the two regions at instant $t_2$ when output switch voltage is zero, even a diode switch can be used.

The same behavior is also observed for the case when resonant inductor is included as described later.

Equivalent Circuit Model without Resonant Inductor

Figure 41B:
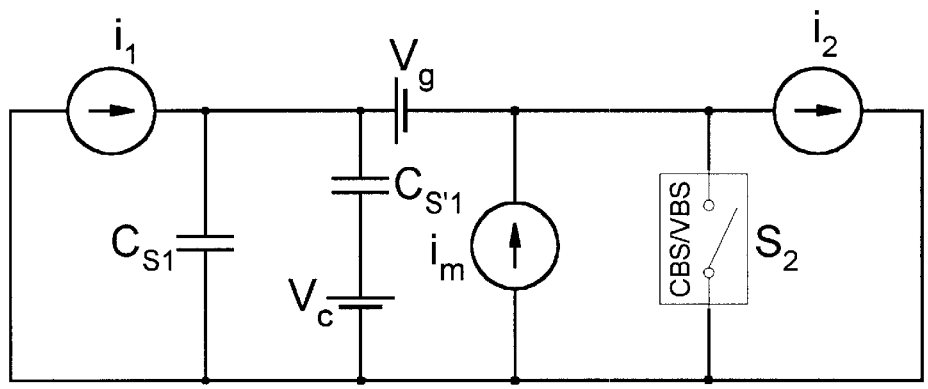
Figure 41C:
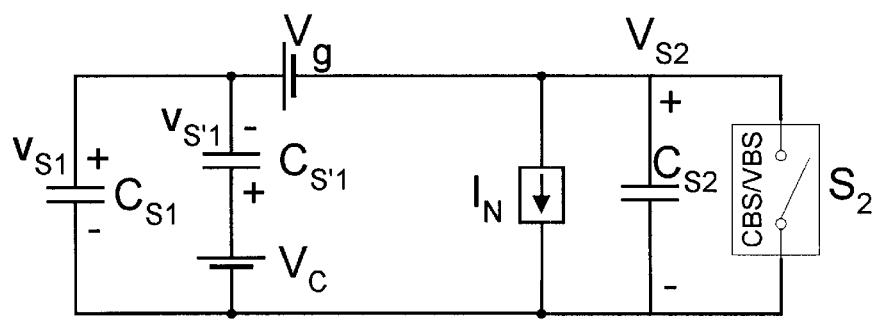

First the simplified model of the D' to D transition is developed. This transition starts with the turning OFF of the complementary input switch $S'_1$, which is thus shown in thin lines on FIG. 41a. The only switch conducting during this transition is complementary output switch $CR'_2$, which is thus shown in thick lines in FIG. 41a. To signify that the timing of this switch is not critical for the circuit operation it is illustrated with a diode. The switching time control of the output switch $S_2$, however, is very critical as is its type. All switches in FIG. 41a, which are OFF are then represented with a corresponding parasitic capacitance of the respective switch as shown in FIG. 41b. Furthermore, the three inductors are represented with three constant current sources, while the input capacitor and auxiliary capacitor are represented as DC voltage sources with their respective DC values $V_g$ and $V_C$ to result in equivalent circuit model of FIG. 41b. Note how due to fundamental properties given by (3) and (6) as well as displayed in FIG. 39b, the three current sources of FIG. 41b are combined into a single current source $I_N$ of FIG. 41c all three inductors' DC currents cancel out. This is the main reason why this lossless switching transition has a very desirable practical feature: it is independent of the DC load current and only depends on the peak AC ripple current $I_N$ of auxiliary capacitor. The two parallel capacitors of FIG. 41c are combined into resonant capacitance $C_r$, with initial voltage value $V_C$ while the capacitor of the output switch has initial $V_C$-$V_g$ value to result in further simplified equivalent circuit model in FIG. 42a.

Both input switch and output switch capacitors are discharging linearly at the same rate of $I_N/(C_r+C_{S2})$. Since the input switch blocking voltage is $V_C$ the input switch starts the discharge with initial voltage equal to $V_C$. From equivalent circuit model in FIG. 42a the fundamental relationship among instantaneous voltages $v_{S1}$ of input switch and $v_{S2}$ of output switch during the transition interval is:

$$v_{S1}=v_{S2}+V_g \quad (18)$$

Thus, when the input switch parasitic capacitor starts discharging at instant $t_1$ from the initial value $V_C$, from (18) the output switch parasitic capacitor starts simultaneously discharging from lower initial voltage level ($V_C$-$V_g$) as seen on the waveforms of FIG. 42b. Since both capacitors discharge linearly at the same rate of $I_N/(C_r+C_{S2})$, the output capacitor will discharge first to zero voltage level at instant $t_2$. At that instant, the parasitic capacitor of input switch is also discharged to lower voltage level $V_g$. Clearly all that charge is now transferred in a lossless way to the parasitic capacitor of the complementary input switch which was charged at the same rate and whose voltage is correspondingly increased. In fact, at instant $t_2$, both controllable input switch and controllable output switch could be turned ON with reduced voltage across them. Clearly this is already beneficial for switching losses, since the output switch is already turned ON at ideal zero voltage across the switch, hence no switching losses. At the same time the input switch voltage is also reduced substantially from $V_C$ to $V_g$ with corresponding reduction of switching losses of that switch. Thus, reduction of switching losses has already been accomplished.

Another critical remark can be made by observing the voltage across the output switch $v_{S2}$ as seen in FIG. 42b. Note that the linear discharge of the parasitic capacitance of the input switch can continue unimpeded further below $V_g$ level and past instant $t_2$ provided that the output switch satisfies certain condition. Note that this would require the voltage across the output switch also to continue dropping below zero level attained at $t_2$. Thus, in order for transition interval to extend into this time region, the output switch must be implemented as Voltage Bidirectional Switch (VBS) as marked VBS for output switch in FIG. 42b for time interval between $t_2$ and $t_3$ instants.

Yet another point of special interest is reached at instant $t_3$ when the voltage across the input switch reaches zero. At that moment the input switch can be turned ON at zero voltage with its switching losses completely eliminated. However, the output VBS switch is blocking the negative voltage (-$V_g$) at that instant and must be turned ON with hard-switching losses proportional to $V_g^2$. Nevertheless, it is shown later that these hard-switching losses are negligible for the very important practical case of the isolated converters with large transformer step-down turns ratio.

Since VBS switch is at present composite switch consisting of MOSFET transistor in series with the diode (or another MOSFET), it will have higher conduction losses than CBS switch. Thus, it is useful to see in which range CBS switch could be utilized. As seen in FIG. 42b, during the time interval between $t_1$ and $t_2$ instants, the CBS switch is deployed, since in that case the output switch needs only to block the voltage of one polarity. On the other hand, active CBS switch is required. If such a switch is to be turned ON prematurely before its own body-diode is turned ON at instant $t_2$, it must be capable to conduct the current in the same direction as its body-diode (output inductor current), which MOSFET used as a synchronous rectifier does. Note that turning ON output switch as well as simultaneously turning ON the input switch in this region would only increase the switching losses of both devices compared to instant $t_2$. In fact, at instant $t_1$ maximum hard-switching losses are obtained for both input and output switch. Thus, it would seem that operating in this time region is always undesirable. While this is true in this case of the converter with no resonant inductor, it will be shown later for the case when resonant inductor is included as well as in all isolation transformer extensions, that this region becomes the most attractive since the lossless switching is quite unexpectedly made much more effective. In fact, surprisingly, by turning ON CBS output switch for those converter extension at instant $t_1$, or even before that instant, leads to most effective lossless switching, as shown later.

Finally, as seen also in FIG. 42b, at instant $t_2$ either CBS or VBS switch could be used. At this very special switching instant $t_2$, even a simple rectifier diode can be used. Note also that unlike output switch, the precise switching time control of complementary output switch during D' to D transition is not critical at all and could be also delegated to a simple diode rectifier. Thus, for that special switching at instant $t_2$, both complementary output switch and output switch can be implemented as diodes eliminating the need for more complex drive and control of active switches. Nevertheless, even in that very special case the use of the CBS switches is often preferred, especially for low output voltage application in order to boost the efficiency. In that case, the body-diode of the MOSFET devices is bypassed by the lower MOSFET channel ON-resistance resulting in reduced conduction losses.

Each of the special cases is now discussed separately.

VBS Switch Implementation—Case A

Several cases with the VBS switch implementation of the output switch are of interest. The VBS output switch is shown implemented in FIG. 43a as serious connection of two N-channel MOSFETs and corresponding waveforms displayed in FIG. 43b. The following are the unique features of this lossless switching in comparison with prior-art soft-switching:

1. The input switch voltage is non-dissipatively reduced completely to zero so that input switch can be turned ON at zero voltage;
2. Lossless switching of input switch is independent of the DC load current so this transition will have the same time duration for full load current and at no load current. In either case very fast transition controlled by the designed peak ripple current $I_N$ of auxiliary capacitor is obtained, thus making operation at high switching frequency possible without excessive reduction of the effective switch duty ratio D;
3. Lossless switching of the input switch is obtained for any operating duty ratio and any input DC voltage;
4. Lossless switching of the input switch is realized without addition of any component, such as resonant inductor;
5. Zero voltage switching of the input switch is obtained with a peak auxiliary capacitor ripple current $I_N$, which does not have to be large; on the contrary in the prior-art soft-switching of FIG. 2e, the peak inductor ripple current must be larger than two times the maximum DC load current. This, in turn, results in heavy conduction loss penalty and diminishing returns for the high DC load currents.

In this non-isolated case the hard-switching losses of the input switch are completely eliminated while the hard-switching losses of the output switch are substantially reduced. However, for the most important practical case of the isolated extension of the converter with large step-down requirements, this method is almost ideal. As shown later for the isolated case of FIG. 59a, the hard-switching voltage $V_g$ of the output switch is through the transformer step-down turns ratio scaled down to much lower hard-switching voltage $V_g/n$ resulting in negligible hard-switching losses of the output switch, while the input switch preserves the ideal zero voltage switching characteristics outlined above. The disadvantage of the extra conduction losses of output switch due to the diode in series with MOSFET can be mitigated by replacing that diode with another MOSFET switch with reduced conduction losses.

VBS Switch Implementation—Case B

Figure 44A:
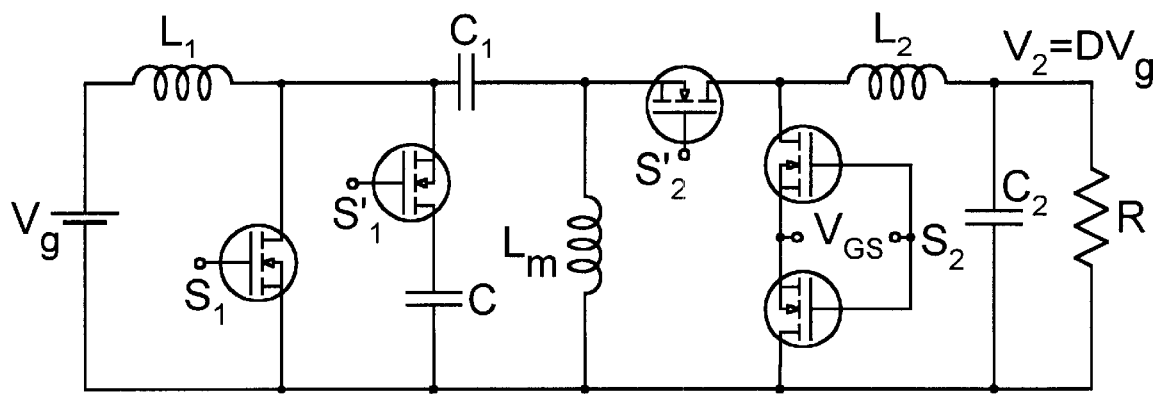
FIG. 44a shows the converter of FIG. 43a, but with VBS switch turned ON at reduced voltage across output switch for reduced switching losses as seen in FIG. 44b.
Figure 44B:
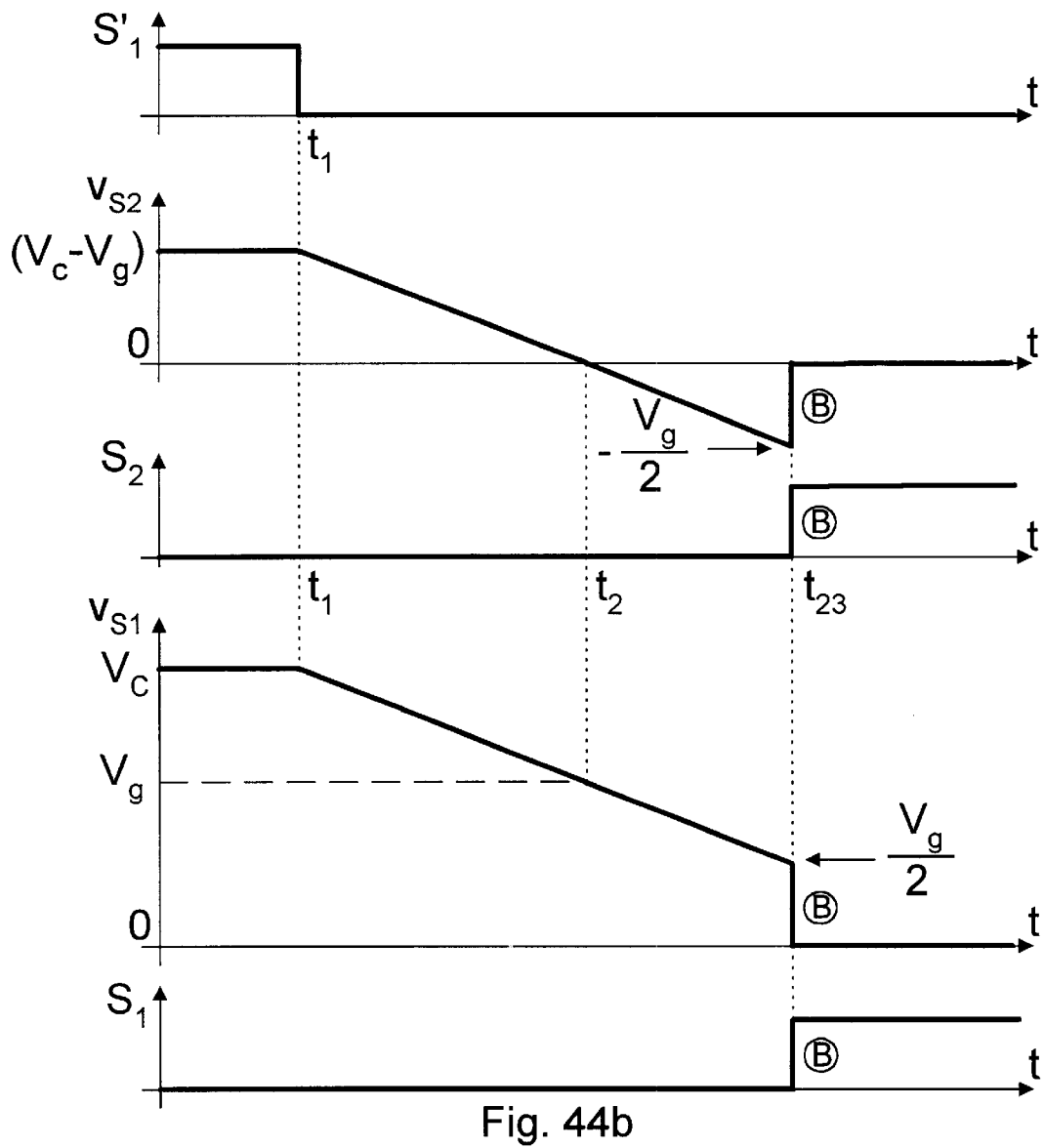

In this case shown in FIG. 44a and FIG. 44b, the VBS output switch is turned on at an instant $t_{23}$ between instants $t_2$ and $t_3$ when, for example, the voltage on both input and output switches is $V_g/2$. Assuming that the parasitic capacitances of the input and output switch are comparable, this would correspond to the lowest switching loss in the non-isolated case.

CBS Switch Implementation—Case C

Figure 45A:
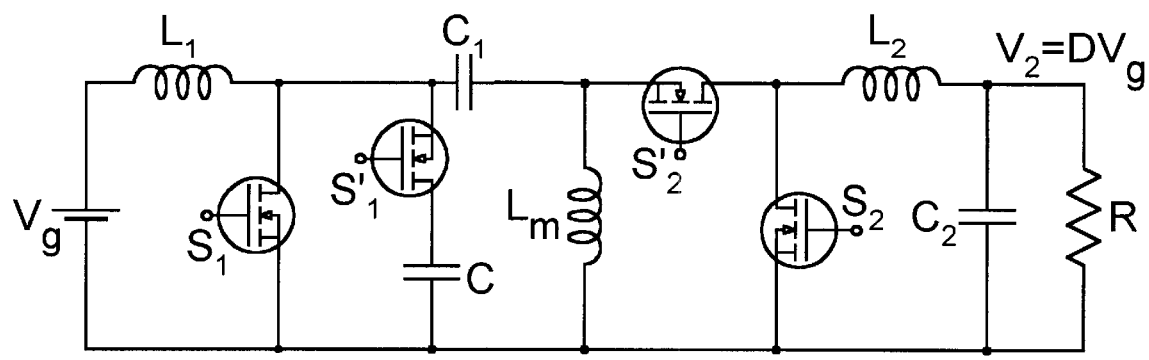
FIG. 45a is the converter implemented with the CBS output switch limiting the turn-ON of output switch to time at or before instant $t_2$. Full line in FIG. 45b represent the case with output switch turned ON at zero voltage, while dotted line case represent earlier turn-ON with some voltage across the output switch.
Figure 45B:
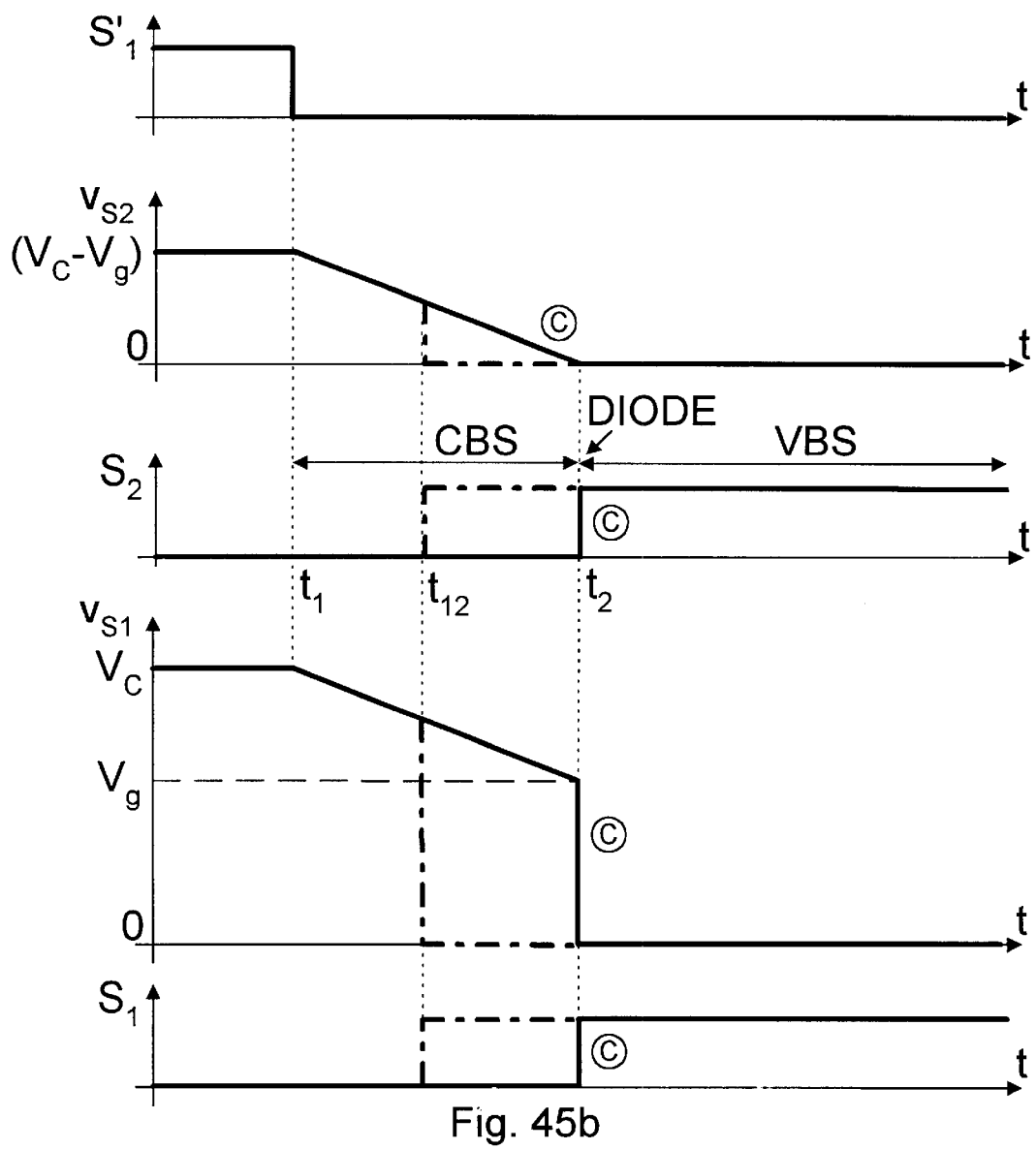

In this case shown in FIG. 45a and FIG. 45b with waveforms drawn in thick lines, the CBS output switch is turned ON at instant $t_2$ when the voltage across it reaches zero. At the same time input switch is turned ON with reduced hard-switching voltage $V_g$.

Note that CBS switch can be turned ON not only at instant $t_2$ when its internal body-diode is forced to turn-ON by converter circuit operation, but the CBS switch can also be prematurely turned ON even before that instant, that is anywhere in-between instants $t_1$ and $t_2$, such as instant $t_{12}$ shown in waveforms in FIG. 45b with dotted lines. Input switch $S_1$ in this case must be turned ON at the same instant $t_{12}$. Clearly, this would result in not only hard-switching losses on output switch, but also in increased hard-switching voltage and losses on the input switch. In fact, if both input and output switch were turned ON at instant $t_1$, the worst case of maximum hard-switching losses would be obtained. Thus, it appears that this region between $t_1$ and $t_2$ instants (CBS switch region) is highly inefficient and should be avoided. While this is indeed true for the case without resonant inductor, when resonant inductor is included, this region becomes the most attractive. In fact, surprisingly, the closer to instant $t_1$ the output switch $S_2$ is turned ON, the more effective lossless switching with resonant inductor is obtained as explained in section with resonant inductor.

Diode Switch Implementation—Case D

Figure 46A:
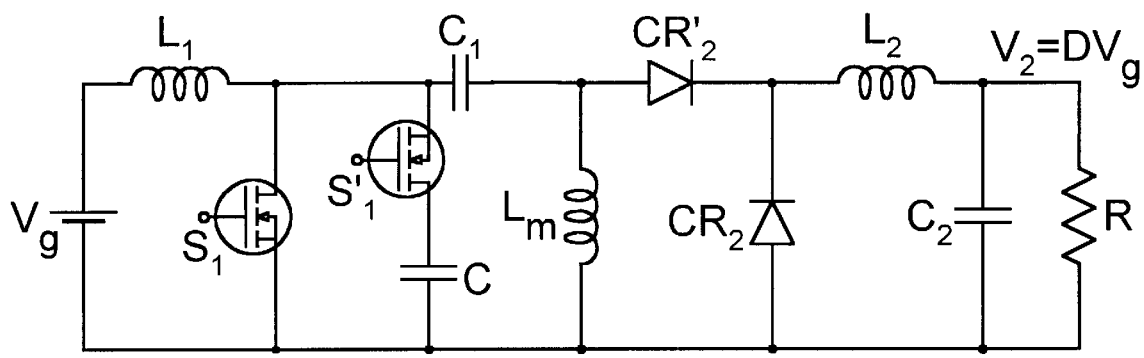
FIG. 46a illustrates the converter with output switch and complementary output switch implemented as current rectifiers (diodes).
Figure 46B:
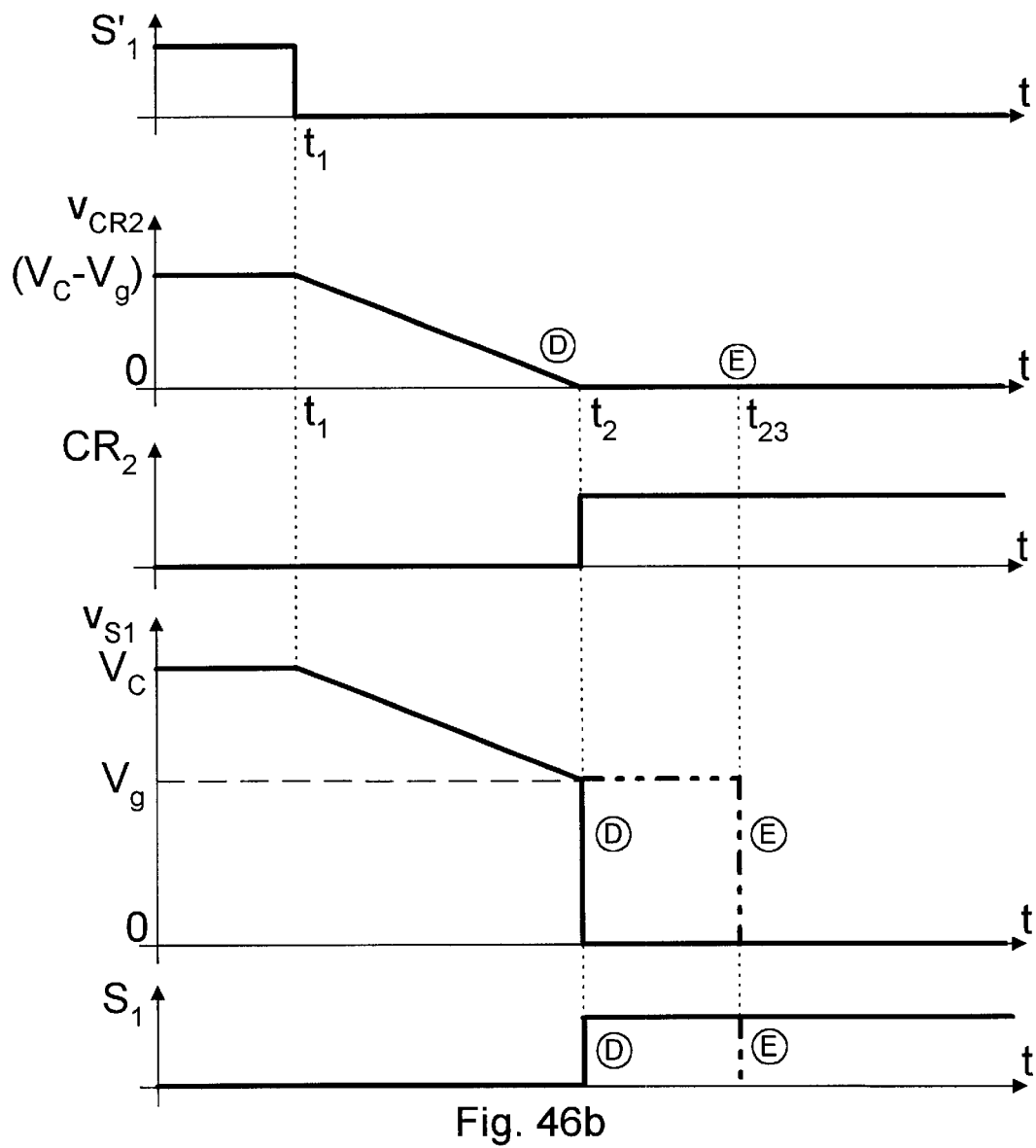
FIG. 46b illustrates in thick lines a special Case D when input switch $S_1$ is turned ON simultaneously with the turn-ON of the output switch diode $CR_2$, while dotted lines show the waveforms if the turn-ON of the input switch $S_1$ is delayed until time $t_{23}$.

In this very special case shown in FIG. 46a and FIG. 46b, the output switch and complementary output switch are passive switches, the diodes. Note, the absence of the corresponding switching time control for output switch $CR_2$ and complementary output switch $CR'_2$. In this case only the switching time control of the active switches on input matters resulting in simplified switching time control circuit. However, the rectifier diodes lead to higher conduction losses than in case C.

Delayed Turn-ON of Input Switch—Case E

Shown also in FIG. 46b is another special case when output switch (either diode as in FIG. 46a or MOSFET as in FIG. 45a) is turned ON at instant $t_2$ when voltage across it is zero, but the input switch turn-ON is delayed and turned ON at some later time $t_{23}$. The only consequence is that the voltage across the input switch will be stalled at voltage level $V_g$ during the delayed interval as seen in the waveforms of FIG. 46b drawn in dotted lines. Clearly, this is undesirable since it will only prolong the transition interval without any other benefits Thus, the optimum time to turn ON input switch is at the same time output switch was turned ON at zero voltage level. Note that in all three cases, C, D, and E the VBS output switch could be used as well. However, CBS switch or even diode is preferred due to lower conduction losses.

Non-isolated DC-to-DC Converter with Resonant Inductor

Figure 47A:
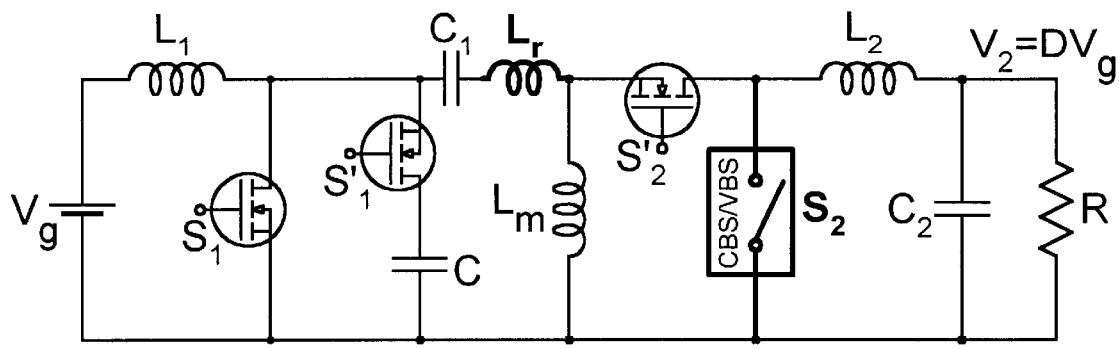
FIG. 47a illustrates the converter with the additional resonant inductor $L_r$.

The lossless switching alternatives when the resonant inductor $L_r$ is included are based on the converter in FIG. 47a. A number of qualitatively and quantitatively different alternatives are obtained, such as Cases 1–6 shown in the overall diagram of FIG. 47b. As before, these cases differ in the time when the output switch is turned ON, ranging from instant to until instant $t_3$. Just as in the case without resonant inductor, these cases also differ in the actual implementation of the output switch: from $t_0$ to $t_2$ instant CBS switch is needed, and from instant $t_2$ until instant $t_3$ a VBS switch is required. Thus, the converter diagram of FIG. 47a includes the adopted VBS/CBS switch designation for the output switch.

Note also another distinguishing characteristic: all the cases in which the resonant inductor has a major effect on the converter operation (cases 1–4) are contained to the CBS region. A rather surprising fact is the emergence of another case (Case 1), which did not even exist in circuit without resonant inductor: the output switch is turned ON at time to even before the complementary output switch is turned OFF at time $t_1$ as displayed in FIG. 47$b$ as waveform 1 in thick lines. Note how the voltage across the input switch rapidly decays to zero voltage at which time the input switch is turned ON.

Equivalent Circuit Models for Transition Subintervals

The complete transition interval is broken down into four distinct and consecutive transition subintervals designated as follows:

1. Boost subinterval during which the resonant inductor current is boosted from its initial value $I_N$ to $(I_N+I_{r1})$;
2. Linear subinterval during which input switch capacitance is discharged at a constant rate, hence linear voltage decay;
3. Resonant subinterval during which the voltage of the input switch continues to fall down due to a resonant discharge of its parasitic capacitance;
4. Current-reversal subinterval during which the input capacitor current $i_{C1}$ is reversing its direction, changing from current $i_1$ to current $-i_m$ flowing in the opposite direction.

Note that depending on the particular switching time patterns, one or more of the above subintervals such as boost or linear subinterval may not be present. Thus, the equivalent circuit models, the characteristic salient waveforms and the analytical quantitative models are developed for all subintervals, so that through their use the best mode of operation can be chosen and optimally designed for the given application. The equivalent circuit models and corresponding design equations are then developed separately for the boost, linear, resonant, and finally for current-reversal subintervals in that order.

The first step is to model the three large inductors $L_1$, $L_m$, and $L_2$ in the converter of FIG. 47$a$ as the constant current sources with current values $i_1(0)$, $i_m(0)$, and $i_2(0)$ at the end of the D'$T_S$ interval (or, equivalently, the beginning of the D$T_S$ interval) as shown in FIG. 48$a$ displaying the instant just before the complementary input switch is turned OFF. Note that the input capacitor current is at that instant equal to $$i_{C1}(t)=i_1(0)+i_r(t) \quad (19)$$

where $$i_r(0)=I_N \quad (20)$$

and where $i_1(0)$ is the value of the input inductor current at the beginning of the D' to D transition. Note that only $i_r(t)$ current component is present in the input switches during the linear and/or resonant subintervals and that current $i_1(0)$ is eliminated. At the instant right after complementary input switch opened (t=0+), the net current flowing out of the node A in FIG. 48$a$ is $I_N$, since the $i_1(0)$ current contributions from the input inductor and from $i_{C1}$ cancel each other. Another way to observe the same effect is to move the input current source $i_1(0)$ by equivalent circuit transformations to effectively appear in parallel across the resonant inductor $L_r$ as seen in the circuit model of FIG. 48$b$ (the current source $i_1(0)$ whose direction is pointing from right to left), The capacitor current from (19) can also be shown as a constant current source $i_1(0)$ in parallel with the same resonant inductor but this time pointing from left to right while the resonant inductor current is reduced to $i_r(t)$. The two opposite current sources with the same value $i_1(0)$ cancel each other, hence only $i_r(t)$ current component is present during the linear and/or resonant discharge interval. With the output switch open, as in FIG. 48$b$, the input switch parasitic capacitance $C_{S1}$ is being discharged with the constant linear discharge rate $I_N/C_r$, until such time that the output switch is turned ON as shown in the model of FIG. 48$c$ at which instant the resonant discharge is initiated. This model is further simplified to that of FIG. 48$d$, in which the DC sources are eliminated and the model is reduced to a simple series resonant $L_1$, $C_r$ circuit without damping. This resonant circuit oscillations in voltage and current can then be fully described with the help of the characteristic resistance $R_0$ as defined by (16), resonant frequency $\omega_r$ as defined by (17) and initial conditions present at the start of resonant oscillations: current in the resonant inductor $i_r(0)$ and the voltage on input switch $v_{S1}(0)$ at instant t=0. Note that $v_{S1}(0)$ is the voltage on the input switch $v_{S1}$ present at the time when the output switch was turned ON and the resonant transition subinterval initiated. For example, in the special case, when the output switch is turned ON at the instant the complementary input switch is turned OFF (Case 2 in FIG. 47$b$) this initial condition is $V_{S1}=V_C$. In that case, one directly goes from switch states as in FIG. 48$a$ to those in FIG. 48$c$ so that the linear subinterval of FIG. 48$b$ is skipped. However, if the switch states include the switching time control such that intermediate subinterval of FIG. 48$b$ is included (the output switch is turned ON some time after the complementary input switch is turned OFF), the Case 3 in FIG. 47$b$ is obtained resulting in both linear subinterval followed by a resonant subinterval. These two cases as well as the other two characteristic cases (Case 1 and Case 4 of FIG. 47$b$) involving resonant discharge are fully explained and modeled separately, qualitatively and quantitatively in the next section.

Boost Subinterval

Figure 49A:
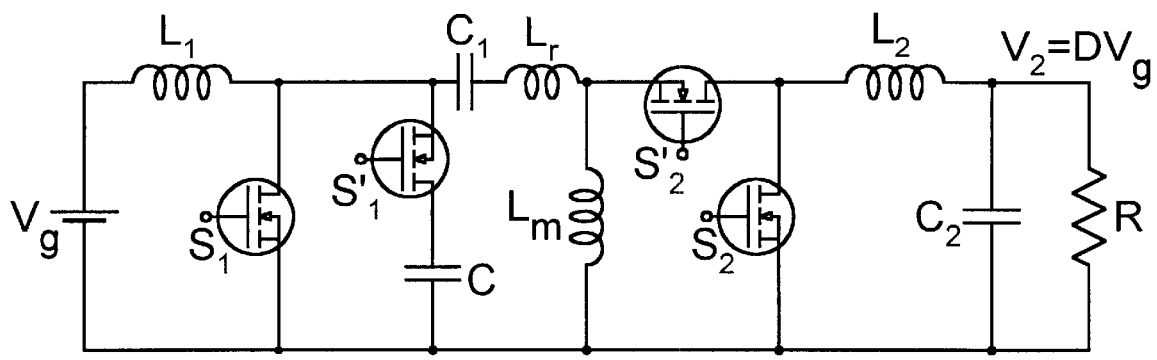
FIG. 49a illustrates the converter for Case 1 of FIG. 47b with CBS output switch and resonant inductor.

The converter of FIG. 49$a$ and the Case 1 are now analyzed in details. Note that the D' to D transition starts by first turning ON the output switch and not as in all other cases by turning OFF the complementary input switch. Thus, the D' to D transition interval is broken down into two subintervals:

1. The boost subinterval between instants $t_0$ and $t_1$, which is modeled by equivalent circuit in FIG. 50$a$.
2. The resonant subinterval between instants $t_1$ and instant $t_{min}$ when input switch is turned ON at minimum voltage, which is modeled by equivalent circuit in FIG. 50$b$.

In the boost subinterval, the DC voltage source $(V_C-V_g)$ is impressed across the resonant inductor, resulting in a linear increase of the resonant current, which at instant $t_1$ is boosted to the peak value $I_{r1}$ equal to $$I_{r1}=(t_1-t_0)(V_C-V_g)/L_r \quad (21)$$

At the same time, the peak negative AC ripple current $I_N$ of the auxiliary capacitor acts as a constant current source boosting the total current in the resonant inductor to $(I_N+I_{r1})$ at the end of boost subinterval.

Resonant Subinterval

When the complementary input switch is turned OFF, the resonant subinterval is initiated. Note that the series resonant circuit consists of the resonant capacitance $C_r$ in series with resonant inductor $L_r$ and with a small, and here considered negligible resistance, which will lead to the model with un-damped oscillations. This resonant circuit also has two initial conditions: initial voltage $V_C$ on resonant capacitance $C_r$ and initial resonant inductor current equal to $(I_{r1}+I_N)$. The solution for such a resonant discharge current $i_r$ can be found and broken down into three fundamental components so that:

$$i_r = i_{r1} + i_{r2} + i_{r3} \quad (22)$$

where $$i_{r1} = I_{r1} \cos(\omega_r t) \quad (23)$$

$$i_{r2} = I_{r2} \sin(\omega_r t) \quad (24)$$

$$i_{r3} = I_{r3} \cos(\omega_r t) \quad (25)$$

and $$I_{r2} = (V_C - V_g)/R_0 \quad (26)$$

$$I_{r3} = I_N \quad (27)$$

Figures 50A, 50B:
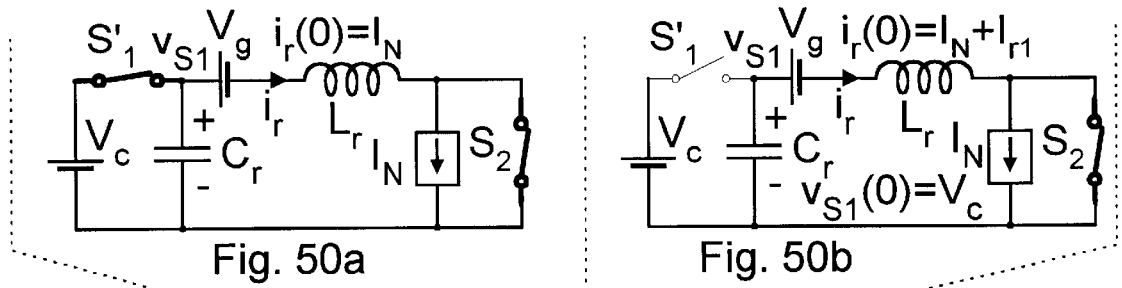
FIG. 50a illustrates an equivalent circuit model of converter in FIG. 49a for the boost subinterval during D' to D transition.
FIG. 50b shows the equivalent circuit model of converter in FIG. 49a for the resonant subinterval during D' to D transition.
Figure 50C:
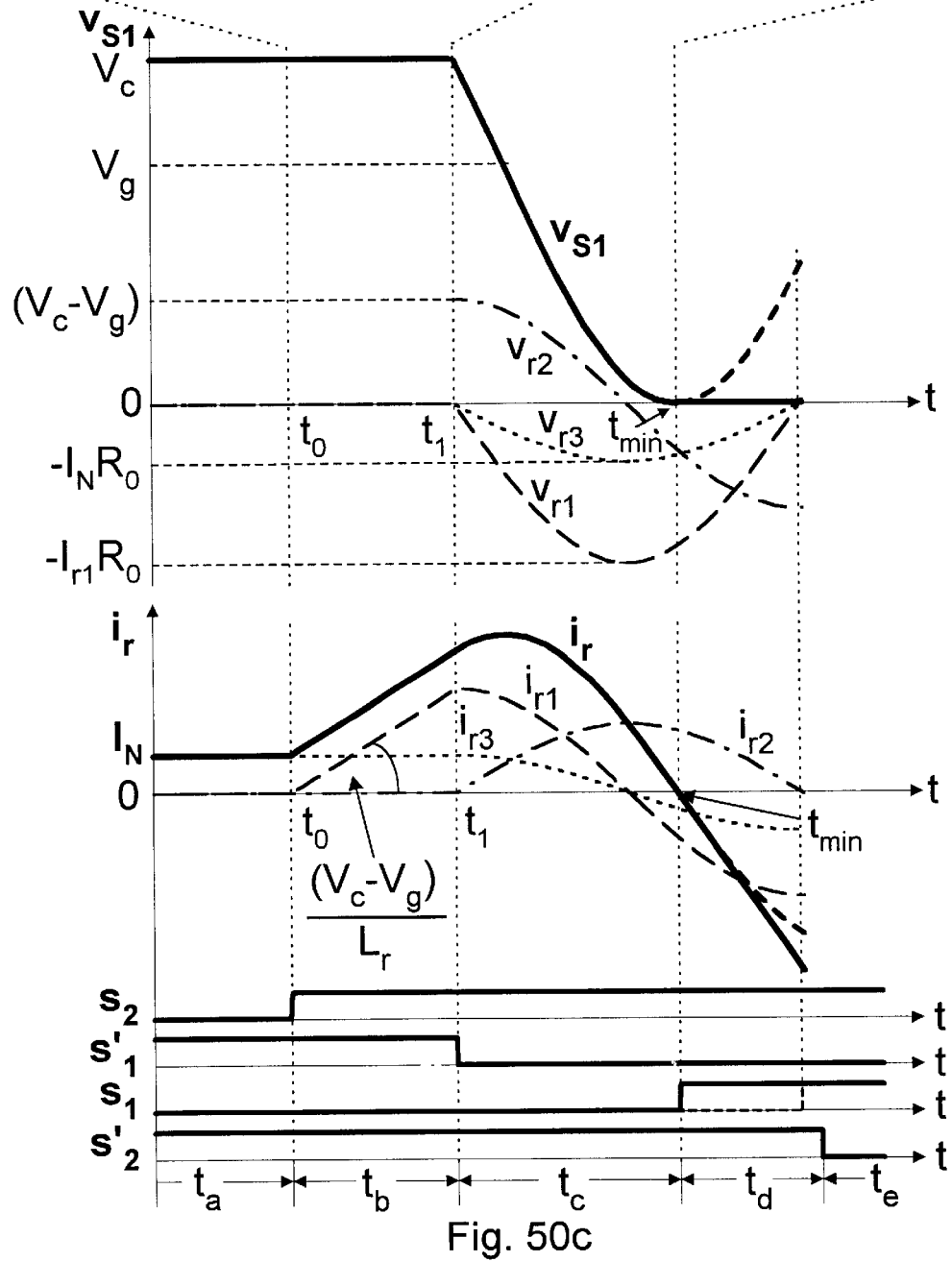
FIG. 50c shows on one timing diagram the three resonant voltage components and resultant voltage of the input switch, and on another timing diagram the three resonant current components and the resultant total resonant current, and special switching time control during D' to D transition.

All three resonant current components are drawn with different thin dotted lines in FIG. 50c, while the resultant total resonant current ($i_r$) is drawn with the thick lines.

Each of the three resonant current components results in corresponding resonant voltage component across the resonant inductor, which is time derivative of each respective resonant current component multiplied with $L_r$ such that $$v_{r1} = -V_{r1} \sin(\omega_r t) = -R_0 I_{r1} \sin(\omega_r t) \quad (28)$$

$$v_{r2} = V_{r2} \cos(\omega_r t) = R_0 I_{r2} \cos(\omega_r t) = (VC - V_g)\cos(\omega_r t) \quad (29)$$

$$v_{r3} = -V_{r3} \sin(\omega_r t) = -R_0 I_{r3} \sin(\omega_r t) \quad (30)$$

The three resonant voltage components are drawn with the thin dotted lines in FIG. 50c. Note the presence of the second resonant voltage component $v_{r2}$, which appears due to the presence of the initial voltage $(V_C - V_g)$ on resonant inductor. Hence the resonant circuit starts to oscillate at time when input complementary switch is turned ON with initial resonant current of $(I_N + I_{r1})$ and initial voltage on resonant inductor of $(V_C - V_g)$, which corresponds to voltage $V_C$ on the input switch.

From the equivalent circuit model in FIG. 50b, the instantaneous voltage $v_{S1}(t)$ of the input switch during the resonant subinterval is given by:

$$v_{S1}(t) = V_g + v_{r1} + v_{r2} + v_{r3} \quad (31)$$

and shown in thick lines in FIG. 50c.

Note from FIG. 50c how all three resonant inductor voltage components work in the same direction, that is toward reduction of the voltage $v_{S1}$ on input switch, which decreases monotonically. For example, if the resonant voltage components $v_{r1}$ and $v_{r3}$ had positive signs in (28) and (30) respectively, these components would work initially toward increasing instead of decreasing the voltage $v_{S1}$. Likewise, negative sign in resonant voltage component $v_{r2}$, would have also increased the input switch voltage $v_{s1}$, instead of decreasing it as per (29). We now can even find closed form analytical expression for the total voltage $v_r(t)$ by summing the sine components and cosine components given by (28), (29), and (30) into one co-sine resultant waveform $v_r(t)$ given by $$v_r(t) = v_{r1} + v_{r2} + v_{r3} = V_r \cos(\omega_r t + \phi) \quad (32)$$

where $$V_{r2} = (V_C - V_g)^2 + (I_N + I_{r1})^2 R_0^2 \quad (33)$$

and $$\phi = \tan^{-1}(I_N + I_{r1})R_0/(V_C - V_g) \quad (34)$$

Thus, the voltage on input switch during the resonant discharge subinterval shown in FIG. 50c in thick lines, is finally represented by $$v_{S1}(t) = V_g + V_r \cos(\omega_r t + \phi) \quad (35)$$

A simple criteria is now available to gauge the effectiveness of the novel lossless switching:

Lossless switching $V_r \geq V_g$ (36)

Hard-switching $V_h = V_g - V_r$ (37)

Thus, when magnitude of the total resonant voltage $V_r$ is equal or greater than input DC voltage $V_g$, the complete reduction to zero voltage is obtained. Otherwise, the difference $V_h$ given by (37) is the remaining minimum hard-switching voltage $V_h$ at which input switch should be turned ON.

The presence of the three resonant voltage discharge components and their simultaneous contribution toward fast resonant discharge of the voltage on input switch is the main reason why this lossless switching mechanism is much more effective than prior-art soft-switching methods, in which, at best, only one out of three possible resonant discharge components is present, and even then only the least effective $v_{r3}$ component is present. However, before comparing the relative effectiveness of the three resonant components the remaining current-reversal subinterval is modeled since it follows and is common to all resonant discharge cases.

Current-reversal Subinterval

By turning ON the input switch at the time $t_2$ when the voltage across the input switch is at $V_g$ level, such as in FIG. 42b, would normally (in case without resonant inductor) complete the D' to D transition. As seen from the circuit model in FIG. 51a for $L_r=0$, the DC voltage across input capacitor will reverse-bias the body-diode of the complementary output switch and will turn it OFF. This, in turn, will, if the complementary output switch MOSFET is turned OFF, cause the input capacitor current to change abruptly from current $i_1$ charging input capacitor to current of opposite direction and magnitude $i_m$ discharging the same capacitor (charge balance requirement on input capacitor).

Figure 51C:
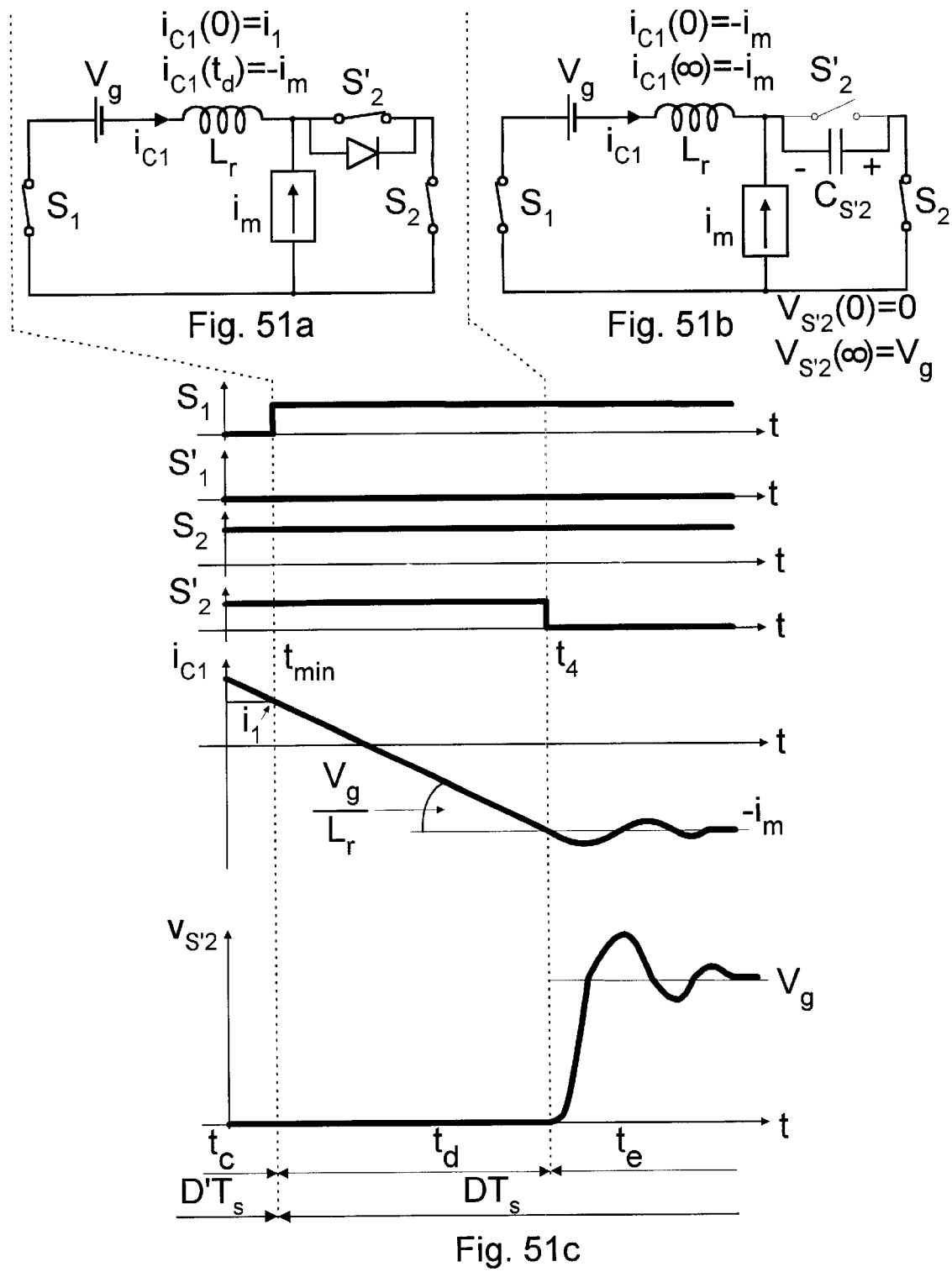
FIG. 51c illustrates the characteristic waveforms during current-reversal subinterval and the beginning of steady-state $DT_S$ interval modeled by equivalent circuits of FIG. 40d and FIG. 51b.

However, in the presence of an inductor, such as resonant inductor $L_r$ in the circuit model of FIG. 51a, such an abrupt change of the input capacitor current is prevented and the current-reversal subinterval $t_d$ is modeled with equivalent circuit of FIG. 51a. Note also that at beginning of this subinterval (the instant $t_{min}$) the resonant inductor current $i_r$ was reduced to zero as seen in FIG. 50c, thus reducing the input capacitor current as per (19) to only input inductor current component $i_{C1}(t_{min}) = i_1(0)$. The input capacitor DC voltage $V_g$ is then impressed across the resonant inductor $L_r$, leading to the linear decrease of the input capacitor current as in FIG. 51c at a rate of $V_g/L_r$ until instant $t_4$ at which $i_{C1} = -i_m$ and current through complementary output switch $S'_2$ is zero, turning effectively that switch OFF. Thus, the length of this current-reversal interval $t_d$ can be obtained from:

$$t_d = [i_1(0) + i_m(0)]L_r/V_g \approx I_2 L_r/V_g \quad (38)$$

with approximation valid for small ripple currents and where $I_2 = I_1 + I_m$ is the approximate magnitude of the total current change in this subinterval. From (38), the length of this subinterval is heavily dependent on the DC load current $I_2$ and DC input voltage $V_g$, and is the longest for the highest DC load current and lowest input DC voltage. Thus, the active complementary output switch must be turned OFF before the expiration of the shortest of the time $t_d$ given by (38), that is before instant $t_4$ in FIG. 51c when its body-diode will turn-OFF. The absence of the abrupt current change in the input capacitor and the gradual change during $t_d$ subinterval is actually very beneficial for reduction of conducted and radiated EMI noise. For previous high voltage example values: $V_g$=400V, $L_r$=27 $\mu$H, $I_2$=27A (output DC load current $I_2$ reflected to the primary side with n=27 turns ratio), the current reversal subinterval is $t_d$=50 ns.

Oscillations in Steady-state $DT_S$ Interval

After the complementary input switch is turned OFF at the end of $t_d$ subinterval, the D' to D transition is completed and results in reversal of the switch states from that at the beginning of this transition as seen in the model of FIG. 51b in which the input and output switches are ON, while the complementary input switch and complementary output switch are OFF. Nevertheless, the very act of turning OFF of the complementary output switch has introduced its parasitic capacitance $C_{S'2}$ in series with resonant inductor. This forms effectively another resonant circuit through which this capacitance $C_{S'2}$ is charged from its initial zero voltage value to its final voltage $V_g$ resulting in an oscillation as shown in FIG. 51c having potentially $2V_g$ peak value. Once this oscillation dies out due to the damping and losses, the final steady-state is reached. The oscillations clearly increase the blocking voltage requirement of the respective switches. If the inherent parasitic resistances associated with the oscillating elements do not sufficiently damp the oscillation, an external R-C snubber network can be used to dampen this oscillation.

Comparison of the Effectiveness of the Three Resonant Components

Clearly, the relative contribution of each resonant voltage component in reduction of the total voltage $v_{S1}$ depends on the corresponding magnitudes of the respective sine voltage and cosine voltage components given by (28), (29), and (30). Here is the practical example of an isolated converter with 27:1 step-down turns ratio designed for a 400V to 5V, 20A output operating at 250 kHz switching frequency. When the secondary side is reflected to the primary, the following values were obtained for the equivalent non-isolated converter:

$$V_C=575V; \ V_g=400V; \ t_b=121 \ ns; \ t_c=162 \ ns; \ L_r=27 \ \mu H; \\ C_r=237 \ pF \quad (39)$$

and the following values calculated from the formulas:

$$I_{r1}=0.78A; \ I_{r2}=0.52A; \ I_{r3}=I_N=0.285A; \ R_0=339\Omega; \\ \omega_r=12.45 \ MHz \quad (40)$$

The three component resonant voltages and resultant combined resonant voltage are:

$$V_{r1}=265V; \ V_{r2}=175V; \ V_{r3}=95V; \ V_r=400V \quad (41)$$

Since $V_{r=Vg}$=400V, zero voltage switching is achieved on input switch as per (36), and as seen in the thick lines in FIG. 50c (for $V_g$=0.6$V_C$). Clearly for the above typical example, the first resonant component is most effective in reducing the input switch voltage, the second resonant component less so, and the third resonant component is the least effective.

This order of effectiveness of the three resonant components is in fact generally true for all practical examples of interest for the following reason. The third resonant voltage component with magnitude $v_{r3}=R_0 I_N$, depends on $I_N$ and is very small for small $I_N$. The second resonant voltage component with magnitude $v_{r2}=V_C-V_g$, however, does not depend on $I_N$. Yet for D=0.5, $v_{r2}=V_g$ so that this component alone can reduce input switch voltage to zero. This component, however, becomes progressively less effective when the operation duty ratio D becomes lower that D=0.5, since $v_{r2}$ becomes only a fraction of input voltage $V_g$. This is where the first resonant voltage component with its magnitude $V_{r1}=I_{r1}R_0$ comes to rescue. Even at low duty ratios this component is effective in reducing the input switch voltage to zero. This only requires proportionally longer boost interval (by effectively turning ON output switch $S_2$ earlier) to increase the first resonant current component $I_{r1}$ as needed. This does not increase any other losses, since the boost interval is quite short on the order of 150 nsec.

Note that the third and least effective resonant component $v_{r3}$ is the only component present in prior-art soft-switching methods. The additional two resonant voltage components, $v_{r1}$ and $v_{r2}$ which are much more effective, are uniquely present in the novel lossless switching methods of the present invention.

The above sine and cosine resonant current and resonant voltage components as well as the resultant sums are plotted to scale in FIG. 50c according to the above practical example to provide insight into typical relative scaling of various resonant components. Furthermore, the scaling of various resonant voltage waveforms in FIG. 47b (waveforms 1 to 4) are also drawn for the above practical example, but for different instants of turning ON of output switch $S_2$ and corresponding turning ON of input switch $S_1$ at the minimum voltage across input switch. This example and its modifications are used later in experimental section to verify the predicted lossless switching waveforms.

Figure 47B:
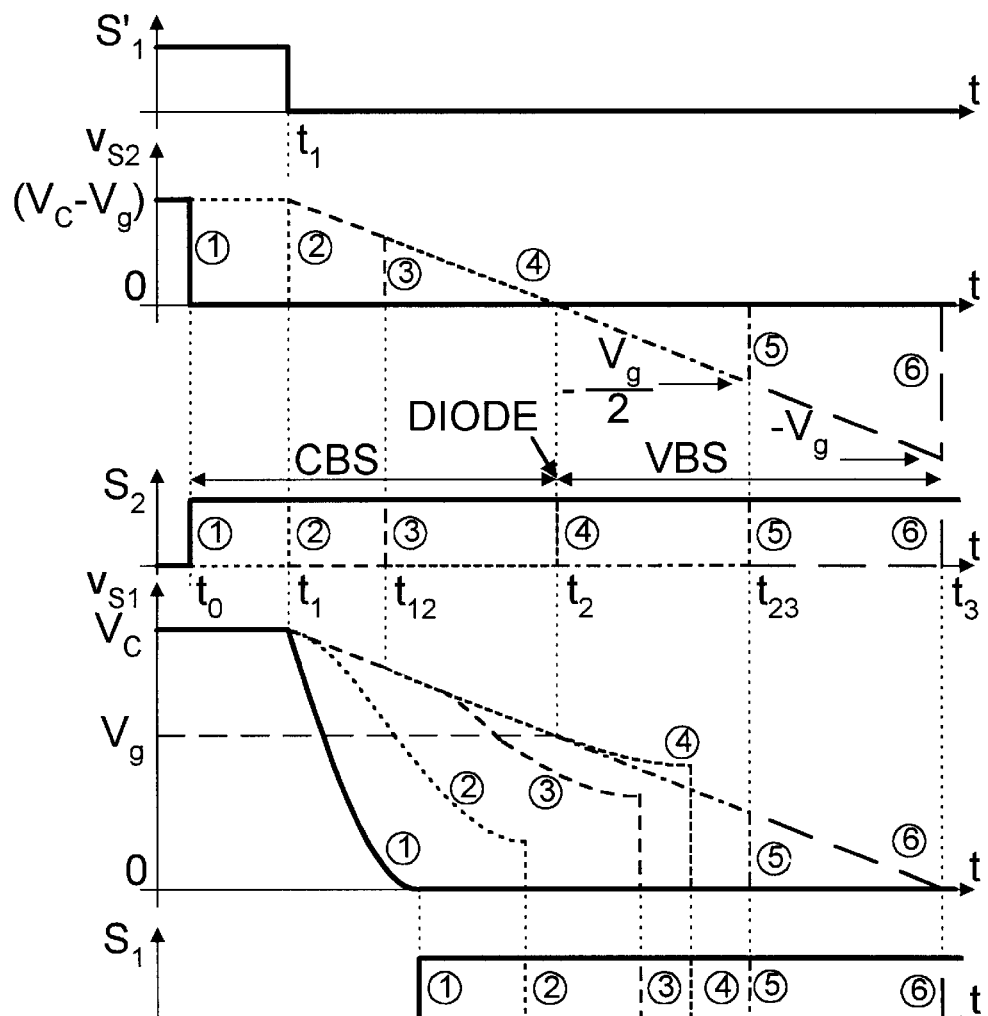
Figure 48A:
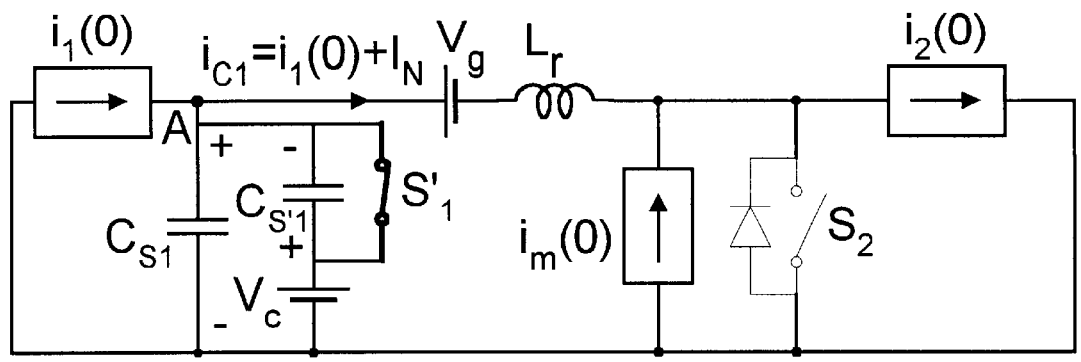
FIGS. 48(a–d) show the progression of circuit models describing the resonant subinterval.
Figure 48B:
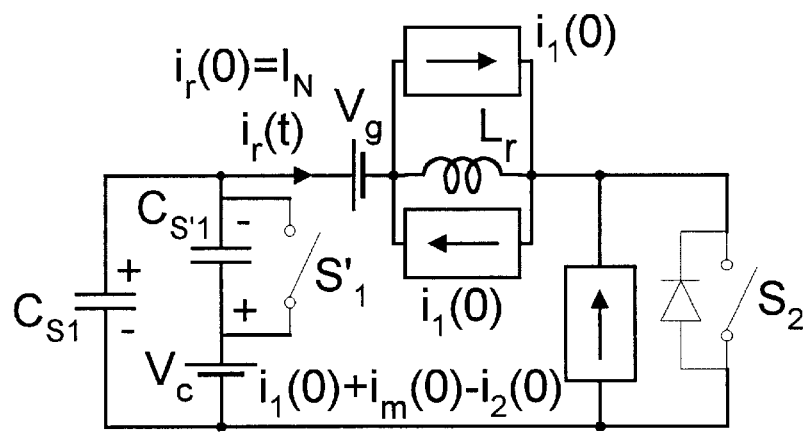
Figure 48C:
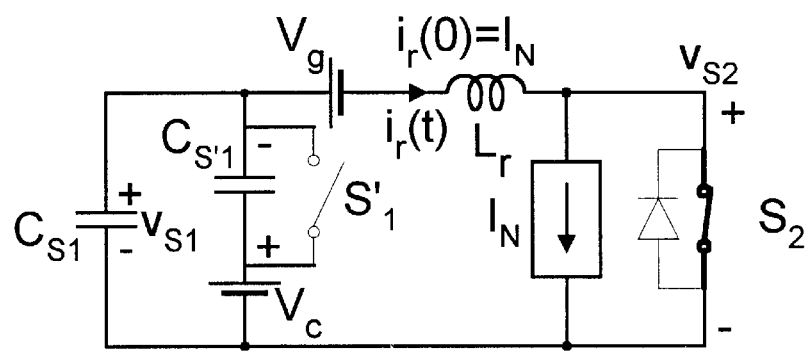
Figure 48D:
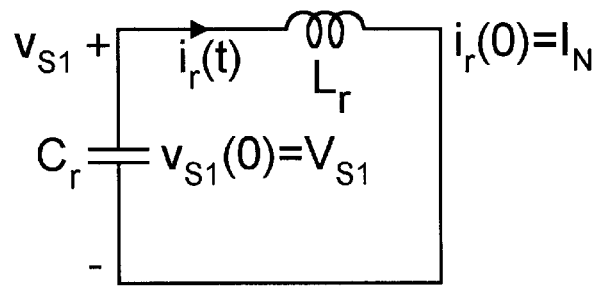

Each of the six different cases displayed in FIG. 47b are now discussed separately.

Case 1—Three Resonant Components and CBS Output Switch

Figure 49B:
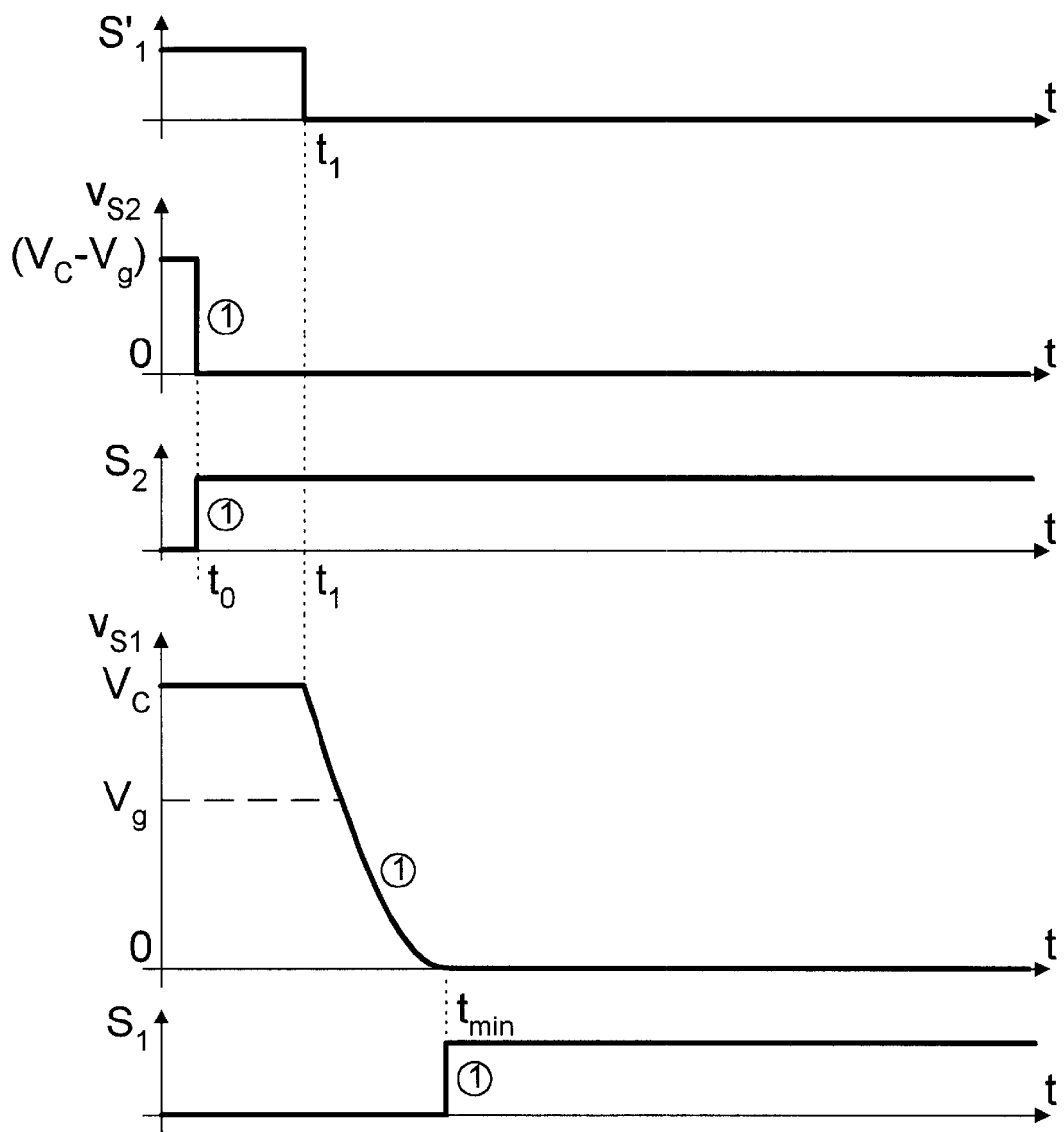
FIG. 49b shows relevant waveforms for the converter of FIG. 49a, when output switch is turned ON before the complementary input switch is turned OFF resulting in boost subinterval.

As shown in FIG. 49b, voltage on input switch is reduced to zero through resonant discharge. Note that the first resonant voltage "boost" component $v_{r1}$ (FIG. 50c) is responsible for most of the voltage discharge, since even if the other two components were eliminated, 265V voltage reduction would have been achieved and $V_h$=135V obtained. Thus, an 18 times reduction of maximum hard-switching losses for $V_C$=575V would be obtained. Note also that the first resonant component $V_{r1}$ can be easily increased. By increasing the "boost" interval (FIG. 50c) by just 50% from $t_b$=121 ns to $t_b$=183 ns, the first resonant boost component alone would become $V_{r1}$=400V and zero voltage switching obtained even without any contribution of the remaining two other resonant components. Furthermore, this comes at virtually no other penalty, since boost interval is short compared to the total switching period, thus despite intentionally increasing $I_{r1}$ current by substantially increasing boost interval, this has negligible effect on conduction losses, the rms current, and efficiency. In this example, boost interval is indeed small compared to whole switching period: 121 ns in comparison with switching period of 4,000 ns or 3%. This is, for example, not the case with the third resonant voltage component $v_{r3}$. By increasing the auxiliary capacitor peak current $I_N$ the rms currents in the whole converter are also substantially increased, thereby offsetting significant portion of the loss reduction. Clearly, this case is therefore very effective for the high input DC voltages, in which large resonant voltage discharge is needed such as 575V as in this example, and is impossible to achieve by any other resonant component.

Case 2—Two Resonant Components and CBS Output Switch

Figure 52A:
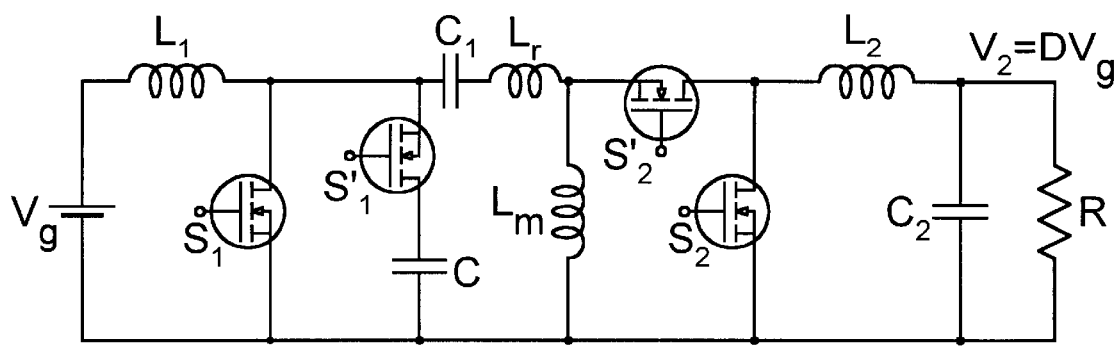
FIG. 52a illustrates the converter for Case 2 of FIG. 47b with CBS output switch and resonant inductor.
Figure 52B:
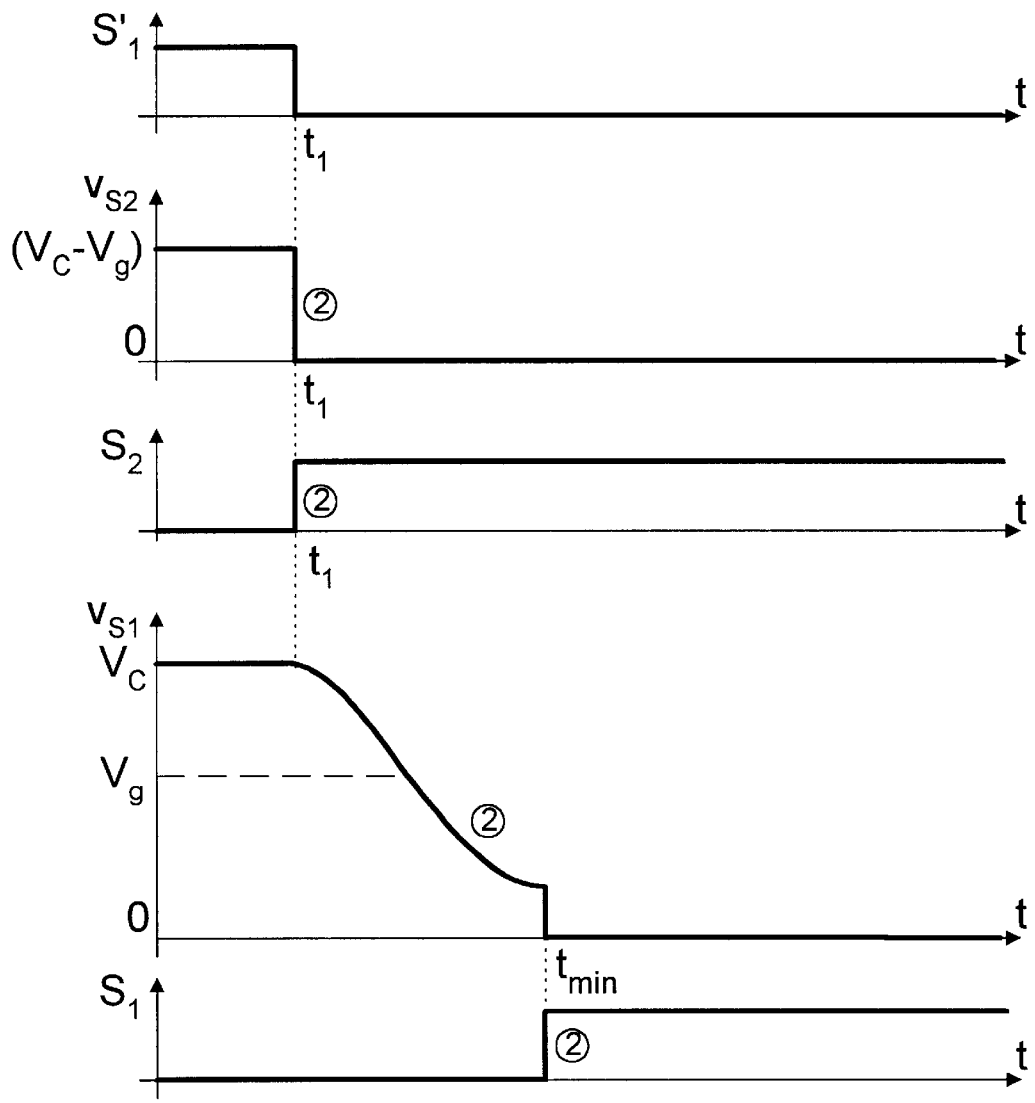
FIG. 52b illustrates the characteristic waveforms for the Case 2 when the output switch $S_2$ is turned ON simultaneously with the turn-OFF of the complementary input switch $S'_1$.

In this case the boost interval is reduced to zero, and thus, the first resonant voltage component $v_{r1}$ is eliminated. This happens when the output switch is turned ON at exactly the same instant $t_1$ when complementary input switch is turned OFF as shown in FIG. 52b, resulting in only two remaining resonant voltage components:

$$v_{S1}(t)=V_g+v_{r2}+v_{r3} \qquad (42)$$

Figure 53A:
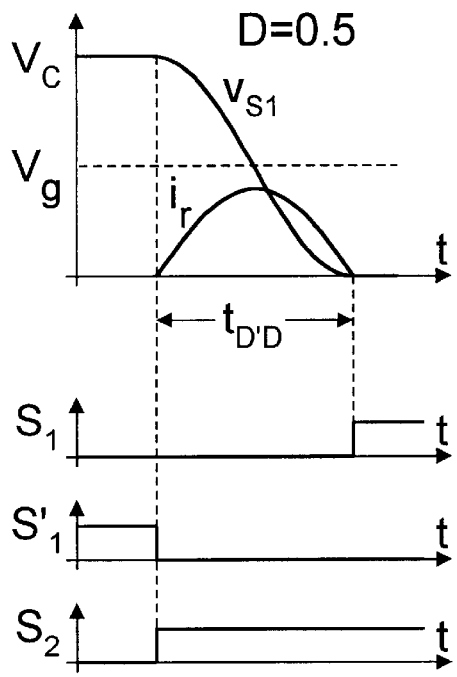
FIG. 53a shows the complete discharge of the parasitic capacitance of input switch at D=0.5 and turn-ON of input switch at zero voltage.
Figure 53B:
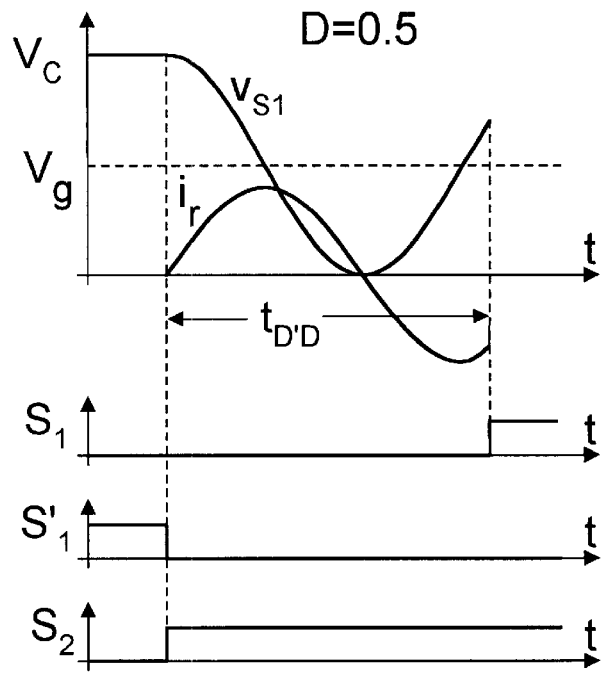
FIG. 53b shows that the delay in turn-ON of input switch past minimum voltage on that switch can lead to substantial hard-switching losses.

Resultant maximum resonant voltage is from formula (33) equal to $V_r$=199V. Thus, from (37) the remaining hard-switching voltage is $V_h$=201V obtained at instant $t_{min}$. Note how the resonant component $v_{r2}$ in this case dominates $v_{r3}$ component, whose only effect was to bring the input switch voltage further down from 225V to 201V, for a net additional decrease of only 24V or less than 10% reduction of hard-switching voltage $V_h$. Note, that effectiveness of the second resonant voltage component depends on the "voltage overhead" ($V_C-V_g$), which, in turn, depends on the duty ratio D. To clearly expose this dependence, let us assume that the third resonant voltage component $V_{r3}$ has a negligible effect, which is the case when $$I_N R_0 << (V_C-V_g) \qquad (43)$$

so that only the component $v_{r2}$ in (42) remains. In that case, the voltage on input switch $S_1$ can at best be reduced by the value $|IV_C-V_g|$ below $V_g$. Thus for a duty ratio D=0.5, $V_C=2V_g$, and $V_C-V_g=V_g$ and the resonant discharge can reduce the capacitor voltage of the input switch all the way down to zero volts for a complete lossless switching as seen in FIG. 53a. Note the importance of "catching" these resonant oscillations at just the right moment by turning ON input switch $S_1$ when the minimum voltage on $S_1$ is obtained. If that moment was missed and turn-ON was delayed as illustrated by waveform in FIG. 53b, the oscillations in the voltage could bring the voltage $v_{S1}$ almost back to the initial value $V_C$ since the very little damping is provided by ultra low parasitic resistances. Clearly, turn-ON at such a voltage would result in almost no reduction of losses compared to the hard-switching case. Thus, in this resonant inductance case, the correct timing of the drive for input switch $S_1$ is critical for the fill benefit to take place.

Figure 53C:
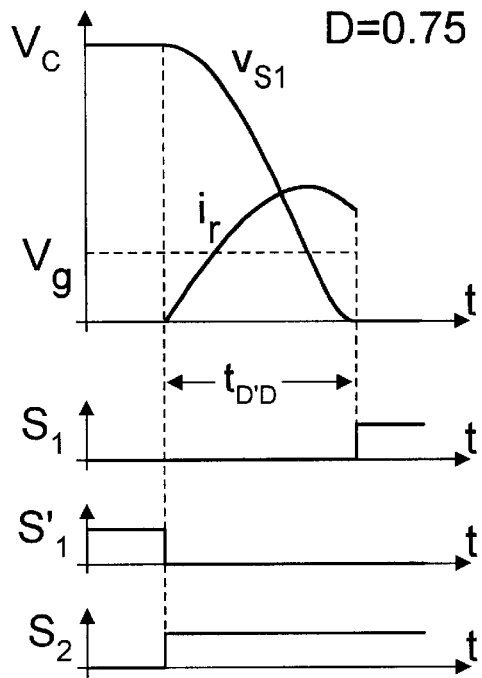
Figure 53D:
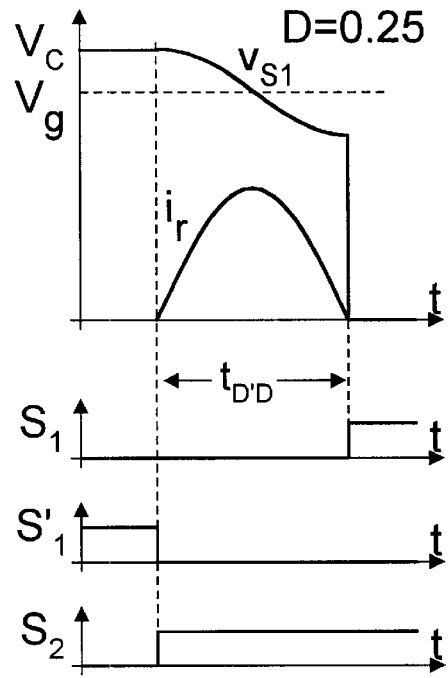
FIG. 53d illustrates the strong dependence of the effectiveness of resonant discharge on the duty ratio: at D=0.25, the large hard-switching voltage remains.

For duty ratios higher than D=0.5, the method is equally effective, since the resonant transition is always guaranteed to bring the voltage down to zero level as seen in FIG. 53c for D=0.75. In this case, $V_C-V_g=3V_g$, and only a portion of resonant voltage reduction available is needed to bring input switch voltage to zero. However, for duty ratios lower than D=0.5 the lossless switching is progressively less efficient. For example for D=0.25 (FIG. 53d), since $V_C$=1.33$V_g$, $V_C-V_g$=0.33$V_g$, resulting in the lowest hard-switching level of 0.66$V_g$ at which point input switch $S_1$ must be turned ON, and hard-switching losses associated with that must be accepted. Hence the lossless switching would result in 4 times reduction of switching losses for duty ratio D=0.25.

Of course, to make the full loss comparison, one has to take into account extra losses of the resonant inductor as well as the additional space for it. However, this is only true for the non-isolated extension of FIG. 52a and its derivatives. In the isolated converter of FIG. 60a and its derivatives, a resonant inductor $L_r$ is already built-in as a leakage inductance of the isolation transformer structure itself, which plays the same role as this external resonant inductor.

Note that the D' to D transition is independent of the DC load current since $v_{r2}$ component depends on voltage difference ($V_C-V_g$) and not on DC load current. Similarly, the $v_{r1}$ and $v_{r3}$ components depend on the boost current component $I_{r1}$ and AC ripple component $I_N$, thus are also independent of the DC load current. Therefore, the resonant subinterval of the D' to D transition will have the same duration for either the full DC load current or for no load current, which is definite advantage over prior-art soft-switching methods dependent on DC load current such as one in FIG. 2e.

The second resonant voltage term $v_{r2}$ is particularly very effective in the case of high input voltage. Note that this "cosine" component of total resonant voltage reduction depends neither on the characteristic resistance $R_0$ nor on auxiliary capacitor AC ripple current $I_N$ but is only function of the voltage overhead ($V_C-V_g$). As seen in FIG. 53a for duty ratio D=0.5, the complete discharge to zero voltage level is guaranteed for any input voltage $V_g$. For example, this input voltage could be 1000V, 2000V, etc. and reduction to zero voltage would be obtained irrespective of $R_0$ value, hence for any resonant/leakage inductance and any resonant capacitance $C_r$ of the switches, and for any auxiliary capacitor AC ripple current $I_N$ including zero-ripple current. All what is needed to activate this second resonant voltage component $v_{r2}$, is to use the active CBS switch for output switch and proper switching time control: instead of letting the output switch body-diode be turned ON in response to converter circuit state, this active switch is deliberately turned ON much earlier. For greatest effect, this output switch is turned ON at the same instant $t_1$ at which the complementary input switch is turned OFF. Note that this second resonant voltage component $v_{r2}$, which is so effective for high input DC voltages, is also missing from the prior-art soft-switching methods.

Just the opposite is the case for the third resonant voltage component $v_{r3}$, which becomes increasingly ineffective as the input DC voltage is increased, as discussed below for Case 4. This third component is the only resonant component present in prior-art soft-switching methods, which explains their ineffectiveness at medium to high input DC voltages.

Case 3—Two Resonant Components with Linear Subinterval

Figure 54A:
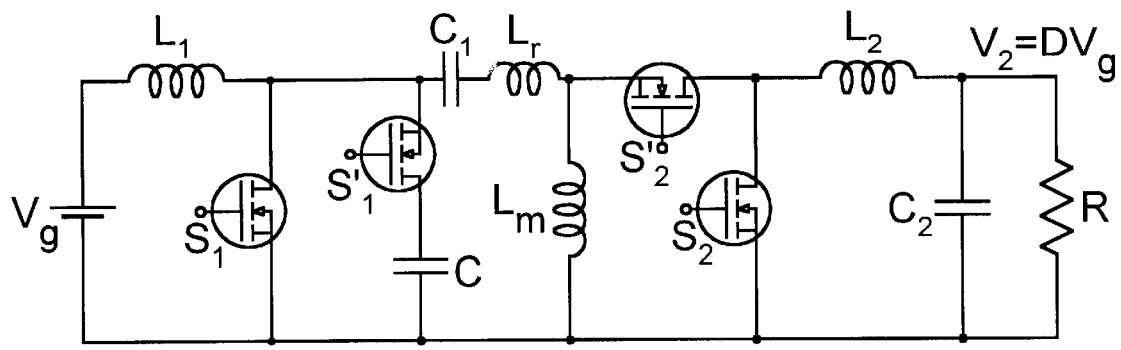
FIG. 54a illustrates the converter for Case 3 of FIG. 47b with CBS output switch and resonant inductor.
Figure 54B:
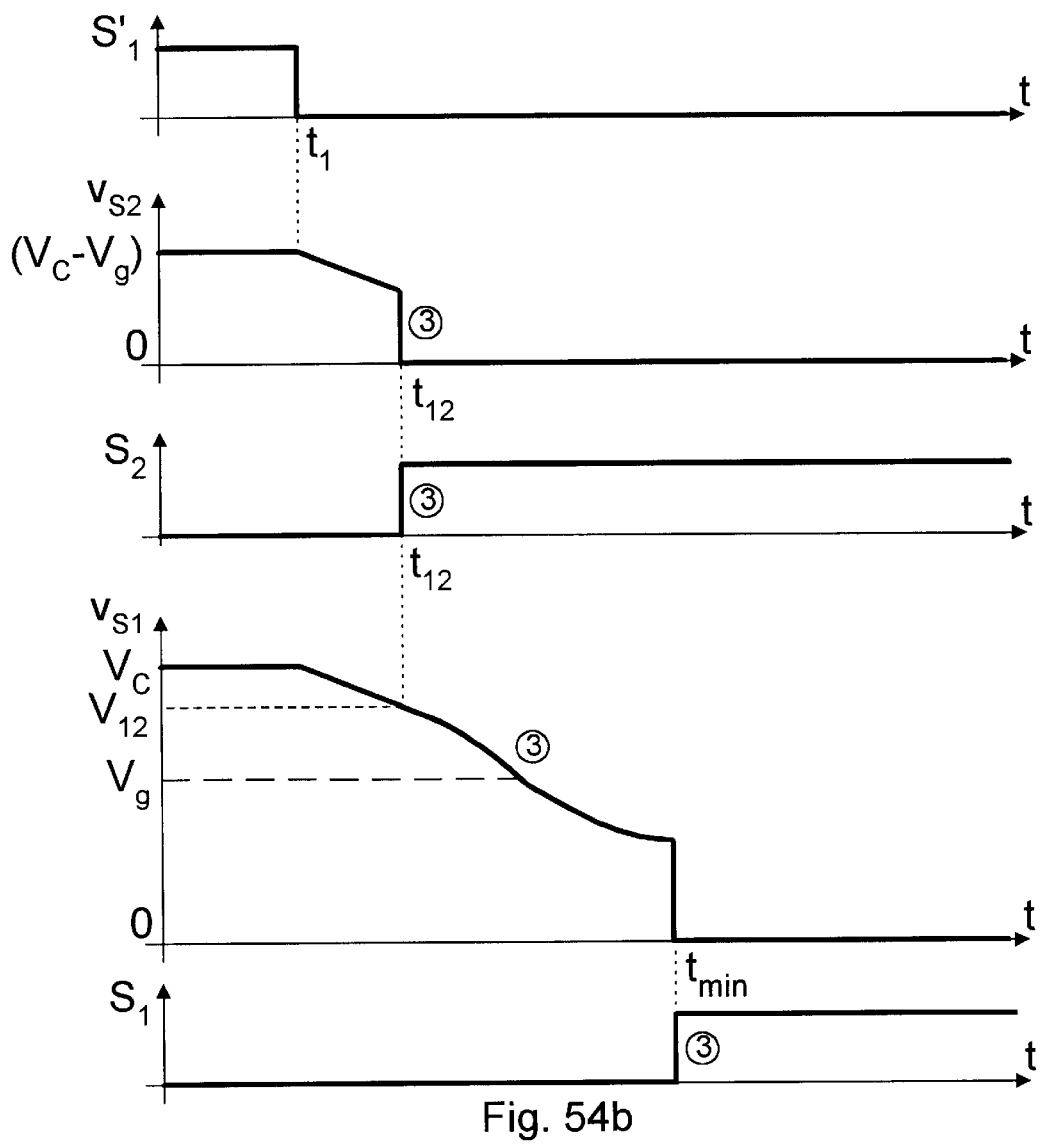
FIG. 54b illustrates the characteristic waveforms of the Case 3 when output switch $S_2$ is turned ON after turn-OFF of complementary input switch but before body-diode of output switch is turned-ON resulting in linear subinterval until $V_{12}$ voltage, followed by a resonant subinterval.

If the turn-ON of output switch $S_2$ is delayed further to instant $t_{12}$ (FIG. 54b) after complementary input switch was already turned OFF at instant $t_1$, an additional linear discharge interval is obtained during which both input and output switch voltages are linearly discharged. The resonant discharge then starts at instant $t_{12}$ when the output switch is deliberately turned ON. Still, only two resonant voltage discharge components exist as in (42). However, maximum value of the second component is now substantially smaller since in (33) the voltage $V_C$ is replaced by a reduced voltage $V_{12}$ present on input switch at instant $t_{12}$. For example, for $V_{12}$=495V, the second component reduces to $v_{r2}$=95V, instead of previous 175V. Now both remaining resonant components have equal influence so that resultant voltage is $V_r$=134V, and the remaining hard-switching voltage is $V_h$=266V. This case is most suitable for medium input DC voltages and for D>0.5. Note how the longer linear subinterval makes the second resonant voltage component less and less effective until it is completely eliminated when linear subinterval extends to instant $t_2$ to result in Case 4.

Case 4—One Resonant Component Only and CBS/Diode Output Switch

Figure 55A:
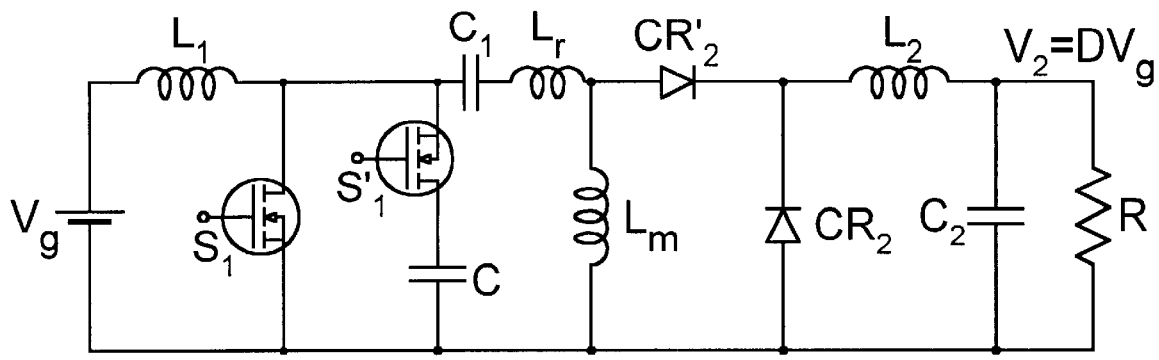
FIG. 55a illustrates the converter for Case 4 of FIG. 47b with current rectifiers (diodes) for output switch and complementary output switch and resonant inductor.
Figure 55B:
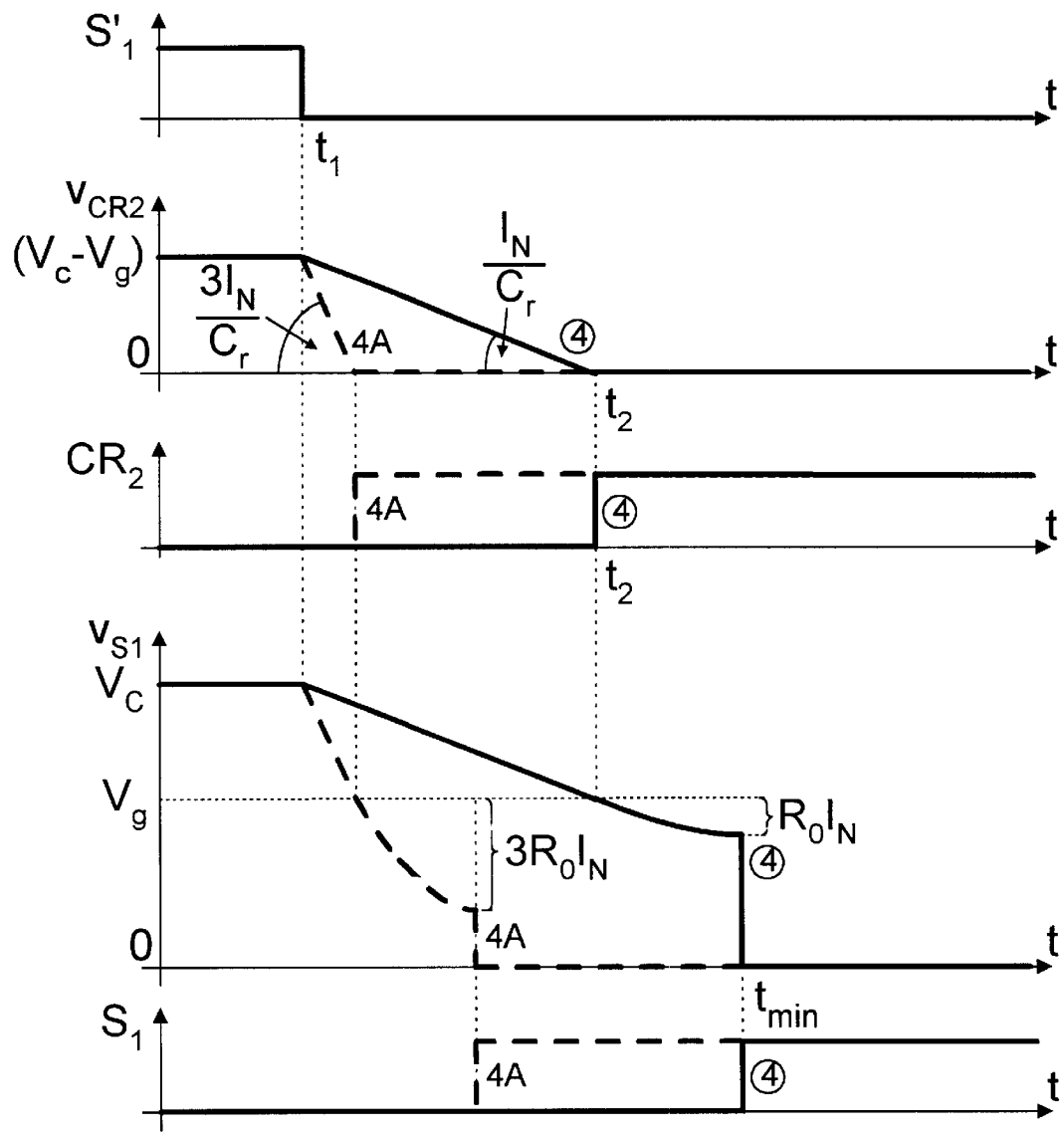
FIG. 55b illustrates in thick lines the characteristic waveforms of the Case 4 with slope $I_N/C_r$ while dotted line waveforms represent the case with slope increased 3 times to $3I_N/C_r$.

If the output switch is not deliberately turned ON prematurely as in previous cases, but is left to turn ON naturally when the voltage across it reaches zero as seen in FIG. 55*b* (hence simple diode rectifiers are sufficient for output switch and complementary output switch as shown in FIG. 55*a*), only the third resonant voltage component remains so that $$v_{S1}(t)=V_g+v_{r3} \qquad (44)$$

This resonant voltage component is least effective in reducing input switch voltage through resonant discharge. In above example, the input switch voltage can only be reduced by $V_{r3}=95V$ below $V_g$ to result in hard-switching voltage of $V_h=305V$. Increasing the auxiliary capacitor AC ripple current $I_N$ may increase the effectiveness of this component but at a proportionally increased overall loss and reduction of efficiency.

This ripple current $I_N$ is the sum of AC ripple currents of all three inductors. Thus, decrease of any of the three inductors values will increase $I_N$. Clearly, decrease of the middle inductor may be preferred in order to preserve the low AC ripple currents at input and output. This is especially case for isolated versions of FIG. 62*a* and FIG. 62*b*, where this translates into small magnetizing inductance of the isolation transformer. This, in turn, results in small size of the transformer. Shown with dotted lines in FIG. 55*b* is the Case 4A, in which original current $I_N$ is increased three times. The discharge of input switch capacitance is now 3 times faster, and the resonance provides 3 times bigger reduction of voltage on this capacitance.

If however, the auxiliary capacitor ripple current is increased 4 (four) times, the voltage reduction of $V_r=380V$ could be obtained to result in only $V_h=20V$. Unfortunately, this would also result in sixteen (16) times increase of conduction losses due to AC ripple currents, which in practice may diminish most of the savings obtained by decrease of switching losses due to the lossless switching. Clearly, this case may be suitable for the lower to medium input DC voltages, such as nominal 50V input DC voltage. Note that, as an alternative, the characteristic resistance $R_0$ could also be increased to result in proportional increase of the net resonant voltage. However, this may actually lead to even higher offsetting reduction of switching losses due to much increased leakage inductance required. For example, to match the above fourfold increase of resonant voltage to $V_{r3}=380V$, fourfold increase in the characteristic resistance $R_0$ would be required, and from (16) the resonant or leakage inductance would have to be increased sixteen (16) times resulting in additional losses due to high leakage inductance. Furthermore, a large external resonant inductor may be needed. Note also that in this special case the diode rectifiers of FIG. 55*a* are sufficient and no controllable switches are needed on output side. However, diodes are for low output voltages replaced with CBS switches in order to further reduce conduction losses.

Note that all of the above lossless switching methods based on the resonant discharge of the parasitic capacitor across input switch are dependent on the duty ratio D. The cases below introduce an alternative lossless switching method for this converter in which lossless switching is accomplished without employing any of the resonant discharge components described above. This novel lossless switching method and circuit implementation is designated lossless switching without resonance.

Case 5—VBS Switch and Reduced Switching Losses

Figure 56A:
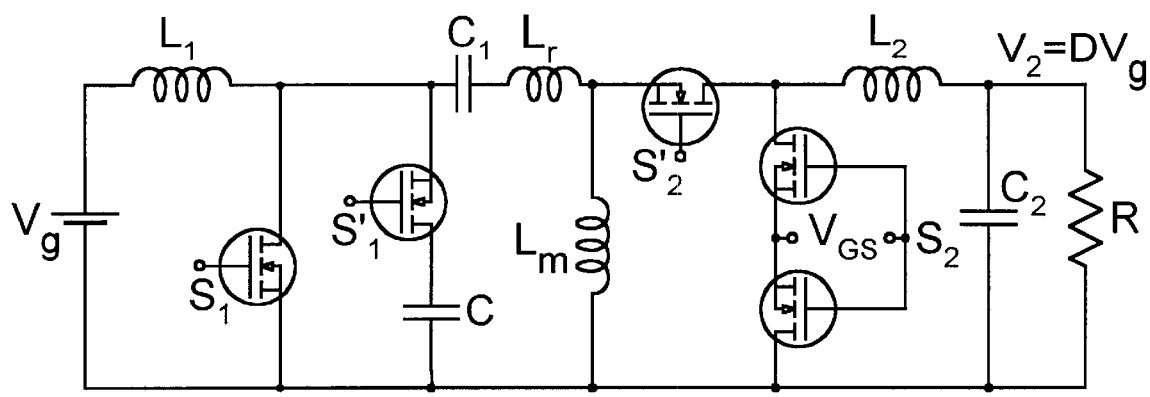
FIG. 56a illustrates the converter for Case 5 of FIG. 47b with output switch implemented with two MOSFET transistors and resonant inductor.
Figure 56B:
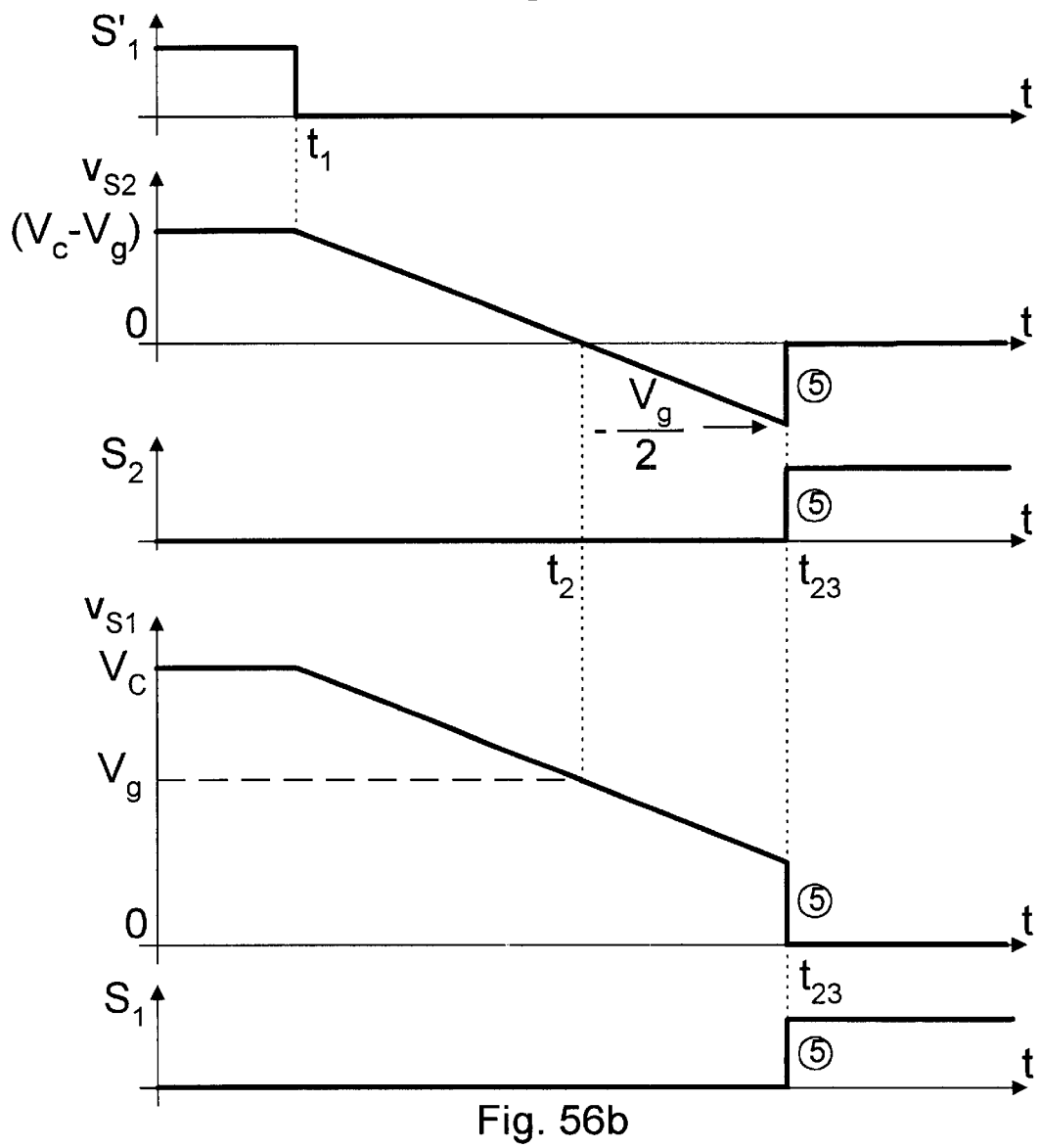
FIG. 56b shows the voltage reversal on the output switch terminals, enabled by VBS switch implementation.

When the output switch is implemented as VBS switch as in FIG. 56*a*, the output VBS switch turn-ON can be further delayed until instant $t_{23}$ to result in waveforms in FIG. 56*b*. Note how the voltage of the input switch continues to drop linearly during whole interval, while the voltage of output switch becomes even negative, until they are abruptly reduced to zero at instant $t_{23}$ when both output active VBS switch and the input CBS switch are simultaneously turned ON. Clearly both input and output switch will incur some hard-switching losses. Note how the previous resonant discharge never took place since upon turning ON output switch, the input switch was also turned ON. When $C_{S2}=C_r$, the total switching losses are minimal at instant $t_{23}$ for which hard-switching voltage is $V_g/2$.

Case 6—VBS Switch and Lossless Switching

Figure 57A:
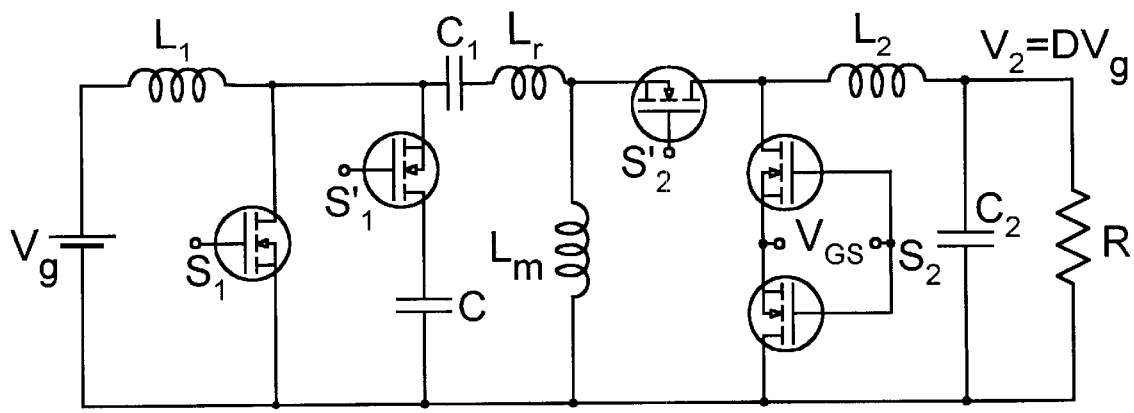
FIG. 57a illustrates the converter for Case 6 of FIG. 47b with VBS output switch implemented with two MOSFET transistors and resonant inductor.

When the output VBS switch $S_2$ of FIG. 57*a* is turned ON after further delay at an instant $t_3$ when the voltage across input switch $S_1$ reaches zero, zero voltage switching of input switch is obtained. Note that output switch is now hard-switched at $V_g$ level. More detailed analysis shows that substantial reduction of total switching losses is achieved even in this non-isolated case. The true effectiveness of this method is, however, fully realized in the isolated step-down converter shown in later section.

Complete D' to D Transition for VBS Switch

Figure 58D:
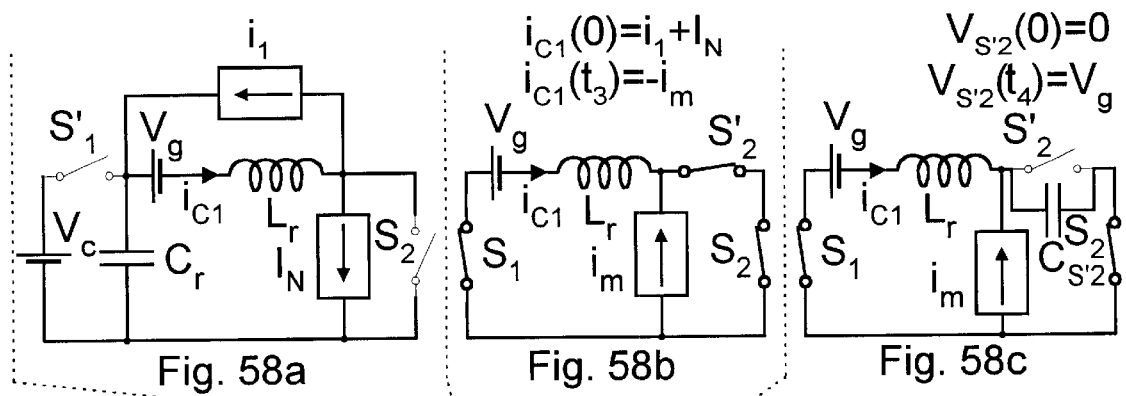
FIG. 58d illustrates the characteristic waveforms during D' to D transition.
Figure 58D:
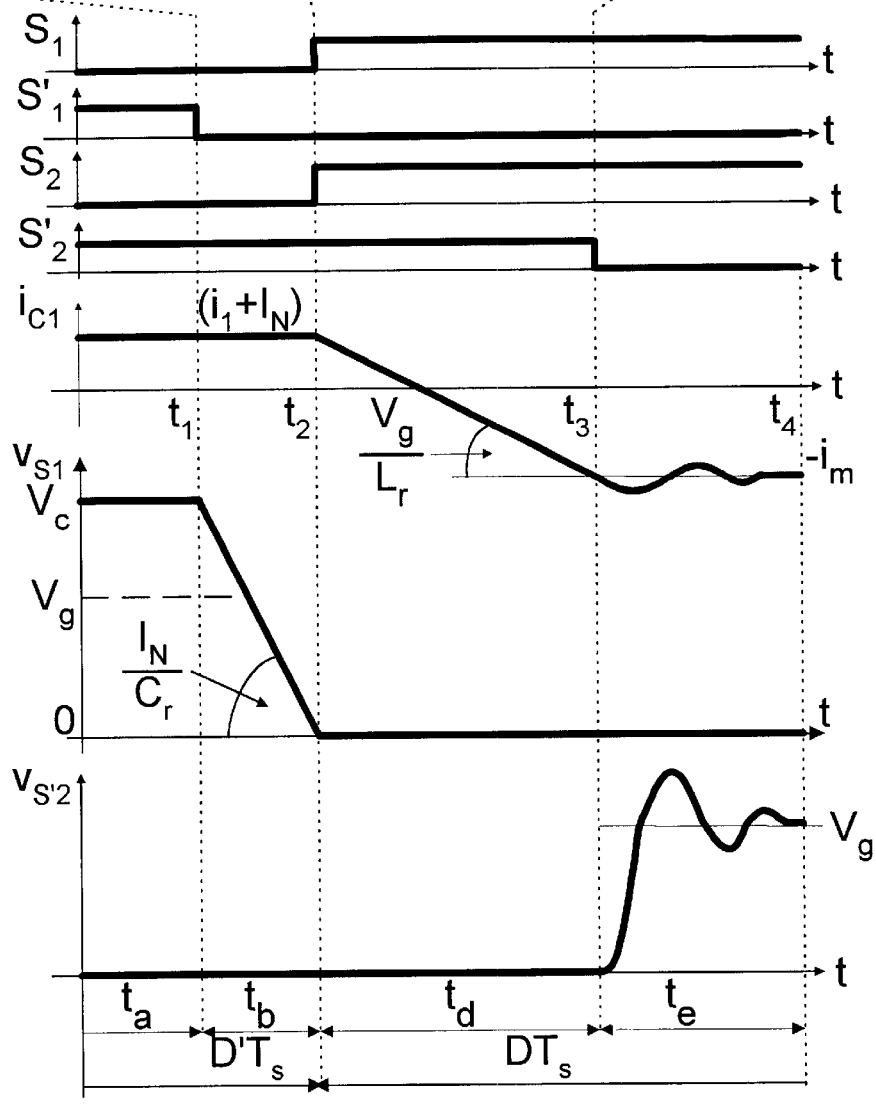

The complete transition interval for CBS switch implementation in addition to the boost, linear, and resonant intervals, also had a current-reversal subinterval. As seen in Cases 5 and 6 above, the resonant subinterval is now replaced with the linear discharge subinterval, which is again followed by current-reversal subinterval and voltage/current oscillations in the steady-state subinterval on output switches. The equivalent circuit models for the linear subinterval, current-reversal subinterval, and steady-state oscillations interval $t_e$ are shown in FIGS. 58(*a–c*) respectively, while the corresponding waveforms are displayed in FIG. 58*d*.

Linear Discharge Subinterval

This D' to D transition is initiated by turning OFF complementary input switch. Just as explained earlier with reference to FIG. 48*b*, the net current discharging the capacitance of input switch is the auxiliary capacitor AC ripple current $I_N$, despite the fact that input capacitor current is $i_{C1}=i_1(t)+I_N$ as in FIG. 58*a* and as seen on the input capacitor current waveform of FIG. 58*d*. When this capacitance is discharged to zero, the input switch is turned ON which completes this linear discharge subinterval $t_d$.

Current-Reversal Subinterval

The presence of the resonant inductor prevents the abrupt change of the current in the input capacitor from its steady-state value $i_1$ charging capacitor, to negative current with magnitude $i_m$ discharging the same capacitor in subsequent $DT_S$ steady-state interval. The equivalent circuit of FIG. 58*b* has three switches ON (input and output switches and complementary output switch), which results in a linear change of the input switch capacitor current $i_{C1}$ from positive level $i_1+I_N$ to negative $i_m$ as seen in FIG. 58*d* during the subinterval $t_{d'}$. Once current $-i_m$ is reached the current in the complementary output switch becomes zero, turning OFF that switch, thus completing the D' to D transition.

Oscillations After Completion of Transition Interval

As before, the equivalent circuit of FIG. 58*c* models the oscillation at the beginning of the steady-state $DT_S$ interval, due to the parasitic capacitance of the complementary output switch and the resonant inductor, caused by the difference in the initial value of the voltage on the complementary output switch, which is zero (moment before it is turned OFF) and final value equal to $V_g$ as dictated by steady-state requirements. An external R-C snubber network as before can be used to dampen these oscillations.

Figure 57B:
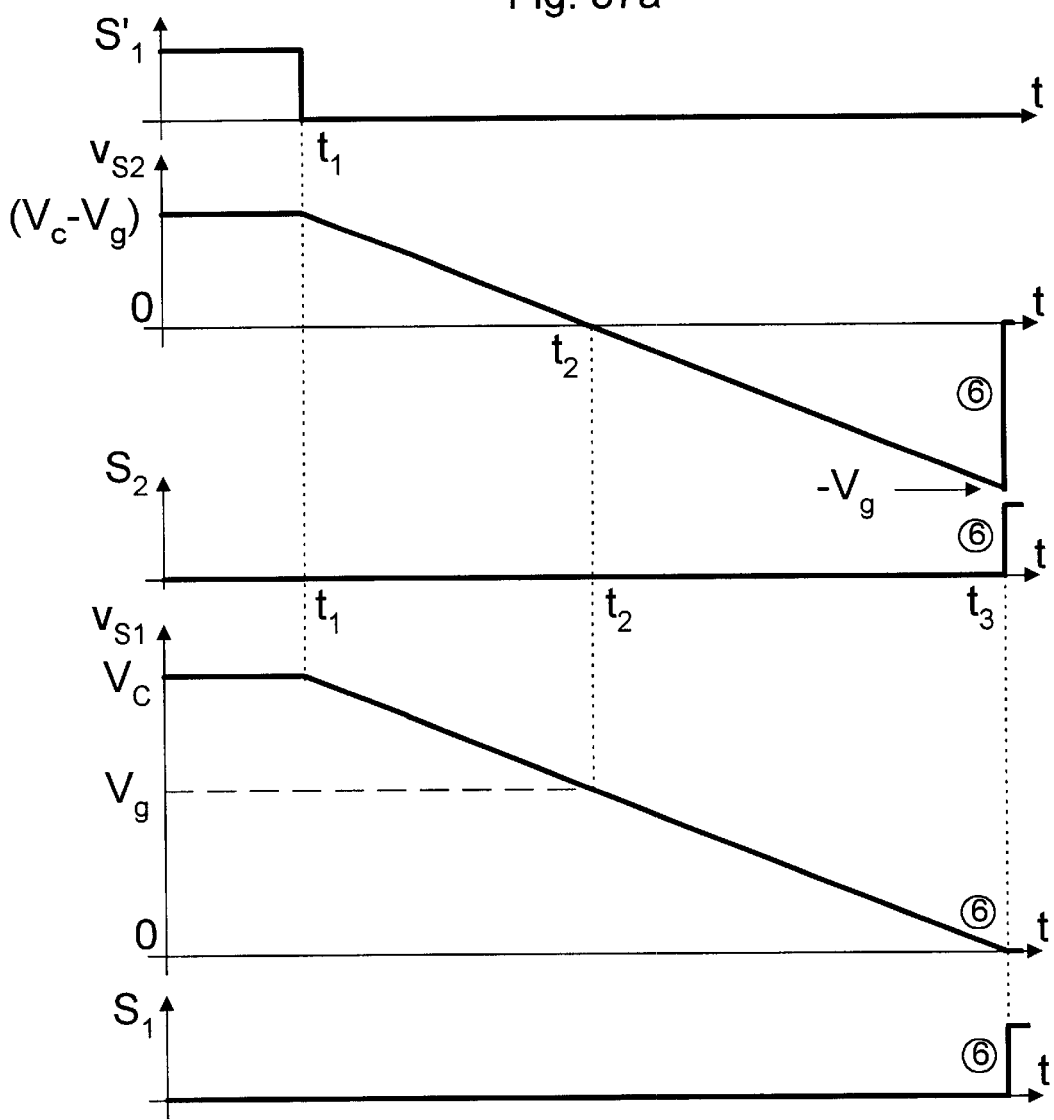
FIG. 57b shows the linear discharge interval with the complete reduction of input switch voltage to zero at $t_3$ at which instant input switch is turned ON with zero switching losses.
Figure 59A:
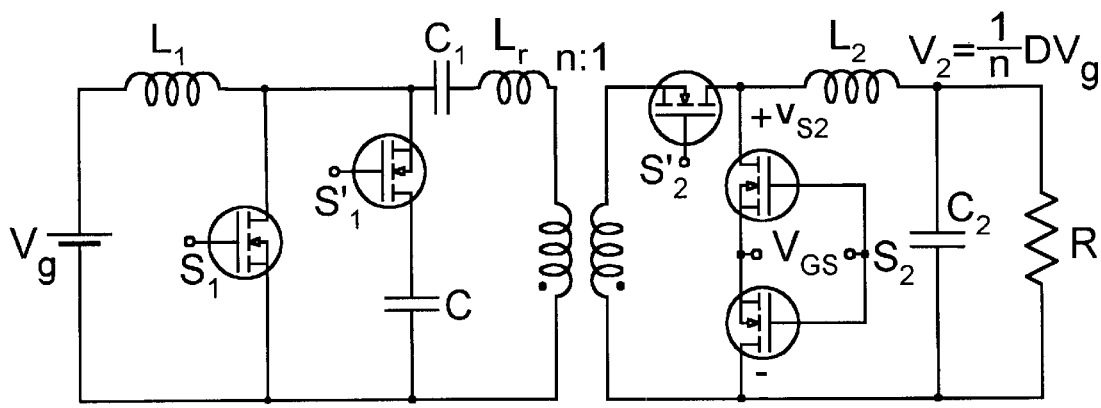
FIG. 59a illustrates the isolated converter with two-MOSFET VBS output switch and n:1 step-down turns ratio of Case I displayed in waveforms of FIG. 59b which shows that the hard-switched voltage $V_g$ of output switch of non-isolated converter is reduced by turns ratio n in the isolated converter to $(-V_g/n)$ making hard-switching losses negligible for high step-down ratio.
Figure 59B:
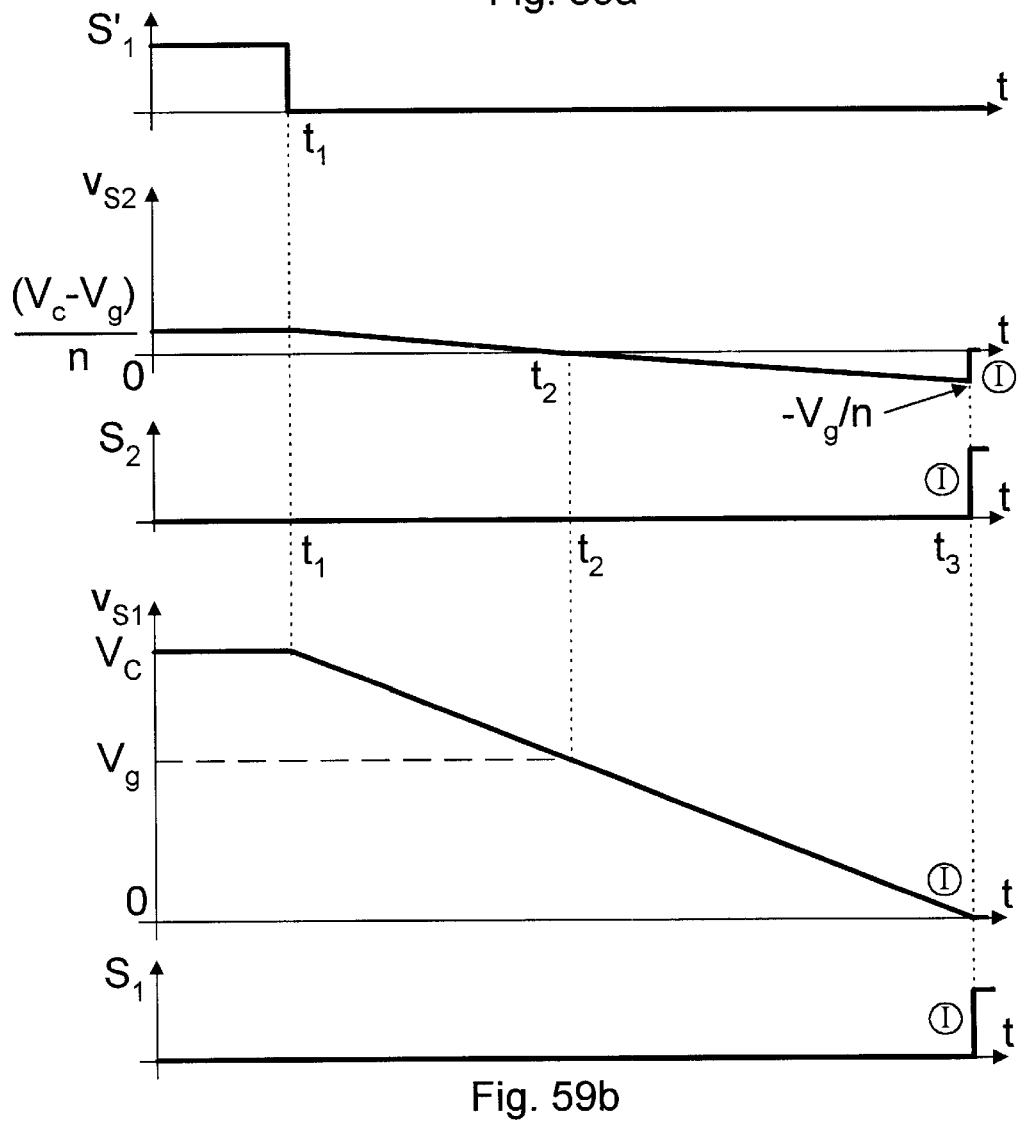

Isolated DC-to-DC Converter
Primary Side vs. Secondary Side Hard-switching
Case I—VBS Switch Replacing the middle inductor $L_m$ in FIG. 57a with an isolation transformer with a step-down turns ratio n, the converter model of FIG. 59a is obtained in which the role of the resonant inductor $L_r$ is played by the leakage inductance of the isolation transformer. Note how the blocking voltage across the output VBS switch has also been scaled down by the same turns ratio n as seen in FIG. 59b and at instant $t_3$ has become $V_{NEG}$ given by $$V_{NEG} = -V_g/n \quad (45)$$

where $V_{NEG}$ designation is used because this voltage is of negative polarity. For n=5, for example, the voltage $V_{NEG}$ across output switch is scaled by a factor of 5 from that in FIG. 57b to result in 5 times reduced voltage of FIG. 59b and 25 times reduced hard-switching losses in comparison to n=1 turns ratio. Thus, the higher the step-down ratio, the lower are the remaining hard-switching losses of the output switch.

In most practical applications, such as off-line switching power supplies, the AC input voltage is first rectified, resulting in high nominal DC voltage of 400V and then by using switching converter with isolation transformer with high step-down turns ratio such as n=27, this high input DC voltage is reduced to 5VDC or lower voltages. The following analysis reveals that primary side high voltage devices contribute by far the most switching losses compared to the secondary side low voltage devices, which even when fully hard-switched at low voltage, contribute only negligible switching losses. This gives the primary motivation for this new type of lossless switching first introduced in the non-isolated extension of the present invention of FIG. 57a, and in its isolated step-down counterpart of FIG. 59a. The following practical example illustrates the advantages of shifting the hard-switching to the secondary side. To facilitate this comparison, the isolated converter of FIG. 59a is chosen with the following values used later in experimental section for measurement and waveform demonstrations: $V_g$=450V, n=27, $V_2$=5V, switching frequency $f_S$=200 kHz and other quantities the same as in previous numerical example.

It is now instructive to compare the power loss due to the hard-switching of the high-voltage primary-side switches to the power loss of the hard-switching of the low-voltage secondary-side switches of the isolated converter in FIG. 59a at the same switching frequency of 200 kHz. The typical data for an off-line switching supply described in the experimental section is used here. The input switch $S_1$ operates with $V_C$=750V and has $C_P$=237 pF which leads to rather high hard-switching loss of $P_{S1}$=13.3W for a 100W converter output at 200 kHz switching frequency. This loss is in the isolated converter of FIG. 59a eliminated and replaced with the hard-switching loss on the output switch $S_2$.

Note, however, that the "hard-switching" of the output switch $S_2$ at the voltage magnitude $V_g$ in the converter of FIG. 57a is replaced with "hard-switching" of the output switch $S_2$ in the isolated converter of FIG. 59a at a much lower voltage level calculated from (45) as $V_{NEG}$=−16.7V. This characteristic negative voltage peak at the trailing edge of the voltage across output switch $S_2$ is confirmed by the waveforms of FIG. 104a measured on an experimental prototype of an off-line converter with 450V input DC voltage with $V_{NEG}$=−16.7V also marked on the measurements waveforms. Note also that the blocking voltage of the output switch in the isolated converter of FIG. 59a is also proportionally reduced, so that a low-voltage rated switch can now be used such as 30V device in experimental prototype. Since this switch has also proportionally increased current capability, it also results in increased parasitic capacitance $C_{S2}$. In the typical case used in experimental prototype, the low voltage output switch $S_2$ of FIG. 59a has over 12 times larger parasitic capacitance than the input switch $S_1$, i.e., $C_{S2}$=2950 pF. However, its hard-switching voltage is only $V_{NEG}$=−16.7V, hence 27 times smaller (same as isolation transformer turns ratio n) than hard-switching voltage on the primary side. In addition, due to quadratic dependence of the switching losses on the blocking voltage, this results in extremely small hard-switching losses of the output switch in the isolated converter of FIG. 59a which are calculated to be $P_2$=0.082W or 0.6% of the maximum hard-switching losses on the input switch on the primary side for an 166 times reduction of input switch switching losses. More importantly, for this 100W converter example, they only lead to 0.08% efficiency loss. Thus the conclusion is that the hard-switching losses of the practical low-voltage devices are negligible and the main source of the switching losses is in the hard-switching losses of the high-voltage switching devices on the primary side. Thus, with reference to FIG. 59a the switching losses of input switch $S_1$ and complementary input switch $S'_1$ in high step-down converter are by far the most critical and need to be reduced or eliminated by utilizing lossless switching methods, while switching losses of the output low-voltage switches $S_2$ and $S'_2$ are practically negligible. This is exactly what is accomplished in this novel lossless switching method applied to the isolated converter of the present invention by shifting hard-switching losses from the primary to the secondary side.

The role of the Voltage Bi-directional Switch in the isolated converter in FIG. 59a is precisely to move any hard-switching from the primary side high-voltage switches to the secondary side low voltage switches, and in the process to enable lossless switching of the high voltage switches on the input primary side and thereby to eliminate most of the switching losses.

Another clear advantage of this new lossless switching method in comparison with either prior-art soft-switching methods or novel resonant methods described earlier is that such performance is maintained throughout the entire operating range, that is for any input DC voltage $V_g$ and any operating duty ratio D. Input switch would always turn ON at zero voltage with zero switching losses, and only output switch would turn ON at voltage given by (45). Although this voltage does depend on $V_g$, the losses are truly negligible as shown above, making this lossless switching method equally effective for any operating point. This is not the case for the CBS switch implementation shown below, which depends on resonance to reduce the input switch voltage, hence is dependent on the operating point.

Finally only proper timing of the switching drives is needed to obtain complete lossless switching of high voltage input switches without relying on transformer leakage inductance, characteristic resistance $R_0$, or addition of any resonant component. This is not the case with CBS switch implementation shown below.

Case II—CBS Switch with Resonant Inductor

Figure 60A:
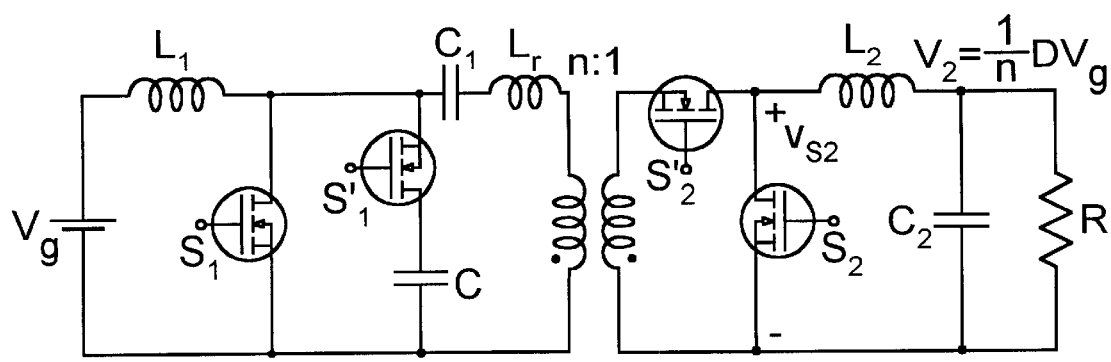
Figure 60B:
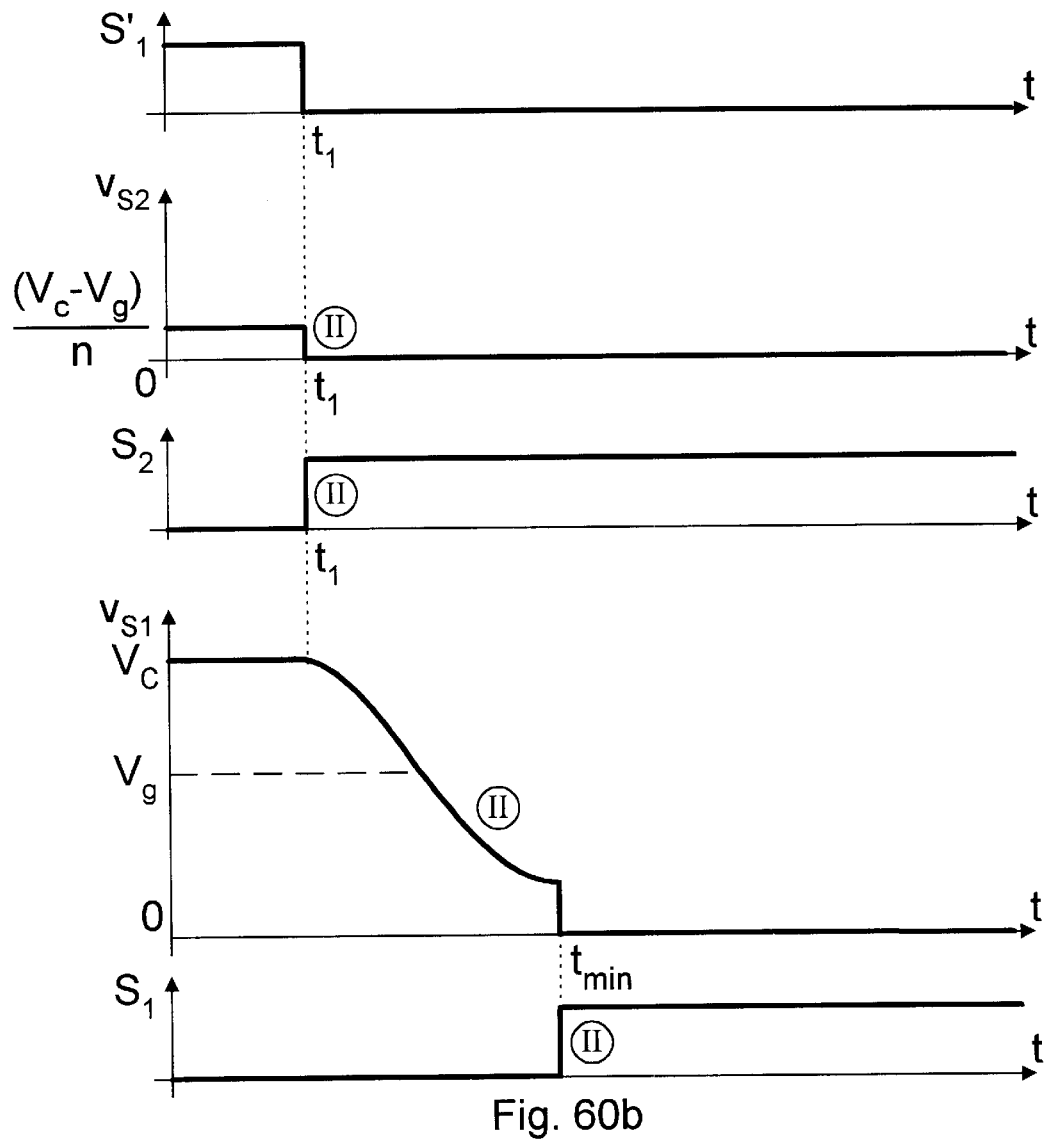

The isolated extension has the same effect on reducing the hard-switching losses on the output switch when the CBS switch is implemented as in converter of FIG. 60a. Here only the previous non-isolated Case 2 is described, but the results are equally applicable to all other resonant cases. Once again, the hard-switching voltage of the output switch is reduced by the isolation transformer turns ratio n to result in voltage $(V_C-V_g)/n$ as seen in FIG. 60b, and hence negligible switching losses on the output switch.

Case III—CBS Switch Used Only in Boost and Resonant Subintervals

The following example is intended to illustrate how combinations of the above lossless switching methods can be used beneficially in some practical applications. In the telecommunication 48V output voltage rectifiers, especially at high current and power levels, the output rectifier diodes may actually be preferred over the MOSFET switches due to lower conduction losses and lower cost.

Figure 61A:
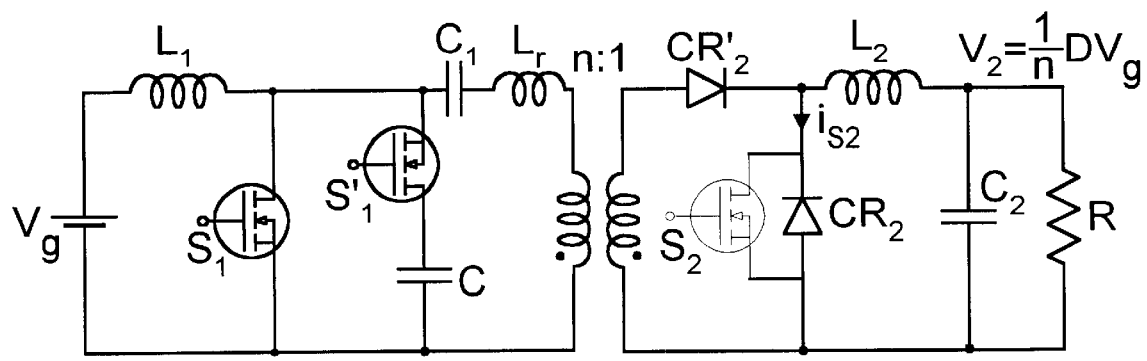
FIG. 61a illustrates an isolated converter with output switch comprising a low power MOSFET $S_2$ and high power external current rectifier $CR_2$ (diode).
Figure 61B:
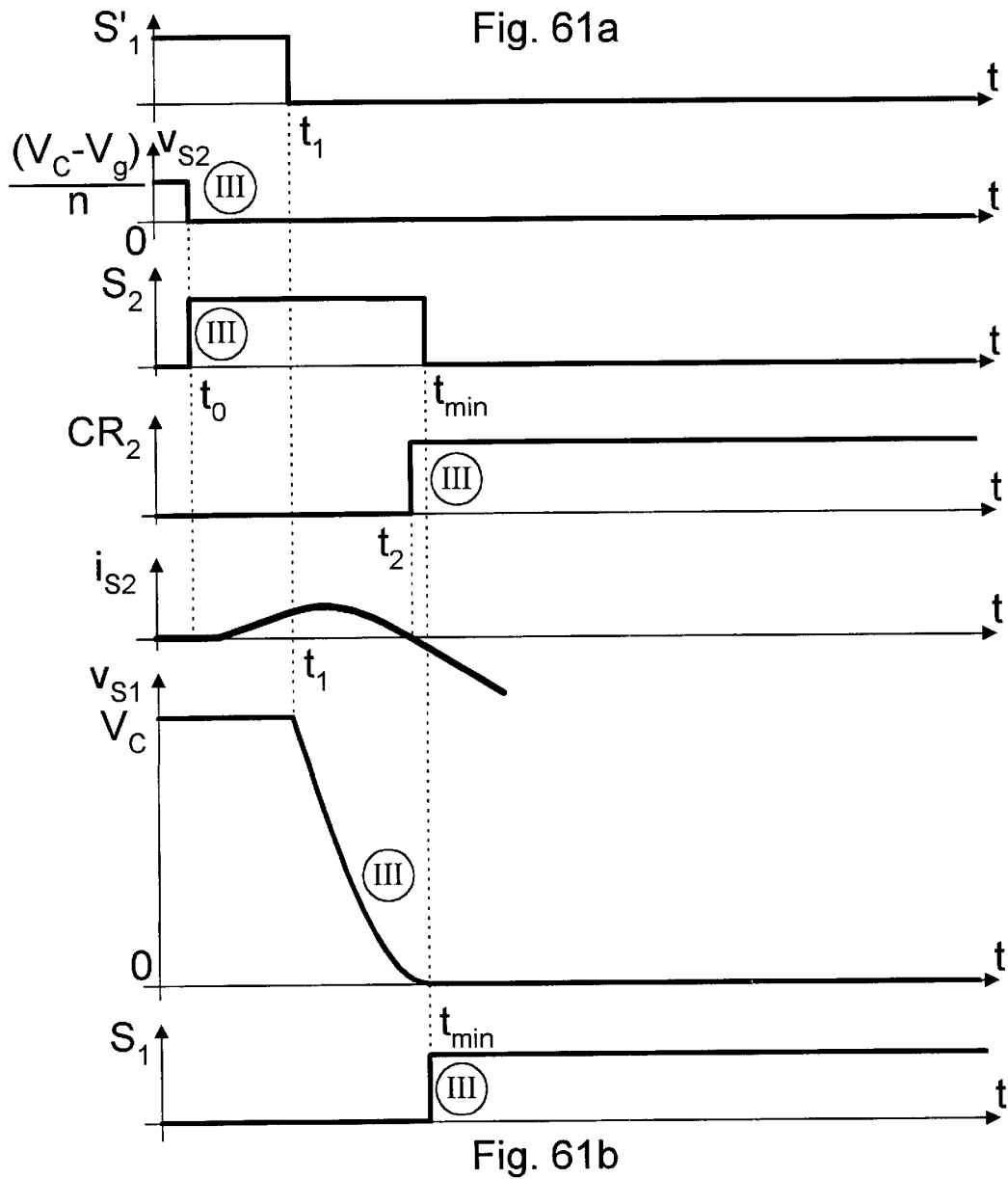
FIG. 61b shows the output MOSFET switch $S_2$ is used during the resonant transition subinterval to eliminate the switching losses and is OFF afterwards when the external diode takes over conduction.

On the other hand, in the case of three-phase utility AC voltage, the rectified AC line results in 800V input DC voltage, which, in turn leads to relatively significant switching losses generated by the high voltage rated switching devices on the primary side. The circuit configuration of FIG. 61a and the particular switching time control drive of the auxiliary MOSFET output switch as in FIG. 61b, leads to both low switching losses and low conduction losses of the output diode rectifiers. Note that the output switch is implemented with the power diode rated for full power and with an "auxiliary" low power, low current rating MOSFET switch in parallel. The "auxiliary" MOSFET switch (shown in thin lines in FIG. 61a), is then used only to conduct current during the boost and resonant subintervals, while the power diode is taking over the conduction when turned ON naturally by the converter circuit at instant $t_2$ as seen by the current waveform $i_{S2}$ in FIG. 61b. Shortly thereafter at time $t_{min}$ the input switch is turned ON at zero voltage and simultaneously the output "auxiliary MOSFET is turned OFF. From that instant onward, output diode rectifier $CR_2$ takes over the conduction of the DC load current.

Any of the previous resonant methods can be implemented. For high input DC voltages as in telecommunications rectifiers, the above case with a boost subinterval followed by a resonant discharge (same as Case 1 of FIG. 47b) might be the most effective in eliminating the otherwise dominant switching losses of the input switch during the D' to D transition. This example also clearly points out the non-critical drive timing of the complementary output switch, which in this case as well as in previous cases could be just a passive diode rectifier switch and not an independently controlled active MOSFET switch.

Case IV—Resonance with Magnetizing Inductance of Isolation Transformer

Figure 62A:
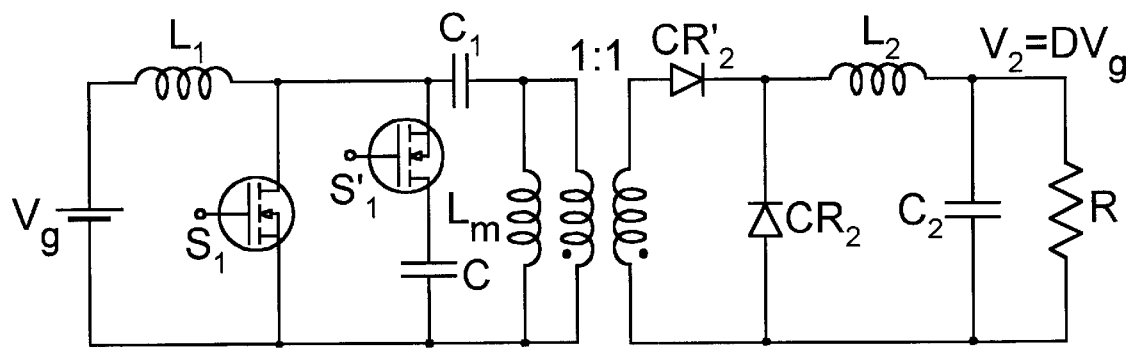
FIG. 62a illustrates an isolated converter having an isolation transformer with a small transformer magnetizing inductance $L_m$ and large ripple current $I_N$ of auxiliary capacitor C, resulting in large resonant current discharge of FIG. 62b.
Figure 62B:
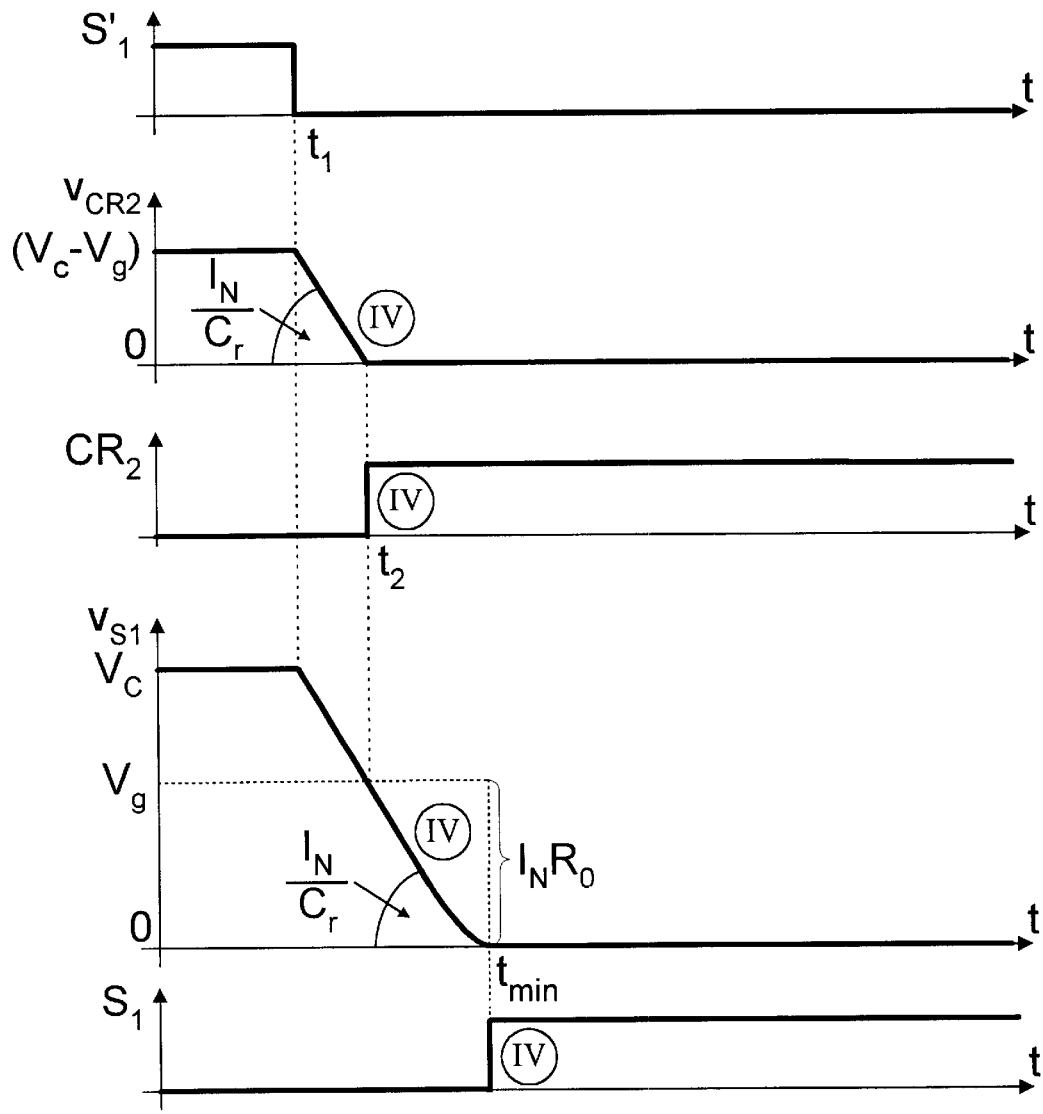

This is another case where only diode rectifiers are used for the output switch and complementary output switch as in FIG. 62a. In addition, the isolation transformer is designed to have a small magnetizing inductance, resulting in correspondingly large ripple current of the magnetizing inductance and large $I_N$ This, in turn, leads to large rate of discharge $I_N/C_r$ and voltage discharge of input switch appears to be practically linear all the way until complete discharge to zero volts. In reality, the resonance is still taking place as in Case 4A but with such a large slope which masks the resonant behavior so that near linear $v_{S1}$ in FIG. 62b is obtained.

Case V—Effect of the Large Capacitance of the Output Switch

The above cases were all based on the assumption (15) that the output switch capacitance reflected to the primary side as defined in (14) is negligible compared to resonant capacitance $C_r$ of the input switches. This is indeed the case for the high transformer step-down turns ratio. In the above example with $V_g=400V$, the output switch capacitance $C_{S2}=$ 2,950 pF becomes $C_{S2P}=4$ pF when reflected to the primary side. This, in turn, is indeed negligible when compared to resonant capacitance $C_r=237$ pF of the actual input switches. Hence, the assumption (15) is well justified in most practical cases with relatively large step-down turns ratio of isolation transformer.

However, when the isolation transformer step-down turns ratio is not large and approaches 1, such scaling is not any more applicable. In fact for 1:1 turns ratio, the output switch voltage blocking requirements are similar to the input switch resulting in comparable parasitic capacitances so that reflected capacitance $C_{S2p} \approx C_r$, so that (15) is not satisfied. The net result is that the output switch capacitance does alter the waveforms across both input and output switch. This effect is now examined for the previous special Case 4 with CBS switch/diode rectifier with only one resonant current component $i_{r3}$ present. In that case, output diode rectifier switch turn-ON is forced by the converter circuit and only the drive timing of input switch and complementary input switch matter.

Figure 63A:
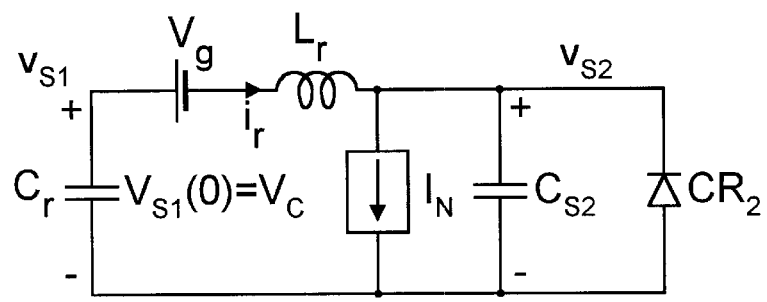
FIG. 63a illustrates the equivalent circuit model of the converter in FIG. 55a with parasitic capacitance $C_{S2}$ of the output switch included.
Figure 63B:
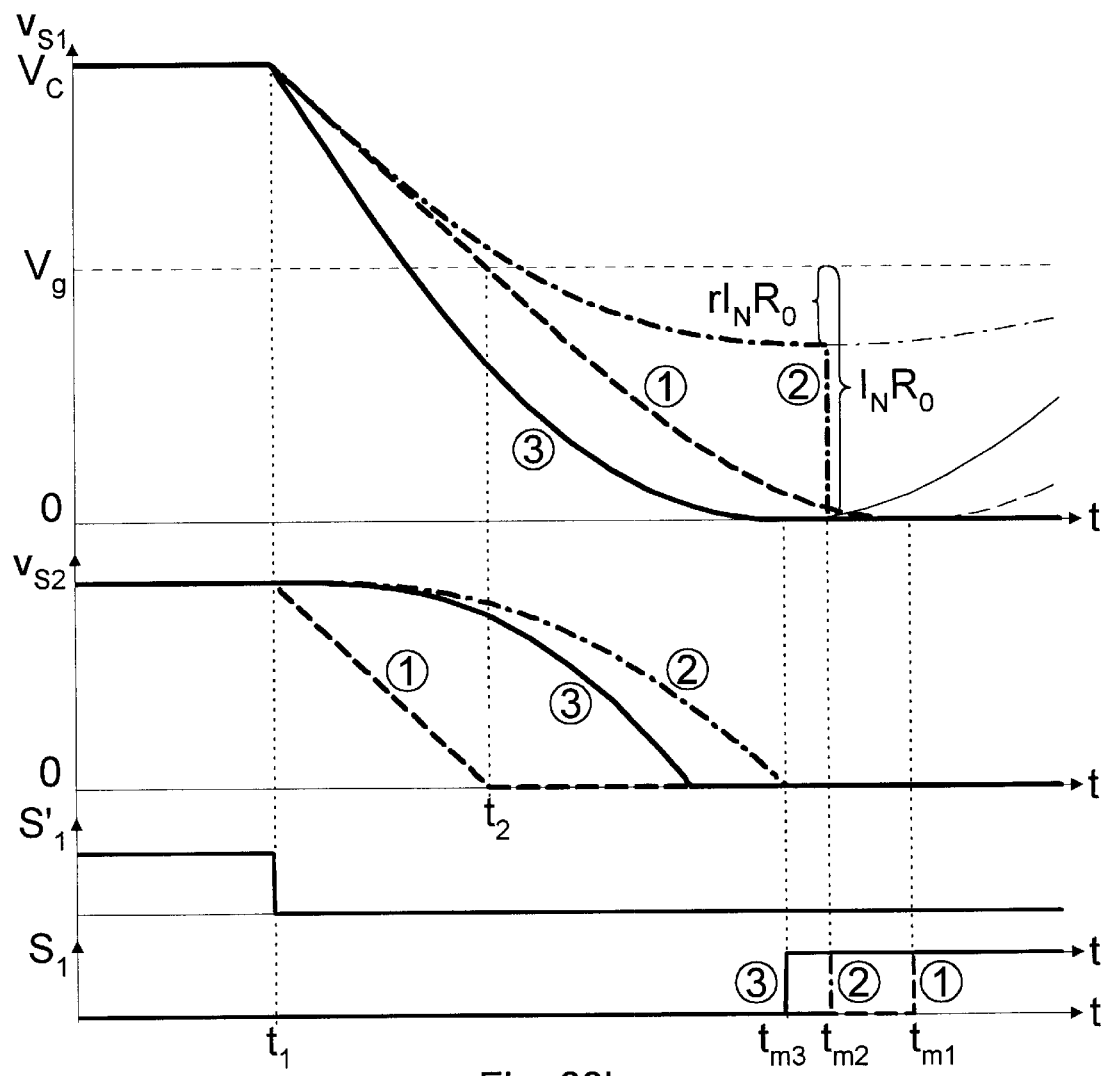
FIG. 63b illustrates characteristic waveforms for three cases: 1) $\alpha=0$; $\beta=0.8$; $\delta=1$, 2) $\alpha=1$; $\beta=0.8$; $\delta=1$, 3) $\alpha=1$; $\beta=0.8$; $\delta=1.64$.

The equivalent circuit for this case is shown in FIG. 63a. Waveforms plotted with dotted lines in FIG. 63b and marked with number 1 correspond to case when $C_{S2}$ is negligible. In that case, both input switch and output switch parasitic capacitances are discharging linearly until the output switch voltage is reduced to zero at $t_2$, and output switch diode turned ON. Then, the resonant discharge starts and brings the input switch voltage down to zero at $t_{m1}$ for a total resonant voltage discharge of 40V since in this case $V_g=40V$. The large capacitor $C_{S2}$, however, has prolonged the discharge as seen in dotted-line waveforms marked with number 2 in FIG. 63b and results in reduced resonant voltage discharge of the input switch of $rI_NR_0$, and leads to remaining hard-switching voltage given by $V_g-rI_NR_0$, where reduction ratio r is obtained from (49). From the model in FIG. 63a the increased capacitance $C_{S2}$ demands additional current, which in turn must be compensated by auxiliary capacitor AC ripple current increase to a new value $I_{NN}$ in order to bring input switch voltage to zero. In that case, the reduction to zero voltage on input switch is restored and the waveforms designated by thick lines and marked with number 3 in FIG. 63b are obtained.

The only resonant voltage component present in this case, $v_{r4}=-V_{r4}\sin\omega t$, is reduced by a reduction factor r, which is dependent on dimensionless factors $\alpha$ and $\beta$, where $$V_{r4}=rV_{r3}=rI_NR_0 \tag{46}$$

$$\alpha=C_{S2}/C_r \tag{47}$$

$$\beta=(V_C-V_g)/(I_NR_0) \tag{48}$$

$$r=f_1(\alpha,\beta) \tag{49}$$

Figure 64A:
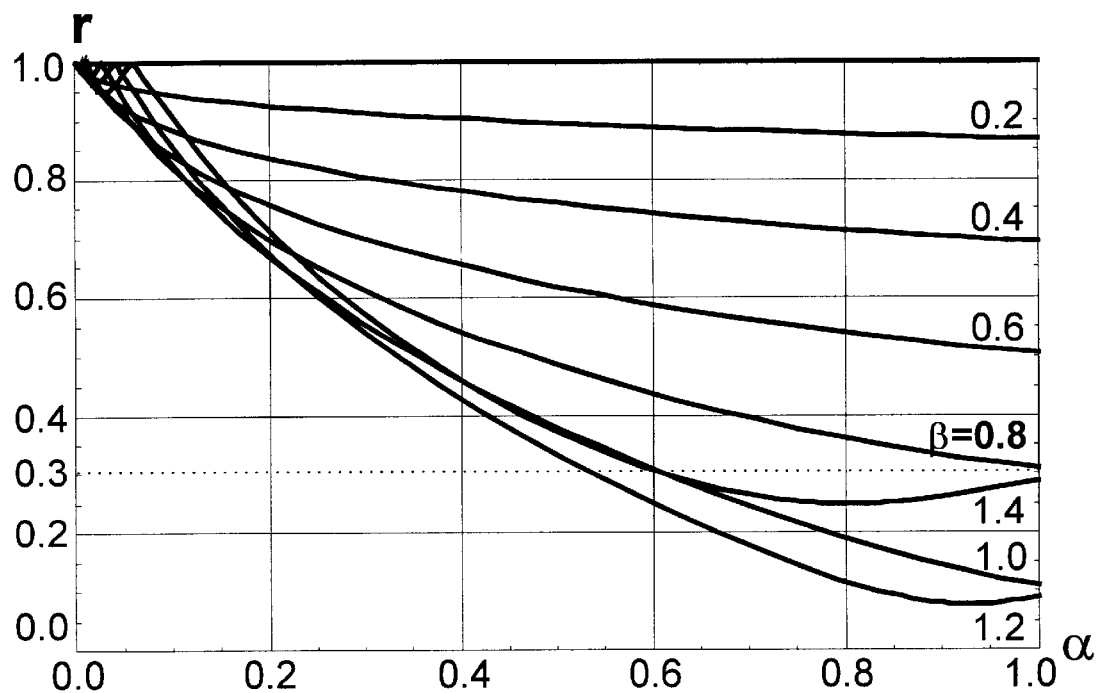
FIG. 64a shows the reduction factor $\delta$ as a function of capacitor ratio $\alpha$ for various values of parameter $\beta$.

Functional dependence $f_1(\alpha,\beta)$ is displayed in the graphs of FIG. 64a and is useful in assessing how much lossless switching degradation is obtained due to excess output switch capacitance. However, for design purposes, important factor is the current amplification factor $\delta$ defined as $$\delta=I_{NN}/I_N=f_2(\alpha,\beta) \tag{50}$$

where $I_{NN}$ is a new peak of auxiliary capacitor AC ripple current needed to achieve zero voltage switching and is displayed in thick lines marked with number 3 in waveforms of FIG. 63b.

Figure 64B:
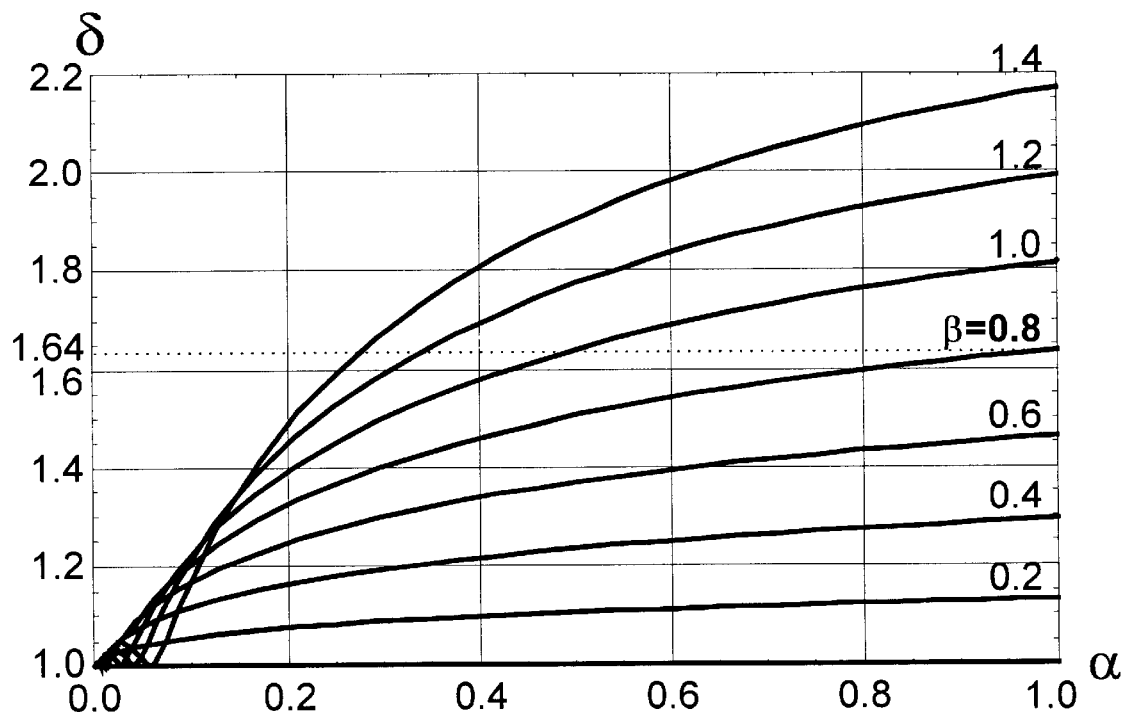
FIG. 64b shows the current increase factor $\delta$ as a function of $\alpha$ and $\beta$.

The above lossless switching method is illustrated on the following numerical example and with the aid of two graphs of FIG. 64a and FIG. 64b plotted based on the analytical model obtained from the circuit in FIG. 63a:

$$V_C=72V; V_g=40V; R_0=40\Omega; I_N=1A; L_r=0.75 \mu H;$$
$$C_{S2}=C_r=0.47 nF \quad (51)$$

Thus, from (47) and (48), it is calculated that α=1 and β=0.8. Hence from the graph on FIG. 64a, the reduction ratio r=0.31 is obtained as displayed by waveform 2 in FIG. 63b. The current amplification factor δ can be obtained from the graphs in FIG. 64b, which for above choice (α=1, and β=0.8), leads to δ=1.64 and $I_{NN}$=1.64A. Hence a 64% increase of auxiliary capacitor AC ripple current is needed to compensate such a large output capacitor.

Note that the outstanding feature of the previous case with negligible $C_{S2}$ is still preserved: both input switch and output switch are turned ON at zero voltage during this D' to D transition despite the large output capacitance $C_{S2}$. The analytical model is, of course, more complicated, and the obtained time domain waveforms more complex. In fact, the later analysis of D to D' transition reveals that complementary input switch and complementary output switch (diode rectifier) are also turned ON at zero voltage during that transition. Hence, all four-semiconductor switches are turned ON at zero voltage in this special case even when large output switch capacitance is considered. Thus, zero voltage switching is preserved by proper increase of the auxiliary capacitor peak ripple current to $I_{NN}$, or corresponding increase of $R_0$.

LOSSLESS SWITCHING DURING D TO D' TRANSITION

Although this transition usually leads naturally to lossless switching, it is important to verify that this is indeed the case as well as consider also a number of different cases and understand their relative merits. For all the cases below, the following fundamental relationship between voltages on input switch and complementary input switch holds not only during the steady-state but also during the transition intervals:

$$v_{S1}(t)+v_{S'1}(t)=V_C \quad (52)$$

During this D to D' transition interval, the lossless switching objective is to reduce the voltage on complementary input switch $v_{S'1}$ from $V_C$ level to zero. From (52), the voltage on input switch is just a complement of the voltage on complementary input switch and will be increased from zero voltage to $V_C$ voltage level. This, in fact, reflects the transfer of the energy stored initially on the parasitic capacitance of the complementary input switch onto parasitic capacitor of the input switch in a non-dissipative, lossless switching way during this transition interval.

Non-isolated DC-to-DC Converter without Resonant Inductor

The non-isolated converter of FIG. 46a implemented with diode rectifiers for output switches is chosen as the first case in order to demonstrate that in this transition, the two output diode switches do not result in the stalled condition as described before for D' to D transition in Case E (FIG. 46b) in which both output diodes conduct resulting in stalled condition until that condition is interrupted by turn-ON of the input switch.

Case A—Diode Rectifier Switches

The D to D' transition starts with turning OFF of the input switch, which results in the equivalent circuit model of FIG. 65a. Note that the diode complementary output switch S'$_2$ is OFF and is thus shown in thin lines, while the diode output switch S$_2$ is ON and is thus shown in thick lines. The parasitic capacitance of the complementary input switch and the parasitic capacitance of the complementary output switch are discharging at the same rate as seen in FIG. 65c until the voltage on the complementary output switch reaches zero at which instant a second subinterval starts at $t_2$. At instant $t_2$, assuming ideal diodes, the complementary output switch diode turns ON, while at the same time the output switch diode turns OFF to result in equivalent circuit of FIG. 65b. The current source $(i_1+i_m)$ maintains the same direction as before but with the magnitude reduced to $I_P$. This results in a lower rate of discharge of the complementary input switch than before, but nevertheless continues smoothly until the complete discharge at which instant this complementary input switch can be turned ON at zero voltage and with no switching losses. Note that the complementary output diode switch was also automatically turned ON earlier at zero voltage with zero switching losses.

Unlike D' to D transition, this transition does depend on the DC load current, since the first linear subinterval depends on the peak input switch current $(i_1+i_m)$ and is thus considerably shorter. However, the second subinterval is dependent only on the small auxiliary capacitor peak AC ripple current $I_P$ and is considerably longer. This transition is therefore in total only somewhat shorter than the D' to D transition.

Case B—CBS Output Switch

When the output switch is replaced with the CBS switch, the identical behavior as in Case A is obtained, provided the output switch is turned OFF either at the same time or before its body-diode stops to conduct at instant $t_2$. Note that if the turn-OFF of that CBS output switch is delayed past the instant $t_2$, it will impose same stalling condition at the $V_g$ level of the input switch or $(V_C-V_g)$ level of the complementary input switch, as already observed in D' to D transition. However, upon turn-OFF of the output switch, the smooth discharge of parasitic capacitance of the complementary input switch will continue at the same rate until full discharge. Clearly, such delay in turn-OFF of output switch is wasteful and would only prolong this transition interval and is thus easily eliminated by proper switching time control.

Case C—VBS Output Switch and Asymmetrical Lossless Switching

The same transition waveforms in FIG. 65c will also be observed when the output switch is replaced with the VBS switch. Clearly, a VBS switch is not needed to enable this lossless switching transition. However, since it is used for D' to D transition to an advantage, this now confirms that VBS switch can be used to successfully provide both transitions with proper timing control. The voltage on the output switch is positive during D to D' transition, but during D' to D transition it is negative. Thus, this lossless switching case is designated asymmetrical lossless switching due to such asymmetrical voltage waveform. Another reason for this name is that the VBS switch enables yet another lossless switching case with symmetrical voltage waveform on the input and output switch as shown next.

Case D—VBS Output Switch and Symmetrical Lossless Switching

Figures 66A, 66B:
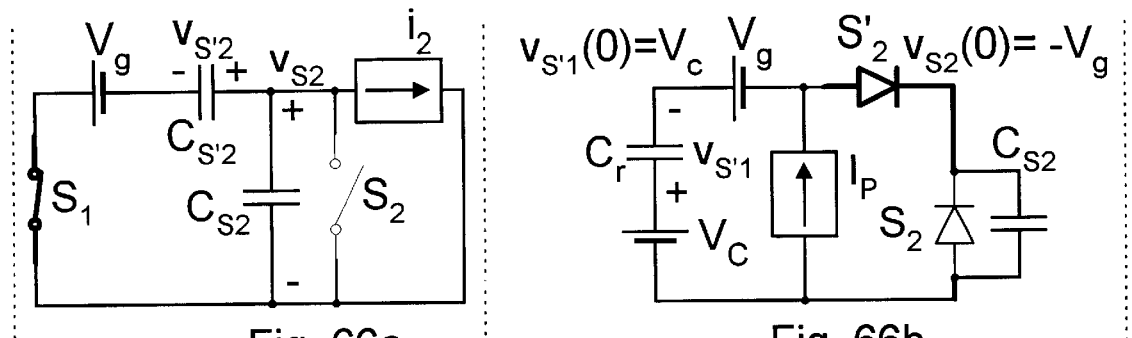
FIG. 66a illustrates the equivalent circuit for D to D' transition and symmetrical lossless switching and for subinterval in which the input switch was turned ON, and FIG. 66b illustrates the equivalent circuit for subinterval in which the input switch is turned OFF.
Figure 66C:
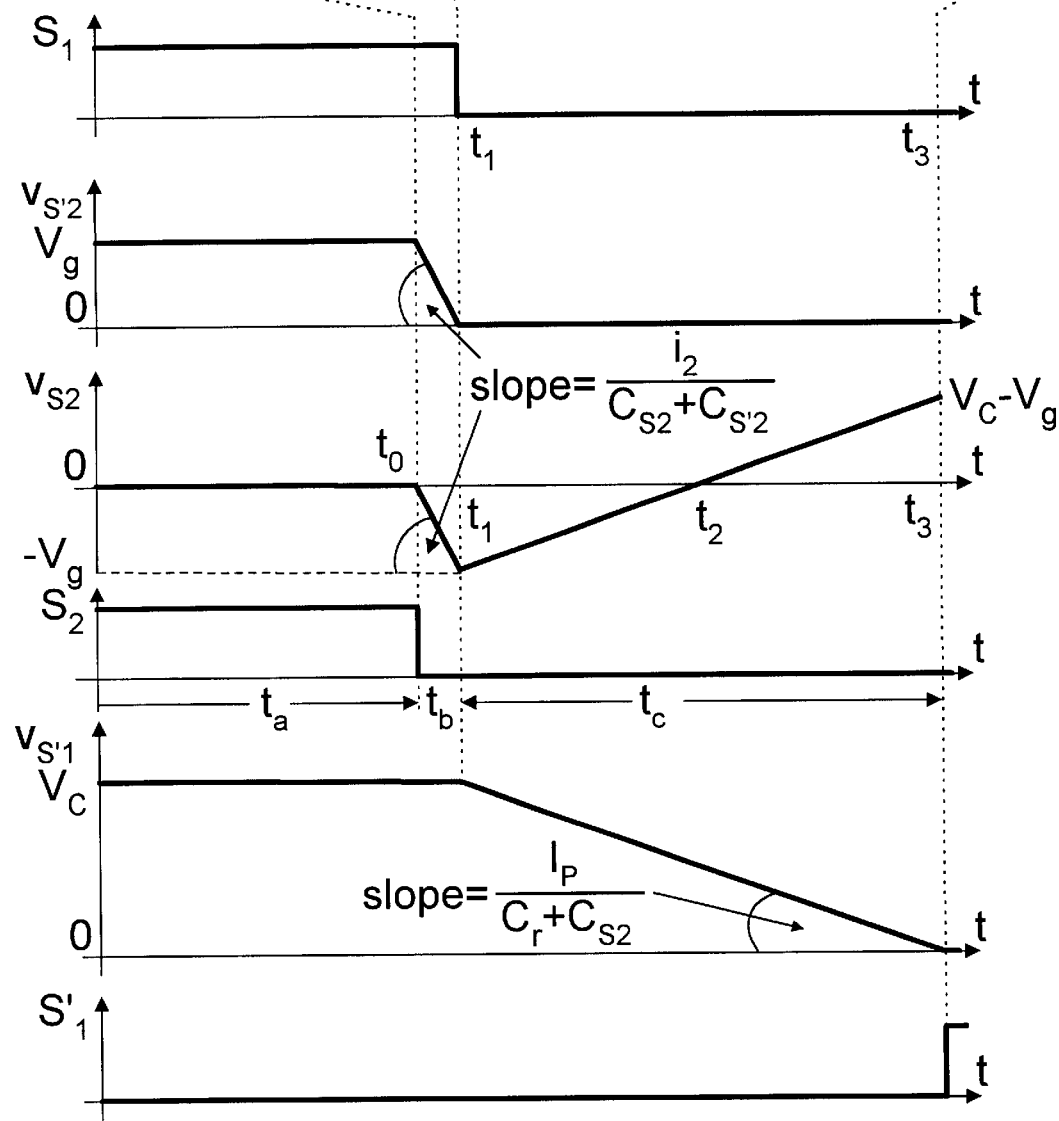
FIG. 66c illustrates the characteristic waveforms during the above two subintervals.

The fact that the VBS output switch can block both the positive and negative polarity of the voltage across it gives yet another lossless switching opportunity. Note that in case of the diode implementation of the output switch, this diode in FIG. 65a keeps the voltage across it clamped at zero during the first subinterval of the D to D' transition. With the VBS output switch implementation, the output switch is turned OFF first at instant $t_0$ to result in the circuit model of FIG. 66a. From this model, the output inductor current $i_2$ linearly discharges the capacitance of the complementary output switch and at the same rate linearly charges the capacitance of the output switch to the negative polarity (this is why VBS switch was needed in the first place!) as seen in the waveforms of FIG. 66c. When the voltage of the complementary output switch S'$_2$ becomes zero at instant t$_1$ (S'$_2$ is turned ON), the voltage on the output switch S$_2$ becomes (-V$_g$). At that instant, the input switch S$_1$ is turned OFF to result in the equivalent circuit model of FIG. 66b valid for second linear transition subinterval. Now, the parasitic capacitance of the complementary input switch is discharged linearly at the rate [I$_P$/(C$_c$+C$_{S2}$)] until fully discharged at instant t$_3$ at which time complementary input switch is turned ON at zero voltage. At the same time, the parasitic capacitance of the output switch is being charged at the same rate from negative voltage level (-V$_g$) to positive voltage level (V$_C$-V$_g$) reached also at instant t$_3$. At some interim time t$_2$, the voltage across output switch is zero and changing polarity afterwards. However, VBS output switch being voltage-bidirectional switch is capable of blocking the voltage of both polarities and keeping the switch open. Once again, this transition results in zero voltage switching (ZVS) for both complementary input switch as well as complementary output switch.

Note that the first subinterval is extremely short, since the DC load current is high and parasitic capacitances of output switches are small compared to those of input switches resulting in very steep discharge rate. On the other hand, the second subinterval rising slope is symmetrical to the falling slope for corresponding D' to D transition for t$_c$ subinterval. Hence, the salient feature of the voltage waveform across the output switch is that it is symmetrical leading to symmetrical lossless switching designation for this case. Note also that the voltage on the input switch will also be completely symmetrical with equal transition times for both transitions (D to D' and D' to D transition). Thus, another feature of the symmetrical lossless switching is that it is independent of the DC load current. The symmetrical but slower rising and falling slopes of both transition edges has a definite advantage in reducing the EMI noise, as is confirmed on the very smooth and noise free transition edges on the experimental prototypes presented in later experimental section.

Furthermore, the complementary input switch and complementary output switch are switched at zero volts during D to D' transition for any input voltage V$_g$, thus zero voltage switching is achieved for any operating duty ratio D. Combined with the much reduced losses for the D' to D transition, makes this lossless switching method especially suitable for applications with wide input voltage range and wide DC load current change.

Non-isolated DC-to-DC Converter with Resonant Inductor

The non-isolated converter with resonant inductor L$_r$ of FIG. 47a is chosen in which the output switch once again can be implemented either as CBS switch, diode or VBS switch.

Case 1—CBS/Diode/NVBS Output Switch

Figures 67A, 67B:
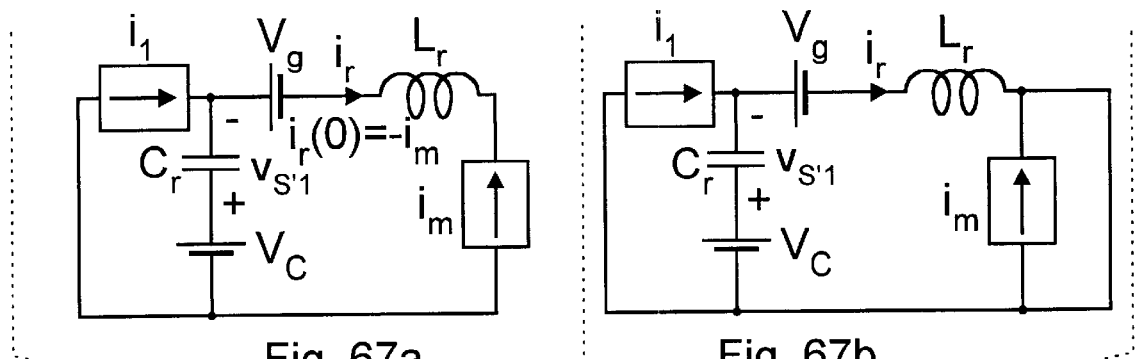

The output switch S$_2$ is closed during entire transition interval. The transition is initiated by turning OFF the input switch to result in the equivalent circuit for the first subinterval as in FIG. 67a. Thus, the difference of the currents (i$_1$-i$_r$) is discharging parasitic capacitor of the complementary input switch. The initial value i$_r$(0)=-i$_m$, thus initially no current is flowing in the capacitance C$_{S'2}$. However, as the voltage on input switch rises, so does the voltage v$_r$ on resonant inductor resulting in decrease of resonant current i$_r$. This, in turn, results in net discharge current in the parasitic capacitor of complementary output switch. As seen in the waveform on FIG. 67c, this capacitor eventually discharges to zero at t$_2$ forcing the respective diode switch to turn ON, or in case of a CBS switch, turning that switch ON when its body-diode turns ON. This leads to the equivalent circuit of FIG. 67b. Thus, the current (i$_1$-i$_r$) continues to further discharge the parasitic capacitance of the complementary input switch all the way to zero at t$_3$ at which instant this switch is turned ON at zero voltage. Note that the output switch was closed throughout both intervals and did not effect its operation in any way. Thus, output switch could be implemented either as diode, CBS, or VBS switch, and identical waveforms will result.

Figure 67C:
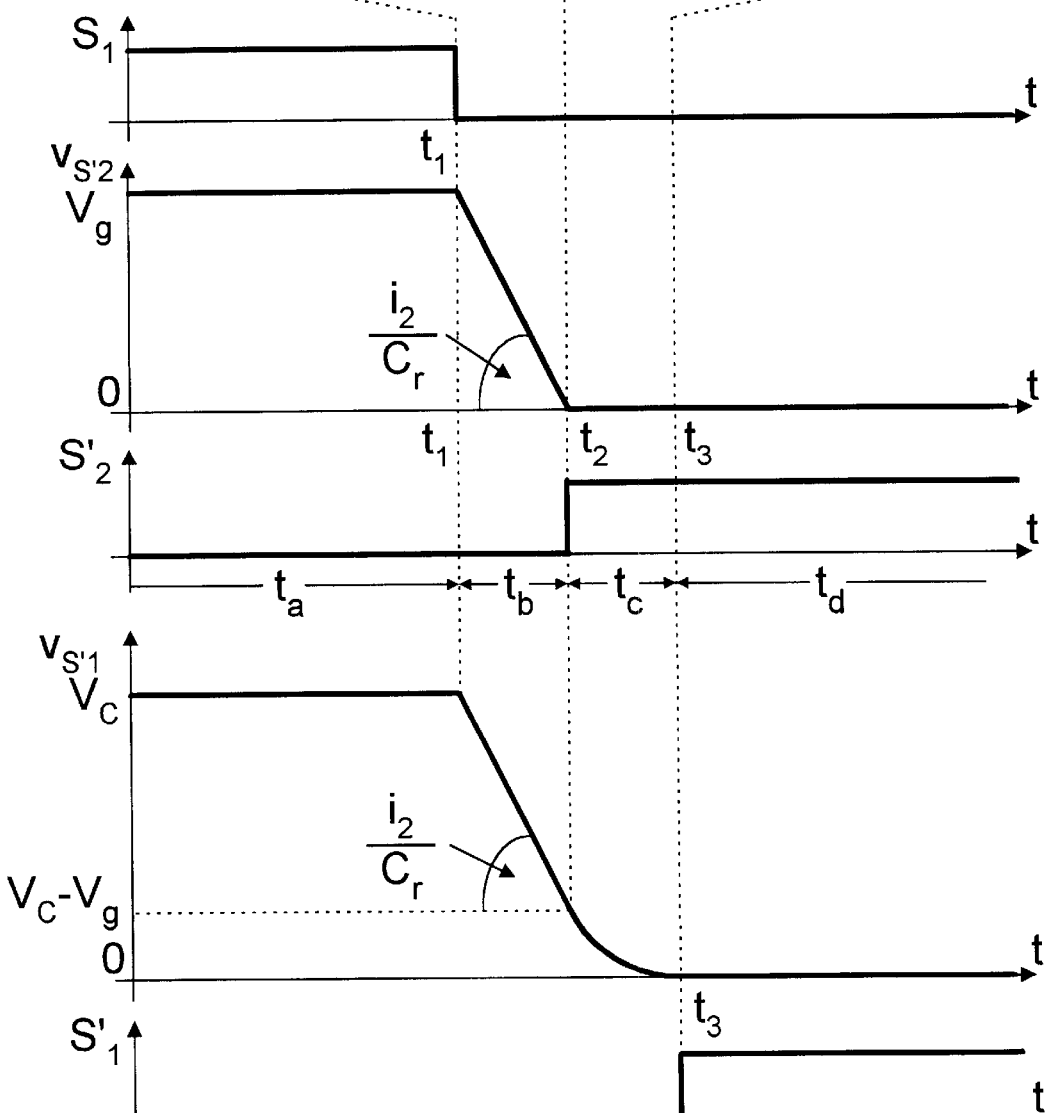
FIG. 67c illustrates the characteristic waveforms during the above two subintervals.
Figure 90:
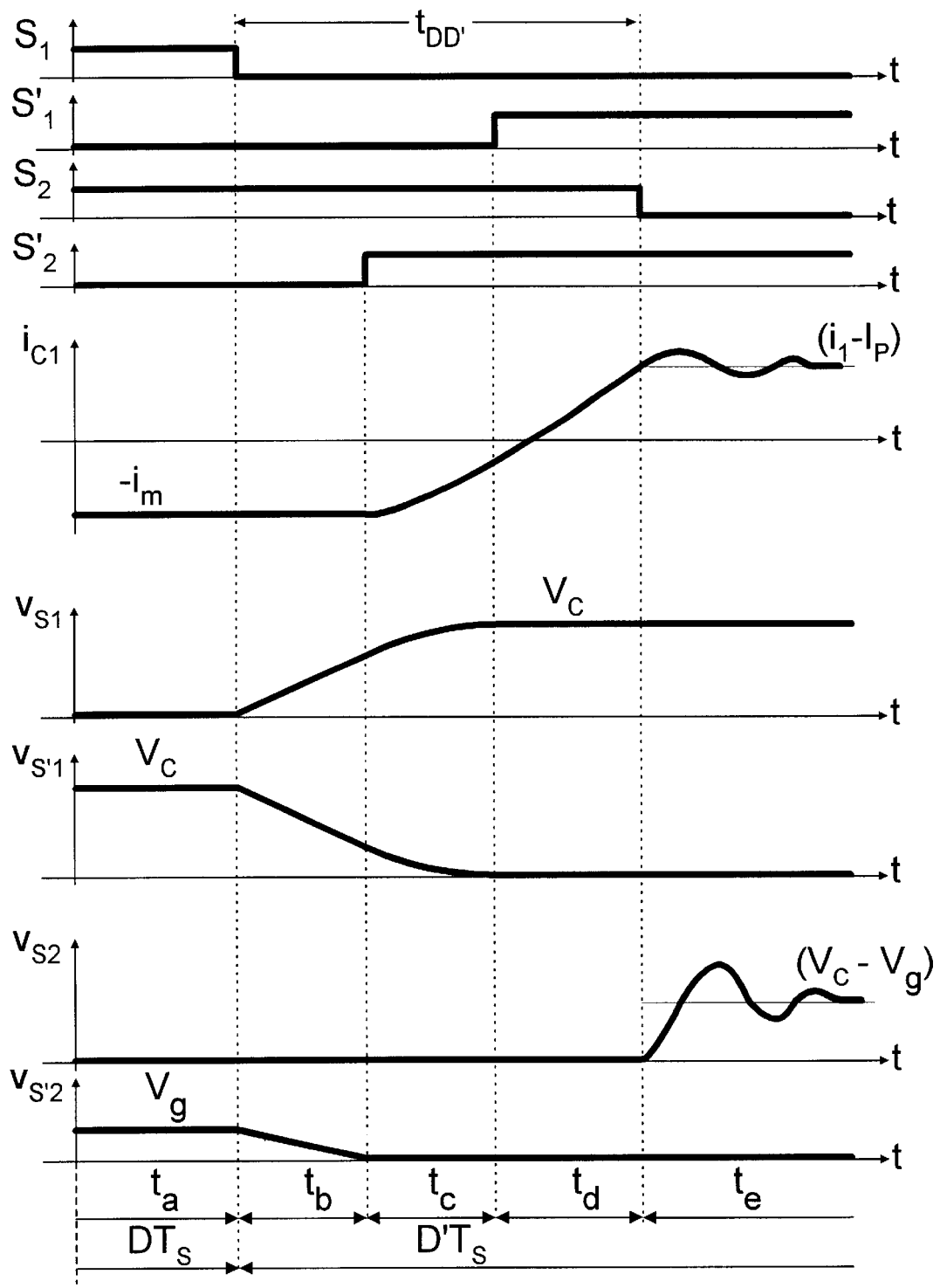

The two subintervals t$_b$ and t$_c$ in FIG. 67c are, as before, followed by a current-reversal subinterval t$_d$ as seen in input capacitor current waveform shown in detailed description with reference to FIG. 90. However, unlike in previous cases, the current-reversal is taking place throughout both subintervals t$_c$ and t$_d$ as seen in FIG. 90. Finally, same oscillations as before in the steady-state interval t$_e$ of FIG. 90 are observed.

Switching Time vs. Transition Interval

Figure 68A:
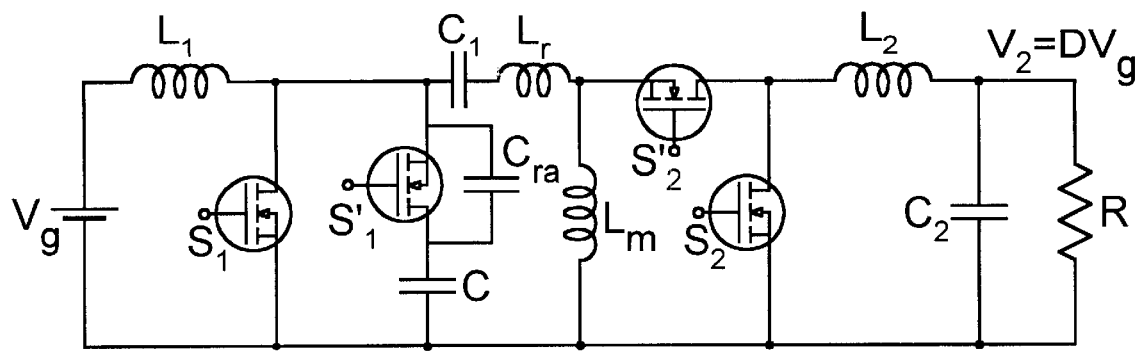
FIG. 68a illustrates how the additional resonant capacitor $C_{ra}$ increases transition interval as shown by waveforms of FIG. 68b in thick lines and eliminates the losses caused by short transition interval (dotted lines on FIG. 68b) and fast switching times of semiconductor switches.
Figure 68B:
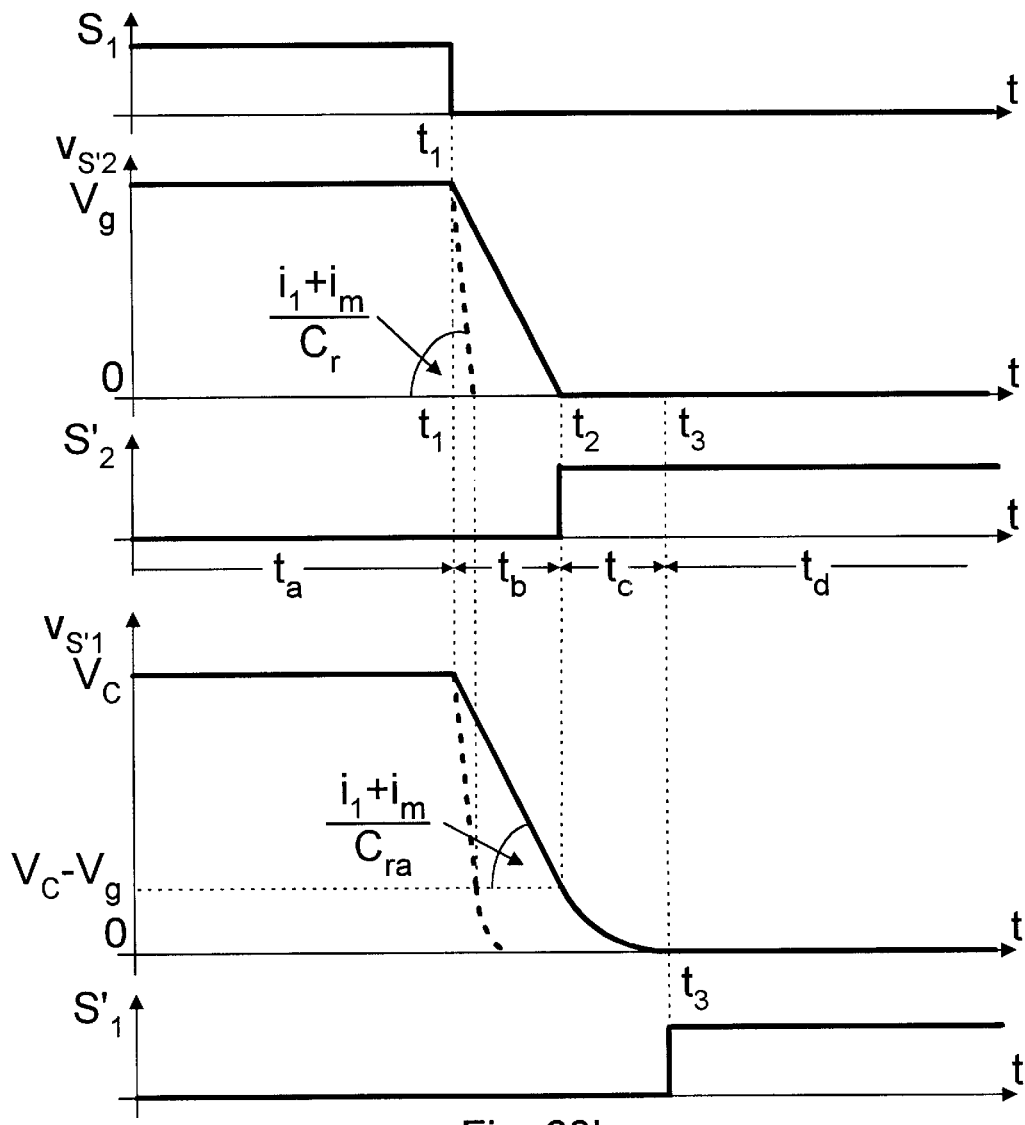

In all cases considered so far, all switches were used with their natural, built-in small parasitic capacitance and no external additional capacitors were placed in parallel with the switches. In some applications, it is actually desirable to put an additional resonant capacitor C$_{ra}$ in parallel with either the input switch or complementary input switch as shown in FIG. 68a. Without such added external capacitor, the transition interval D to D' may be very short as shown by the waveforms of FIG. 68b in dotted lines due to the large slope (i$_1$+im)/C$_r$ created by either a large output DC load current or a very small inherent parasitic capacitance of the switch or both. This is the direct consequence of the fact that the D to D' transition is dependent on the DC load current. In that case, the transition interval becomes comparable to the native turn-OFF speed capability of the input switch S$_1$. This, in turn, will cause the partially turned OFF input switch to generate some switching losses during the D to D' transition. The added resonant capacitor C$_{ra}$ eliminates these losses by slowing down the D to D' transition as seen by the waveforms in thick lines in FIG. 68b while the decay slope is substantially decreased to (i$_1$+i$_m$)/C$_{ra}$, where C$_{ra}$ is typically several times larger than C$_r$. The slowing down of the rate of voltage decay has the additional positive effect of reducing the conducted and radiated EMI noise.

Isolated DC-to-DC Converter—Case I

In the isolated DC-to-DC converter the role of the resonant inductor is played by the leakage inductance L$_r$ of the isolation transformer as shown in FIG. 59a and FIG. 60a. Except for scaling the voltages as before in Cases I and II of the D' to D transition, the D to D' transition follows the same behavior as in the above Case I for non-isolated converters with resonant inductor. Furthermore, it applies equally to all three realizations for output switch: CBS/diode/VBS switch.

DETAILED LOSSLESS SWITCHING OPERATION

The above analysis provided an overview of the variety of novel lossless switching possibilities and gave both qualitative as well as quantitative assessment of their relative merits by analyzing separately first difficult to achieve D' to D transition, followed by the analysis of D to D' transition. This also clearly exposed three distinct novel lossless switching converter groups based on output switch implementation: CBS switch, diode, or VBS switch. Since the diode represents a very special case of a CBS switch, it will be combined here with those CBS cases into one group. Thus, the detailed description of the circuit operation and of the salient waveforms of both D to D' and D' to D transitions are carried below separately following two major lossless switching categories:

1. Lossless switching with CBS/Diode output switch;
2. Lossless switching with VBS output switch.

For each lossless switching case, the circuit state of the converter at particular interval is presented and the converter circuit models correlated to respective intervals and characteristic waveforms during those intervals. Thus, very first converter circuit model will show the converter at the beginning of the transition, while last converter circuit model always shows the circuit after the transition has been completed. For these circuits only (since they are steady-state circuit models), to distinguish them easier from converter models during transition intervals, only those switches which are ON are displayed and then drawn with thick lines, while OFF switches are omitted entirely. On the other hand, for the converter circuit models during the transition intervals, which could have several subintervals characterized by a distinct converter circuit for each subinterval, the following convention is adopted: the switches which are ON during particular subinterval are drawn in thick lines, while the switches which are OFF are drawn in thin lines. Furthermore, the symbol for MOSFET switch is retained in those models to signify the control action on particular switch (thick lines for turned ON, thin lines for turned OFF switch). In addition, in some cases, the body-diode of the CBS switch for example, can be turned ON by the circuit operation even if the respective active switch is NOT given signal by switching time control to turn ON. Thus, in those cases, as well as when the turn-ON of the body-diode is important for better understanding of the converter operation, the body-diode is also shown explicitly in thick lines.

LOSSLESS SWITCHING USING CBS OUTPUT SWITCH

The detailed description of lossless switching is further broken down into three sub-categories:

1. Non-isolated converter without resonant inductor;
2. Non-isolated converter with resonant inductor;
3. Isolated DC-to-DC converter.

Non-isolated Converter without Resonant Inductor

The auxiliary capacitor negative current $I_N$ at the end of the $D'T_S$ time interval already exists as proved earlier in FIG. 39e. Thus neither the large output inductor ripple current is needed, nor even the addition of any resonant element, such as resonant inductor as in many prior-art soft-switching schemes. In fact, as shown below, the unique switching configuration of the present invention, along with the recognition of the key relationship (4) and its consequence in the time domain waveforms of FIG. 39e, makes for a unique possibility of practical lossless switching with much reduced switching losses just by use of the proper drive timing of the four switches in FIG. 45a. This method of switching loss reduction is termed here conditionally reduced switching loss, although in many practical cases it is almost as good as lossless switching method discussed below as well. Due to the lack of a proper or established designation for this type of novel switching without resonant inductance, the name reduced switching loss is adopted.

Figure 69A:
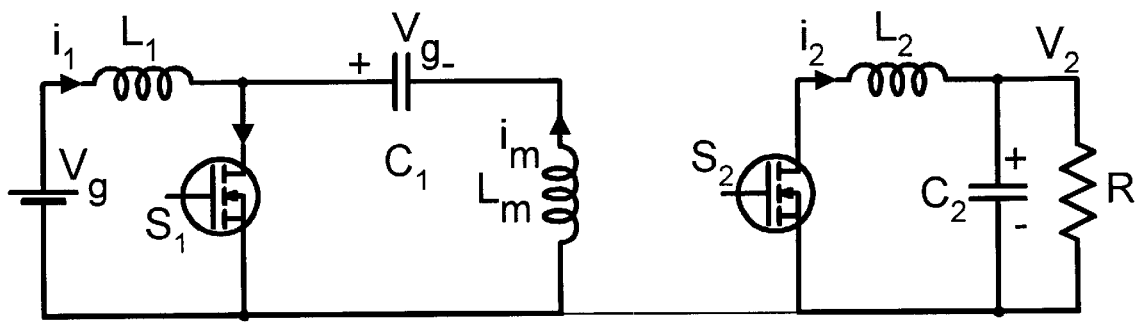
FIGS. 69(a–d) illustrate four converter circuits states of the converter in FIG. 45a relevant to the D to D' transition.

First we will look at the D to D' transition of the circuit in FIG. 69a.

The D to D' transition

Figure 70A:
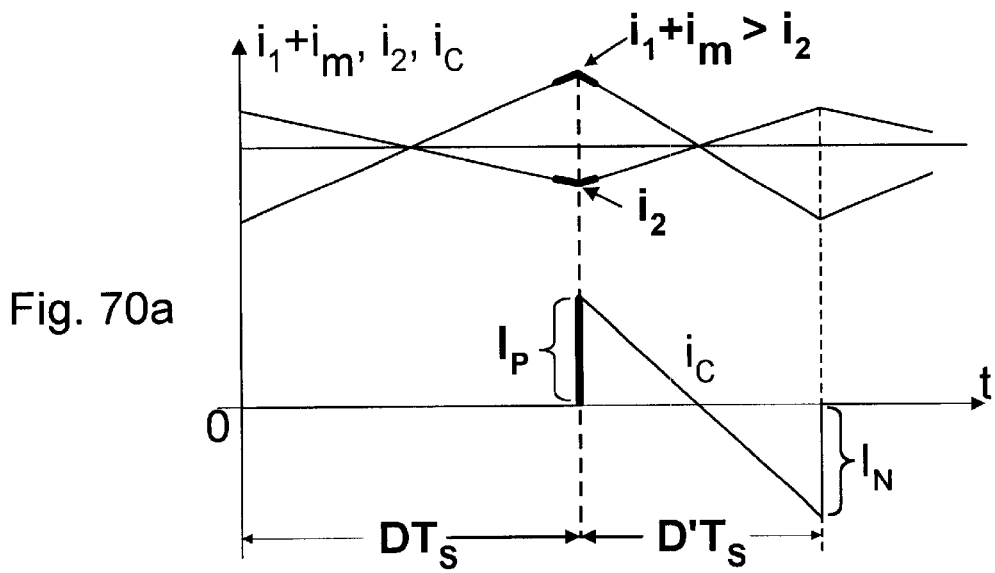
FIG. 70a shows the graph of the inductors' currents relation relevant to the D to D' transition and FIG. 70b shows the graph of characteristic switching time control waveforms and respective switch voltages relevant to the D to D' transition modeled by four converter circuits states of FIGS. 69(a–d).

From the steady-state analysis and the waveforms in FIG. 70a it follows that at the end of the time interval $DT_S$, the instantaneous current $i_1+i_m$ is larger than $i_2$ (effectively their difference is equal to $I_P$ as in FIG. 70a). The transition from D to D' interval can be represented by the four equivalent circuits shown in FIGS. 69a, b, c, and d, and their corresponding time intervals $t_a$, $t_b$, $t_c$, $t_d$ shown in FIG. 70b.

Interval $t_a$

Figure 69B:
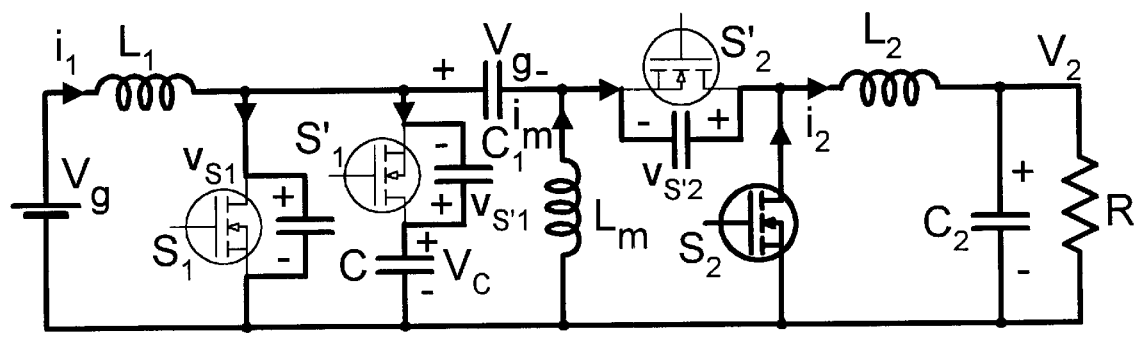
Figure 70B:
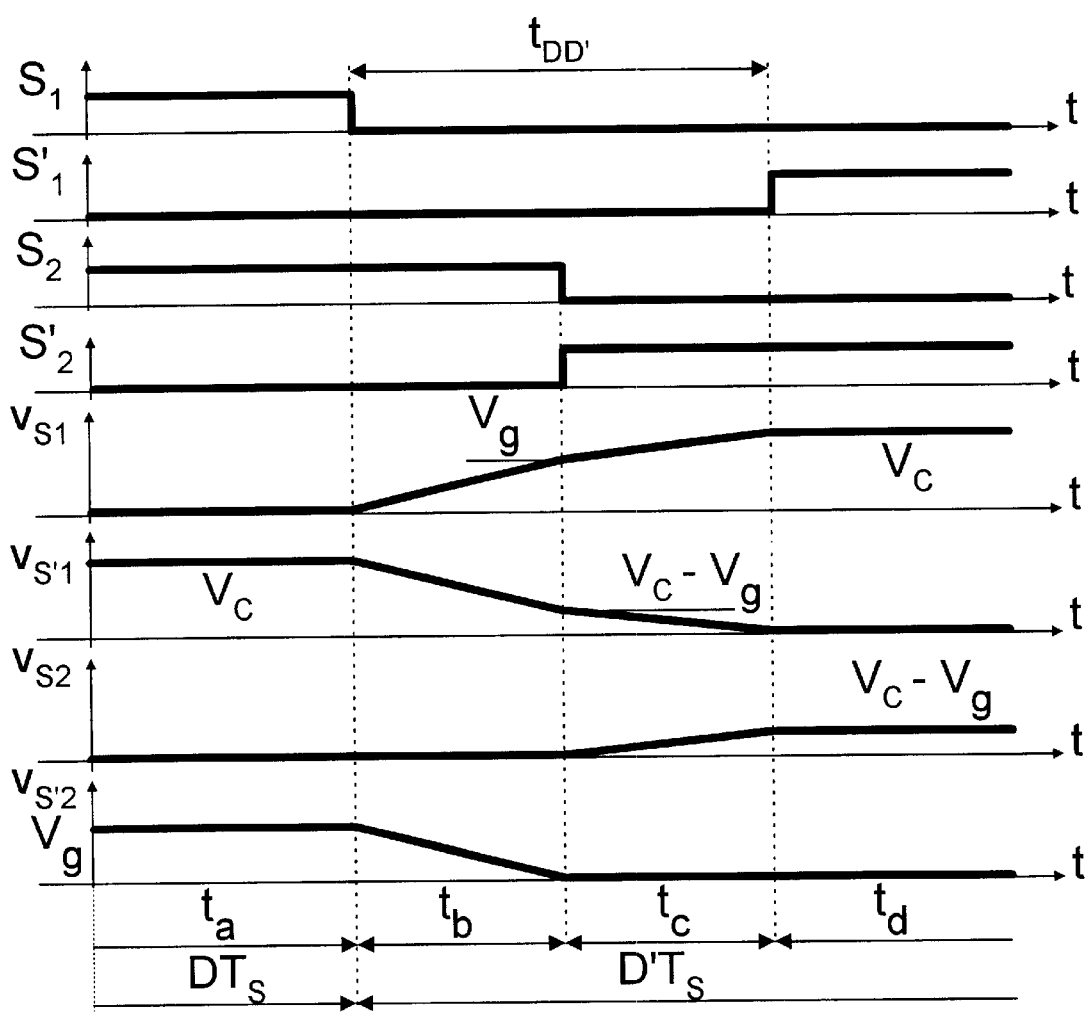

FIG. 69a and $t_a$ interval in FIG. 70b corresponds to the $DT_S$ time interval before the first transition starts. $S_1$ and $S_2$ switches are both ON and $S'_1$ and $S'_2$ are OFF. This interval ends and the first, so-called "natural" transition is initiated when $S_1$ is turned OFF, which results in the circuit of FIG. 69b.

Interval $t_b$

During the interval $t_b$ (first part of total transition interval $t_b+t_c$ as represented by FIG. 70b), the current $i_1+i_m$ is charging the parasitic capacitor of $S_1$ (which initially was fully discharged as switch $S_1$ was ON moments before) and discharging parasitic capacitor across $S'_1$ and $S'_2$ switches. Since this current contains DC component $I_1+I_m$, this results in relatively fast charge and discharge of these parasitic capacitors, hence in fast voltage rise on parasitic capacitor of input switch $S_1$. Given the above, these three capacitors are AC-wise connected in parallel. This interval is concluded when the voltage across switch $S'_2$, $V_{S'2}$ drops down to zero and the body-diode of $S'_2$ starts to conduct. Hence, switch $S'_2$ is naturally turned ON at zero voltage by its own parasitic diode. Since the diode conduction at low voltage is rather inefficient due to high voltage drop across the diode, this is also the ideal time to turn ON switch $S'_2$ (or equivalently to turn ON the original $S'_2$ MOSFET). Due to low ON resistance of the MOSFET and corresponding low voltage drop across it, the current through the diode is by-passed through the MOSFET device thus minimizing the conduction losses of the output rectification. As $S'_2$ is turned ON, switch $S_2$ is simultaneously turned OFF, which results in the circuit model of FIG. 69c valid for interval $t_c$ in FIG. 70b. Note that if the turning OFF of switch $S_2$ was delayed, an intermediate level would follow with all the voltages clamped at the present value, $V_g$ and $V_C-V_g$ for switches $S_1$ and $S'_1$ respectively. Clearly this interval is unproductive and unnecessary since it only delays the completion of the first transition interval and should therefore be avoided by proper drive timing as in FIG. 70b.

Interval $t_c$

Figure 69C:
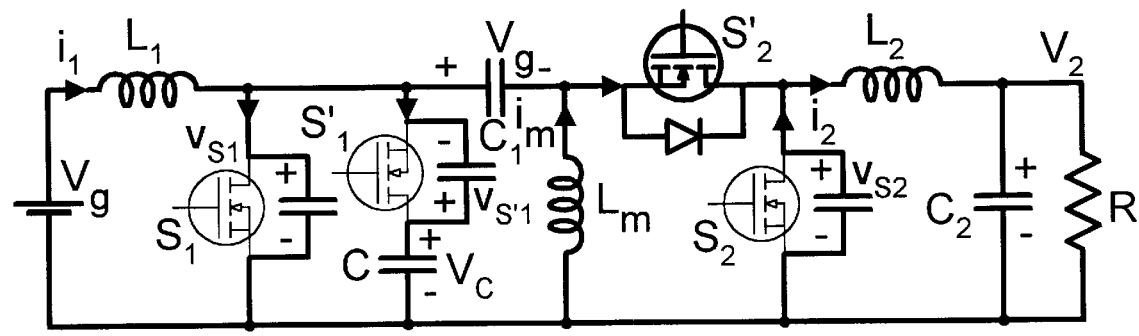
Figure 69D:
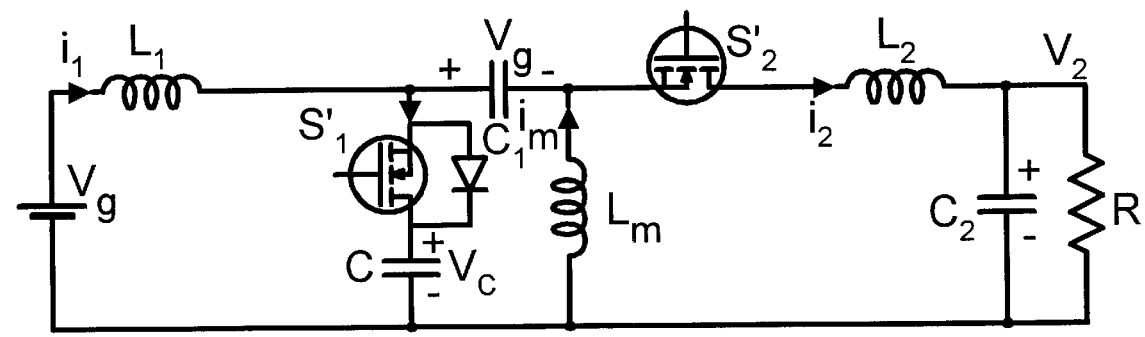

The interval $t_c$ in FIG. 70b (second part of the D' to D transition interval) is then characterized by the equivalent circuit of FIG. 69c during which three switches $S_1$, $S'_1$ and $S_2$ are OFF and only switch $S'_2$ is ON, by-passing its own body-diode (body-diode also shown in FIG. 69c in bold to signify the fact that this diode started conduction first and triggered the turn-ON of $S'_2$). Note that due to the fundamental relation (4), where $I_1+I_m=I_2$, the current $i_1+i_m-i_2$ now consists only of respective AC ripple components $I_P=\Delta i_1+\Delta i_m-\Delta i_2$ resulting in reduced slopes of voltage rise on switch $S_1$ compared to previous interval $t_b$. This total AC ripple current starts to charge the capacitance across $S_2$ while at the same time it continues to charge the capacitance across $S_1$ and discharge the capacitance across $S'_1$, albeit at a much slower rate than in the previous $t_b$ interval. The end of this interval has arrived when voltage on switch $S'_1$ reaches zero and the body-diode of that switch starts to conduct as shown in FIG. 69d, which shows the converter circuit at the beginning of interval $t_d$. This has the effect of clamping the voltage on switch $S_1$ at the $V_C$ level. At this point switch $S'_1$ can be turned ON at zero voltage hence with zero switching loss and also bypass the internal body-diode to reduce the conduction losses.

Interval $t_d$

The circuit in FIG. 69d signifies that the D to D' transition has been completed and that now the switches S'$_1$ and S'$_2$ are simultaneously ON, as compared to the beginning state in FIG. 69a during which the switches S$_1$ and S$_2$ were simultaneously ON. In summary, during this first transition, all switches are turned ON at zero voltage and lossless switching of the D to D' transition is achieved, hence without switching losses.

The D' to D Transition

Figure 71A:
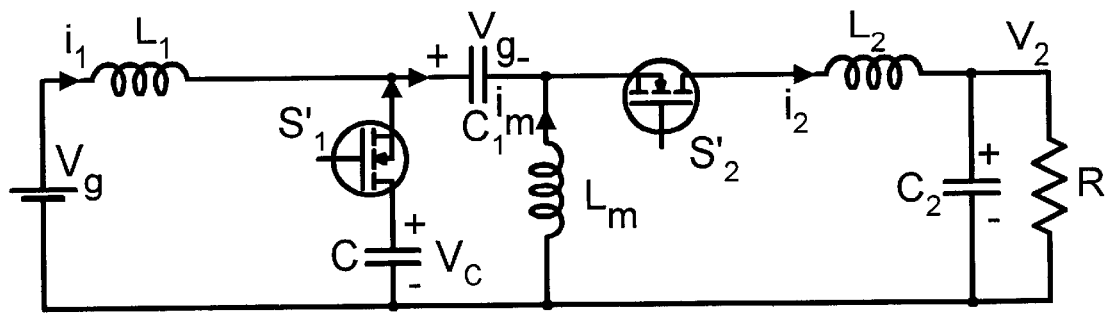
FIGS. 71(a–d) illustrate four converter circuits states of the converter in FIG. 45a relevant to the D' to D transition.
Figure 72A:
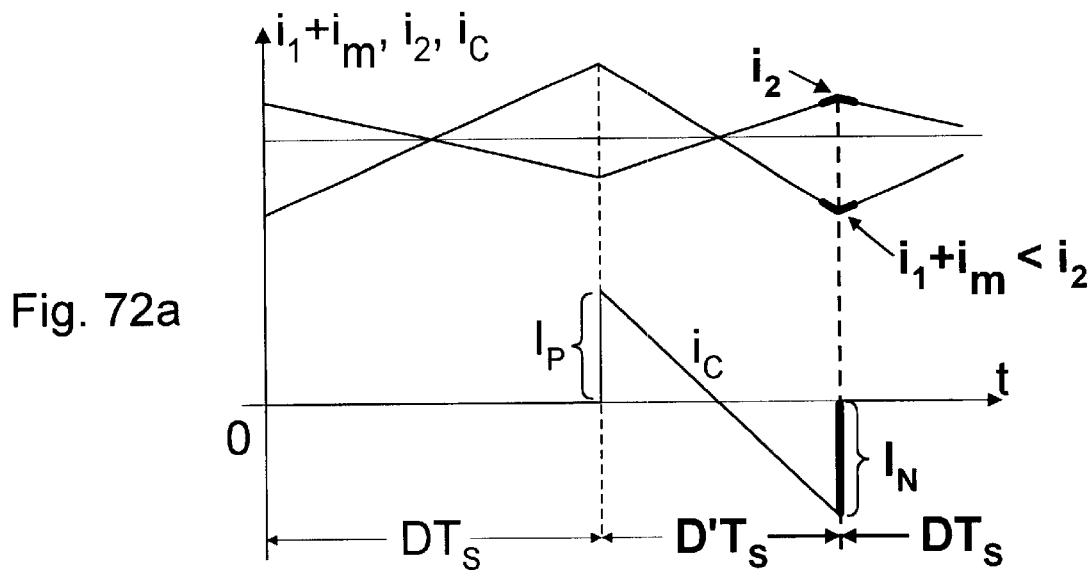
FIG. 72a illustrates a graph of the inductors' currents relation relevant to the D' to D transition and FIG. 72b illustrates a graph of characteristic switching time control waveforms and respective switch voltages relevant to the D' to D transition modeled by four converter circuits states of FIGS. 71(a–d).

For this transition at the end of D'T$_S$ interval current $i_1+i_m$ is less than current $i_2$, as seen from the waveforms in FIG. 72a. The D' to D transition is thus represented by circuits in FIGS. 71a, b, c, d, and their respective intervals $t_a$, $t_b$, $t_c$, $t_d$ shown in FIG. 72b.

Interval $t_a$

Figure 71B:
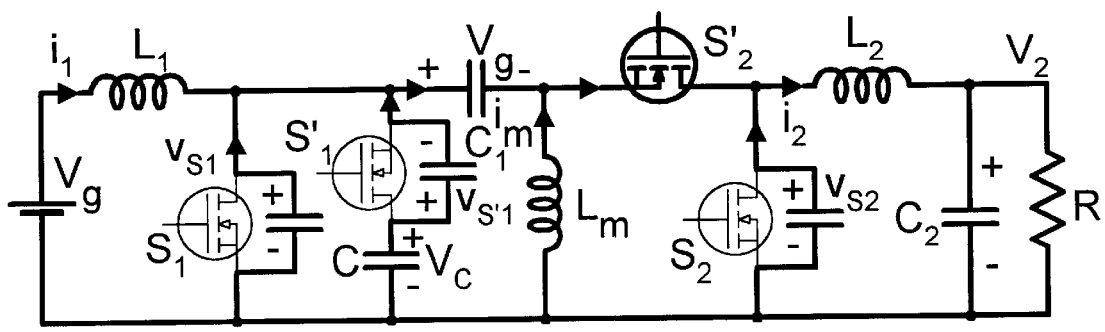
Figure 72B:
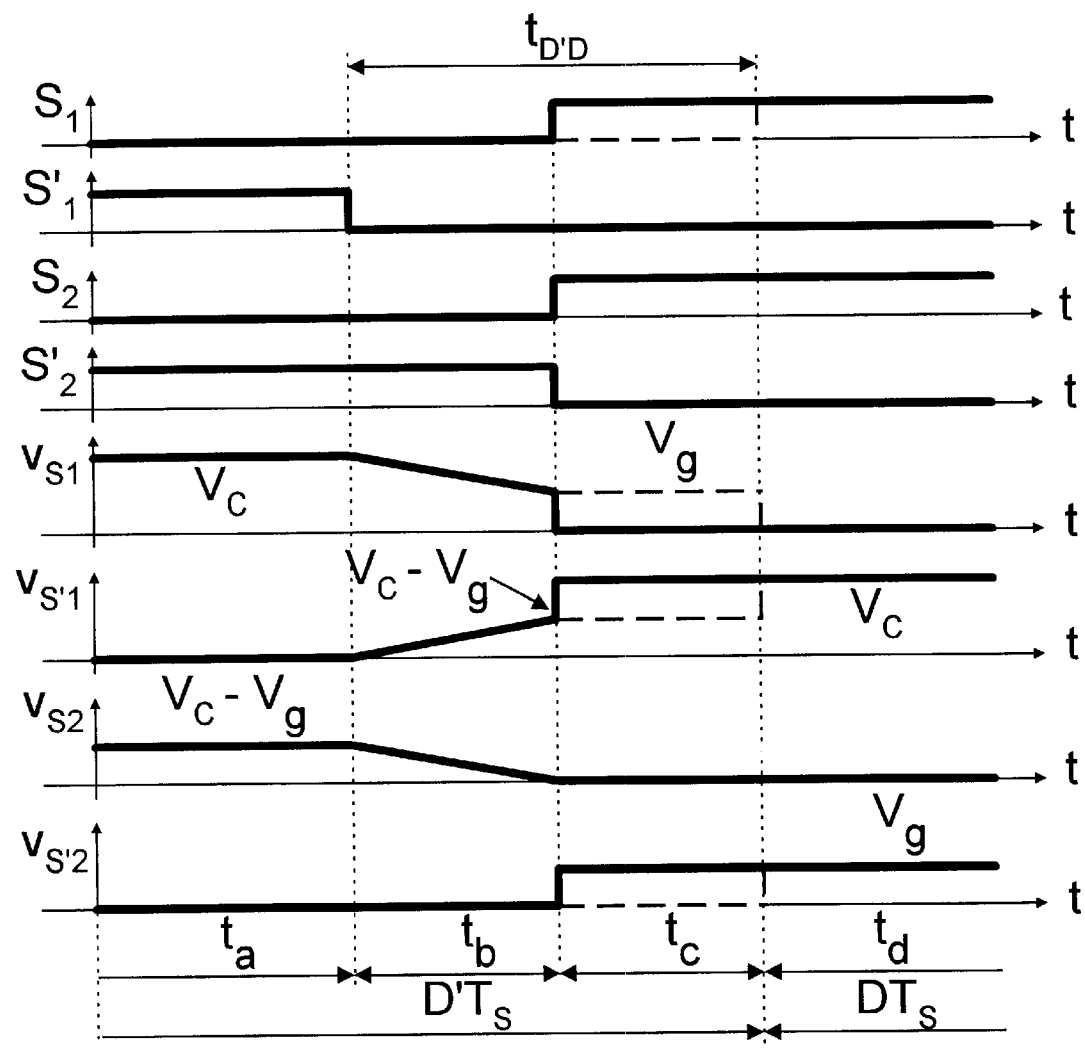

FIG. 72a and $t_a$ interval in FIG. 72b corresponds to the D'T$_S$ time interval just before the D' to D transition starts. The switches S'$_1$ and S'$_2$ are both ON and S$_1$ and S$_2$ are OFF. This interval ends and the second transition, usually called "forced" transition is initiated when switch S'$_1$ is turned OFF, which results in the circuit of FIG. 71b representing the first subinterval $t_b$ of the forced transition.

Interval $t_b$

During this interval $t_b$ (the first subinterval of the total transition interval $t_b+t_c$) as represented by the circuit in FIG. 71b, the current $i_2-i_1-i_m$ is charging the parasitic capacitor across S'$_1$ and is discharging the parasitic capacitors across S$_1$ and S$_2$. Since the total DC component of this current is zero, only the total AC ripple component is left. Thus, this results in a relatively slow charge and discharge of these parasitic capacitors, hence in a slow voltage rise on parasitic capacitor of complementary input switch S'$_1$. Given the above assumptions, these three capacitors are AC-wise connected in parallel. This interval is concluded when the voltage across switch S$_2$, $v_{S2}$ drops down to zero and the body-diode of S$_2$ starts to conduct. Hence, switch S$_2$ is naturally turned ON at zero voltage (soft-switched) by its own parasitic body-diode. Since the diode conduction at low voltage is rather inefficient due to the high voltage drop across the diode, this is also the ideal time to turn ON switch S$_2$ (or equivalently to turn ON the original S$_2$ MOSFET). Due to the low ON-resistance of the MOSFET and the corresponding low voltage drop across it, the current through the diode is by-passed through the MOSFET device thus minimizing the conduction losses of the output rectification.

Interval $t_c$

Figure 71C:
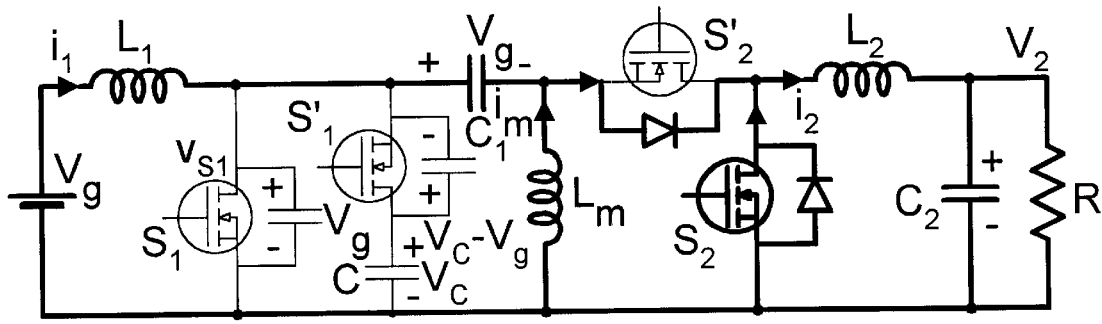

As switch S$_2$ is turned ON, switch S'$_2$ is simultaneously turned OFF, which results in the circuit model of FIG. 71c valid for interval $t_1$ in FIG. 72b. Note that now if the turning ON of S$_1$ switch was delayed as shown by dotted lines in FIG. 72b, all voltages would be clamped at the present value, that is V$_g$ across switch S$_1$ and V$_C$-V$_g$ across switch S'$_1$, while switch S'$_2$ will stay at zero voltage level. The remaining part of the transition interval cannot be completed in a lossless switching manner. Thus, switch S$_1$ must be turned ON "hard" at reduced voltage and its parasitic capacitor discharged abruptly. This third interval $t_c$ should ideally be eliminated, since it only delays the completion of the transition interval without having any useful function. The thick lines in FIG. 72b illustrate the case when the switch S$_1$ is turned ON exactly at the end of $t_b$ interval and thus interval $t_c$ is completely eliminated.

Interval $t_d$

Figure 71D:
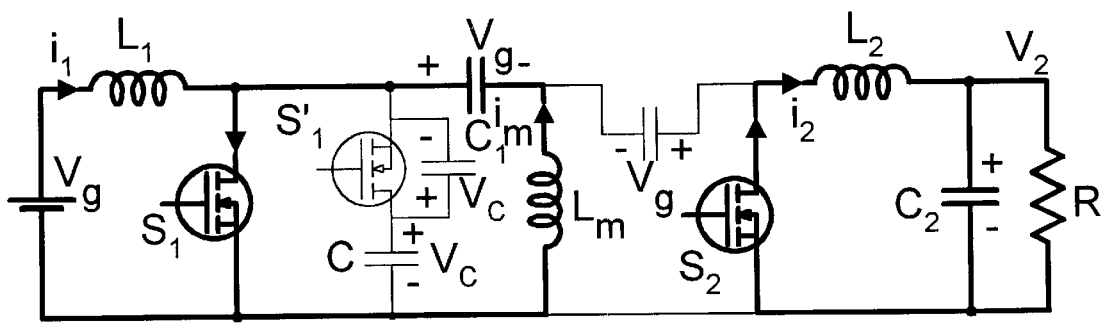

The losses associated with the hard turn-ON of switch S$_1$ are mainly composed of the reverse recovery losses in the parasitic body-diode of switch S'$_2$ and the $(CV^2)/2$ losses in the parasitic capacitors across switches S$_1$, S'$_1$ and S'$_2$ whose effective voltage is V$_g$. FIG. 71d hence shows the final stage after completion of D' to D transition in which switches S$_1$ and S$_2$ are turned ON. FIG. 71d also shows the final voltage of the parasitic capacitor of switch S'$_1$ to be V$_C$ and the final voltage of parasitic capacitor of switch S'$_2$ to be V$_g$, which are their starting values for the next D to D' transition.

It is now interesting to see how effective this type of lossless switching is. It is clear that the D to D' transition results in lossless switching, while the D' to D transition results in reduced switching losses since the parasitic capacitor of switch S$_1$ cannot discharge below the input voltage V$_g$. A very simple analysis reveals that this switching loss reduction, although relatively simple to implement, is also very effective, especially for operation at higher duty ratios such as for example for D=0.8 when $V_C=V_g/(1-D)=5V_g$. Hence the parasitic capacitor across switch S$_1$ is discharged from a high voltage $V_C=5V_g$ down to the V$_g$ level. Hence, only the fraction of the energy stored on the switches S$_1$, S'$_1$, and S'$_2$ is lost as given by the voltage ratio squared. In this case this translates into a 25 times energy loss reduction or 96% saving of the energy which would have been lost if the D' to D transition was hard-switched, that is switch S$_1$ turned ON with full voltage of $V_C=5V_g$ on it. Clearly for many practical applications such a result is more than adequate. Note that at lower duty ratios, such as D=0.6, still a 6.25 times reduction of losses is achieved or 84% of the hard-switching losses were recovered.

As the operating point is moved to lower duty ratios, such as D=0.25 for example, the hard-switching interval $t_c$ starts even at a higher percentage, that is at 75% of the total blocking voltage $V_C=V_g/(1-D)=1.33V_g$ hence 44% of the total hard-switching losses of that transition are recovered. Thus, the resonant inductor is included in order to further reduce switching losses.

Non-isolated Converter with Resonant Inductor

Here we can combine one case of the D to D' transition discussed earlier in FIGS. 67a, b, c with each of the four different cases of the resonant discharge for the D' to D transition (Cases 1, 2, 3, 4) as reference with waveforms 1, 2, 3, 4 in FIG. 47b to obtain a four distinct lossless switching cases.

The D to D' Transition (Cases 1, 2, 3, 4)

Figure 73A:
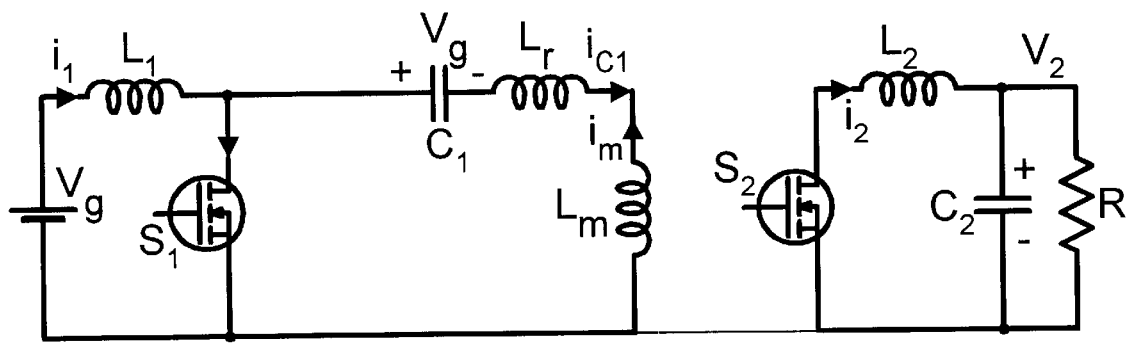
FIGS. 73(a–e) illustrate the five converter circuits states of the converter in FIG. 49a with resonant inductor relevant to the D to D' transition.
Figure 74:
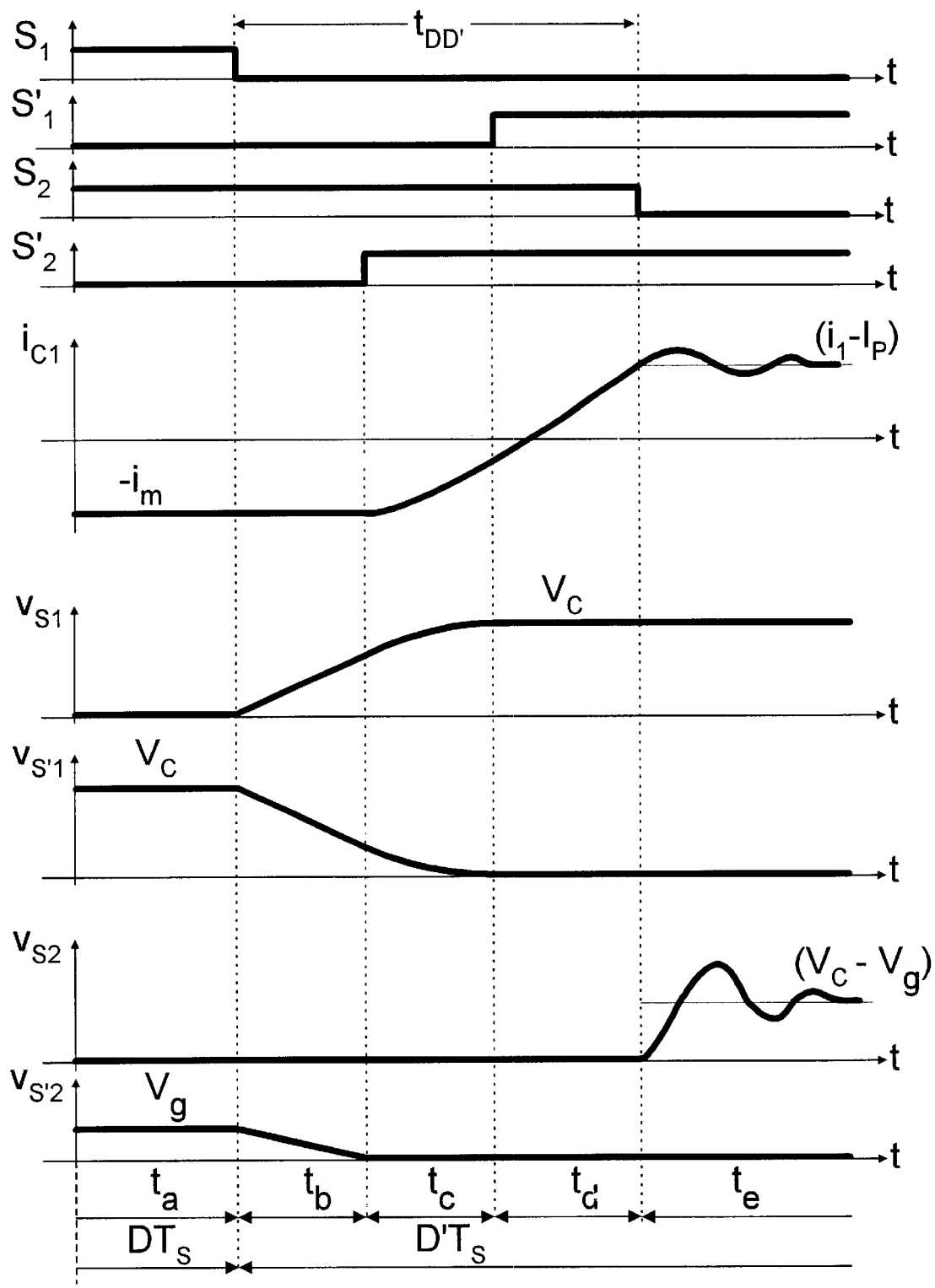
FIG. 74 shows the graph of the characteristic switching time control waveforms, respective switch voltages, and the input capacitor current during the D to D' transition described by five converter circuits states of FIGS. 73(a–e).
Figure 75A:
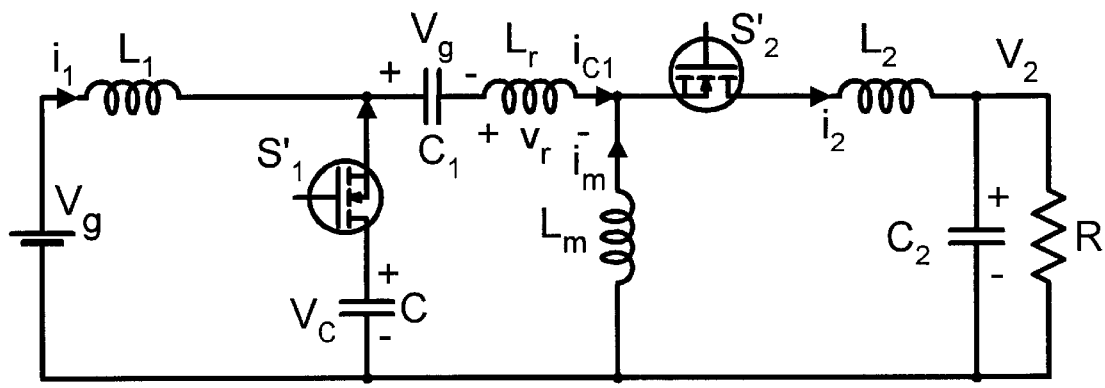
FIGS. 75(a–e) illustrate the five converter circuits states of the converter in FIG. 49a with resonant inductor relevant to the D' to D transition of Case 1 in FIG. 49b.
Figure 75B:
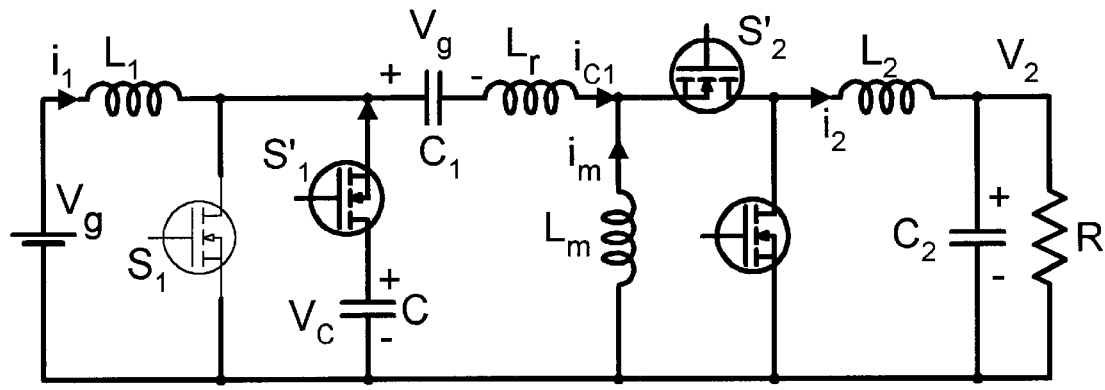
Figure 75C:
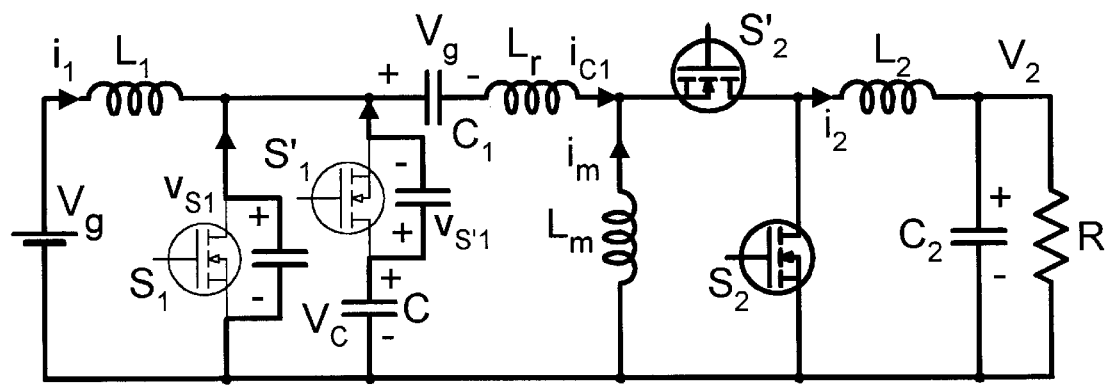
Figure 75D:
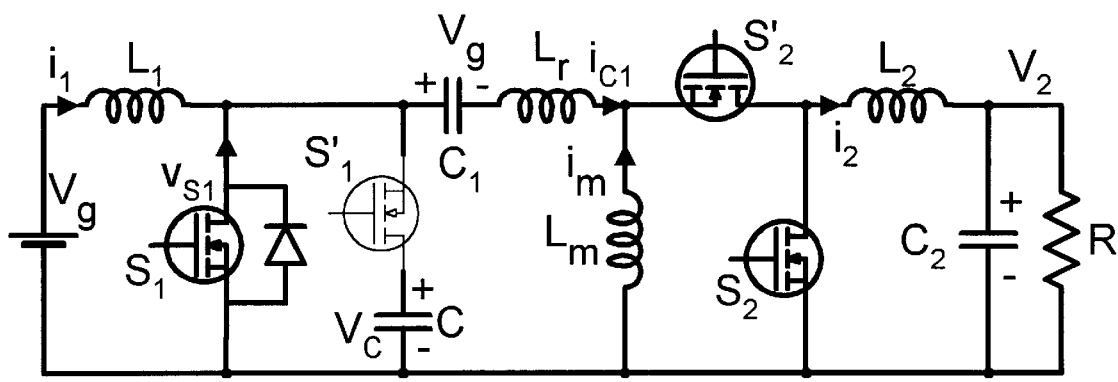
Figure 75E:
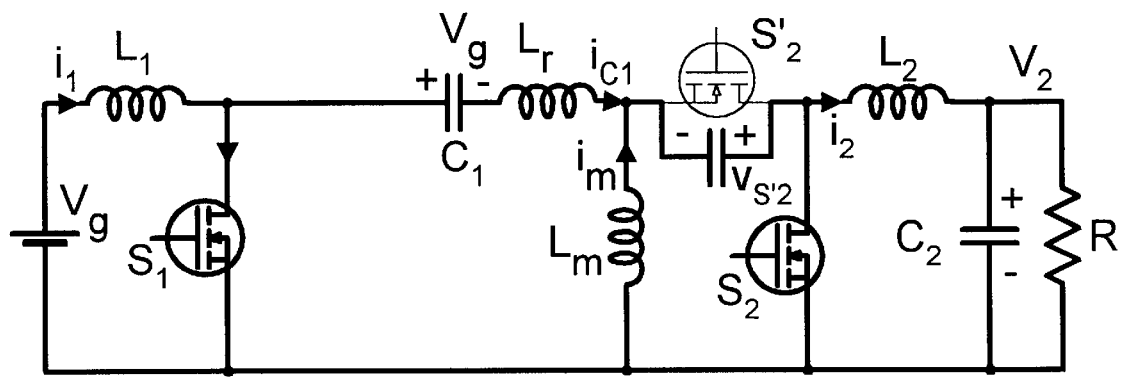

The transition from the D to D' interval is represented by 5 characteristic circuits of FIGS. 73a, b, c, d, e, and corresponding waveforms of FIG. 74. The description of the circuit operation in each interval follows:

Interval $t_a$

This corresponds to end of DT$_S$ interval before the transition starts. S$_1$ and S$_2$ are ON and S'$_1$ and S'$_2$ are OFF as in FIG. 73a. This interval ends and the transition is initiated when S$_1$ is turned OFF.

Interval $t_b$

Figure 73B:
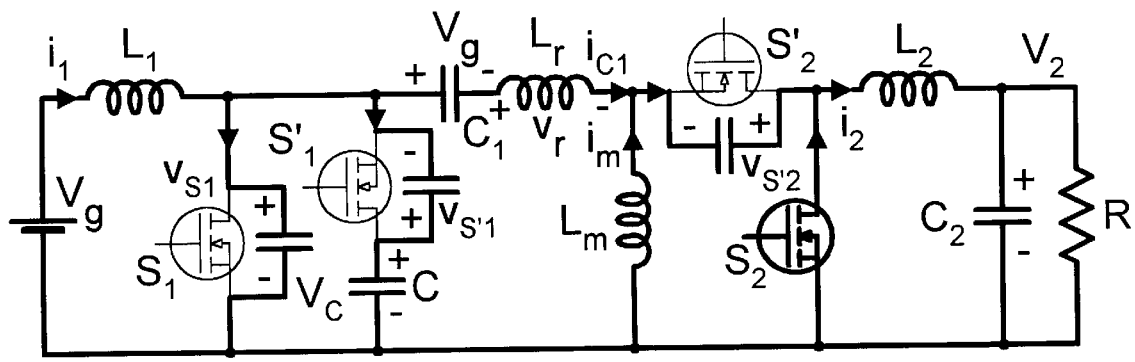

The sum of currents $i_1$ and $-i_{C1}$ ($i_{C1}$ is the input capacitor current with positive direction as in FIG. 73b) is charging the capacitor across S$_1$ and discharging capacitor across S'$_1$. The initial value of the current $i_{C1}$ is $-i_m$, thus initially no current is flowing toward S'$_2$ as shown in $i_{C1}$ waveform of FIG. 74. As the voltage $v_{S1}$ increases, the voltage $v_r$ on resonant inductor starts to increase, which causes $i_{C1}$ to decrease in magnitude. As a result the current in switch S'$_2$ can no longer be zero and the capacitance of that switch is also being discharged from its initial value V$_g$. This interval ends when this capacitance is completely discharged and the body-diode of S'$_2$ starts to conduct. At this time switch S'$_2$ is turned ON at zero voltage (hence without switching losses).

Interval $t_c$

Figure 73C:
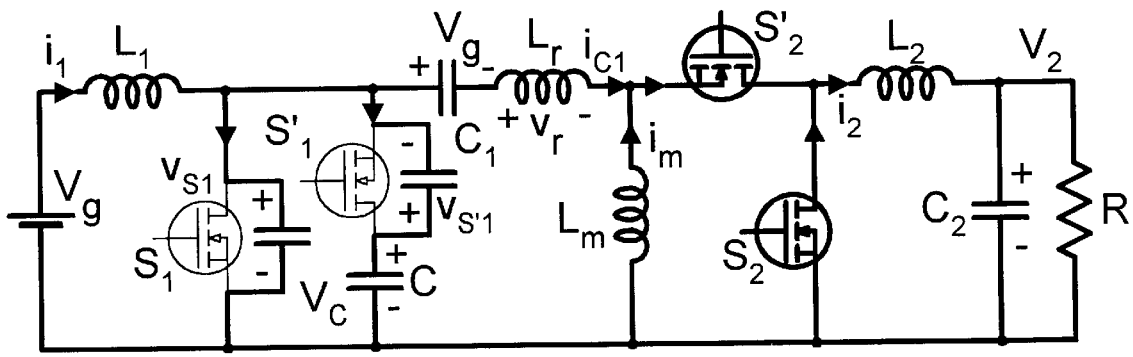

The currents $i_1$ and $-i_r$ continue to charge the capacitance of $S_1$ and discharge the capacitance of $S'_1$ as in FIG. 73c. The voltage $v_r$ builds up further, which further decreases the magnitude of $i_r$. This interval is concluded when voltage on switch $S'_1$ reaches zero and the body-diode of $S'_1$ starts to conduct. Now $S'_1$ can be also turned ON without switching loss.

Interval $t_d$

Figure 73D:
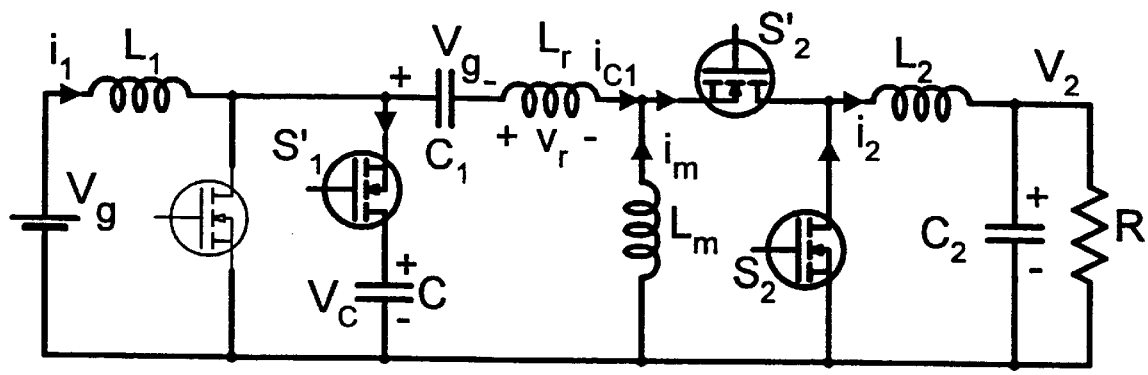

The voltage $v_r$ is now given by $V_C-V_g$ and thus the magnitude of $i_r$ continues to decrease linearly as in FIG. 73d. At some point during this or the last two subintervals it has become negative (initially it was $i_m$). When $i_{C1}$ reaches the value of $i_1-I_P$ the current of output switch $S_2$ becomes zero. The switch $S_2$ has to be turned OFF at this point.

Interval $t_e$

Figure 73E:
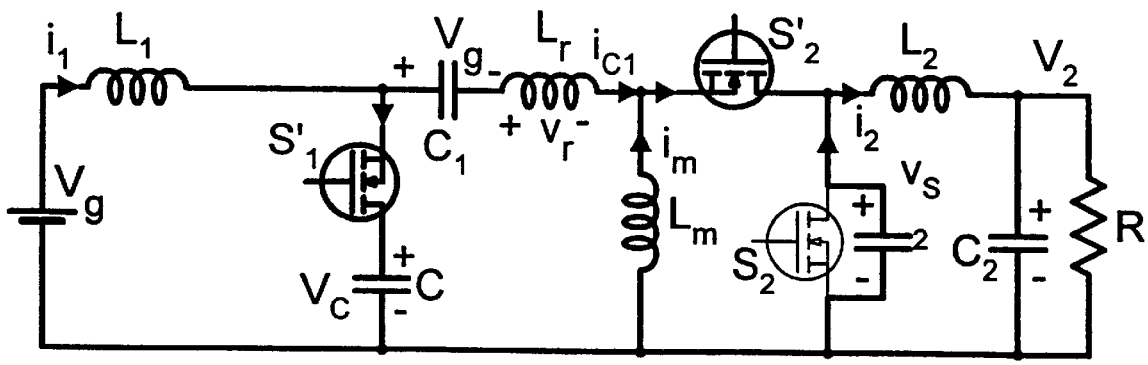

The current of switch $S_2$ which now becomes negative charges capacitance of switch $S_2$ as per FIG. 73e. The initial value of $i_{C1}$ in this interval is also the final value after the D to D' transition has been completed. Thus, in order to charge the capacitance of $S_2$ to its final value ($V_C-V_g$) the current $i_{C1}$ has to undershoot somewhat. This in turn causes the voltage on $S_2$ to overshoot. The result is an oscillation between $L_r$ and $C_{S2}$ which if not damped would continue. If the inherent parasitic resistance associated with the oscillating elements does not sufficiently damp the oscillation, an additional R-C damping network is needed, which also damps a similar oscillations after completion of D' to D transition. The oscillation dies out at the end of $t_e$ interval.

The D' to D Transition (Case 1)

This corresponds to Case 1 illustrated earlier in waveforms of FIG. 49b. This case is represented by the five equivalent circuits of FIGS. 75(a–e) and the corresponding waveforms in the five subintervals shown in FIG. 76.

Interval $t_a$

This represents the state of the converter before the transition starts. $S_1$ and $S_2$ are OFF and $S'_1$ and $S'_2$ are ON. This interval ends and the transition is initiated when $S_2$ is turned ON.

Interval $t_b$

This immediately applies the voltage ($V_C-V_g$) across the resonant inductor $L_r$, which rapidly increases the current $i_r$ and stores extra energy in $L_r$. The length of this interval controls the amount of this stored energy. Turning OFF of $S'_1$ switch concludes this interval.

Interval $t_c$

Turning OFF of switch $S'_1$ also starts the resonant discharge of the capacitor $C_{S1}$ with three resonant current components each contributing to the reduction of the voltage $v_{S1}$ on input switch $S_1$. When this voltage $v_{S1}$ arrives at its lowest value $S_1$ switch must be turned ON, which concludes this interval. At this instant, the resonant current is reduced to zero, and the input capacitor current $i_{C1}$ is equal to current $i_1$, as seen in $i_{C1}$ current waveform of FIG. 76. Very often complete discharge and turn ON at zero voltage will be obtained. In some cases, when the operating duty ratio is low and the input voltage also very high, zero voltage may not be obtained, but substantial reduction of switching losses will occur. In fact, the experiments have shown that switching at some remaining small hard-switching voltage $V_h=V_C/4$ results in higher efficiency due to reduction in circulating resonant current, which is necessary to achieve lower $v_{S1}$.

Interval $t_d$

This current-reversal subinterval starts with input capacitor current $i_{C1}=i_1$, when input switch $S_1$ is turned ON. The input capacitor current reduces linearly at a constant rate equal to $V_g/L_r$, as seen in $i_{C1}$ waveform in FIG. 76. At certain moment during this interval, it becomes zero, then reverses the direction afterwards and reaches the steady-state current level $-i_m$. When that happens, the current of the body-diode of complementary output switch $S'_2$ becomes zero, hence body-diode turns OFF and switch $S'_2$ must be turned OFF. This completes D' to D transition.

Interval $t_e$

Figure 76:
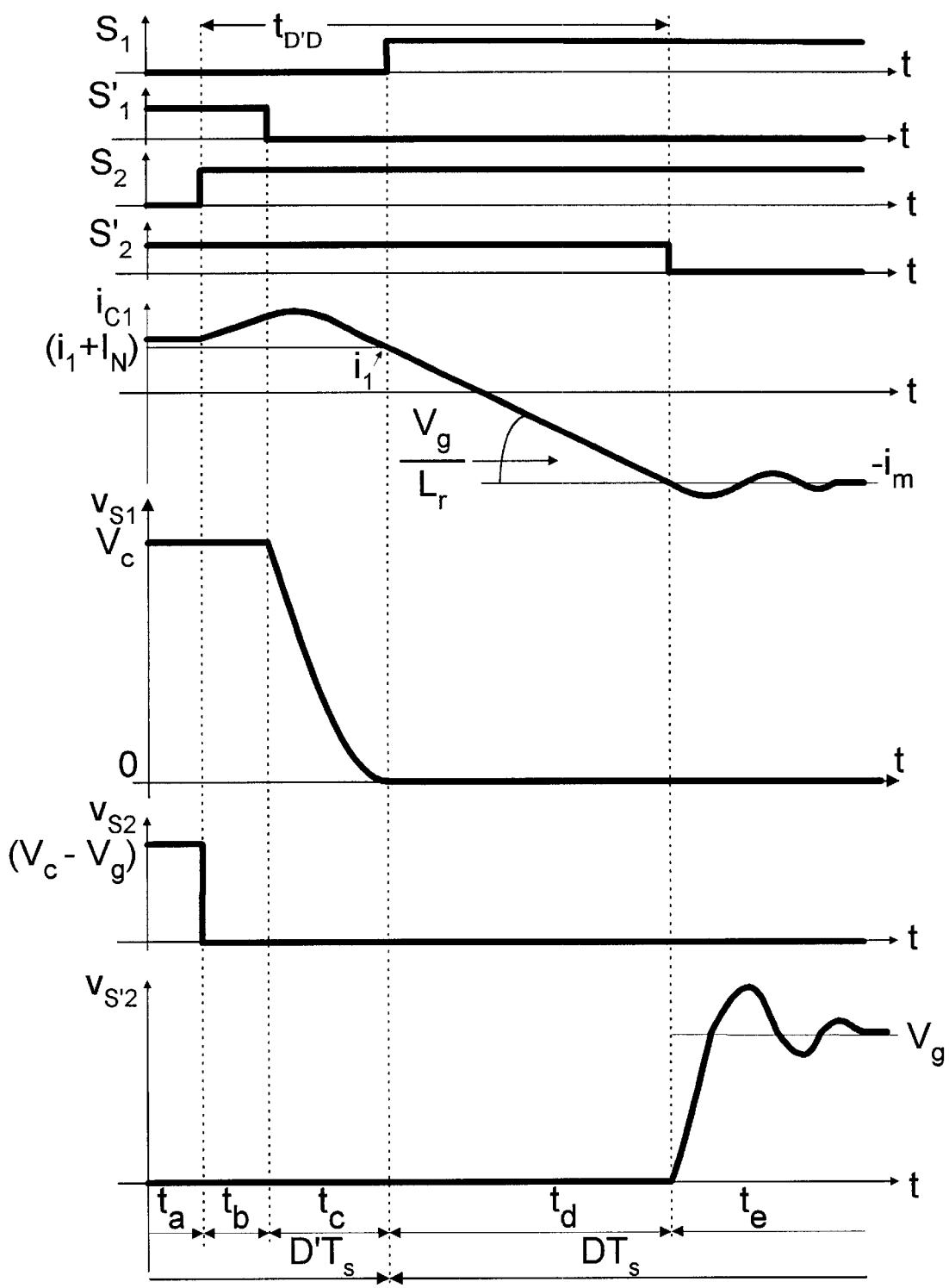
FIG. 76 illustrates the graph of the characteristic switching time control waveforms, respective switch voltages, and the input capacitor current during the D' to D transition described by five converter circuits states of FIGS. 75(a–e).
Figure 77A:
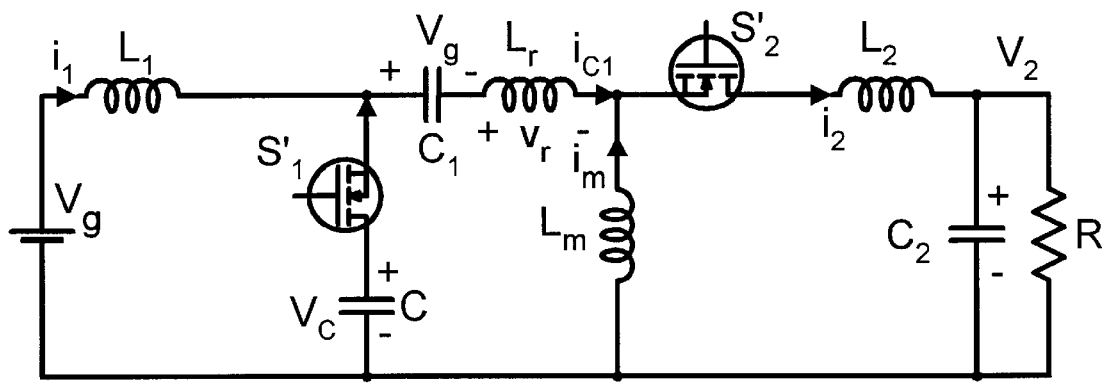
FIGS. 77(a–d) illustrate the four converter circuits states of the converter in FIG. 52a relevant to the D' to D transition of Case 2 in FIG. 52b.
Figure 77B:
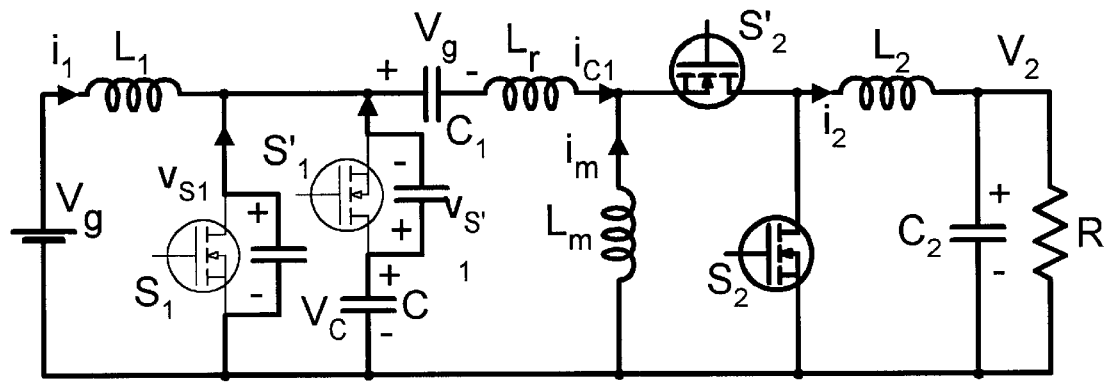
Figure 77C:
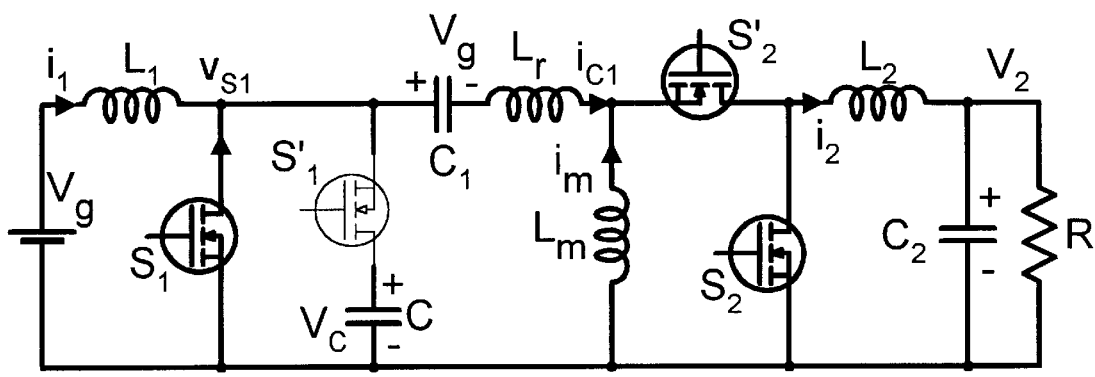
Figure 77D:
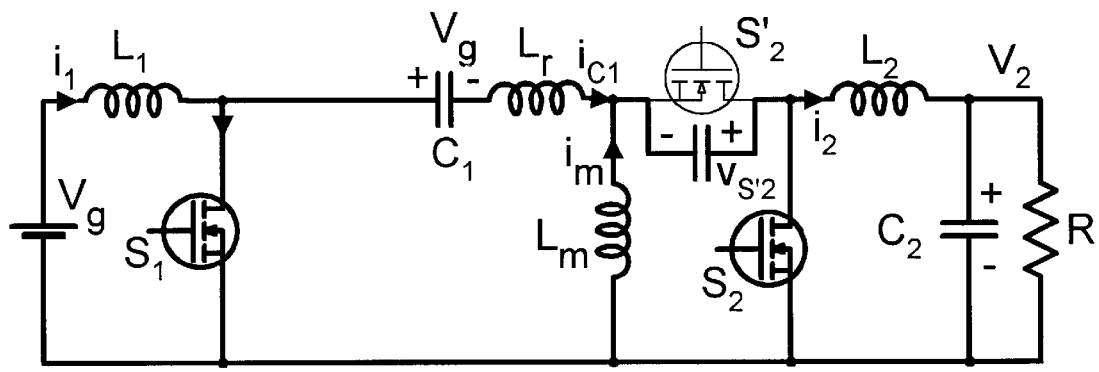

During this interval, the parasitic capacitance $C'_{S2}$ of the switch $S'_2$ is being charged in a resonant fashion from its initial zero value ($S'_2$ switch was just turned OFF moment before) to its final voltage value $V_g$. Thus, resonant circuit comprising resonant inductor $L_r$ and parasitic capacitor $C_{S'2}$ induces voltage oscillations on $S'_2$ switch as shown in FIG. 76. These oscillations can be damped and ringing suppressed by use of the identical R-C snubber network used to suppress similar oscillation occurring after D to D' transition.

The D' to D Transition (Case 2)

Figure 78:
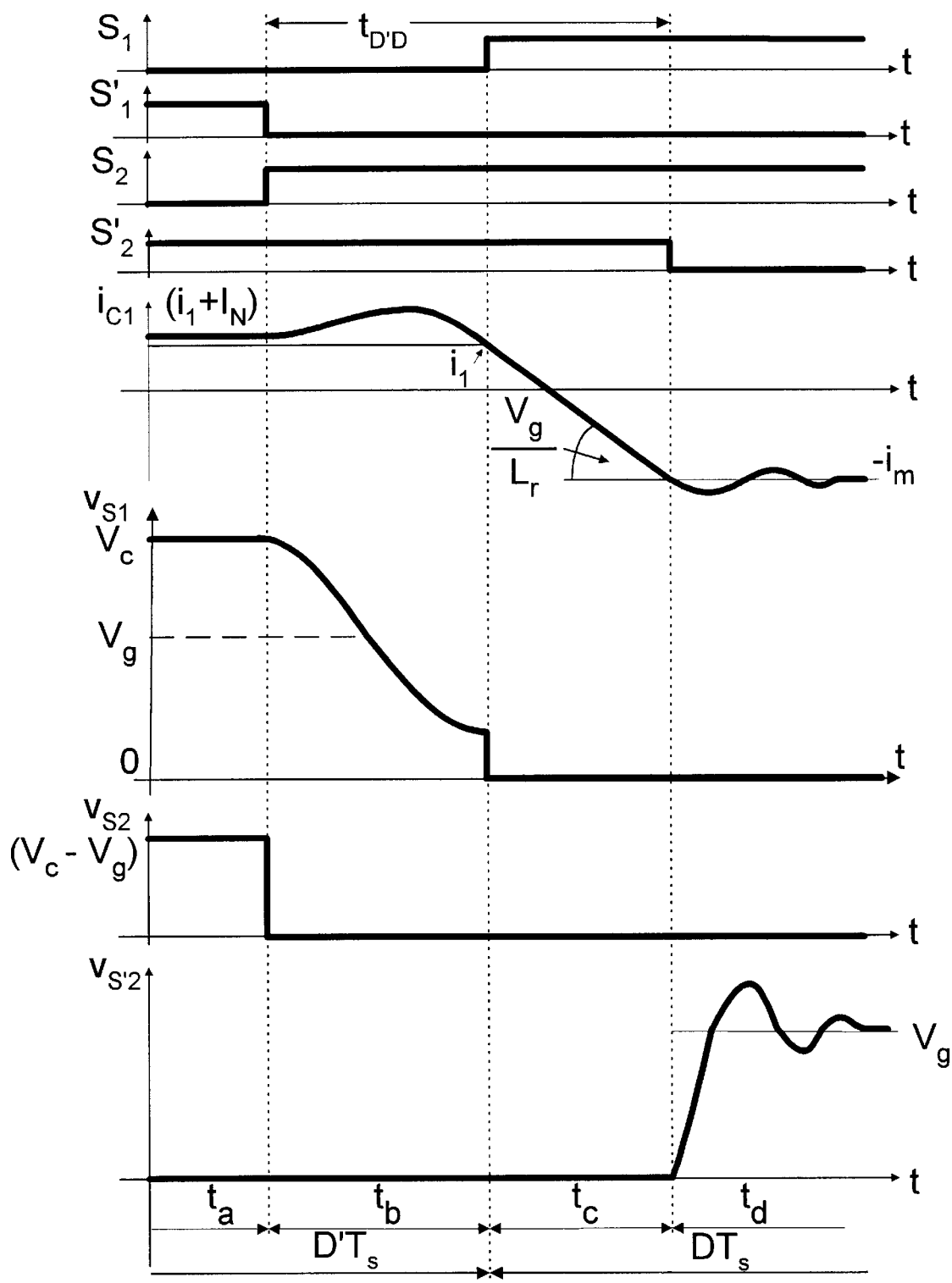
FIG. 78 illustrates the graph of the characteristic switching time control waveforms, respective switch voltages, and the input capacitor current during the D' to D transition described by four converter circuits states of FIGS. 77(a–d).

This corresponds to Case 2 illustrated earlier in waveforms of FIG. 52b. This case is represented by the four equivalent circuits of FIGS. 77(a–d) and the corresponding waveforms in the four subintervals shown in FIG. 78.

Interval $t_a$

This represents the state of the converter before the transition starts. $S_1$ and $S_2$ are OFF and $S'_1$ and $S'_2$ are ON. This interval ends and transition is initiated when $S'_1$ is turned OFF and simultaneously $S_2$ turned ON.

Interval $t_b$

By turning ON switch $S_2$ prematurely (before its body-diode would turn-ON), the resonant discharge is started. However, this time only two resonant current components remain, since the boost component present in Case 1 is eliminated because the boost time is reduced to zero. Nevertheless, just one of the two remaining resonant current sinusoidal components with magnitude equal to $(V_C-V_g)/R_0$ is capable alone to reduce the input switch voltage completely to zero at duty ratio of D=0.5, regardless of the magnitude of input voltage $V_g$.

Interval $t_c$

Same as for interval $t_d$ for Case 1

Interval $t_d$

Same as for interval $t_e$ for Case 1.

The D' to D Transition (Case 3)

This corresponds to Case 3 illustrated earlier in waveforms of FIG. 54b. This case is represented by the five equivalent circuits of FIGS. 79(a–e) and the corresponding waveforms in the five subintervals shown in FIG. 80.

Interval $t_a$

This represents the $D'T_S$ interval just before the transition starts. $S_1$ and $S_2$ are OFF and $S'_1$ and $S'_2$ are ON. This interval ends and the D' to D transition is initiated when $S'_1$ is turned OFF.

Interval $t_b$

Figure 79A:
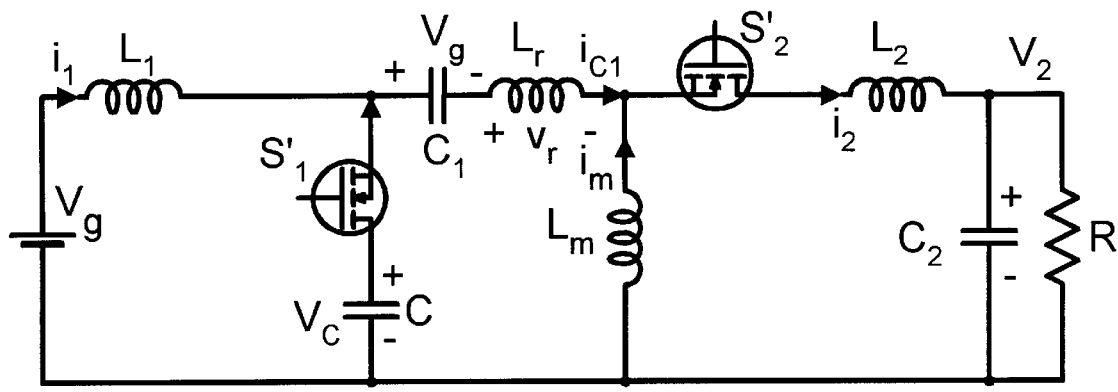
FIGS. 79(a–e) illustrate the five converter circuits states of the converter in FIG. 54a relevant to the D' to D transition of Case 3 in FIG. 54b.
Figure 79B:
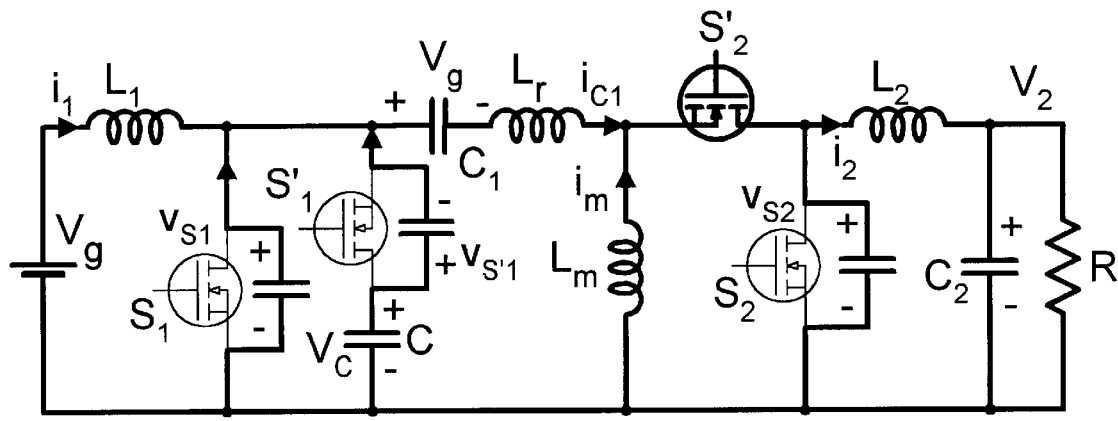
Figure 79C:
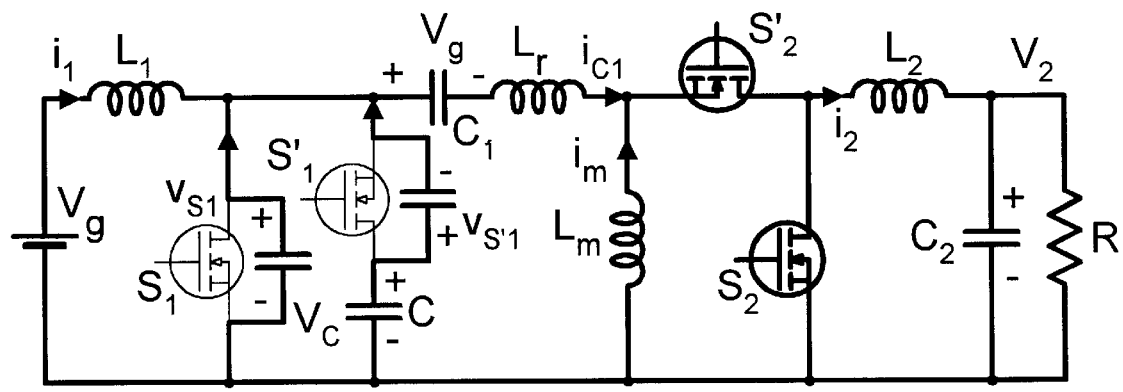
Figure 79D:
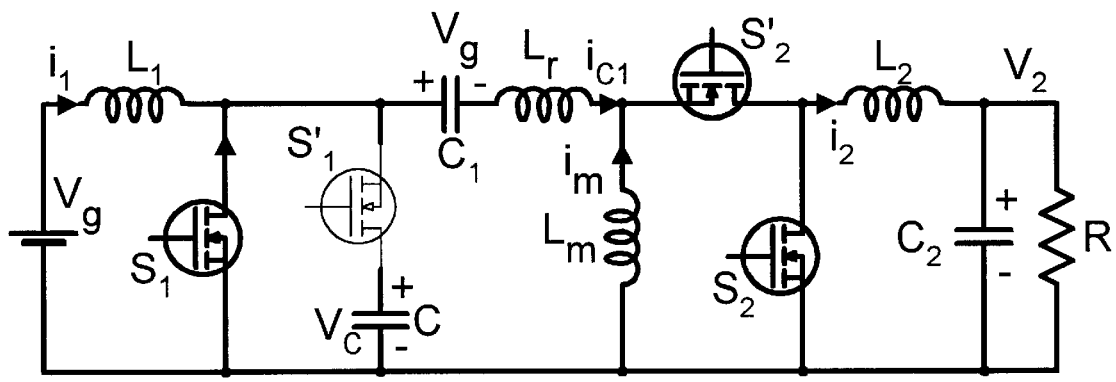
Figure 79E:
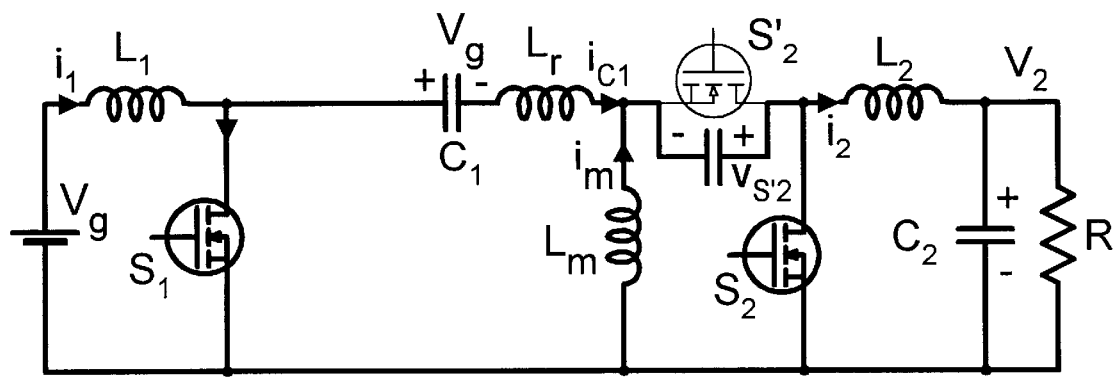
Figure 80:
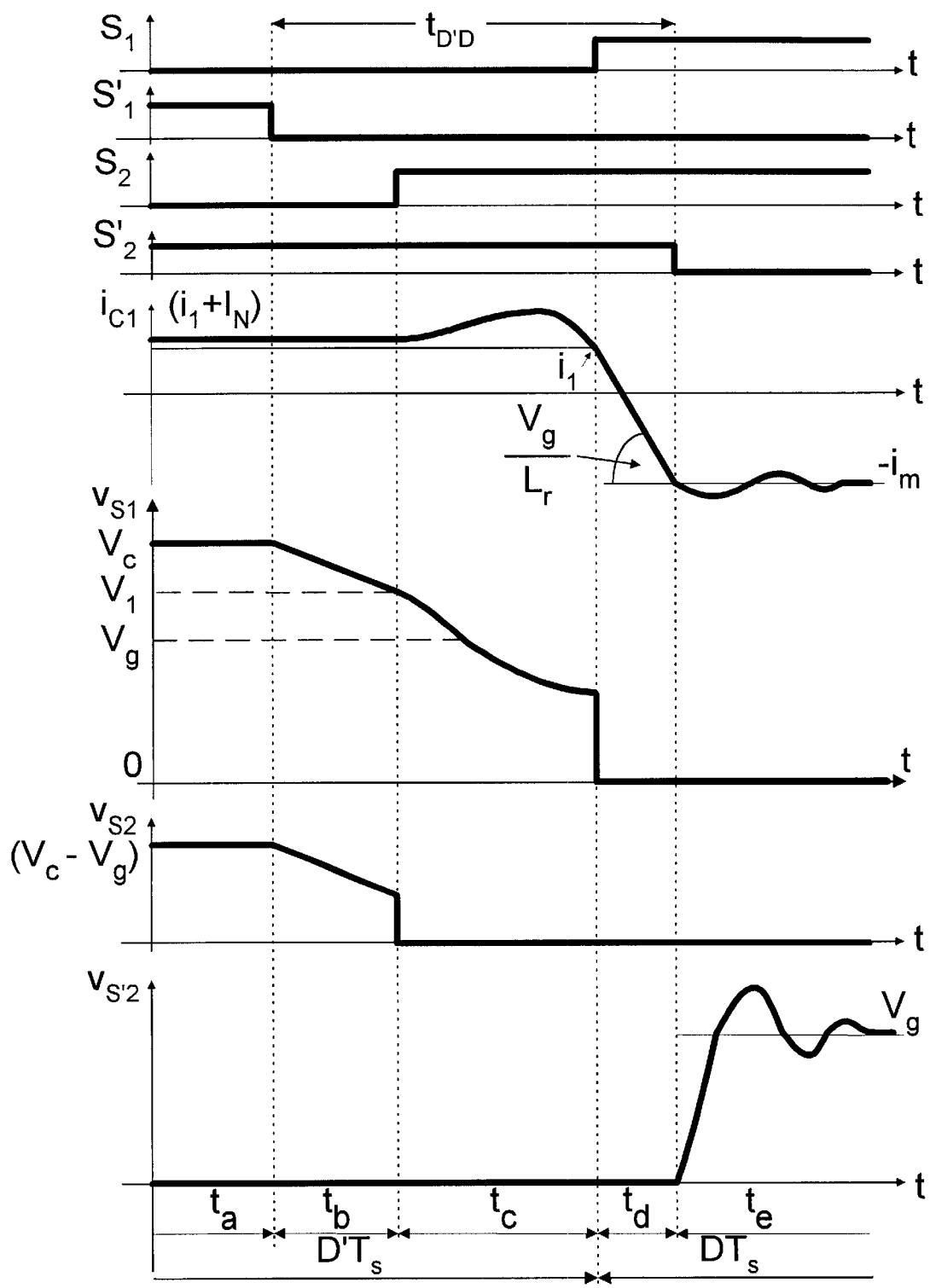

From circuit in FIG. 79b, the capacitance $C_{S1}$ of the input switch $S_1$ is discharging at the constant rate given by $-I_N/C_r$. Output switch $S_2$ is turned ON before its voltage reaches zero to complete this linear discharge interval with input switch voltage reduced to $V_{S1}$.

Interval $t_c$

Turning ON $S_2$ starts the resonant subinterval and discharge of the parasitic capacitance of the input switch, also with the two resonant current components, as in above Case 2, but with one of them with reduced magnitude equal to $(V_{S1}-V_g)/R_0$ resulting in less effective resonant discharge than before. When the voltage on the input switch $S_1$ arrives to its lowest value, input switch $S_1$ must be turned ON, which concludes this interval. The minimum value of $S_1$ voltage depends on the timing of switch $S_2$, that is, the length of the previous interval $t_b$. The shorter the interval $t_b$, the lower the minimum value because the resonance process starts with a higher initial voltage value. The minimum value of the voltage on switch $S_1$ can be made zero by appropriate timing of $S_2$. However, the experiments have shown that values of approximately $V_C/4$ result in higher efficiency. The $\frac{1}{2}CV^2$ losses are reduced by a factor of 16 over the hard-switching case. A further reduction, however, causes increased losses due to a larger circulating current necessary to achieve a lower voltage on $S_1$.

Interval $t_d$

Same as for subinterval $t_d$ of Case 1.

Interval $t_e$

Same as for subinterval $t_e$ of Case 1.

The D' to D Transition (Case 4)

This corresponds to Case 4 illustrated earlier in waveforms of FIG. 55b. This case is represented by the five equivalent circuits of FIGS. 81(a–e) and the corresponding waveforms in the five subintervals shown in FIG. 82.

Interval $t_a$

This represents interval before the transition starts. $S_1$ and $S_2$ are OFF and $S'_1$ and $S'_2$ are ON. The interval ends and the transition is initiated when $S'_1$ is turned OFF.

Interval $t_b$

Figure 81A:
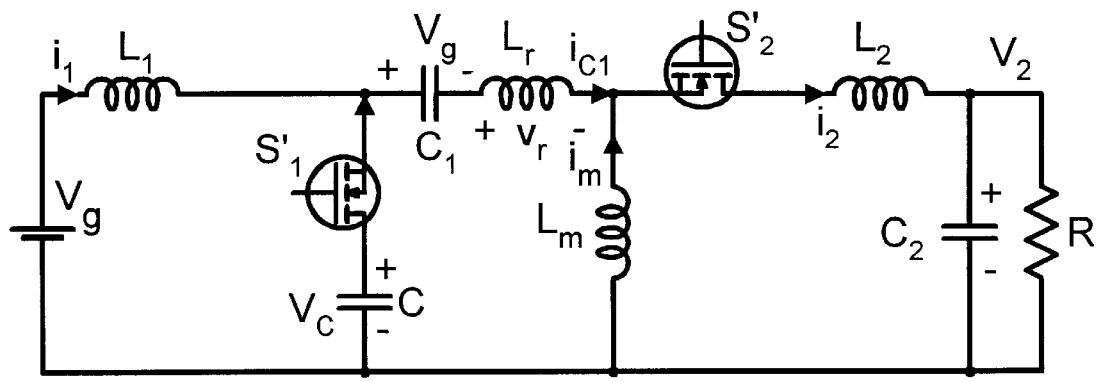
FIGS. 81(a–e) illustrate the five converter circuits states of the converter in FIG. 55a (in which diodes, current rectifiers were replaced with MOSFETS) relevant to the D' to D transition of Case 4 in FIG. 55b.
Figure 81B:
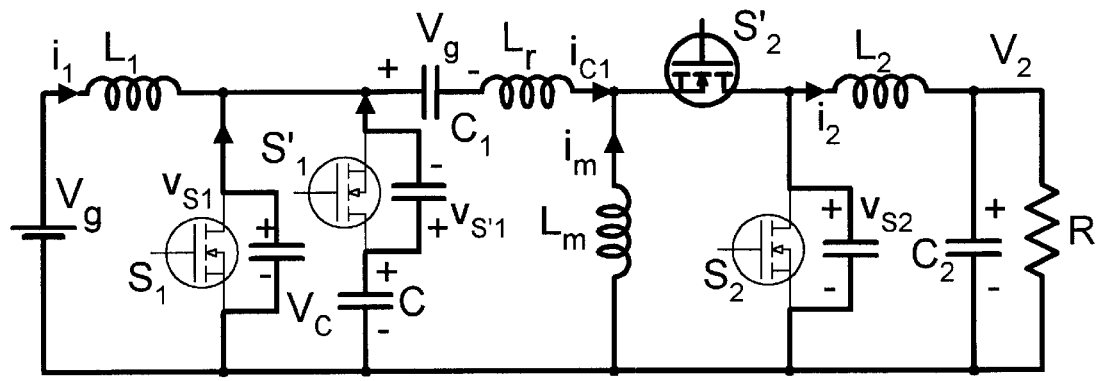

The switches $S_1$, $S'_1$ and $S_2$ are OFF, and $S'_2$ is ON as in circuit of FIG. 81b. The parasitic capacitances of the input switch $S_1$ and output switch $S_2$ are discharging at the same constant rate $-I_N/C_r$. This linear discharge subinterval is completed when the voltage across output switch $S_2$ reaches zero and the voltage on input switch $S_1$ reduces to $V_g$. This turns ON the body-diode of the output switch $S_2$ as shown in FIG. 81c, at which instant the output MOSFET switch $S_2$ is turned ON to bypass its body-diode and reduce conduction losses.

Interval $t_c$

Figure 81C:
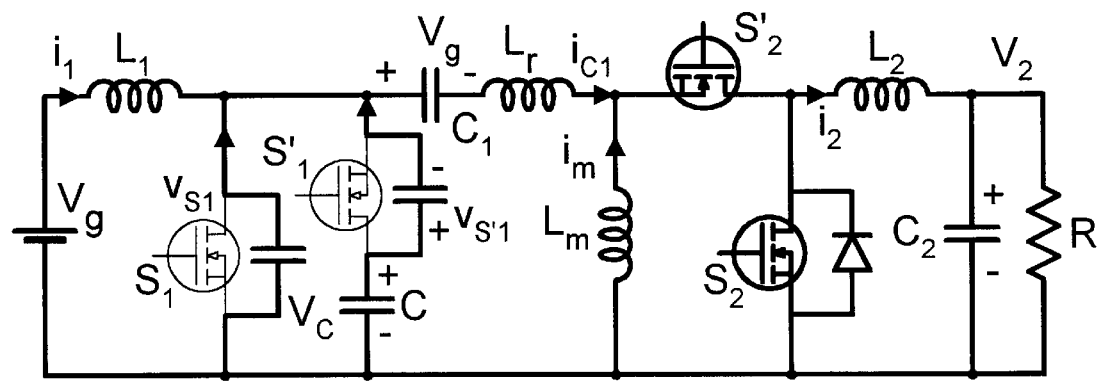
Figure 81D:
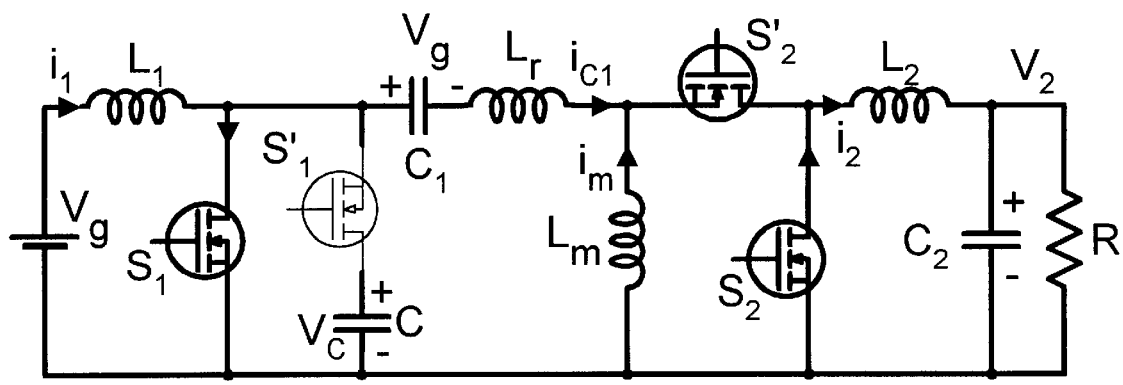
Figure 81E:
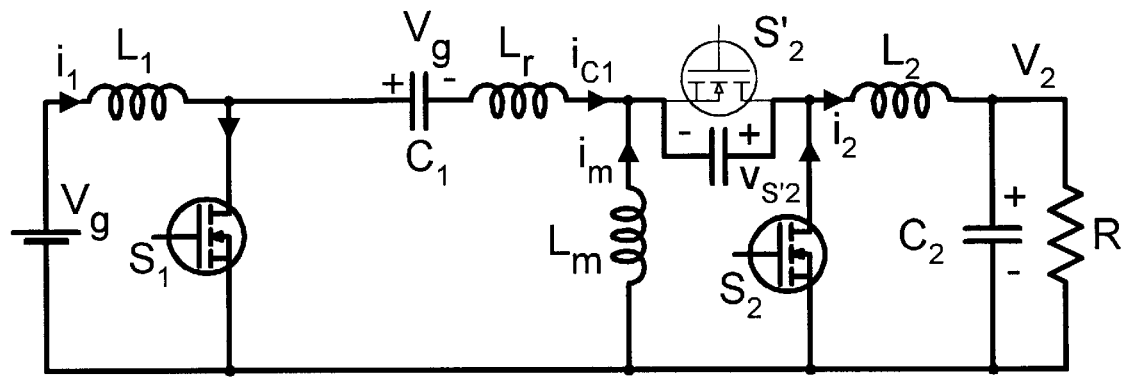
Figure 82:
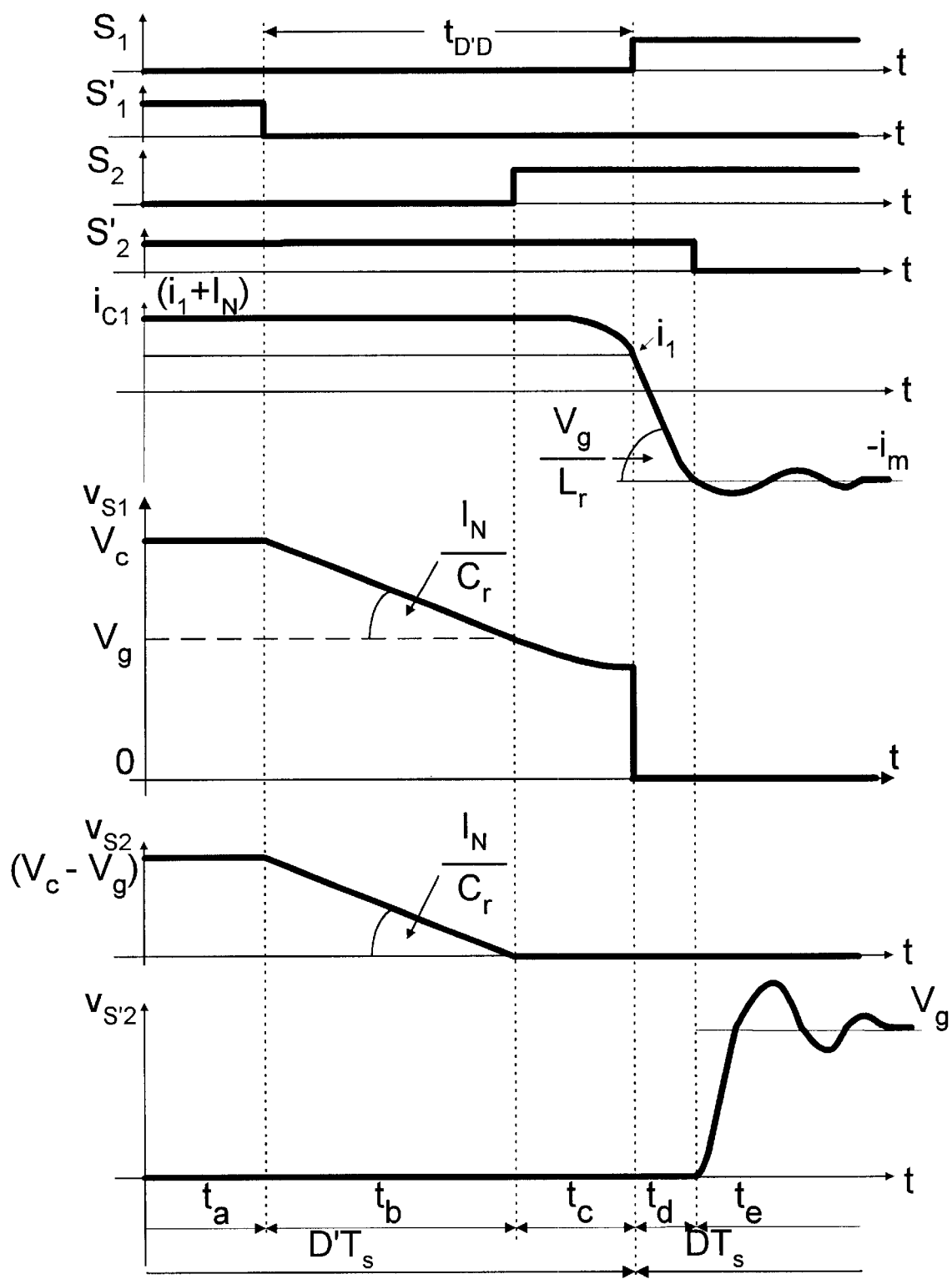
FIG. 82 illustrates the graph of the characteristic switching time control waveforms, respective switch voltages, and the input capacitor current during the D' to D transition modeled by five converter circuits states of FIGS. 81(a–e) for the converter in FIG. 55a (in which diodes, current rectifiers were replaced with MOSFETs).

The resonant discharge subinterval starts with turning ON of output switch $S_2$ as in circuit of FIG. 81c (body-diode turn-ON is sufficient to start resonance). In this case, only one resonant current discharge component remains, since the second resonant current component present in Case 3 above is eliminated (its magnitude is $v_{r2}=V_1-V_g=0$, because the voltage on input switch $S_1$ at that instant is $V_1=V_g$ as seen in waveform of $v_{S1}(t)$ on FIG. 82). As also seen in same waveform, the reduction of the voltage on input switch $S_1$ below $V_g$ level is minimal, since this component is least effective in reducing the voltage. To increase its effectiveness will require increase of $I_N$ and/or characteristic impedance $R_0$, since $v_{r3}=R_0 I_N$, both of which may diminish some of the loss reduction brought by lossless switching.

Interval $t_d$

Same as for subinterval $t_d$ of Case 1.

Interval $t_e$

Same as for subinterval $t_e$ of Case 1.

Note that in the above case, exactly the same waveforms and identical behavior would have been obtained if instead of the controllable MOSFET CBS switches, the output switch and complementary output switch were implemented as simple diode current rectifiers.

Isolated DC-to-DC Converter

In the isolated DC-to-DC converter the role of the resonant inductor is played by the leakage inductance $L_r$ of the isolation transformer as shown in FIG. 60a. Except for scaling the voltages as explained in reference to FIG. 60b the detailed lossless switching operation follows the same cases as outlined above for the non-isolated converter with resonant inductor.

LOSSLESS SWITCHING USING VBS OUTPUT SWITCH

The detailed lossless switching description is broken down into three subcategories:

1. Non-isolated converter without resonant inductor
2. Non-isolated converter with resonant inductor
3. Isolated DC-to-DC converter In addition, the first subcategory has two special cases depending on the switching time control of four switches: a) symmetrical lossless switching; b) asymmetrical lossless switching, which are described separately.

Non-isolated Converter without Resonant Inductor

Symmetrical Lossless Switching

Figure 43A:
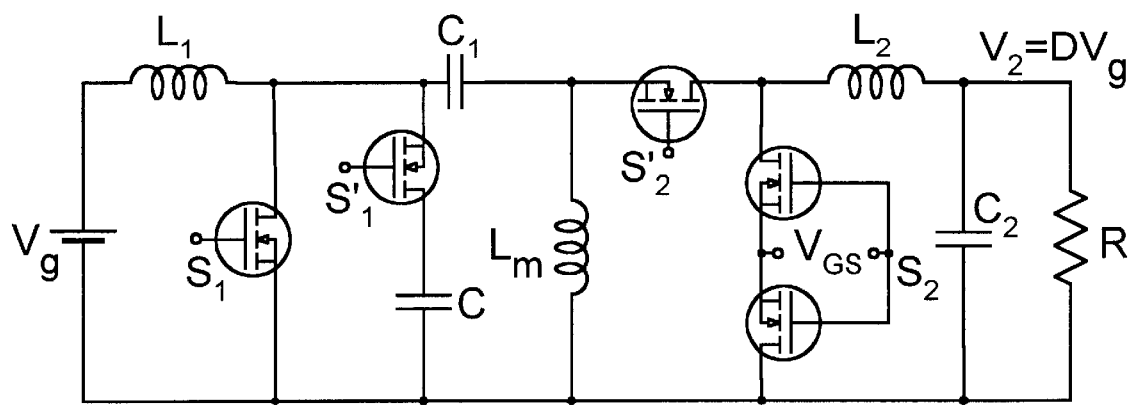
FIG. 43a shows the converter implemented with the VBS output switch implemented with two MOSFET transistors to enable lossless switching of D' to D transition.
Figure 43B:
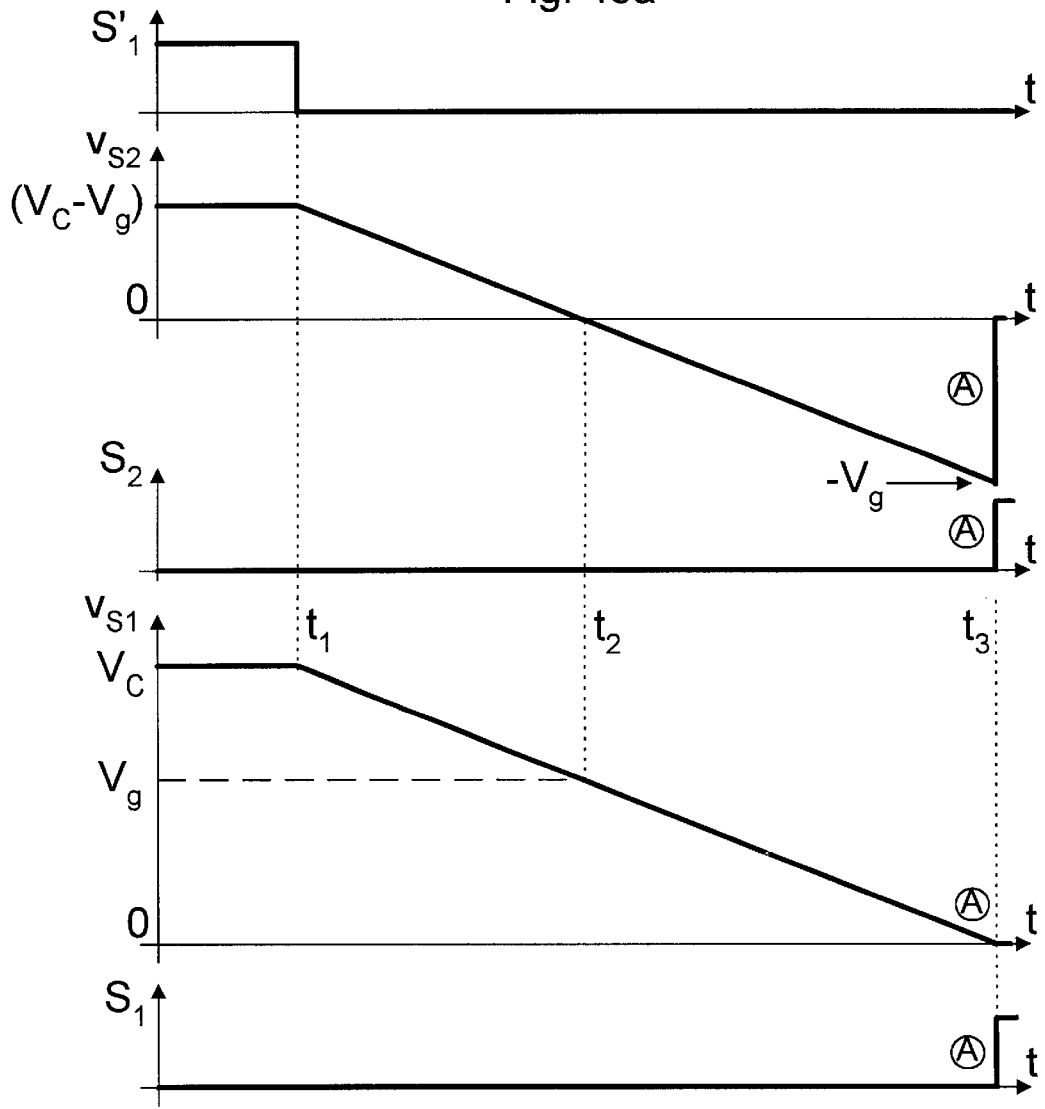
FIG. 43b illustrates the complete discharge of input switch parasitic capacitance during D' to D transition in converter of FIG. 34a allowing turn-ON of input switch with no switching losses.

First we will look at the D to D' transition of the converter in FIG. 43a.

The D to D' Transition

Figure 84A:
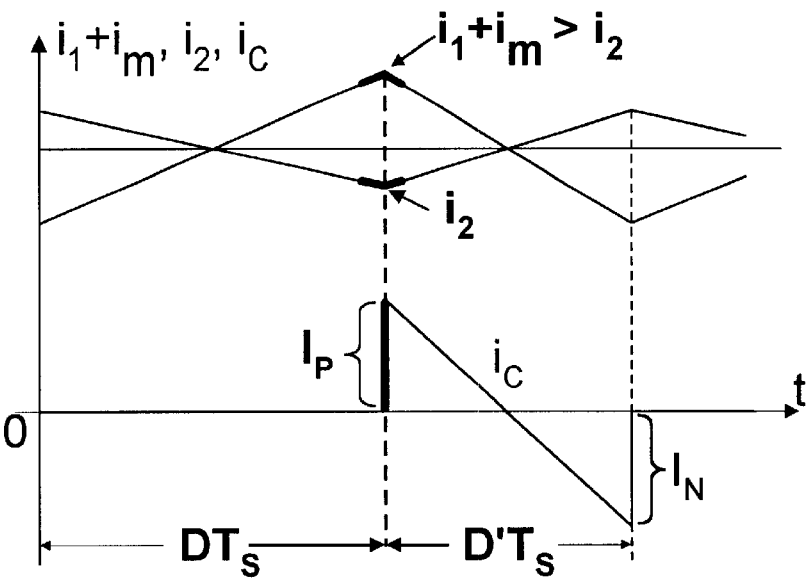

From the steady-state analysis and the waveforms in FIG. 84a it follows that at the end of the time interval $DT_S$, the instantaneous current $i_1+i_m$ is larger than $i_2$ (effectively their difference is equal to $I_P$ as in FIG. 84a). The transition from D to D' interval can be represented by the four equivalent circuits shown in FIGS. 67a, b, c, and d, and their corresponding time intervals $t_a$, $t_b$, $t_c$, $t_d$ shown in FIG. 84b.

Interval $t_a$

Figure 83A:
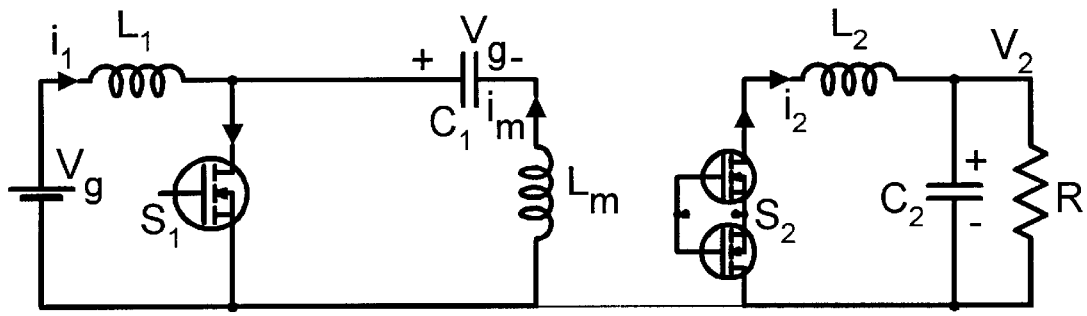
FIGS. 83(a–d) illustrate the four converter circuits states of the converter in FIG. 43a with two-MOSFET VBS switch relevant to the D to D' transition shown in FIG. 66c as the case of symmetrical lossless switching.
Figure 83B:
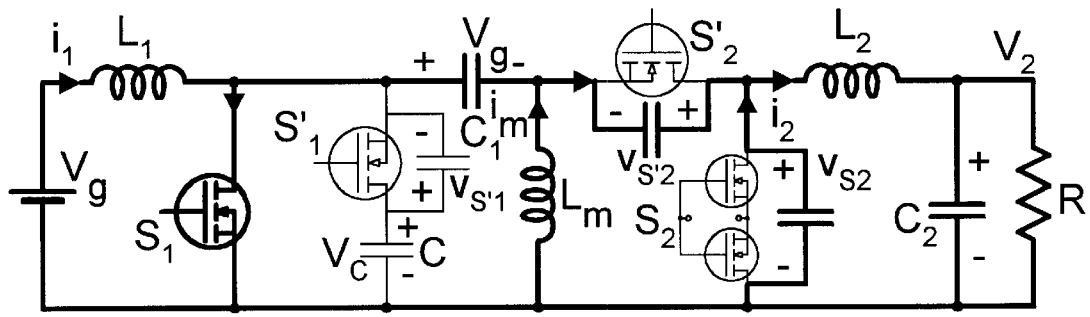
Figure 84B:
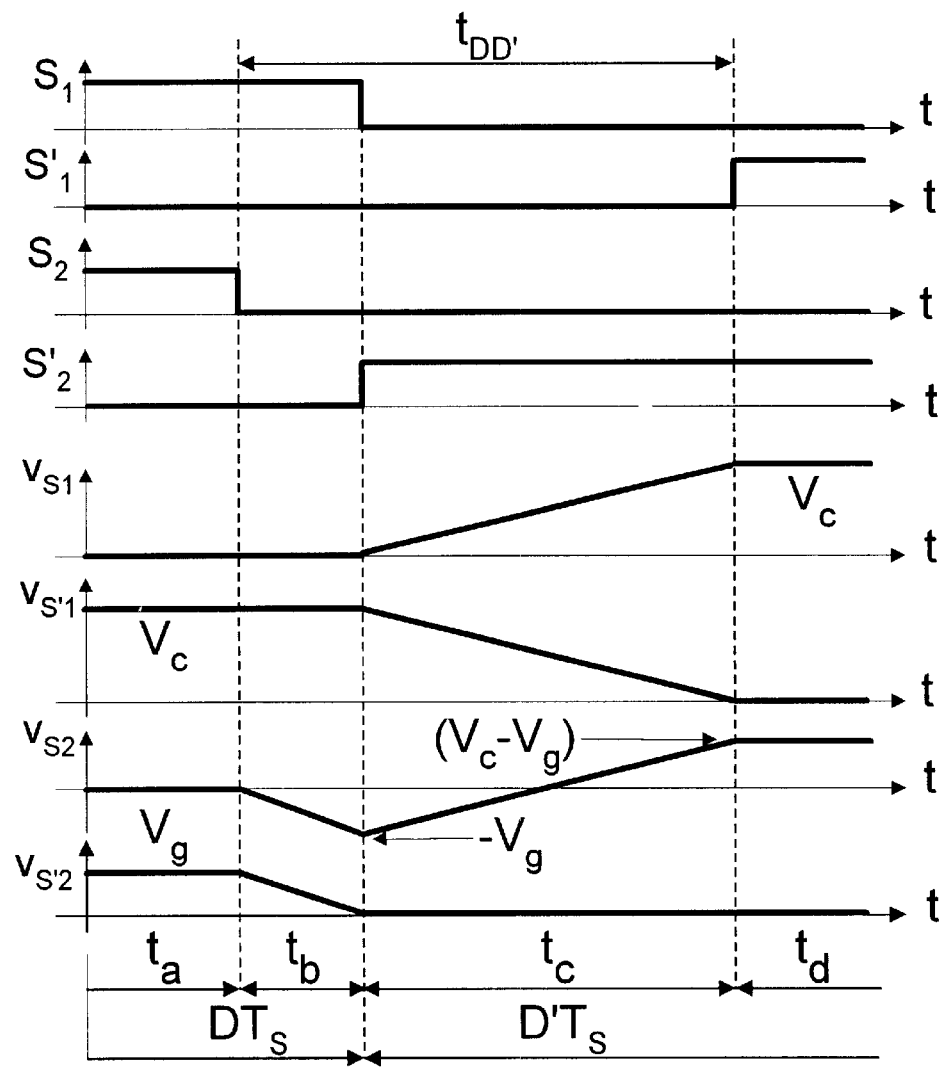

FIG. 83a and $t_a$ interval in FIG. 84b corresponds to the $DT_S$ time interval before the D to D' transition starts. Switches $S_1$ and $S_2$ are both ON and $S'_1$ and $S'_2$ are both OFF. This interval ends and the first, so-called "natural" transition is initiated when output switch $S_2$ is turned OFF, which results in the circuit of FIG. 83b.

Interval $t_b$

Figure 83C:
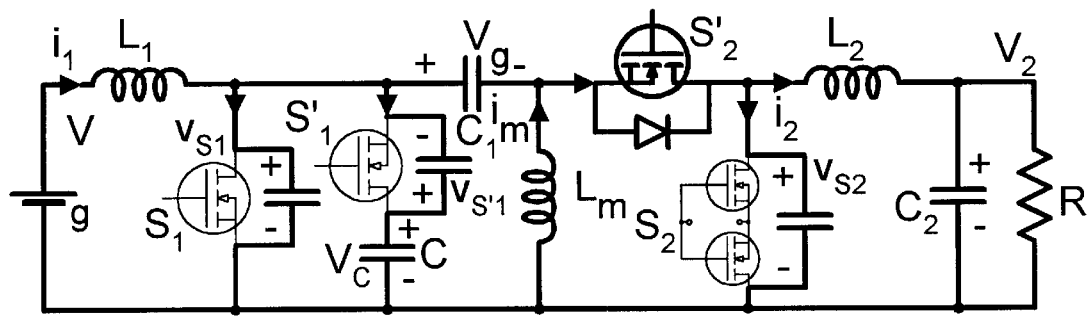

During the interval $t_b$ represented by circuit in FIG. 84b, the current $i_2$ quickly discharges the parasitic capacitor of $S'_2$ switch and charges with negative polarity the parasitic capacitor of $S_2$ switch. This interval is concluded when the voltage across switch $S'_2$, $V_{S'2}$ drops down to zero and the body-diode of $S'_2$ starts to conduct as seen in FIG. 83c. Hence, switch $S'_2$ is naturally turned ON at zero voltage (soft-switched) by its own parasitic diode. Since the diode conduction at low voltage is rather inefficient due to the high voltage drop across the diode, this is also the ideal time to turn ON switch $S'_2$ (or equivalently to turn ON the original $S'_2$ MOSFET) in order to minimize the conduction losses. As $S'_2$ is turned ON, the input switch $S_1$ is simultaneously turned OFF, which results in the circuit model of FIG. 83c valid for interval $t_1$ in FIG. 84b. Note that if the turning OFF of switch $S_1$ was delayed, an intermediate interval would follow the interval $t_b$ with all the voltages clamped at the present value, $V_C$ and $-V_g$ for switches $S'_1$ and $S_2$ respectively. Clearly this interval is unproductive and unnecessary since it only delays the completion of the D to D' transition and should therefore be avoided by proper drive timing as in FIG. 84b.

Interval $t_c$

The interval $t_c$ in FIG. 84b (second part of the D to D' transition) is then characterized by the equivalent circuit of FIG. 83c during which three switches $S_1$, $S'_1$ and $S_2$ are OFF and only switch $S'_2$ is ON, by-passing its own body-diode (shown also in FIG. 83c in bold to signify the fact that body-diode started conduction first and initiated the turn-ON of $S'_2$. Note that due to the fundamental relation (4), where $I_1+I_m=I_2$, the current $i_1+i_m-i_2$ now consists only of their respective AC ripple components $I_P=\Delta i_1+\Delta i_m-\Delta i_2$ resulting in a reduced slope $I_P/C_r$ of voltage changes on switches $S_1$, $S'_1$, and $S_2$ compared to slope of voltage changes on switches $S_2$ and $S'_2$ in previous interval $t_b$ of $(i_1+i_m)/C_r$. This total AC ripple current $I_P$ starts to discharge the capacitance across $S_2$ from $-V_g$ to zero and then to charge it with positive polarity to $V_C-V_g$ while, at the same time, this AC ripple current $I_P$ charges the capacitance across $S_1$ to voltage $V_C$ and discharges the capacitance across $S'_1$ to zero as seen in FIG. 84b. This interval $t_c$ ends when voltage on switch $S'_1$ reaches zero and the body-diode of switch $S'_1$ starts to conduct (shown on FIG. 83d which shows the converter circuit at the beginning of interval $t_d$). This has the effect of clamping the voltage on switch $S_1$ at the $V_C$ level. At this point switch $S'_1$ can be turned ON at zero voltage hence with zero switching loss and also bypass the internal body-diode to reduce the conduction losses.

Interval $t_d$

Figure 83D:
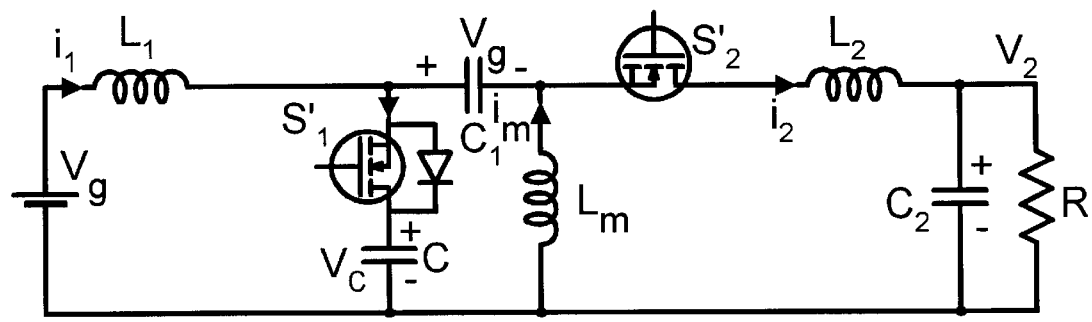

The circuit in FIG. 83d signifies that the D to D' transition has been completed and that the switches $S'_1$ and $S'_2$ are simultaneously ON, as compared to the beginning state in FIG. 83a during which the switches $S_1$ and $S_2$ were simultaneously ON. In summary, during this D' to D transition, all switches are turned ON at zero voltage and lossless switching of the D to D' transition is achieved, hence without switching losses.

The D' to D Transition

Figure 85A:
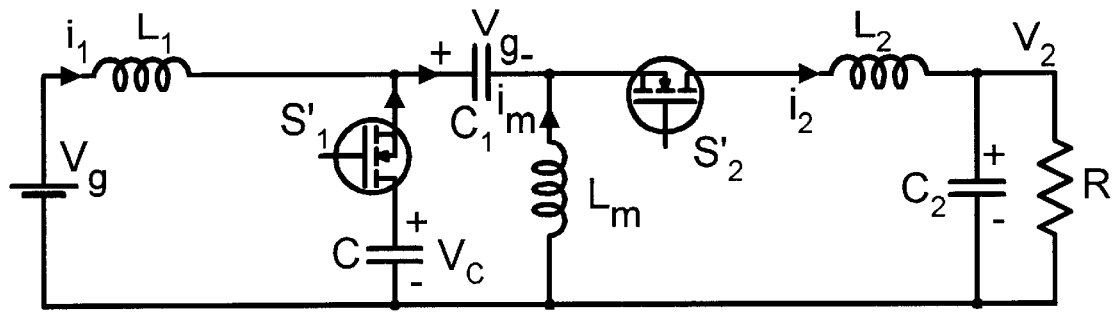
FIGS. 85(a–d) illustrate the four converter circuits states of the converter in FIG. 43a relevant to the D' to D transition shown in FIG. 43b as Case A.
Figure 86A:
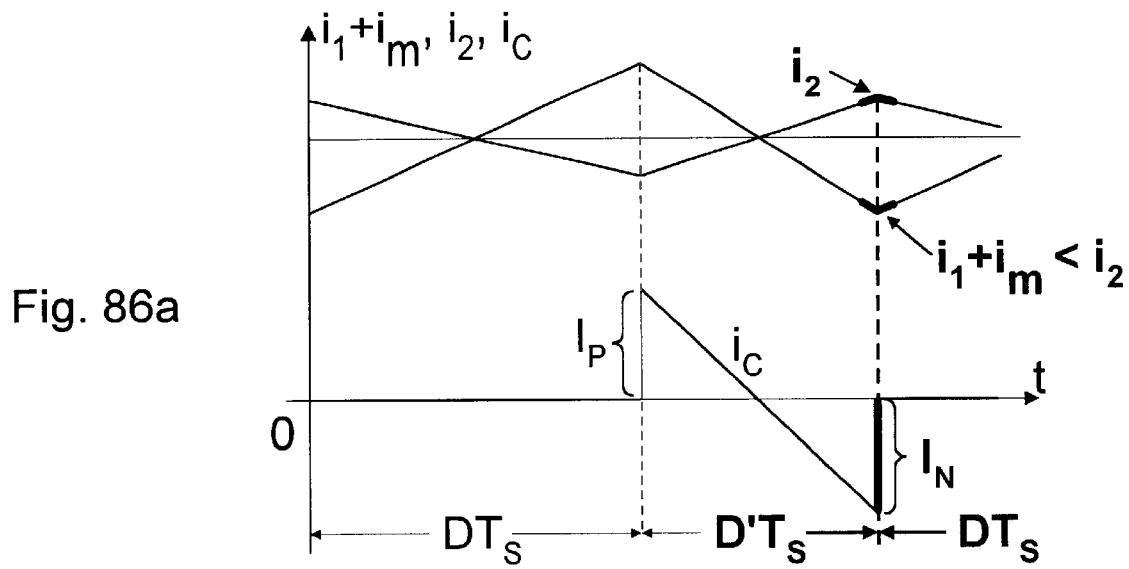

For this transition at the end of $D'T_S$ interval current $i_1+i_m$ is smaller than current $I_2$, as seen from the waveforms in FIG. 86a. The D' to D transition is thus represented by circuits in FIGS. 85a, b, c, d, and their respective intervals $t_a$, $t_b$, $t_c$, $t_d$ shown in FIG. 86b.

Interval $t_a$

FIG. 85a and $t_a$ interval in FIG. 70b corresponds to the $D'T_S$ time interval just before the D' to D transition starts. The switches $S'_1$ and $S'_2$ are both ON and $S_1$ and $S_2$ are OFF. From FIG. 86a, the instantaneous current $i_1+i_m$ is smaller than $i_2$ during this transition. This interval ends and the D' to D transition, usually called "forced" transition is initiated when the complementary input switch $S'_1$ is turned OFF, which results in the circuit of FIG. 85b representing the first part $t_b$ of the forced transition.

Interval $t_b$

Figure 85B:
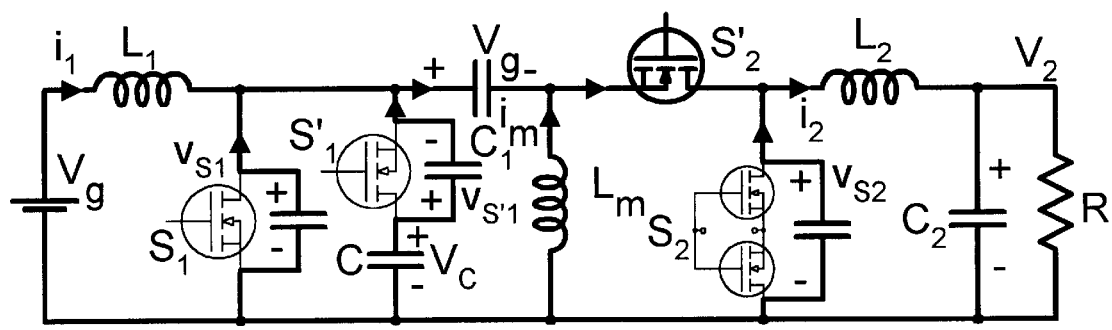
Figure 85C:
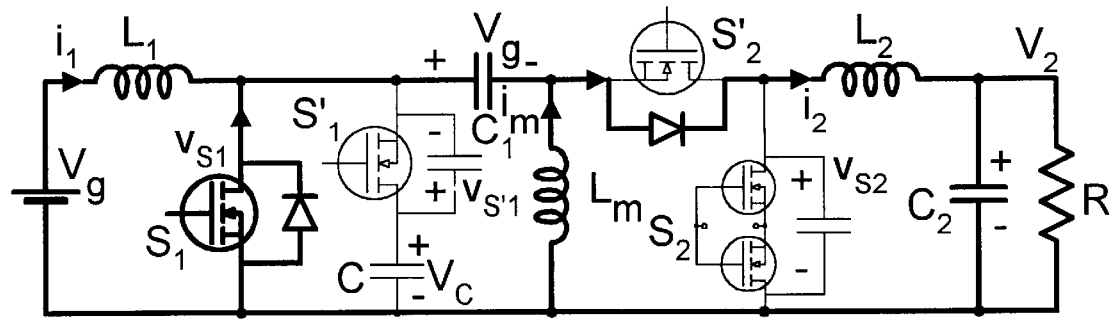
Figure 86B:
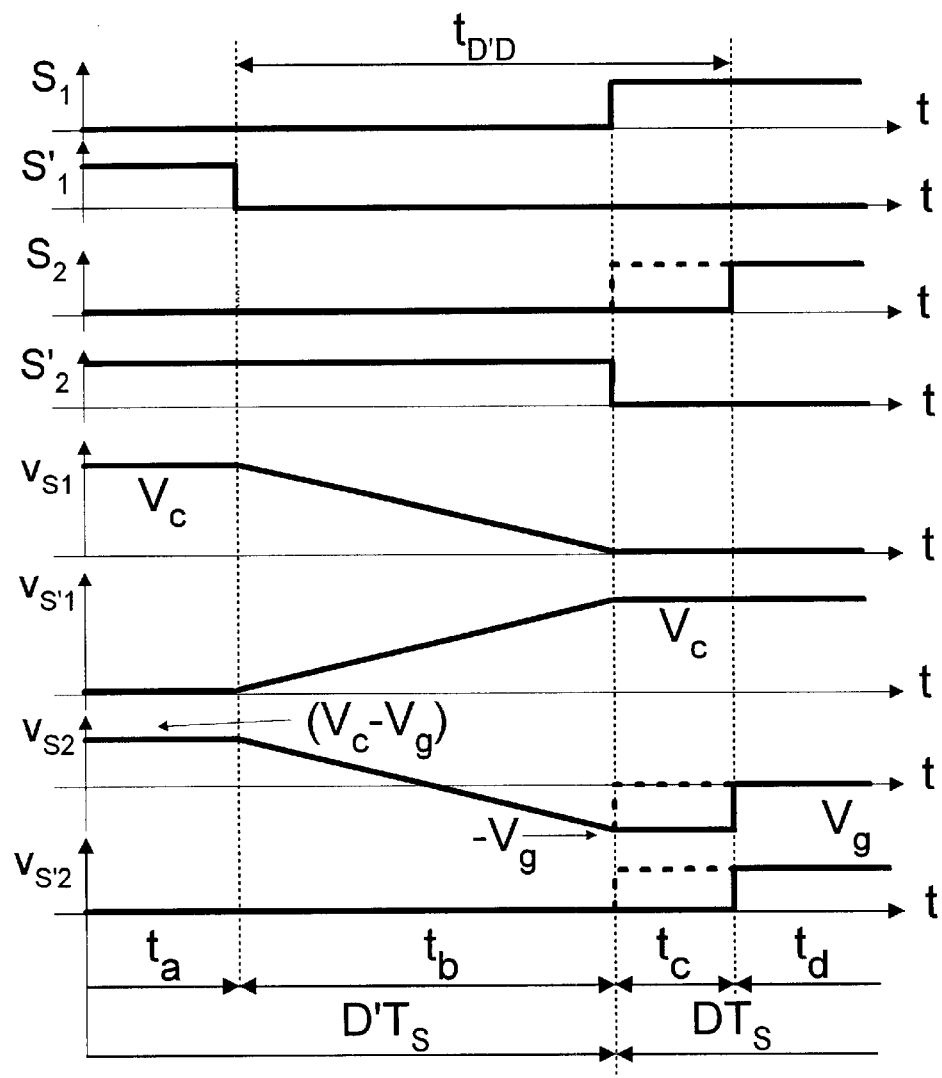

During this interval $t_b$ (the first part of the total D' to D transition interval $t_{D'D}=t_b+t_c$ as represented by the circuit in FIG. 85b), the current $i_2-i_1-i_m$ is charging the parasitic capacitor across $S'_1$ and is discharging the parasitic capacitors across $S_1$ and $S_2$ as seen in the waveforms in FIG. 86b for interval $t_b$. Since the total DC component of this current is zero, only the total AC ripple component is left. This results in a relatively slow charge and discharge of these parasitic capacitors, hence in a slow voltage rise on switch $S'_1$. Given the above assumptions (large inductances are replaced by current sources and large capacitances by voltage sources), these three capacitors are AC-wise connected in parallel. This interval is concluded when the voltage across switch $S_1$, $V_{S1}$ drops down to zero and the body-diode of $S_1$ starts to conduct as seen in FIG. 85c. Hence, switch $S_1$ is naturally turned ON at zero voltage (soft-switched) by its own parasitic body-diode. Since the diode conduction at low voltage is rather inefficient due to the high voltage drop across the diode, this is the ideal time to turn ON switch $S_1$ (or equivalently to turn ON the original $S_1$ MOSFET) in order to minimize the conduction losses.

A very crucial observation is now made, which clearly shows the importance of the Voltage Bidirectional Switch implementation for the output switch $S_2$. As seen in FIG. 86b for interval $t_b$, the voltage across switch $S_2$ changes from initial positive voltage $V_C-V_g$ to negative voltage $-V_g$. If the switch $S_2$ were implemented with Current Bidirectional Switch (CBS), the negative voltage across switch $S_2$ would be prevented and voltage on it would be clamped at zero voltage by the body-diode of CBS switch. This in turn would prevent the complete discharge of the capacitor across input switch $S_1$ to zero. Instead, the voltage on $S_1$ would be clamped at $+V_g$ and this switch would have to be turned ON, accepting the resulting hard-switching losses. However, when Voltage Bidirectional Switch is used instead for switch $S_2$, this problem is eliminated, since the negative voltage across $S_2$ switch is now allowed. Thus, discharge of $S_1$ switch will continue unimpeded to zero voltage at which instant it will be turned ON with zero switching losses.

Interval $t_c$

As switch $S_1$ is turned ON, switch $S'_2$ is simultaneously turned OFF, which results in the circuit model of FIG. 85c valid for interval $t_c$ in FIG. 86b. The remaining part of the transition interval cannot be completed in a lossless switching manner. Thus, switch $S_2$ must be turned ON "hard" at reduced voltage $-V_g$ and its parasitic capacitor discharged abruptly. This third interval $t_c$ should ideally be eliminated, since it only delays the completion of the D' to D transition without having any useful function.

Interval $t_d$

Figure 85D:
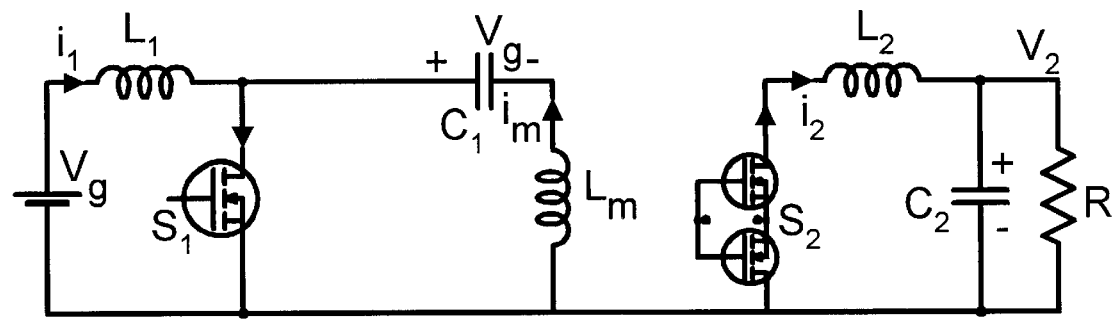

The losses associated with the hard turn-ON of switch $S_2$ are $\frac{1}{2}CV^2$ losses in the parasitic capacitor of switch $S_2$ whose effective voltage is $V_g$, and reverse recovery current losses in the body-diode of switch $S'_2$. FIG. 85d hence shows the final stage after completion of D' to D transition in which switches $S_1$ and $S_2$ are turned ON. FIG. 86b also shows the final voltage of the parasitic capacitor of switch $S'_1$ to be $V_C$ and the final voltage of parasitic capacitor of switch $S'_2$ to be $V_g$, which are their starting values for the next D to D' transitions.

It is now interesting to see how effective this type of switching loss reduction is. It is clear that the D to D' transition results in lossless switching, while the D' to D transition results only in partial reduction of switching losses since at turn-ON the parasitic capacitor of switch $S_2$ is charged to the voltage $(-V_g)$. A very simple analysis reveals that this method is still effective for operation at higher duty ratios. For example for D=0.8, $V_C=V_g/(1-D)=5V_g$. Hence the parasitic capacitor across switch $S_1$ is discharged from a high voltage $V_C=5V_g$ down to the zero level enabling lossless switching with zero losses for this high-voltage switch, while the parasitic capacitor across switch $S_2$ is discharged from $V_C-V_g$ (which is equal to $4V_g$ for this case of duty ratio D=0.8) to $-V_g$ level, and then turned ON in hard-switching way but with significantly reduced switching losses. Hence, only the fraction of the energy stored on the switches is lost compared to the case of hard-switching with the turn-ON losses given by $$\tfrac{1}{2}(5V_g)^2(C_{S1}+C_{S'1})+\tfrac{1}{2}(4V_g)^2C_{S2}+\tfrac{1}{2}V_g^2C_{S'2} \qquad (27)$$

When lossless switching is implemented, the turn-ON losses are reduced to $\tfrac{1}{2}V_g^2(C_{S2}+C_{S'2})$. If the parasitic capacitances of the switches were the same, lossless switching losses would have been less than 3% of the hard-switching losses (2 to 67 ratio!).

Asymmetrical Lossless Switching

First we will look at the D to D' transition of the circuit in FIG. 43a.

The D to D' Transition

Figure 87A:
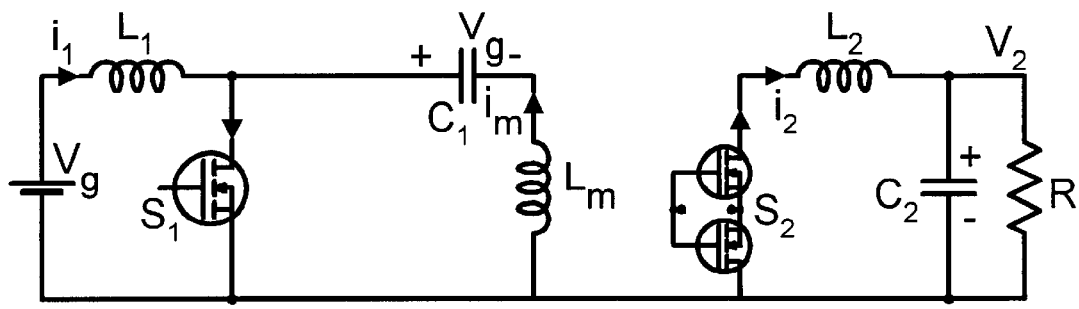
FIGS. 87(a–d) illustrate the four converter circuits states of the converter in FIG. 43a relevant to the D to D' transition shown in FIG. 65c as asymmetrical lossless switching case.
Figure 88A:
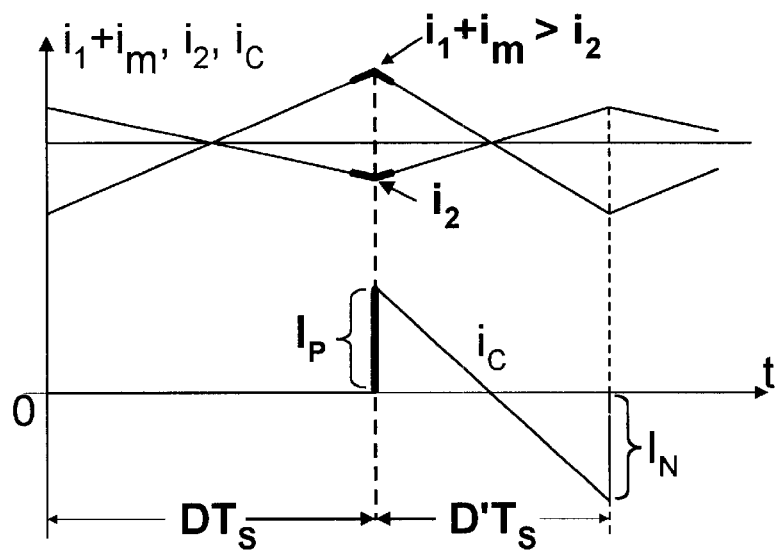

From the steady-state analysis and the waveforms in FIG. 88a it follows that at the end of the time interval $DT_S$, the instantaneous current $i_1+i_m$ is larger than $i_2$ (effectively their difference is equal to $I_P$ as in FIG. 88a). The transition from D to D' interval can be represented by the four equivalent circuits shown in FIGS. 87a, b, c, and d, and their corresponding time intervals $t_a$, $t_b$, $t_c$, $t_d$ shown in FIG. 88b.

Interval $t_a$

Figure 87B:
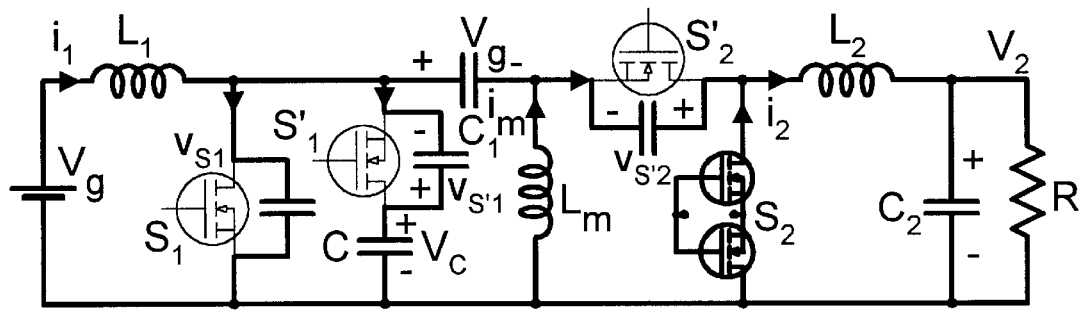
Figure 88B:
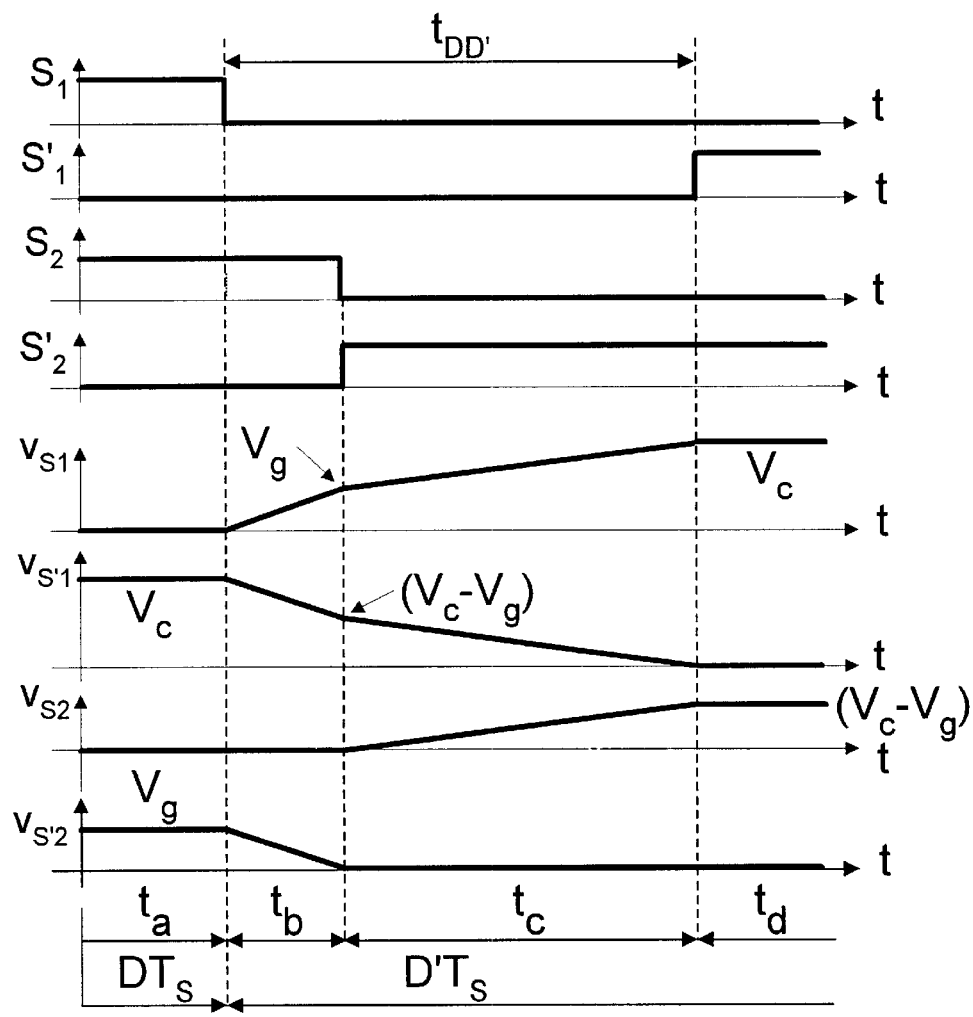
Figure 89A:
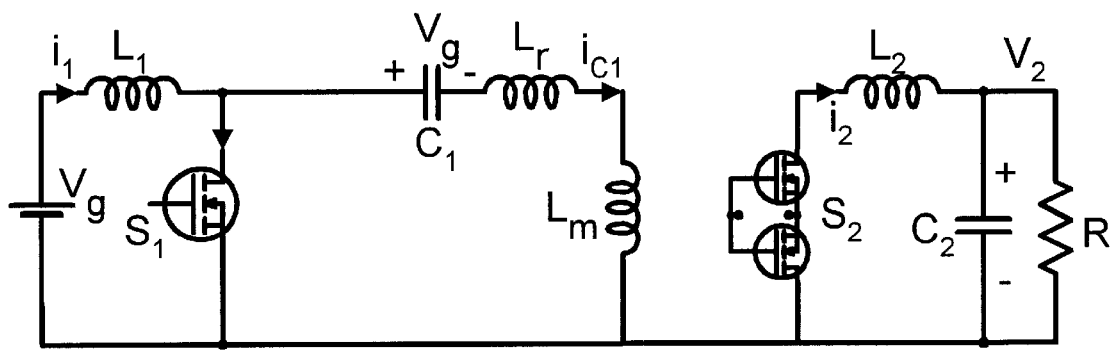
FIGS. 89(a–e) illustrate the five converter circuits states of the converter in FIG. 57a relevant to the D to D' transition with resonant inductance included.
Figure 89B:
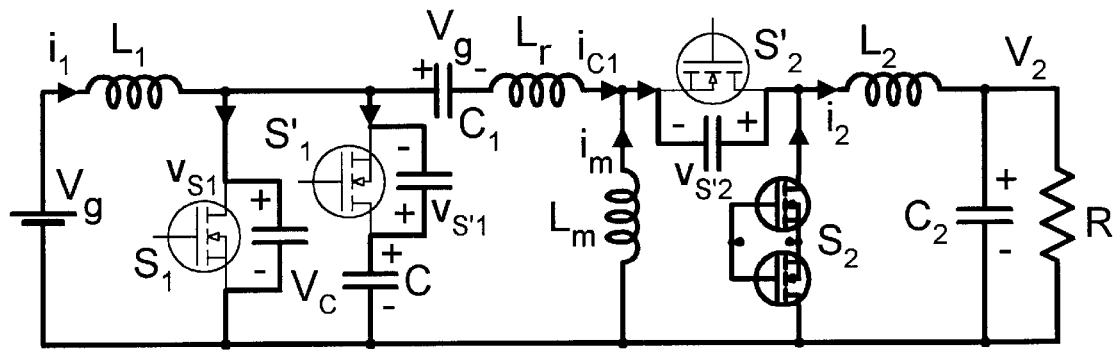
Figure 89C:
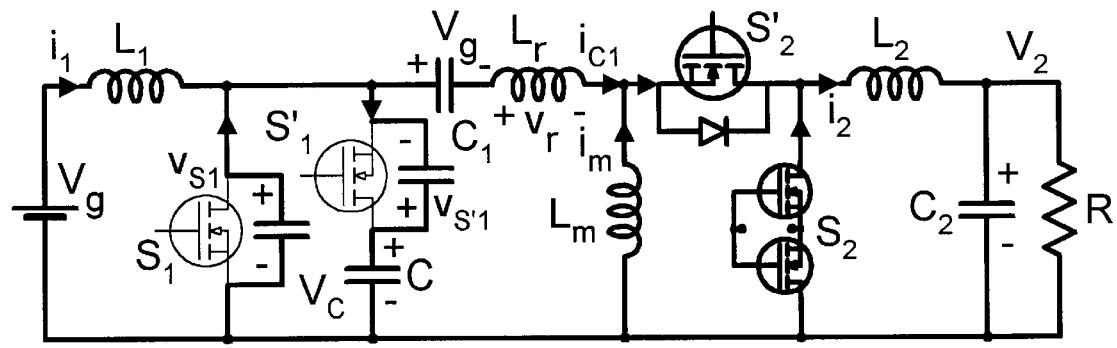
Figure 89D:
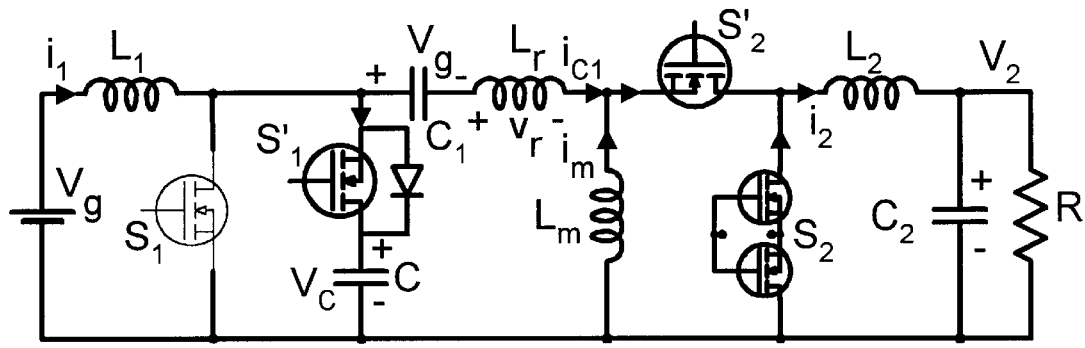
Figure 89E:
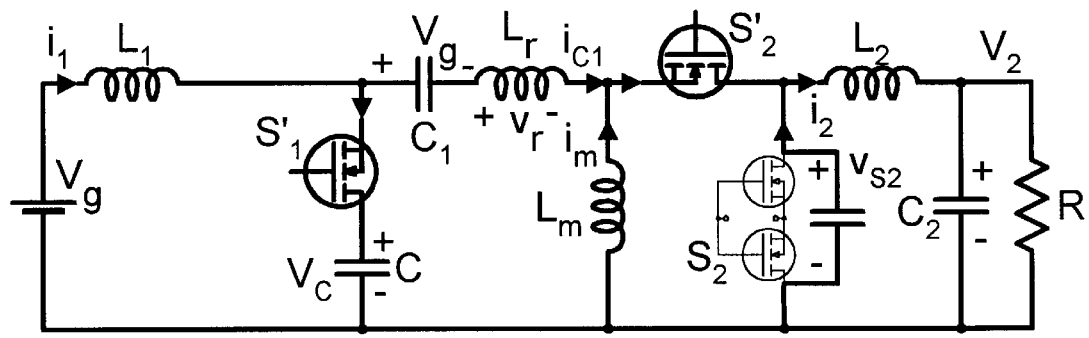

FIG. 87a and $t_a$ interval in FIG. 88b corresponds to the $DT_S$ time interval before the D to D' transition starts. Switches $S_1$ and $S_2$ are both ON and $S'_1$ and $S'_2$ are OFF. This interval ends and the first, so-called "natural" transition is initiated when $S_1$ is turned OFF, which results in the circuit of FIG. 87b.

Interval $t_b$

Figure 87C:
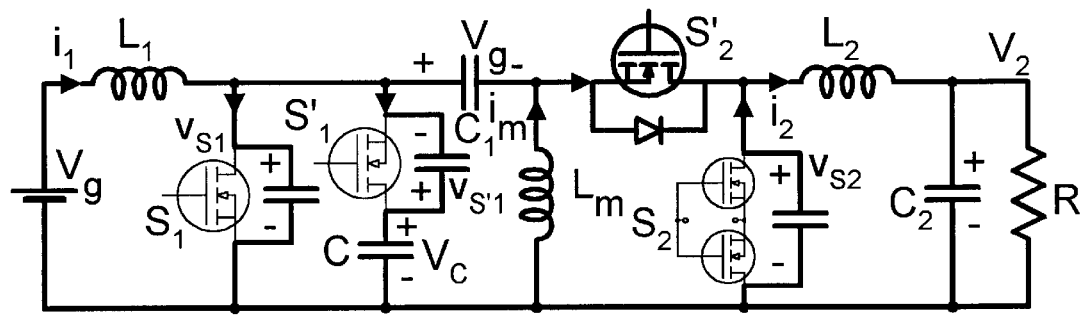

During the interval $t_b$ (first part of total D to D' transition interval $t_{DD'}=t_b+t_c$ as represented by FIG. 88b), the current $i_1+i_m$ is charging the parasitic capacitor of $S_1$ (which initially was fully discharged as switch $S_1$ was ON moments before) and discharging parasitic capacitor across $S'_1$ and $S'_2$ switches. Since this current contains DC component $I_1+I_m$, this results in relatively fast charge and discharge of these parasitic capacitors, hence in fast voltage rise on switch $S_1$. Given the assumptions that the large inductances are replaced by current sources and large capacitances by voltage sources, these three capacitors are AC-wise connected in parallel. This interval is concluded when the voltage across switch $S'_2$, $V_{S'2}$ drops down to zero and the body-diode of $S'_2$ starts to conduct as shown in FIG. 87c. Hence, switch $S'_2$ is naturally turned ON at zero voltage (soft-switched) by its own parasitic diode. Since the diode conduction at low voltage is rather inefficient due to high voltage drop across the diode, this is also the ideal time to turn ON switch $S'_2$ (or equivalently to turn ON the original $S'_2$ MOSFET) in order to minimize conduction losses. As $S'_2$ is turned ON, switch $S_2$ is simultaneously turned OFF, which results in the circuit model of FIG. 87c valid for interval $t_c$ in FIG. 88b. Note that if the turning OFF of switch $S_2$ was delayed, an intermediate interval would follow the interval $t_b$ with all the voltages clamped at the present value, $V_g$ and $V_C-V_g$ for switches $S_1$ and $S'_1$ respectively. Clearly this interval is unproductive and unnecessary since it only delays the completion of the D to D' transition interval and should therefore be avoided by proper drive timing as in FIG. 88b.

Interval $t_c$

Figure 87D:
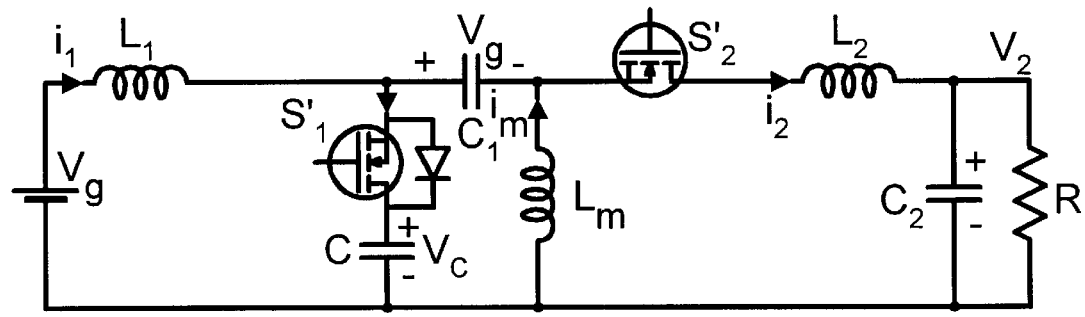

The interval $t_c$ in FIG. 88b (second part of the D to D' transition interval $t_{DD'}$) is then characterized by the equivalent circuit of FIG. 87c during which three switches $S_1$, $S'_1$ and $S_2$ are OFF and only switch $S'_2$ is ON, by-passing its own body-diode (shown also in FIG. 87c in bold to signify the fact that body-diode started conduction first and initiated the turn-ON of $S'_2$). Note that now due to the fundamental relation (4), where $I_1+I_m=I_2$, the current $i_1+i_m-i_2$ now consists only of their respective AC ripple components $\Delta i_1+\Delta i_m-\Delta i_2=-I_N$ resulting in reduced slopes of voltage rise on switch $S_1$ compared to previous interval $t_b$. This total AC ripple current starts to charge the capacitance across $S_2$ while at the same time it continues to charge the capacitance across $S_1$ and discharge the capacitance across $S'_1$, albeit at a much slower rate than in the previous $t_b$ interval. This interval ends when voltage on switch $S'_1$ reaches zero and the body-diode of that switch starts to conduct as shown in FIG. 87d which shows the converter circuit at the beginning of interval $t_d$. This has the effect of clamping the voltage on switch $S_1$ at the $V_C$ level. At this point switch $S'_1$ can be turned ON at zero voltage hence with zero switching loss and also bypass the internal body-diode to reduce the conduction losses.

Interval $t_d$

The circuit in FIG. 87d signifies that the D to D' transition has been completed and that now the switches $S'_1$ and $S'_2$ are simultaneously ON, as compared to the beginning state in FIG. 87a during which the switches $S_1$ and $S_2$ were simultaneously ON. In summary, during this D to D' transition, all switches are turned ON at zero voltage and lossless switching of the D to D' transition is achieved, hence without switching losses.

The D' to D Transition

This transition is identical to the D' to D transition when symmetrical timing is implemented and was already explained and shown by circuits in FIGS. 85(a–d), and their respective intervals $t_a$, $t_b$, $t_c$, $t_d$ shown in FIG. 86b.

Non-isolated Converter with Resonant Inductor

Asymmetrical Lossless Switching

The analysis of the novel lossless switching method implemented on the non-isolated converter with resonant inductor of FIG. 57a is now undertaken.

This novel lossless switching is easily recognized from other lossless switching types by its "signature"—the negative voltage peak on the trailing edge of the voltage across output switch $S_2$. Linear slope of the trailing edge confirms the absence of any resonant discharge in the forced D' to D transition.

Another practical advantage of this lossless switching is that both high-voltage devices on the primary side are turned ON at zero voltage and hence without switching losses at any operating point. Thus, remaining negligible switching losses due to hard-switching at very low voltage across output low voltage devices permit operation at much higher switching frequencies of 500 kHz and higher with only a modest increase of the switching losses. The lossless switching analysis with respect to non-isolated converter with resonant inductor of FIG. 57a follows below. The same assumptions as in the previous analysis are made regarding the large inductors and large non-parasitic capacitors.

The D to D' Transition

The transition from the D to D' interval is represented by 5 characteristic circuits of FIG. 89a–e, and corresponding waveforms of FIG. 90. FIG. 90 has a timing diagram broken down into five intervals, $t_a$, $t_b$, $t_c$, $t_d$, $t_e$ with each interval corresponding to respective circuit model, such as $t_a$ to FIG. 89a, $t_b$ to FIG. 89b, etc.

The circuit operation with VBS switch implementation is exactly the same as when CBS switch was implemented in circuits of FIG. 73(a–e) (see the identical waveforms of FIG. 74 and FIG. 90). Hence, same description as given with FIG. 74 applies.

The D' to D Transition

Figure 91A:
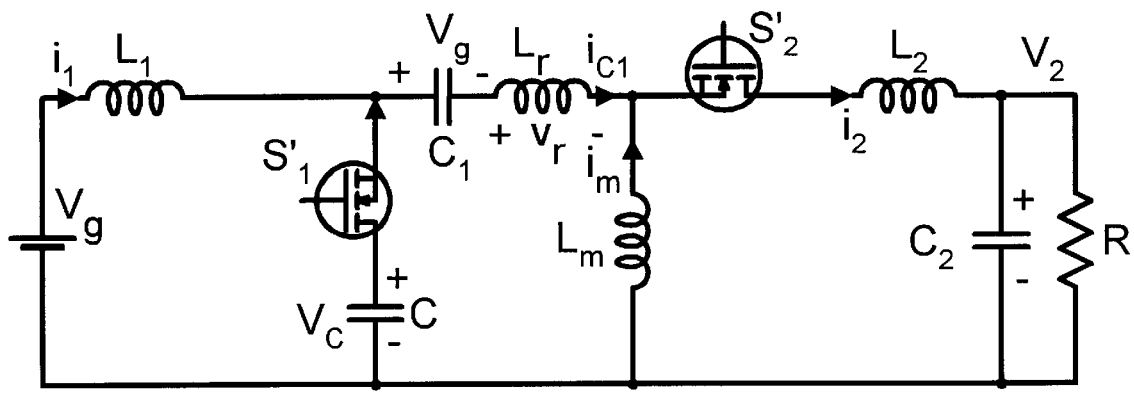
FIGS. 91(a–e) illustrate the five converter circuits states of the converter in FIG. 57a relevant to the D' to D' transition with resonant inductance included.
Figure 91B:
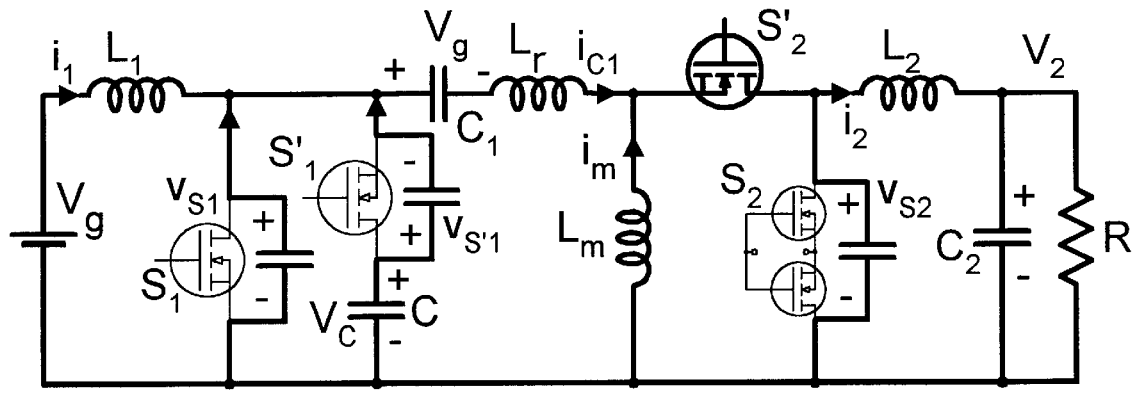
Figure 91C:
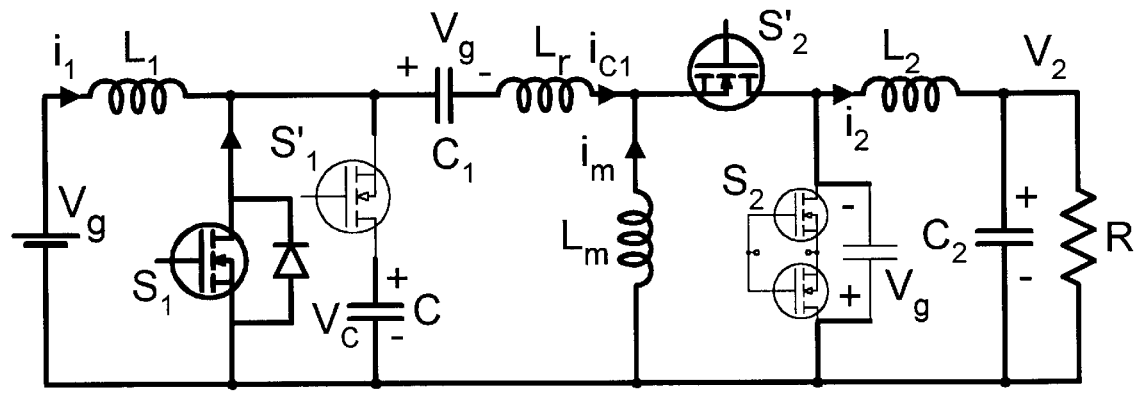
Figure 91D:
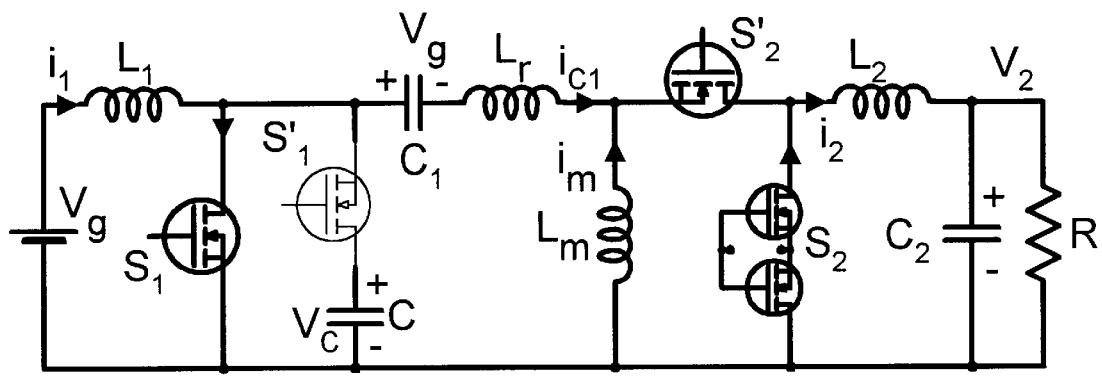
Figure 91E:
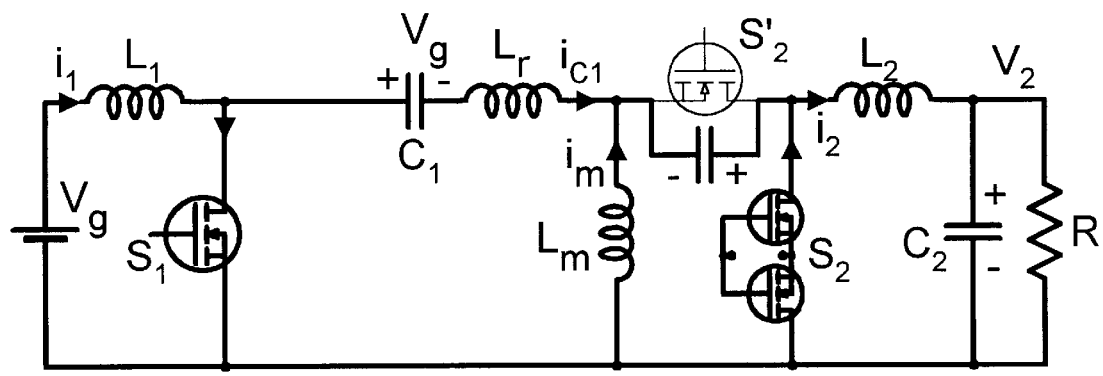
Figure 92:
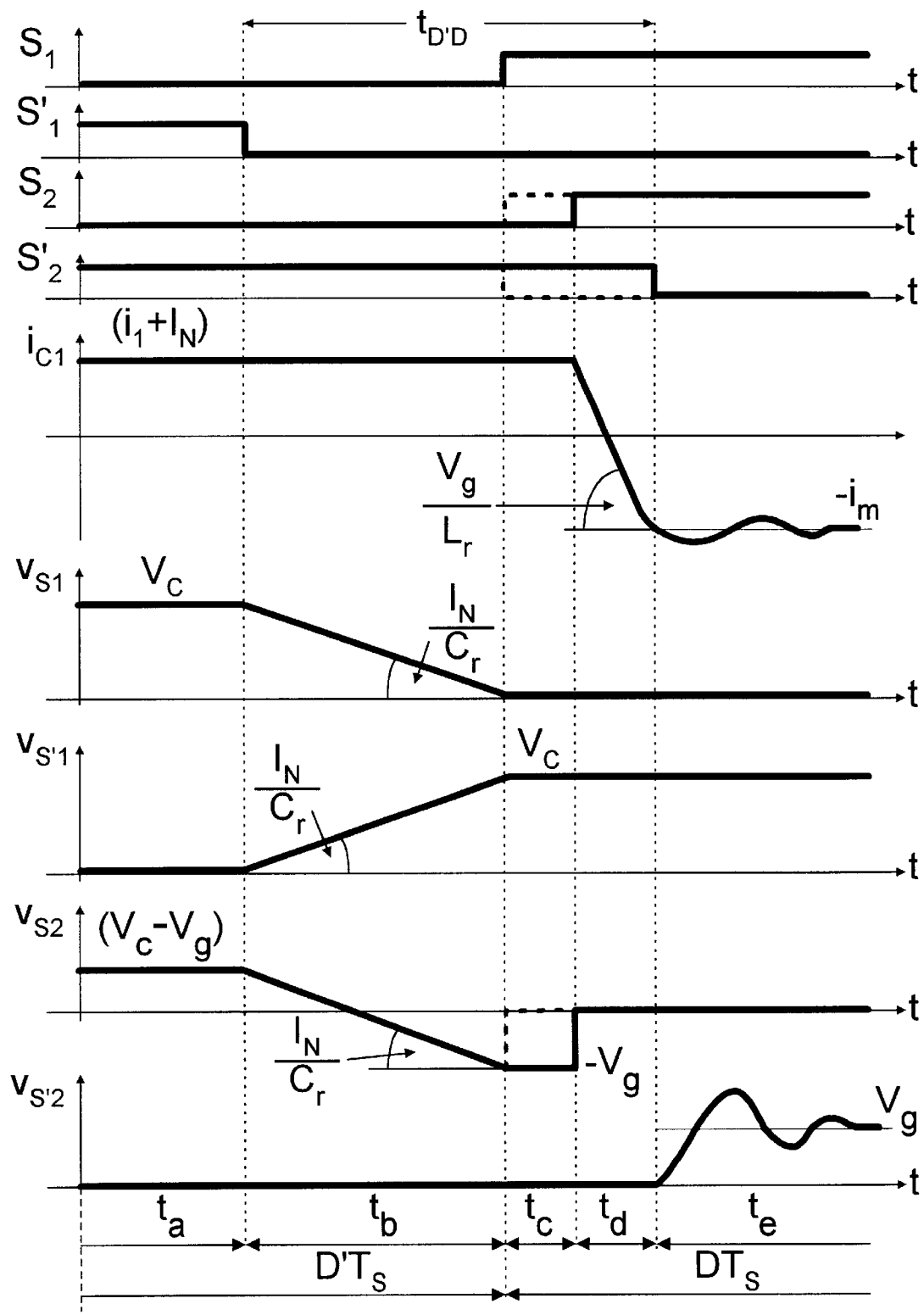

For this transition, the five circuit models are shown in FIGS. 91(a–e), and the corresponding waveforms in FIG. 92. The five intervals in FIG. 92 correspond to the five circuits in FIGS. 91(a–e).

Interval $t_a$

This interval, which corresponds to the equivalent circuit in FIG. 91a represents the $D'T_S$ interval just before the transition starts. The corresponding waveforms are shown in FIG. 92. $S_1$ and $S_2$ are OFF and $S'_1$ and $S'_2$ are ON. This interval ends and the D' to D transition is initiated when $S'_1$ is turned OFF.

Interval $t_b$

The same description of operation applies as for the converter without resonant inductor and with VBS output switch as explained earlier with reference to linear discharge interval $t_b$ of FIG. 86b.

Interval $t_c$

The same description of operation applies as for interval $t_c$ of FIG. 86b, including that this interval should be eliminated by proper switching time control since it is unproductive.

Interval $t_d$

This current-reversal subinterval starts with input capacitor current $i_{C1}=i_1+I_N$, when output switch $S_2$ is turned ON.

The input capacitor current reduces linearly at a constant rate equal to $V_g/L_r$ as seen in $i_{C1}$ waveform in FIG. 92. At certain moment during this interval, it becomes zero, then reverses the direction afterwards and reaches the steady-state current level ($-i_m$). When that happens, the current of the body-diode of complementary output switch $S'_2$ becomes zero, hence body-diode turns OFF and switch $S'_2$ must be turned OFF. This completes D' to D transition and triggers same unwanted oscillations in steady-state interval $t_e$.

Interval $t_e$

Turning OFF of complementary output switch $S'_2$ forms the resonant circuit comprising resonant inductor $L_r$ and parasitic capacitor $C'_{S2}$ of complementary output switch $S'_2$. This resonant circuit facilitates the charging of this parasitic capacitance from its initial zero voltage to its final voltage $V_g$ in steady-state, through a series of unwanted oscillations. These oscillations can be damped and suppressed by use of the identical R-C snubber network used to suppress similar oscillations occurring after D to D' transition.

EXPERIMENTAL VERIFICATION

The four sets of experiments were conducted to confirm a number of novel lossless switching methods applicable to the new converter of FIG. 11a with CBS output switch and the new converter of FIG. 11b with VBS output switch and their isolated counterparts of FIG. 11d.

Non-isolated Converter Prototype

For non-isolated converter experiments the configuration of FIG. 40a was used and three breadboard prototypes of the nominal 50W, 10V output converter were built: one with the CBS output switch, another with VBS output switch and the third one with diode rectifiers for both output switch and complementary output switch. Input voltage was in the range of 13V to 40V depending on the type of the test employed. The switching frequency was fixed at 200 kHz. The following component values were used for the breadboard prototype:

$S_1$ and $S'_1$ were IRF3710 (100V/28 mΩ); $S_2$ and $S'_2$ were SUP70N06-14 (60V/14 mΩ) C=2×4.7 µF/100V; $C_1$=5×10 µF/50V; $C_2$=2200 µF/25V;

Separate inductors: $L_1$=200 µH; $L_m$=200 µH; $L_2$=50 µH; $L_r$=0.75 µH

Isolated Converter Prototype

The two prototypes of a practical off-line converter operating from a rectified AC line were built to test the lossless switching methods in the isolated switching converters: one with the CBS output switch (FIG. 60a) and another with VBS output switch (FIG. 59a). The input DC voltage from 210V to 450V is converted to an output DC voltage of 5V at a nominal power of 100W and operating at switching frequency of 200 kHz. The components with following values were used for the converters of FIG. 59a and FIG. 60a:

C=47 nF; $C_1$=1 µF; $C_2$=3×1200 µF; $S_1$→STU10NB80; $S'_1$→STP4NB80FP; $S_2$ & $S'_2$→STV160NF03L

Separate inductors: $L_1$=6 mH; $L_2$=4 µH

The isolation transformer with a 27:1 step-down turns ratio was built and leakage inductance also designated $L_r$ measured on the primary was $L_r$=27 µH.

EXPERIMENTS WITH CBS OUTPUT SWITCH

Non-isolated Converter with CBS Switch

Reduced Switching Losses in Non-isolated Converter

Figure 93A:
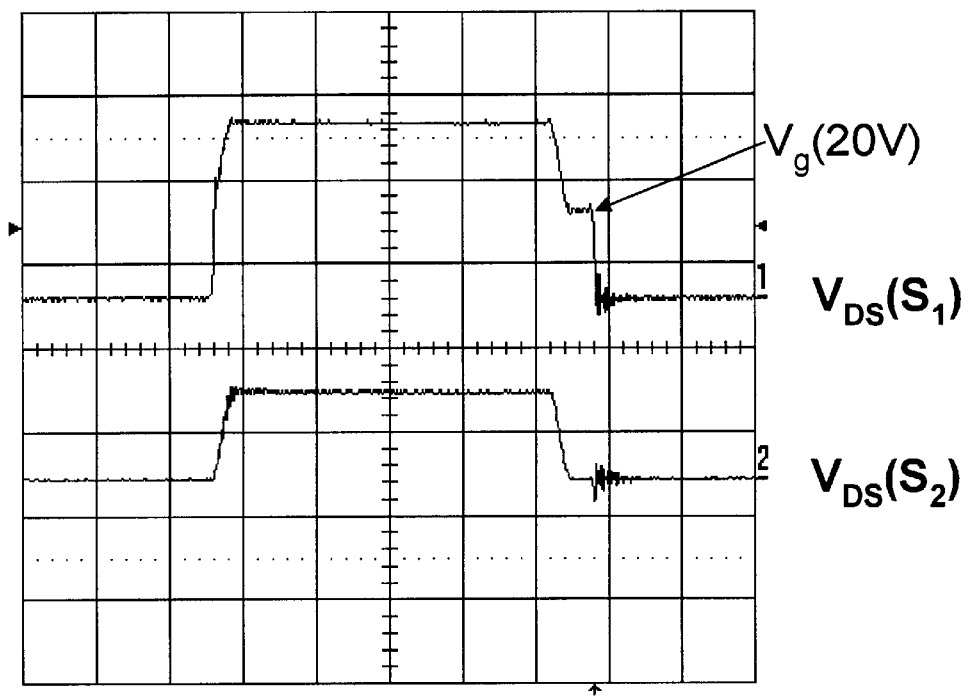
FIG. 93a shows oscilloscope trace of the measured voltage waveform on the input switch $S_1$ (top trace) whose trailing edge (D' to D transition) is clamped at the $V_g$ level of 20V at which time it must be hard-switched, and voltage waveform of output switch $S_2$ (bottom trace).
Figure 93B:
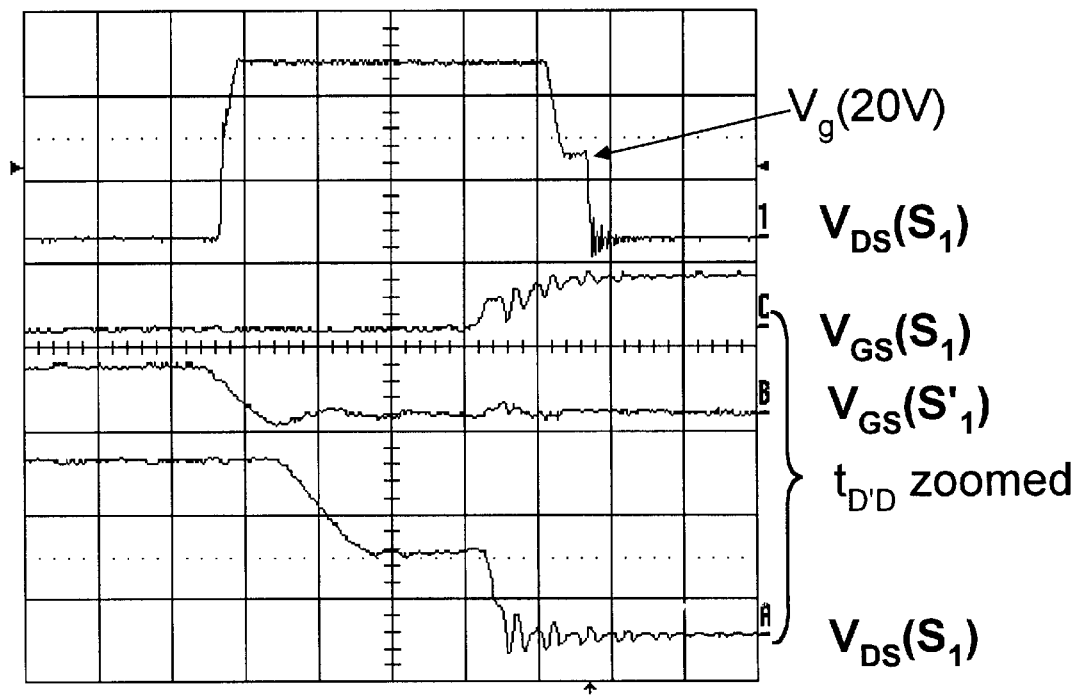
FIG. 93b shows the expanded view of the D' to D transition of FIG. 93a with expanded bottom three traces showing the gate drives of input switch and complementary input switch and the drain-to-source voltage of the input switch respectively.

For these experiments, $L_r$=0 in FIG. 40a. Converter is adjusted to operate at 50% duty ratio (hence 20V to 10V conversion) and input voltage was $V_g$=20V. FIG. 93a displays the Drain-to-Source voltages $V_{DS}$ on switches $S_1$ and $S_2$. The $V_{DS}$ of $S_1$ switch at 50% duty ratio is 40V. Note the two transitions of voltage $V_{DS}$ of input switch $S_1$. As predicted, the D to D' transition clearly displays the fast slope due to peak load current of the input switch $S_1$ at the beginning of D to D' transition until voltage level $V_g$ (20V on FIG. 93a) is reached at which point slope changes into a much slower slope determined by positive AC ripple current peak $I_P$ in switch $S'_1$. This transition results in lossless switching of $S'_1$ switch. The D' to D transition, however, shows discharge of the parasitic capacitor of the input switch $S_1$ and with the same slower slope due to the negative AC ripple current peak $I_N$ in switch $S'_1$, which is of the same magnitude as the positive AC ripple current peak $I_P$. Note, as predicted when voltage $V_{DS}$ on switch $S_1$ reduces to $V_g$ level, further discharge is prevented by the turn-ON of the body-diode of switch $S_2$ which would hold that level, hence the flat part at level $V_g$ of 20V in the waveform of FIG. 93a. This stalling condition, of course, can be deliberately terminated by turning $S_1$ switch ON (hard-switching) to result in only reduced but not eliminated switching losses of input switch $S_1$. Note however, that the output switch $S_2$ voltage is also discharged to zero as seen in FIG. 93a (bottom trace) and thus can be turned ON at zero voltage, hence no switching losses due to this switch, which is lossless switched all the way. FIG. 93b displays this D' to D transition with expended time base for better view of the transition and corresponding drive timing waveforms.

Figure 94A:
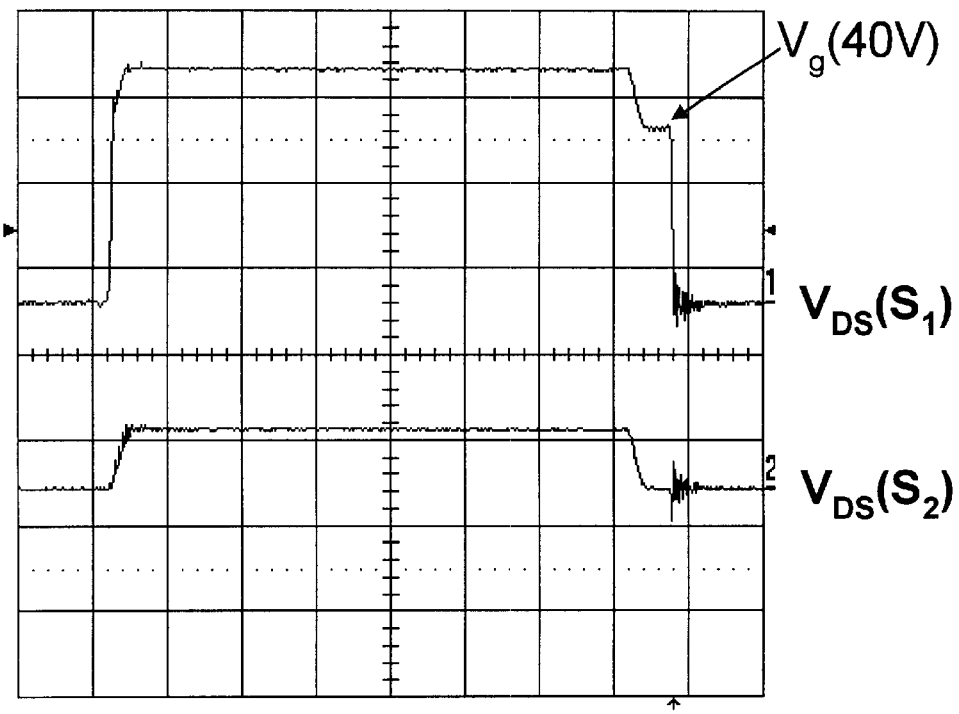
FIG. 94a shows the oscilloscope traces of the measured voltage waveforms on the $S_1$ and $S_2$ switches illustrating that for higher input voltage $V_g$=40V, the clamping voltage on $S_1$ switch is 40V, thus increasing hard-switching losses.

This type of lossless switching is heavily dependent on the duty ratio operating point. For example, at duty ratio D=0.25, obtained for $V_g$=40V and $V_2$=10V, the waveforms of FIG. 94a are obtained. Note that the D' to D transition also results in the flat part of $v_{DS}$ voltage, which is once again at $V_g$ but this time at 40V level. This time, however, $v_{DS}$ drop is limited to the discharge from $V_C$=53.3V level down to 40V at which point hard-switching is initiated. Thus, at low duty ratio, this D' to D transition will result in minimal reduction of the losses compared to fully hard-switching at $V_C$=53 .3V. Of course, the D to D' transition still enables lossless switching of switch $S'_1$.

Figure 94B:
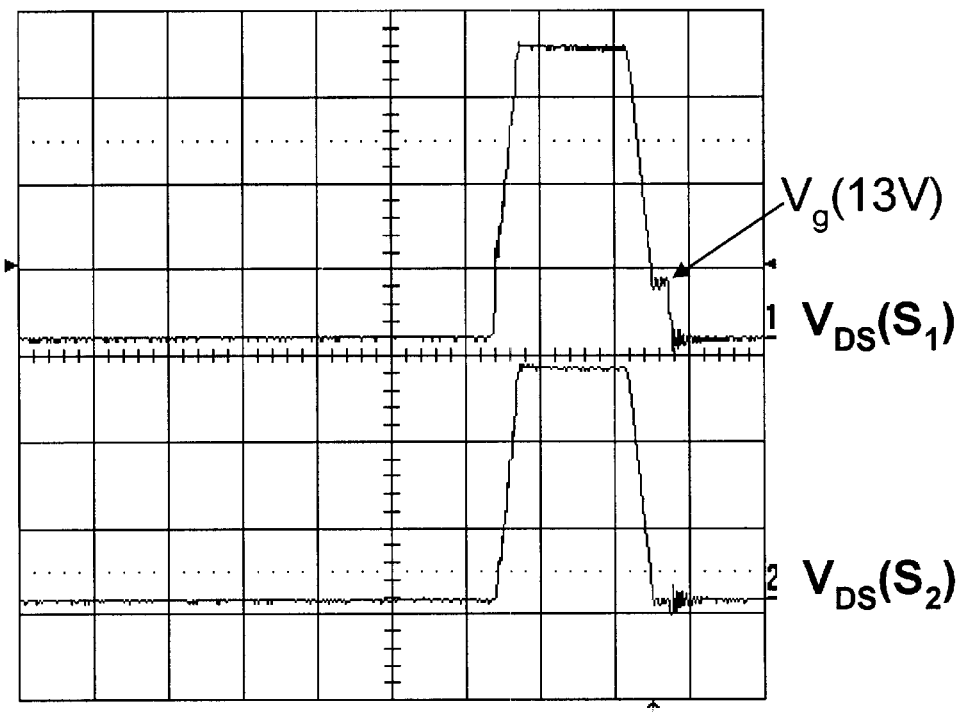
FIG. 94b shows the oscilloscope traces of the measured voltage waveforms on the $S_1$ and $S_2$ switches illustrating that for lower input voltage $V_g$=13V, the clamping voltage on $S_1$ switch is 13V, thus reducing substantially hard-switching losses.

On the other hand, operation at duty ratio D higher than D=0.5, such as D=0.8 as displayed in FIG. 94b, will result only in small part of total energy stored on parasitic capacitance of the input switch $S_1$ being dissipated, and most part recovered. In this case, input voltage was changed to 13V to result in D=0.8 for 10V output. Note, how this time D' to D transition results in the lossless switching all the way down to 13V level, from the total $V_{DS}$ voltage of input switch of $V_{DS}=V_g/(1-D)$=65V for D=0.8. Hence only the fraction given by $(13V/65V)^2$=0.04 or 4% of the original hard-switched loss remains. Hence, 25 times reduction of the hard-switching losses on this input switch $S_1$ at D' to D transition is accomplished. For all practical purposes, this is sufficient and may, in fact, be considered as though the complete elimination of the switching losses is in effect. For example, the original hard-switching losses of say, 200 mW, would be reduced to only 8 mW, which are truly negligible.

Figure 95:
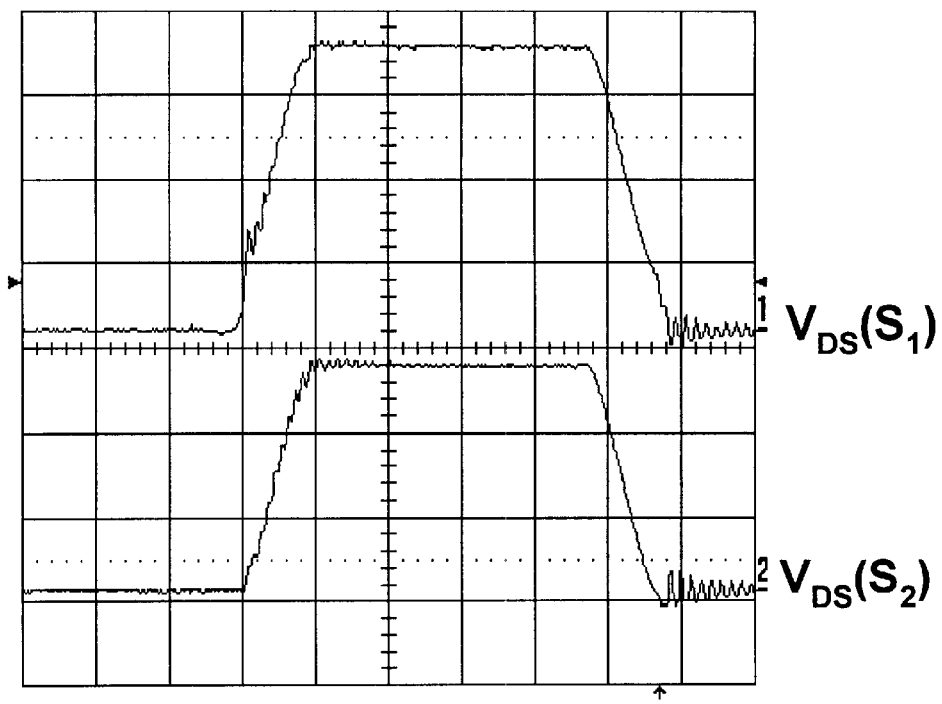
FIG. 95 shows the same waveforms as in FIG. 94b on a 2.5 times larger time scale, but after the timing is adjusted so that the flat part in trailing edge of the voltage on $S_1$ switch disappears.

This is further bolstered by the waveforms in FIG. 95, which displays the same waveforms as FIG. 94b, but with the scale expended 2.5 times so that the details of the transition could be seen better. This time, however, another change is made. The switch $S_1$ is turned ON at exactly the right time (as soon as body-diode of $S_2$ switch was turned ON) to eliminate the flat portion of the waveform, thus resulting in seemingly smooth D' to D transition in FIG. 95, but, in fact, still hard-switching for last 13V as seen by change of the discharge slope at 13V level.

Lossless Switching in Non-isolated Converter (Using Resonant Inductor)

Figure 96:
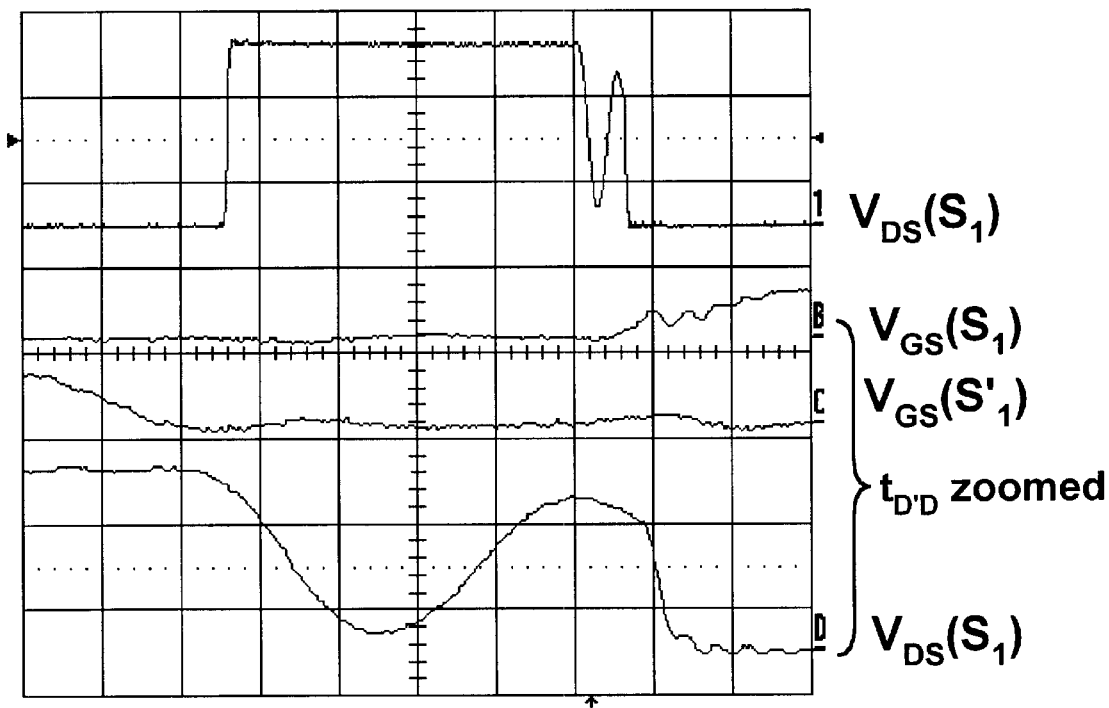
FIG. 96 illustrates the effect of the addition of the resonant inductor $L_r$=0.75 μH and shows oscilloscope trace of the voltage on input switch $S_1$ (top trace) for $V_g$=20V when the turn-ON of that switch is delayed too much so that the oscillations take place and the bottom three traces are expanded views of the D' to D transition depicting gate drives of input switch and complementary input switch and the voltage on input switch.

Next a series of experiments were made to demonstrate that the improvement of the lossless switching was made possible by utilizing additional resonant inductor $L_r$=0.75 µH in series with input capacitor in order to help D' to D transition and to accomplish the lossless switching at zero voltage level. Without resonant inductor, the converter operating at D=0.5 would clamp the voltage on input switch at $V_g$=20V. However, with resonant inductor, the resonant discharge oscillation on the input switch voltage will take place as seen in FIG. 96 and will reduce the input switch voltage well below 20V, i.e., close to zero. This illustrates the Case 2 of FIG. 52b with two resonant current discharge components.

FIG. 96 illustrates the consequences of not turning-ON the input switch $S_1$ at the lowest voltage on switch $S_1$, thus allowing the resonance between the resonant inductor $L_r$ and parasitic capacitances of input switch $S_1$ and complementary input switch $S'_1$ to continue beyond the first minimum as seen in sinusoidal oscillations of the D' to D transition (top trace) and in expanded view of that transition (bottom trace). The timing of turning ON the input switch $S_1$ is thus important not to be delayed beyond some particular instant. For example, if $S_1$ were to be turned ON when the first positive peak of the oscillation occurs at 30V in FIG. 96, almost the same losses as in hard-switched case would occur. However, if $S_1$ is turned ON at the lowest voltage on $S_1$ at 5V in FIG. 96 (negative peak of oscillation), hard-switching losses would become negligible.

Figure 97:
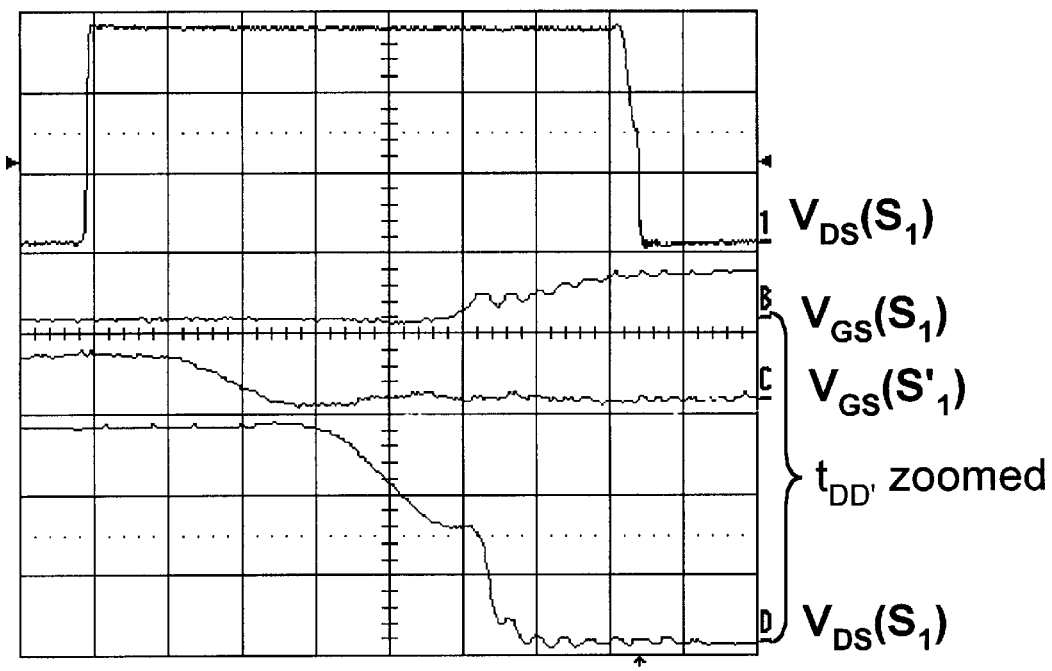
FIG. 97 illustrates the operation at low duty ratio, such as D=0.25, $V_g$=40V here, in which bottom three traces are enlarged traces of the D' to D transition.

The operation is now moved to low duty ratio D=0.25, by changing the input voltage to 40V with still 10V output voltage to demonstrate the dependence of this method on operating duty ratio D. Note from FIG. 97 that at lower duty ratio, the effectiveness of the resonant inductor is also reduced, since the resonant discharge is now limited to the voltage level which is at almost 50% of the total voltage on input switch $S_1$ (hence 25% of the hard-switching loss). Nevertheless even at low duty ratio of 0.25, the reduction to 75% of hard-switching loss is accomplished, as compared to reduction of 44% in case no resonant inductor was used. Of course, the full comparison would have to include the losses of the added resonant inductor.

Lossless Switching with Resonant Inductor and Output Diodes

This experiment demonstrates the Case 4 of FIG. 55b with only one resonant current component present and its effectiveness at low to moderate input DC voltages of $V_g$=20V to $V_g$=50V. This experiment is also conducted to verify that the lossless switching to zero-voltage could be obtained even for low duty ratio, depending on the values of the characteristic resistance $R_0$ of the resonant circuit, auxiliary capacitor AC ripple current $I_N$, and the input voltage $V_g$. The switch implementation to accomplish this requires only the proper drive timing of the input switch and complementary input switch, which need to be the MOSFET-like CBS switches, whereas the output switch and output complementary switch could be even simple single-quadrant diode rectifiers, whose conduction is forced by the circuit operation. The unique feature is that all four switching devices are turning ON at zero voltage with zero switching losses for a wide operating range which includes even low duty ratio, such as D=0.25 as in FIG. 98a or lower. Of, course, MOSFET implementation would still be preferred in low voltage applications to reduce the conduction losses of the output rectifier diodes. Although FIG. 98a displays these experimental waveforms for non-isolated converter, the same benefits were also verified experimentally for isolated counterpart. Top trace shows the voltage on the input switch $S_1$, middle trace shows the voltage on the output switch $S_2$ (diode current rectifier $CR_2$), and the bottom trace shows the voltage of the complementary output switch $S'_2$ (diode current rectifier $CR'_2$).

Figure 98A:
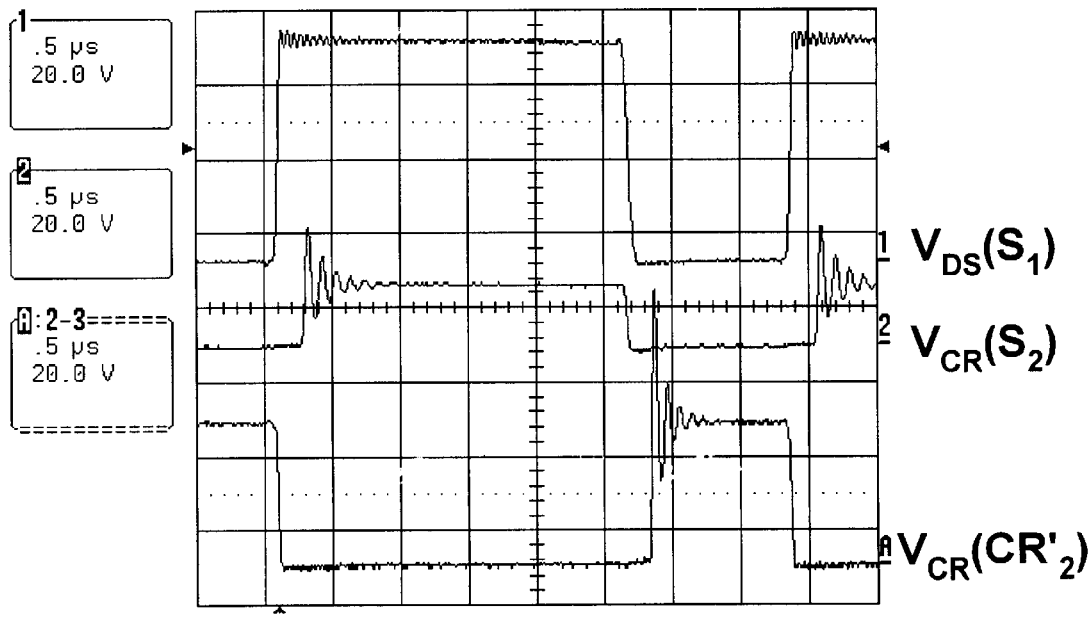
FIG. 98a illustrates the lossless switching operation of the converter in FIG. 55a with current rectifiers (diodes). FIG.
Figure 98B:
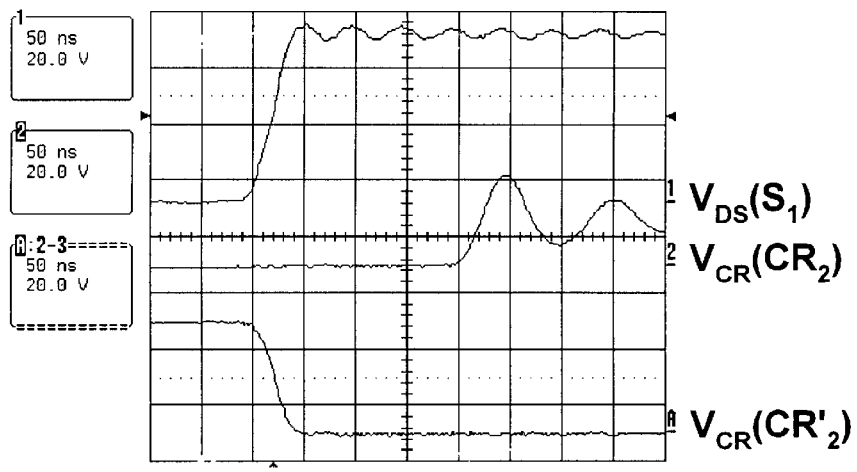
Figure 98C:
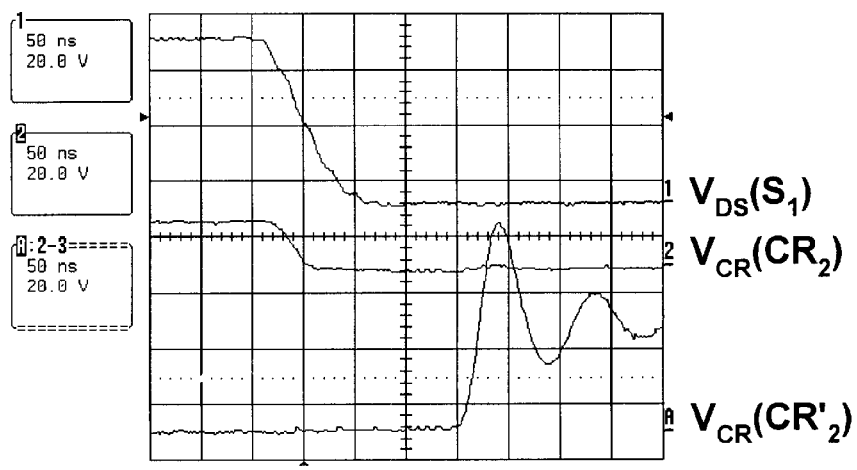
Figure 98D:
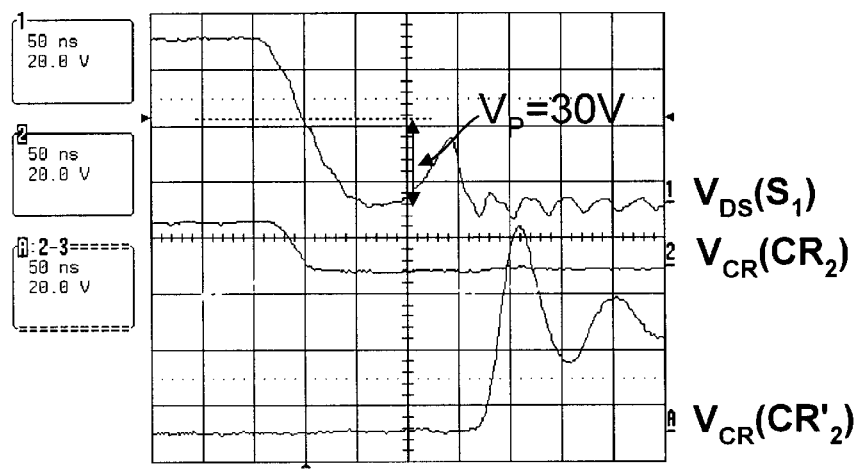
FIG. 98d displays the same D' to D transition of FIG. 98a but when turn-ON of input switch is delayed to highlight the resonant oscillations.

FIG. 98b shows the expanded view of D to D' transition, and FIG. 98c shows the expended view of the D' to D transition of FIG. 98a. The converter was operated at 260 kHz, which resulted in $I_N$=3A. The characteristic resistance $R_0$ is calculated to be $R_0$=$(L_r/C_{S1})^{1/2}$=15Ω, for $L_r$=0.75 µH and $C_{S1}$=3.2 nF. Hence, predicted resonant voltage peak is $V_P$=$I_N$×$R_0$=45V. FIG. 82d displays the D' to D transition when turn-ON of input switch $S_1$ is delayed to show that the peak of the resonant voltage oscillation is sufficient to reduce the input switch voltage to zero even at low duty ratio of D=0.25. Note from FIG. 98d that $V_P$=30V is measured from time when voltage on output switch rectifier becomes zero. The discrepancy with 45V predicted value is due to the fact that the parasitic capacitance of the output switch diode rectifier delays turn-ON of output switch diode rectifier and reduces the effectiveness of lossless switching as discussed and shown in FIG. 63b.

Isolated Converter with CBS Switch

Lossless Switching in Isolated Converter (with Leakage Inductance)

For higher input DC voltages, such as $V_g$=300V or higher, the previous method with one resonant current component is not adequate. Thus, the method with two resonant current components of FIG. 52b and Case 2 is employed and here experimentally verified. Note how in this case the output switch $S_2$ is turned ON at the same instant when the complementary input switch $S'_1$ is turned OFF to initiate resonant discharge with two current components.

Figure 99A:
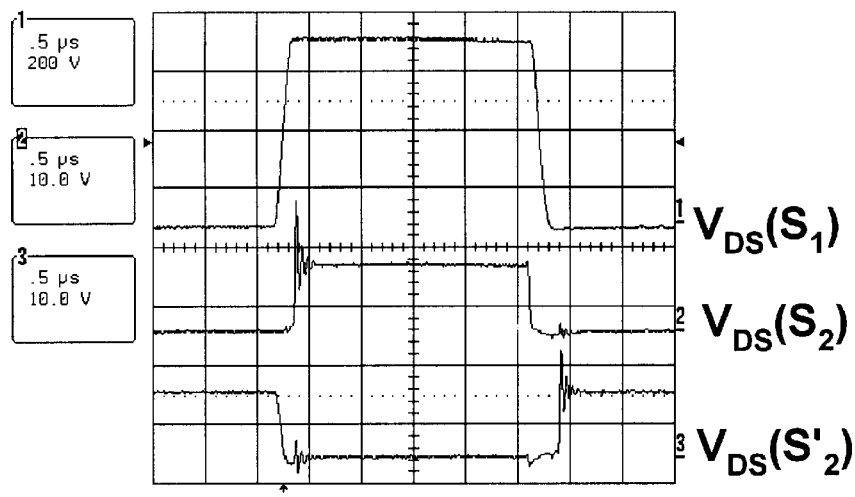
FIG. 99a displays the measured waveforms on a 300V to 5V converter with two resonant current components.
Figure 99B:
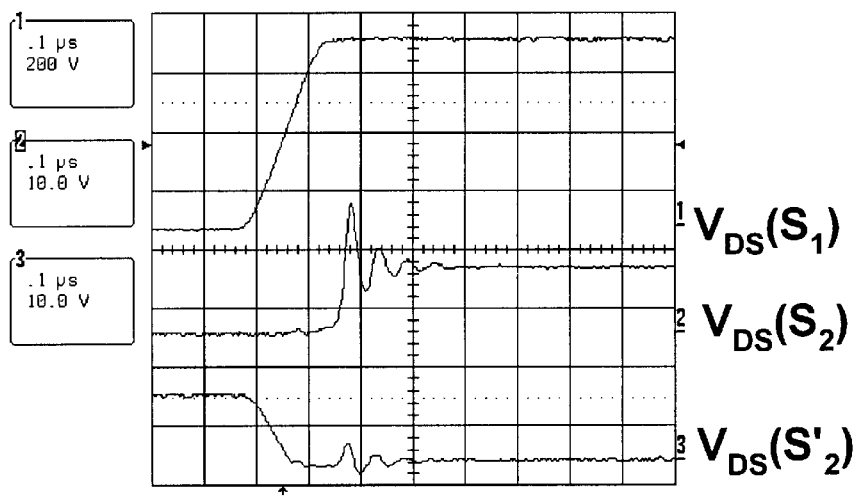
Figure 99C:
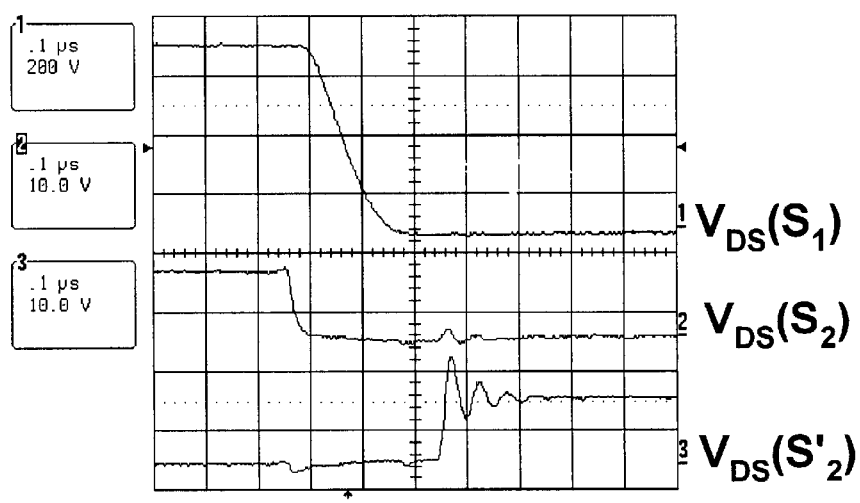

The experimental isolated converter with CBS switch is operated with 300V input DC voltage, 27:1 step-down isolation transformer turns ratio and at approximately D=0.5 duty ratio. Its lossless switching performance is modeled with its equivalent circuit of non-isolated counter-part of FIG. 60a and the waveforms of FIG. 53a displaying the case for D=0.5, which predicts the complete discharge of the voltage of input switch to zero voltage. This is confirmed by the experimental waveforms of FIG. 99a in which the top trace is the voltage on input switch, middle trace is the voltage on output switch and bottom trace is the voltage on complementary output switch. FIG. 99b displays the expanded view of the D to D' transition. The expanded view of the D' to D transition in FIG. 99c clearly shows the complete discharge of the voltage on input switch to zero at which point it can be turned ON with zero voltage across it.

Figure 100:
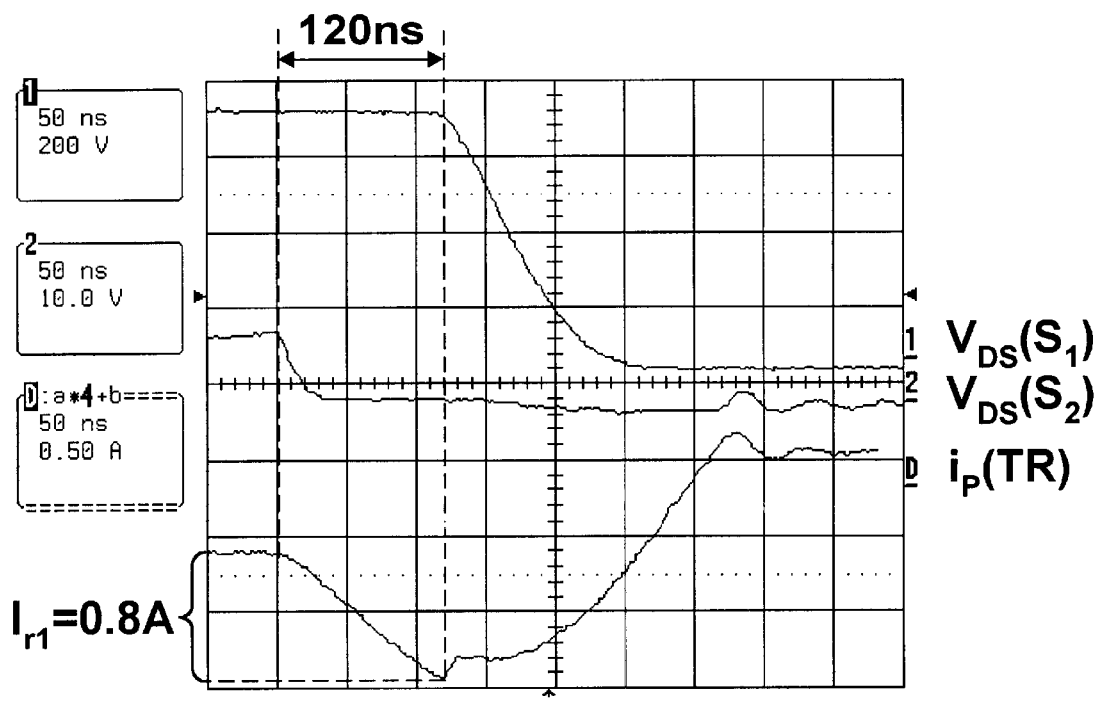
FIG. 100 displays the measured waveforms on a high input voltage converter with three resonant current components.

In some high input DC voltage applications, the above 2 resonant current components are not enough to provide sufficient discharge to reduce input switch voltage to zero level. In that case, the Case 1 of FIG. 49b with three resonant current components can be implemented, as illustrated by experimental waveforms of FIG. 100. First trace represents the drain-to-source voltage on input switch $S_1$, middle trace is the drain-to-source voltage on output switch $S_2$ and bottom trace is the current in the transformer primary. Note from the waveforms how the output switch $S_2$ is turned ON first (voltage $v_{S2}$ reduced to zero) before the complementary input switch $S'_1$ is turned OFF (voltage on $S_1$ switch started dropping). Notice how during that time of 120 ns, the current in the complementary input switch is producing the peak resonant current component $I_{r1}$=0.8A. The top trace clearly demonstrates the discharge of voltage on input switch from 675V all the way to zero voltage.

EXPERIMENTS WITH VBS OUTPUT SWITCH

Two prototypes were built to verify the performance of the converter with VBS output switch:

1. Lossless switching converter of FIG. 43a with no galvanic isolation and with two-MOSFET implementation of the four-quadrant Voltage Bidirectional Switch.
2. Lossless switching isolated switching converter of FIG. 59a with galvanic isolation and with two-MOSFET implementation of the four-quadrant Voltage Bidirectional Switch.

A number of tests were made to verify the four types of the lossless switching mechanisms unique to this converter with VBS output switch as described in detail in specifications, such as:

1. Symmetrical lossless switching of the non-isolated converter of FIG. 43a;
2. Asymmetrical lossless switching of the non-isolated converter of FIG. 43a;
3. Lossless switching of the non-isolated converter including additional resonant inductor of FIG. 57a;
4. Lossless switching in the isolated converter of FIG. 59a.

Non-isolated Converter with VBS Switch

The same prototype of the non-isolated switching converter of FIG. 43a for a nominal 50W, 10V output was used but with VBS output switch to further test novel lossless switching methods.

Symmetrical Lossless Switching

Figure 101:
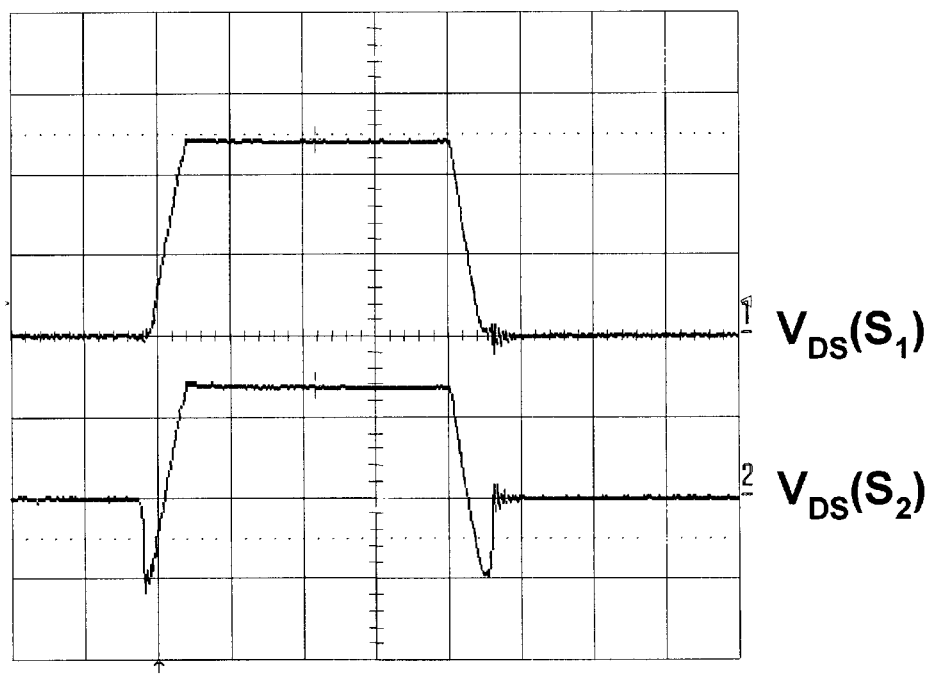
FIG. 101 shows oscilloscope traces of symmetrical lossless switching waveforms of the voltage of the input switch (top trace) and the voltage of the four-quadrant output switch (bottom trace) at 200 kHz switching frequency.

First the timing of switching drives is adjusted so that a symmetrical lossless switching case is obtained, that is for D to D' transition, the output switch $S_2$ is turned OFF before input switch $S_1$ is turned OFF as described by waveforms of FIG. 66c. In FIG. 101, the top trace shows the measured waveform of the voltage of the input switch, and the bottom trace the voltage of the output switch $S_2$ at 200 kHz which exhibit the distinct symmetrical behavior for both switches as seen from the symmetrical leading and trailing edges in the voltage waveforms. As seen in FIG. 101, the voltage across the input switch $S_1$ falls completely to zero thus enabling difficult to achieve zero voltage switching during D' to D transition. Additional experiments were conducting at other operating points and symmetrical lossless switching waveforms were observed, confirming zero voltage switching of input switch $S_1$ at all operating points.

Note also the distinct negative voltage peaks of approximately 20V across the VBS output switch $S_2$ in FIG. 101, which corresponds to input DC voltage of $V_g$=20V as predicted by the analysis. In addition, the D to D' transition clearly shows the two distinct subintervals in the voltage waveform across output switch $S_2$: first the very fast voltage drop with negative slope interval, followed by much slower voltage rise with positive slope due to AC ripple currents only. Note also how the voltage waveform transition at the edges are rounded and smooth even at 200 kHz switching frequency and free of usually high frequency ringing and spike noise associated with hard-switching. The efficiency measured on prototype was 95.5%.

Asymmetrical Lossless Switching

Figure 102:
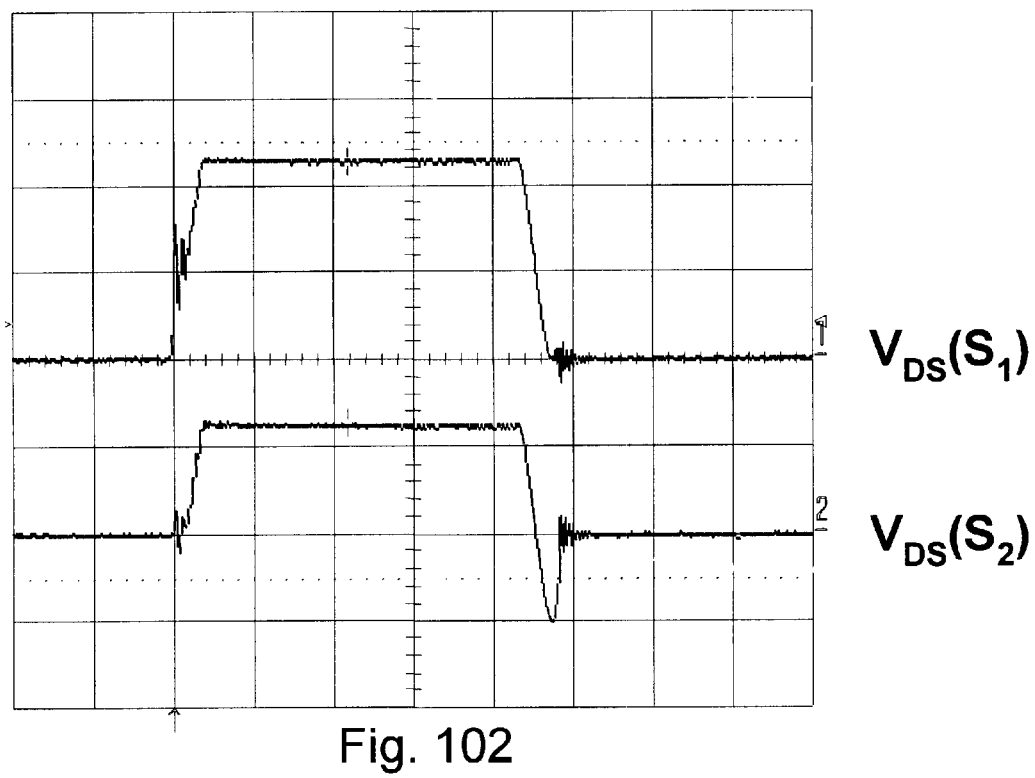
FIG. 102 shows oscilloscope traces of asymmetrical lossless switching waveforms of the voltage of the input switch (top trace) and the voltage of the four-quadrant output switch (bottom trace) at 200 kHz switching frequency.

Now the timing of switching drives is modified so that an asymmetrical lossless switching case is obtained. For D to D' transition, the input switch $S_1$ is now turned OFF before output switch $S_2$ is turned OFF as shown by waveforms of FIG. 65c. The drive timing for the D' to D transition is the same as in the symmetrical lossless switching case, i.e., it is initiated by turning OFF complementary input switch $S'_1$ first. In FIG. 102, the top trace shows the waveform of the voltage of the input switch $S_1$, and the bottom trace the voltage of the output switch $S_2$ at the 200 kHz switching frequency. Note the asymmetrical shape of the voltage waveform on the output switch $S_2$, due to the absence of the negative voltage peak in the D to D' transition which is present in symmetrical lossless switching case. In addition, the voltage of input switch $S_1$ during D to D' transition has two distinct slopes, which further brings asymmetry to the waveforms of FIG. 102. Note, however, that the trailing edge slope of the input switch $S_1$ voltage during D' to D transition is the same as in symmetrical case (no abrupt change in the trailing edge slope to indicate hard-switching), thus resulting in zero voltage switching and zero switching losses of the input switch at any operating point. In fact, the predicted zero voltage switching of complementary input switch during D to D' transition is also confirmed by experiments, leaving only output switch hard-switched during D' to D transition, with hard-switching taking place at $-V_g$ voltage level.

Asymmetrical Lossless Switching with Resonant Inductor

Figure 103:
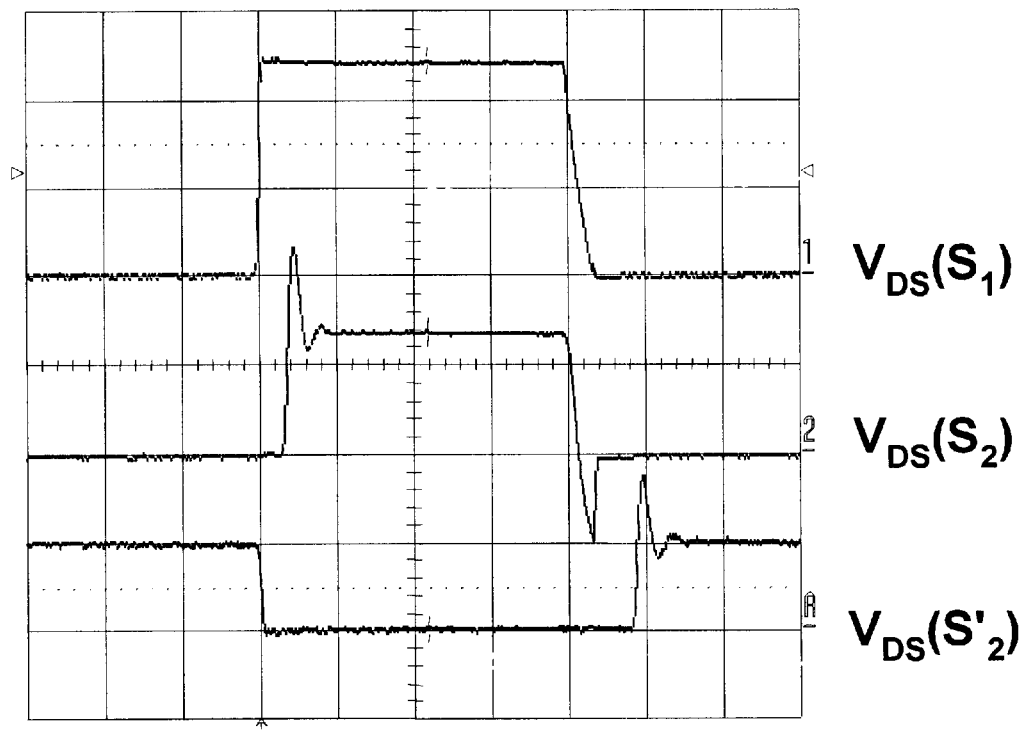
FIG. 103 illustrates the case of non-isolated converter with VBS output switch using additional resonant inductor and shows oscilloscope traces of the lossless switching waveforms of the voltage of the input switch (top trace), the voltage of the four-quadrant output switch (middle trace), and the voltage of the complementary output switch $S'_2$ at 200 kHz switching frequency.

The resonant inductor $L_r$ is now added in series with input capacitor to the non-isolated converter and the same drive timing used as in asymmetrical lossless switching. Note that the asymmetrical shape of the output switch $S_2$ voltage waveform is obtained as seen in FIG. 103. However, the two distinct slopes of the leading edge voltage transition of input switch $S_1$ during D to D' transition as in FIG. 102 have been now replaced with a single fast slope of FIG. 103 when resonant inductor $L_r$ is present. Note also ringing voltage on the output switch due to presence of the resonant inductor. The D' to D transition results in a same single slope and a negative voltage peak as in asymmetrical lossless switching without resonant inductor.

Isolated Converter with VBS Switch

Lossless Switching with Leakage Inductance

Figure 104A:
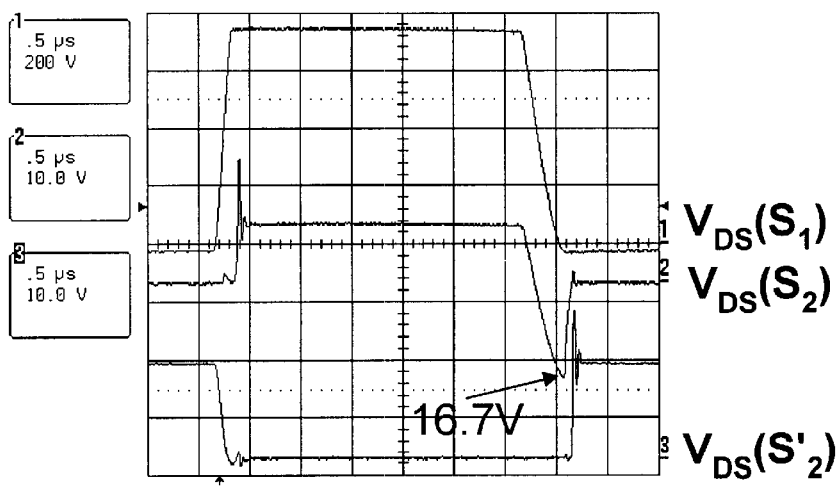
FIG. 104a illustrates the case of an isolated converter with four-quadrant VBS output switch and shows the lossless switching voltage waveforms of the input switch (top trace), the voltage of the four-quadrant output switch (middle trace) displaying −16.7V at which level output switch is turned ON, and the voltage of the complementary output switch $S'_2$ (bottom trace) at 450V input voltage.
Figure 104B:
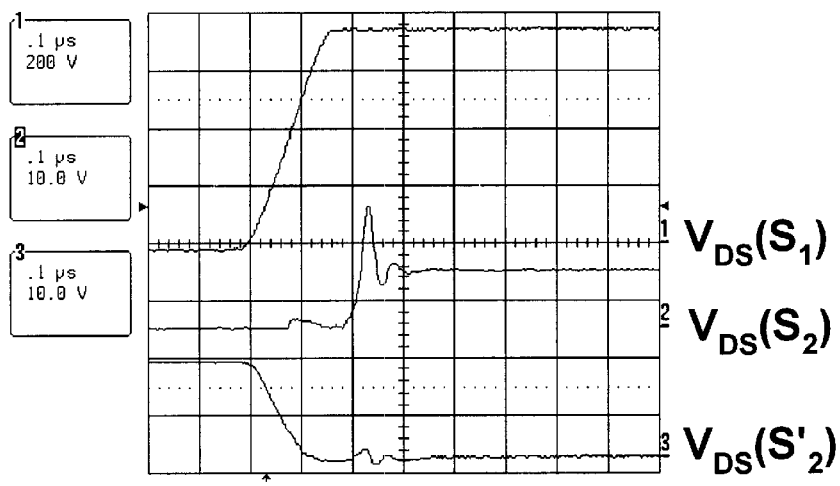
FIG. 104b illustrates an expanded view of the waveforms for D to D' transition of FIG. 104a and FIG. 104c is an expanded view of the waveforms for D' to D transition in FIG. 104a confirming the lossless switching transition down to zero volts of the input switch for $V_g$=450V.
Figure 104C:
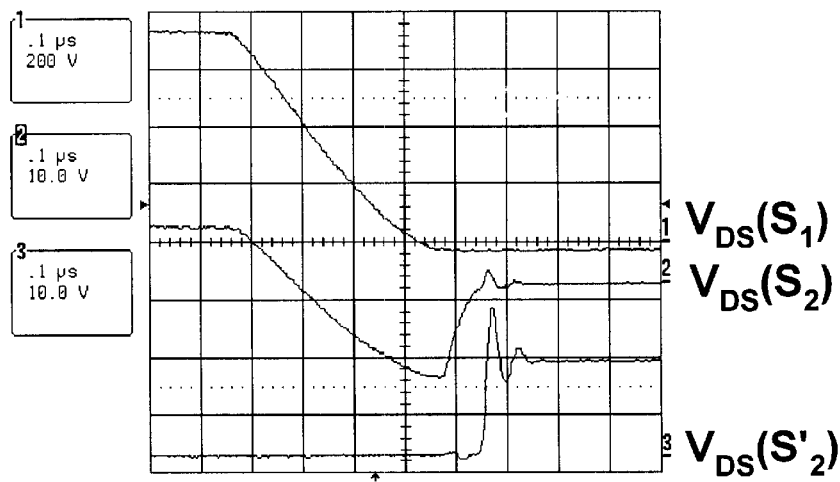

The correct drive timing for the isolated converter case is the same as in the asymmetrical lossless switching of non-isolated converter with resonant inductor. Here the role of resonant inductor is played by the isolation transformer's built-in leakage inductance. Thus, D to D' transition is initiated by turning OFF the input switch $S_1$. The lossless switching performance of the isolated switching converter is displayed in FIG. 104a for the operation with 450V DC input voltage. The top trace in FIG. 104a represents the drain-to-source voltage of the input switch $S_1$, the middle trace represents the drain-to-source voltage of the output switch $S_2$, and the bottom trace represents the drain-to-source voltage of the complementary output switch $S'_2$. The overall appearance of the voltage waveforms on input switch and output switch resembles the corresponding waveforms in the asymmetrical lossless switching in non-isolated converter with resonant inductor. The input switch voltage is reduced to zero and the switch is turned ON at zero voltage resulting in zero switching losses during D' to D transition. Note also the negative voltage peak of approximately 16.7V at the output switch in accordance to equation (45) for $V_g$=450V and n=27. The output switch $S_2$ is the only one which is turned ON with hard-switching losses during D' to D transition. However, as seen from FIG. 104a, this negative voltage peak is only approximately 16.7V compared to 450V if the hard-switching were to remain on the primary side with $V_g$=450V. The parasitic capacitance of the low voltage output devices (30V blocking voltage in this case) is $C_{S2}$=2950 pF. Since the hard switched voltage is also very low (16.7V) power loss is equal to $P_L=\frac{1}{2}C_{S2}V_B^2 f_S$=82 mW and practically negligible. This confirms the importance of having the lossless switching of the high voltage switching devices on the high voltage primary side, and relative insignificance of the switching losses due to hard-switching at low voltages of the output switch on the low voltage secondary side.

If the hard-switching were taking place on the high voltage primary side at voltage level of $V_g$=450V, as in reduced switching loss case and for actual capacitances of switches, $C_{S1}$=350 pF and $C_{S'1}$=95 pF so $C_r$=445 pF the total switching losses calculated are $P_L$=9W, which is a factor of 9/0.082=110 times larger than when the hard-switching losses are only on the secondary low voltage side output switch.

Efficiency Measurements

Figure 105:
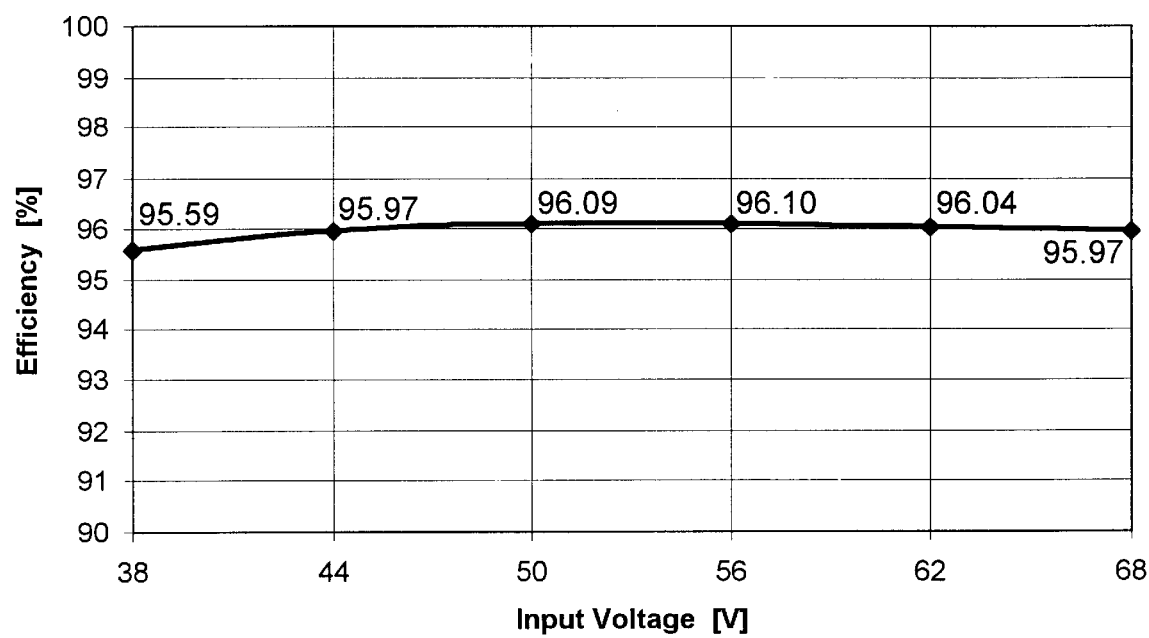
FIG. 105 illustrates the graph of the measured efficiency obtained on an experimental 50V to 5V isolated converter over the wide input voltage range from 38V to 68V input DC voltage.

Efficiency measurements made on a prototype of a 50V to 5V, 20A isolated converter with CBS output switch are shown in FIG. 105. High efficiency of over 86% over most of the wide 2:1 input voltage range is directly attributed to the efficacy of the novel lossless switching methods presented.

CONCLUSION

Past attempts to reduce the size and weight of the switching DC-to-DC converters resulted in an obvious push toward higher switching frequencies. While increase in switching frequency initially allowed smaller size of energy transfer and storage components, such as capacitors and magnetic components (inductors and transformers), the switching losses of semiconductor switching devices rose in direct proportion to switching frequency, thus resulting in diminishing returns. The prior-art soft-switching converters improved this trade-off by turning ON the critical high voltage switching devices at zero or near zero voltage, thus reducing the switching losses due to parasitic capacitances of the switching devices. However, to accomplish that, prior-art soft-switching converters either required inordinately large AC ripple currents (more than double its maximum DC load current), or a large leakage inductance of the isolation transformer (often enhanced by separate and large external resonant inductor) or other design constraints, causing additional losses so that the net loss reduction was quite lower than anticipated. Hence, a novel class of lossless switching converters is introduced with this invention, which insures the switching loss elimination without introduction of other efficiency loss mechanisms.

The hard-switching version of the present invention belongs to the Four-Switch Converter Class with four ideal four-quadrant switches. The simple hardware realizations with electronic semiconductor switching devices dictate the use of switches with either one-quadrant or at most two-quadrant characteristics, which still leads to 144 possible switching converter realizations. The simplest such hardware realization has controllable MOSFET transistors for both input switch and complementary input switch and passive diode rectifiers for both output switch and complementary output switch, which results in an inefficient operation when the simple hard-switching time control is implemented. Yet, just the replacement of the passive diode as the output switch with the controllable switching device of either CBS variety (for example single active MOSFET switch) or VBS variety (single MOSFET switch in series with the diode), leads together with the novel switching time control of all controllable switches to lossless switching performance: substantial efficiency improvements which enables simultaneous reduction in size. For comparison, the typical 90% efficiencies of the prior-art isolated soft-switching converters of comparable size and performance at low 5V voltage output is increased in the novel lossless isolated switching converter to above 96% over the wide input DC voltage operating range.

Although the particular embodiments of the novel invention have been described and illustrated herein, it is recognized that modifications may readily occur to those skilled in the art. Consequently, it is intended that the claims be interpreted to cover such modifications and equivalents thereof.

What is claimed is:

1. A lossless switching DC-to-DC converter for providing power from a DC voltage source connected between an input terminal and a common input terminal to a DC load connected between an output terminal and a common output terminal, said converter comprising:

(1) an input inductor connected at one end thereof to said input terminal;

(2) an output inductor connected at one end thereof to said output terminal;

(3) a middle inductor connected at one end thereof to said common input terminal and said common output terminal;

(4) a resonant inductor connected at one end thereof to a second end of said middle inductor;

(5) an input capacitor, having one end connected to a second end of said input inductor and second end of said input capacitor connected to a second end of said resonant inductor;

(6) an input switch with one end connected to said common input terminal and a second end of said input switch connected to said second end of said input inductor;

(7) an output switch with one end connected to said common output terminal and a second end of said output switch connected to said second end of said output inductor;

(8) a complementary output switch, having one end connected to said second end of said output inductor and a second end of said complementary output switch connected to said second end of said middle inductor;

(9) a branch comprising a complementary input switch and an auxiliary capacitor connected in series;

(10) switching time control means for providing a precise pattern of turning ON and turning OFF signals for said input switch, said complementary input switch, said output switch and said complementary output switch, with a referenced time interval $DT_S$ during which said input switch is turned ON and a complementary time interval $D'T_S = (1-D)T_S$ during which said input switch is turned OFF, where D is a variable and controllable duty ratio and D' is a complementary duty ratio within one complete switch operating cycle $T_S$;

(11) means for connecting the ends of said branch to said converter whereby during said complementary time intervals $D'T_S$ current through said branch is equal to the sum of current flowing into said one end of said input inductor and current flowing into said one end of said middle inductor reduced by current flowing out of said one end of said output inductor;

wherein no current flows through said branch during said referenced time interval $DT_S$, and only AC current flows through said branch during said complementary time interval $D'T_S$, wherein said input switch, said complementary input switch, said output switch, and said complementary output switch are semiconductor current bidirectional switching devices, capable of conducting the current in both directions while in an ON-state, and sustaining voltage in one direction, while in an OFF-state, and said semiconductor current bidirectional switching devices are modeled as comprising parallel connection of an ideal switch, a parasitic body-diode and a parasitic capacitance;

wherein a DC-to-DC voltage conversion ratio of said converter depends linearly on said operating duty ratio D;

wherein said switching time control means includes precise electronically controlling operation of said semiconductor current bidirectional switching devices whereby two transitions, first transition D to D' and second transition D' to D, are obtained during each successive switch operating cycle $T_S$ wherein said transition intervals are short compared to said switch operating cycle, and said switching time control means provides control signals for respective switches as follows:

said first transition D to D' is initiated by turning said input switch OFF and, when voltage on said complementary output switch is reduced to zero, said switching time control means provides control signal for complementary output switch to be turned ON at zero voltage for zero switching losses, and said first transition continues until the voltage on said complementary input switch reduces to zero, at which instant said switching time control means provides control signal for said complementary input switch to be also turned ON at zero voltage for zero switching losses, and said first transition continues until the current through the output switch is reduced to zero, making this the latest instant at which output switch must be turned OFF to complete said first transition D to D';

said second transition D' to D is initiated by first turning said output switch ON, intentionally before said complementary input switch is turned OFF, to boost the current in said resonant inductor by an additional magnitude which is inversely proportional to inductance of said resonant inductor, directly proportional to voltage difference of DC voltage of said auxiliary capacitor and DC voltage of said DC voltage source and directly proportional to this boost subinterval during which said output switch and said complementary input switch are both turned ON, and when said complementary input switch is turned OFF, the resonant discharge of parasitic capacitor across said input switch and simultaneous resonant charge of parasitic capacitor across said complementary input switch take place during this resonant subinterval in which the total resonant current is comprising three distinct current components, the first one a cosinusoidal resonant current component with said additional magnitude defined above, the second one a sinusoidal resonant current component whose magnitude is directly proportional to voltage difference of DC voltage of said auxiliary capacitor and DC voltage of said DC voltage source and inversely proportional to a characteristic impedance of resonant circuit which is equal to a square root of the ratio of inductance of said resonant inductor and capacitance of resonant capacitance equal to the sum of parasitic capacitors of said input switch and said complementary input switch, and the third one a cosinusoidal resonant current component whose magnitude is equal to initial current value in said resonant inductor at the instant when said output switch was turned ON, and at the instant when said parasitic capacitor of said input switch is fully discharged, said switching time control means provides a control signal for said input switch to be turned ON at zero voltage and with zero switching losses to complete said resonant subinterval, and said second transition continues with a current-reversal subinterval during which the input capacitor current is reversed from being equal to input inductor current to current flow in opposite direction with magnitude equal to middle inductor current at which instant the current through the complementary output switch is reduced to zero making this the latest instant at which complementary output switch must be turned OFF to complete said second transition D' to D;

wherein said resonant capacitance is significantly higher than capacitance of parasitic capacitors across said output switch and said complementary output switch, and whereby a lossless switching cycle is provided based on the precise pattern of the switch timing of said semiconductor current bidirectional switching devices by said switching time control means; during this lossless switching cycle, electrical charge is transferred between parasitic capacitors in a lossless manner, and during said second transition D' to D said output switch is turned ON as early as needed before said complementary input switch is turned OFF for sufficient additional energy storage in said resonant inductor to increase the peak resonant current in said resonant inductor, just enough to enable complete discharge of said parasitic capacitor of said input switch to zero volts and complete said second transition D' to D with substantially reduced switching losses and voltage stress on said semiconductor switching devices and increased efficiency of said converter with reduced electromagnetic interference, and said lossless switching is especially effective for DC-to-DC conversion when said duty ratio D is well below 0.5 and said DC voltage source is very high as in rectified utility AC line voltage, where prior-art soft-switching is ineffective.

2. Lossless switching converter as defined in claim 1, wherein said second transition D' to D is initiated by turning said complementary input switch OFF and simultaneously turning said output switch ON to start a resonant discharge of parasitic capacitor across said input switch and simultaneous resonant charge of a parasitic capacitor across said complementary input switch with a total resonant current comprising two distinct current components, said second one sinusoidal resonant current component and said third one cosinusoidal resonant current component, and, at the instant when a voltage of said parasitic capacitor of said input switch reaches the minimum value, said input switch is turned ON by said switching means at substantially reduced voltage and with substantially reduced switching losses completing said resonant subinterval and said second transition D' to D continues until the current through the complementary output switch is reduced to zero, making this the latest instant at which complementary output switch must be turned OFF to complete this current-reversal subinterval and said second transition D' to D, and whereby during said second transition D' to D energy already stored in said resonant inductor facilitates resonant discharge and voltage reduction of said parasitic capacitor of said input switch to complete said second transition D' to D with substantially reduced switching losses and voltage stress on said semiconductor switching devices and increased efficiency of said converter with reduced electromagnetic interference, and said lossless switching is especially effective for DC-to-DC conversion when said duty ratio D is in the middle of the operating range at and around 0.5, and said DC voltage source is very high as in rectified utility AC line voltage.

3. Lossless switching converter as defined in claim 1, wherein said second transition D' to D is initiated by turning said complementary input switch OFF to start a linear discharge of said parasitic capacitor across said input switch, and, at any time before a voltage across said input switch drops to the level of said DC voltage source, said output switch is turned ON to force a resonant discharge of said parasitic capacitor across said input switch with a total resonant current comprising two distinct current components, said second one sinusoidal resonant current component with magnitude equal to voltage difference of said input switch voltage present at the instant when said output switch is turned ON and the DC voltage of said DC voltage source, and said third one cosinusoidal resonant current component, and, at the instant when said voltage of said parasitic capacitor reaches the minimum value, said input switch is turned ON by said switching means at significantly reduced voltage and with significantly reduced switching losses completing said resonant subinterval and second transition D' to D continues until the current through said complementary output switch is reduced to zero making this the latest instant at which said complementary output switch must be turned OFF (could have been turned OFF any time before that instant since its body-diode was still conducting) to complete said current-reversal subinterval and said second transition D' to D, and whereby during said second transition D' to D, said complementary input switch and said output switch are both turned-OFF providing said linear discharge followed by said resonance discharge for further voltage reduction of said parasitic capacitor across said input switch, and said input switch and said output switch are turned ON at reduced voltages to complete said second transition D' to D with substantially reduced switching losses and voltage stress on said semiconductor switching devices and increased efficiency of said converter with reduced electromagnetic interference, and said lossless switching is especially effective for DC-to-DC conversion when said duty ratio D is either in the middle of the operating range or at duty ratios higher than 0.5, and said DC voltage source is very high as in rectified utility AC line voltage.

4. Lossless switching converter as defined in claim 1, wherein said second transition D' to D is initiated by turning said complementary input switch OFF to start a linear discharge of said parasitic capacitor across said input switch, and, when voltage of said input switch drops to a level of said DC voltage source, said output switch is turned ON at zero voltage with zero switching losses forcing a resonant discharge of said parasitic capacitor across said input switch with a resonant current comprising only said third one cosinusoidal resonant current component, and, at the instant when said voltage of said parasitic capacitor across said input switch reaches the minimum value, said input switch is turned ON by said switching time control means at a voltage lower than said DC voltage source level and with reduced switching losses completing said resonant subinterval and second transition D' to D continues until the current through the complementary output switch is reduced to zero making this the latest instant at which said complementary output switch must be turned OFF (could have been turned OFF any time before that instant since its body-diode was still conducting) to complete said current-reversal subinterval and said second transition D' to D, and whereby during said second transition D' to D said output switch is turned ON at zero voltage with zero switching losses and at the particular instant in time when its body-diode would naturally start to conduct, hence significantly reducing current conduction losses of said body-diode, and said input switch is turned ON at reduced voltage to complete said second transition D' to D with reduced switching losses and reduced voltage stress on said semiconductor switching devices and increased efficiency of said converter with reduced electromagnetic interference, and said lossless switching is especially effective when the product of said magnitude of said third one cosinusoidal resonant current component and said characteristic impedance is equal to said DC voltage source in which case said input switch is turned ON at zero voltage resulting in zero switching losses on all four said semiconductor current bidirectional switching devices.

5. Lossless switching converter as defined in claim 1, wherein said output switch and said complementary output switch are two-terminal current rectifier switches (diodes), which are in an ON or OFF state in response to said converter operating state and conditions caused by electronically controlled switching of said input and said complementary input switching devices;

wherein said switching time control means includes precise electronically controlling operation of said input switch and said complementary input switch whereby two transitions D to D' and D' to D are obtained during each successive switch operating cycle $T_S$, wherein said transition intervals are short compared to said switch operating cycle, and said switching time control means provides control signals for respective switches as follows:

said first transition D to D' is initiated by turning said input switch OFF and, when blocking voltage across said complementary output rectifier switch is reduced to zero, said complementary output rectifier switch starts to conduct, hence automatically is turned ON at zero voltage for zero switching losses, and said first transition continues until the voltage on said complementary input switch reduces to zero, at which instant said complementary input switch is turned ON by said switching time control means at zero voltage for zero switching losses while said output rectifier switch is turned OFF by reverse bias voltage applied by converter across said output rectifier switch, and wherein said second transition D' to D is initiated by turning said complementary input switch OFF to start linear discharge of said parasitic capacitor across said input switch, and, when a voltage across said input switch drops to the level of said DC voltage source, blocking voltage across said output rectifier switch is zero, hence said output rectifier switch is automatically turned ON with zero switching losses forcing a resonant discharge of said parasitic capacitor across said input switch with a resonant current comprising only of said third one cosinusoidal resonant current component, and, at the instant when said voltage of said parasitic capacitor across said input switch reaches the minimum value, said input switch is turned ON by said switching means at voltage reduced below said DC voltage source level and with reduced switching losses while said complementary output rectifier switch is by the blocking voltage automatically turned OFF to complete said second transition D' to D, and whereby control and drive circuitry for said output rectifier switch and said complementary output rectifier switch are obviated, thereby simplifying said converter's drive and control circuitry;

whereby during said second transition D' to D said output rectifier switch is automatically turned ON at zero voltage with zero switching losses, and said input switch is turned ON at reduced voltage to complete said second transition D' to D with reduced switching losses and voltage stress on said semiconductor devices and increased efficiency of said converter with reduced electromagnetic interference, and said lossless switching is especially effective when the product of said magnitude of said third one cosinusoidal resonant current component and said characteristic impedance is equal to said DC voltage source in which case said input switch is also turned ON at zero voltage resulting in zero switching losses on two said semiconductor current bidirectional switching devices and two said two-terminal current rectifier switches (diodes).

6. Lossless switching converter as defined in claim 1, wherein said resonant inductor has zero inductance, i.e., it is short-circuited, hence said second end of said input capacitor is connected to said second end of said middle inductor;

wherein said first transition D to D' is initiated by turning said input switch OFF to start linear discharge of said parasitic capacitance across said complementary input switch, and when voltage across said complementary output switch reduces to zero, this switch is turned ON by said switching time control means at zero voltage for zero switching losses, while the output switch is simultaneously turned OFF and the linear discharge of the parasitic capacitance of said complementary input switch continues but at reduced rate until the voltage across said complementary input switch reduces to zero at which instant the complementary input switch is turned ON with zero switching losses;

wherein said second transition D' to D is initiated by turning said complementary input switch OFF to start linear discharge of said parasitic capacitor across said input switch, and, when voltage across said input switch drops to the level of said DC voltage source, said input switch is turned ON by said switching time control means at reduced voltage and with reduced switching losses, and said output switch is by said switching time control means simultaneously turned ON with a voltage across said output switch zero and with zero switching losses, and at the same instant said complementary output switch is by said switching time control means turned OFF to complete said second transition D' to D.

7. Lossless switching converter as defined in claim 6, wherein said output switch and said complementary output switch are two-terminal current rectifier switches (diodes), which are in an ON or OFF state in response to said converter operating state and conditions caused by electronically controlled switching of said input and said complementary input switching devices;

wherein said switching time control means includes precise electronically controlling operation of said input switch and said complementary input switch whereby two said transitions D to D' and D' to D are obtained during each successive switch operating cycle $T_S$, wherein said transition intervals are short compared to said switch operating cycle, and said switching time control means provides control signals for respective switches as follows:

said first transition D to D' is initiated by turning said input switch OFF and, when blocking voltage across said complementary output rectifier switch is reduced to zero, said complementary output rectifier switch starts to conduct, hence automatically is turned ON at zero voltage for zero switching losses, and said first transition continues until the voltage on said complementary input switch reduces to zero, at which instant said complementary input switch is turned ON by said switching time control means at zero voltage for zero switching losses while said output rectifier switch is turned OFF by reverse bias voltage applied by converter across said output rectifier switch, and wherein said second transition D' to D is initiated by turning said complementary input switch OFF to start linear discharge of said parasitic capacitor across said input switch, and, when a voltage across said input switch drops to the level of said DC voltage source, blocking voltage across said output rectifier switch is zero, hence said output rectifier switch is automatically turned ON with zero switching losses, and at the same time said input switch is turned ON by said switching means at voltage reduced to said DC voltage source level and with reduced switching losses while said complementary output switch is by the blocking voltage automatically turned OFF for accomplishing a lossless switching cycle, and whereby control and drive circuitry for said output switch and said complementary output switch are obviated, thereby simplifying said converter's drive and control circuitry;

whereby during said second transition D' to D said output switch is automatically turned ON at zero voltage with zero switching losses, and said input switch is turned ON at reduced voltage to complete said second transition D' to D with reduced switching losses and voltage stress on said semiconductor switching devices and increased efficiency of said converter with reduced electromagnetic interference, and reduced switching losses are provided even without any resonant inductor.

8. A lossless switching DC-to-DC converter for providing power from a DC voltage source connected between an input terminal and a common input terminal to a DC load connected between an output terminal and a common output terminal, said converter comprising:

(1) an input inductor connected at one end thereof to said input terminal;
(2) an output inductor connected at one end thereof to said output terminal;
(3) a middle inductor connected at one end thereof to said common input terminal and said common output terminal;
(4) a resonant inductor connected at one end thereof to a second end of said middle inductor;
(5) an input capacitor, having one end connected to a second end of said input inductor and second end of said input capacitor connected to a second end of said resonant inductor;
(6) an input switch with one end connected to said common input terminal and a second end of said input switch connected to said second end of said input inductor;
(7) an output switch with one end connected to said common output terminal and a second end of said output switch connected to said second end of said output inductor;
(8) a complementary output switch, having one end connected to said second end of said output inductor and a second end of said complementary output switch connected to said second end of said middle inductor;
(9) a branch comprising a complementary input switch and an auxiliary capacitor connected in series;
(10) switching time control means for providing a precise pattern of turning ON and turning OFF signals for said input switch, said complementary input switch, said output switch and said complementary output switch, with a referenced time interval $DT_S$ during which said input switch is turned ON and a complementary time interval $D'T_S=(1-D)T_S$ during which said input switch is turned OFF, where D is a variable and controllable duty ratio and D' is a complementary duty ratio within one complete switch operating cycle $T_S$;
(11) means for connecting the ends of said branch to said converter whereby during said complementary time intervals $D'T_S$ current through said branch is equal to the sum of current flowing into said one end of said input inductor and current flowing into said one end of said middle inductor reduced by current flowing out of said one end of said output inductor;
  wherein no current flows through said branch during said referenced time interval $DT_S$, and only AC current flows through said branch during said complementary time interval $D'T_S$;
  wherein said input switch, said complementary input switch, and said complementary output switch are semiconductor current bidirectional switching devices, capable of conducting the current in both directions while in an ON-state, and sustaining voltage in one direction, while in an OFF-state, and said semiconductor current bidirectional switching devices are modeled as the parallel connection of an ideal switch, a parasitic body-diode and a parasitic capacitance;
  wherein said output switch is a semiconductor voltage bidirectional switching device, capable of conducting the current while in an ON-state, and sustaining voltage in both directions, while in an OFF-state, and said semiconductor voltage bidirectional switching device is a composite switch whose model consists of the parallel connection of an ideal switch, and an equivalent parasitic capacitance;
  wherein a DC-to-DC voltage conversion ratio of said converter depends linearly on said operating duty ratio D;
  wherein said switching time control means includes precise electronically controlling operation of said semiconductor current bi-directional and voltage bi-directional switching devices whereby two transitions, first transition D to D' and second transition D' to D, are obtained during each successive switch operating cycle $T_S$ wherein said transition intervals are short compared to said switch operating cycle, and said switching time control means provides control signals for respective switches as follows:
    said first transition D to D' is initiated by turning said input switch OFF and, when voltage on said complementary output switch is reduced to zero, said switching time control means provides control signal for complementary output switch to be turned ON at zero voltage for zero switching losses, and said first transition continues until the voltage on said complementary input switch reduces to zero, at which instant said switching time control means provides control signal for said complementary input switch to be also turned ON at zero voltage for zero switching losses, and said first transition continues further until the current through the output switch is reduced to zero, making this the latest instant at which output switch must be turned OFF to complete said first transition D to D';
    said second transition D' to D is initiated by turning said complementary input switch OFF to start linear discharge of said parasitic capacitor across said input switch, and, when voltage across said input switch drops to zero said input switch is turned ON by said switching time control means at zero voltage and with zero switching losses, and said output switch is by said switching time control means simultaneously turned ON with a voltage across said output switch equal to negative value of said DC voltage source, and said second transition continues with a current-reversal subinterval during which the input capacitor current is reversed from being equal to input inductor current to current flow in opposite direction with magnitude equal to middle inductor current at which instant the current through the complementary output switch is reduced to zero making this the latest instant at which complementary output switch must be turned OFF to complete said second transition D' to D;
  wherein said resonant capacitance is significantly higher than capacitance of parasitic capacitors across said output switch and said complementary output switch, and
  whereby during said second transition D' to D said input switch is turned ON at zero voltage, hence substantially reducing switching losses and voltage stress on said semiconductor devices and increasing efficiency of said converter with reduced electromagnetic interference;
  whereby a lossless switching cycle is provided based on the precise pattern of the switch timing of said semiconductor current bidirectional and voltage bi-directional switching devices by said switching time control means;

whereby the switching at zero voltage of the complementary input switch during D to D' transition and input switch during D' to D transition is achieved for any operating point, that is, for all input DC source voltage and for any DC load current from no load to full load.

9. Lossless switching converter as defined in claim 8, wherein said second transition D' to D is initiated by turning said complementary input switch OFF to start linear discharge of said parasitic capacitor across said input switch, and, when voltage across said input switch drops to the level of one half of said DC voltage source, said input switch is turned ON by said switching time control means at substantially reduced voltage and with substantially reduced switching losses, and said output switch is by said switching time control means simultaneously turned ON at a voltage across said output switch which is negative and equal to one half of said DC voltage source, and said second transition continues with a current-reversal subinterval during which the input capacitor current is reversed from being equal to input inductor current to current flow in opposite direction with magnitude equal to middle inductor current at which instant the current through the complementary output switch is reduced to zero making this the latest instant at which complementary output switch must be turned OFF to complete said second transition D' to D;

whereby during said second transition D' to D said input switch and said output switch are simultaneously turned ON at voltages equal in magnitude to one half of said DC voltage source, hence substantially reducing switching losses and voltage stress on said semiconductor devices and increasing efficiency of said converter with reduced electromagnetic interference.

10. Lossless switching converter as defined in claim 8, wherein said resonant inductor has zero inductance, i.e., it is short-circuited, hence said second end of said input capacitor is connected to said second end of said middle inductor;

wherein said first transition D to D' is initiated by turning said input switch OFF and, when voltage on said complementary output switch is reduced to zero, said switching time control means provides control signal for complementary output switch to be turned ON at zero voltage for zero switching losses, while said output switch is simultaneously turned OFF, and said first transition continues until the voltage on said complementary input switch reduces to zero, at which instant said switching time control means provides control signal for said complementary input switch to be also turned ON at zero voltage for zero switching losses to complete said first transition D to D';

wherein said second transition D' to D is initiated by turning said complementary input switch OFF to start linear discharge of said parasitic capacitor across said input switch, and, when voltage across said input switch drops to zero said input switch is turned ON by said switching time control means at zero voltage and with zero switching losses, and said output switch is by said switching time control means simultaneously turned ON with a voltage across said output switch equal to negative value of said DC voltage source.

11. Lossless switching converter as defined in claim 10, wherein said second transition D' to D is initiated by turning said complementary input switch OFF to start linear discharge of said parasitic capacitor across said input switch, and, when voltage across said input switch drops to the level of one half of said DC voltage source, said input switch is turned ON by said switching time control means at substantially reduced voltage and with substantially reduced switching losses, and said output switch is by said switching time control means simultaneously turned ON at a voltage across said output switch equal to negative value of one half of said DC voltage source, and complementary output switch is simultaneously turned OFF to complete said second transition D' to D;

whereby during said second transition D' to D said input switch and said output switch are simultaneously turned ON at voltages equal in magnitude to one half of said DC voltage source, hence substantially reducing switching losses and voltage stress on said semiconductor devices and increasing efficiency of said converter with reduced electromagnetic interference.

12. Lossless switching converter as defined in claim 8, wherein said first transition D to D' is initiated by turning said output switch OFF and, when voltage on said complementary output switch is reduced to zero, said switching time control means provides control signal for complementary output switch to be turned ON at zero voltage for zero switching losses while said input switch is simultaneously turned OFF, and said first transition continues until the voltage on said complementary input switch reduces to zero, at which instant said switching time control means provides control signal for said complementary input switch to be also turned ON at zero voltage for zero switching losses.

13. Lossless switching converter as defined in claim 12, wherein said second transition D' to D is initiated by turning said complementary input switch OFF to start linear discharge of said parasitic capacitor across said input switch, and, when voltage across said input switch drops to the level of one half of said DC voltage source, said input switch is turned ON by said switching time control means at substantially reduced voltage and with substantially reduced switching losses, and said output switch is by said switching time control means simultaneously turned ON at a voltage across said output switch equal to negative value of one half of said DC voltage source, and complementary output switch is simultaneously turned OFF to complete said second transition D' to D;

whereby during said second transition D' to D said input switch and said output switch are simultaneously turned ON at voltages equal to one half of said DC voltage source, hence substantially reducing switching losses and voltage stress on said semiconductor devices and increasing efficiency of said converter with reduced electromagnetic interference.

14. An isolated lossless switching DC-to-DC converter for providing power from a DC voltage source connected between an input terminal and a common input terminal to a DC load connected between an output terminal and a common output terminal, said converter comprising:

(1) an input inductor connected at one end thereof to said input terminal;

(2) an output inductor connected at one end thereof to said output terminal;

(3) an isolation transformer with primary winding and secondary winding placed on a common magnetic core, and each winding having one dot-marked end and another unmarked end whereby any AC voltage applied to said primary winding of said isolation transformer induces AC voltage in said secondary winding of said isolation transformer so that two AC voltages are in phase at dot-marked ends of said primary and secondary windings of said isolation transformer, wherein said primary winding of said isolation transformer is connected at a dot-marked end thereof to said common input terminal and said secondary winding of said isolation transformer is connected at a dot-marked end thereof to said common output terminal;

(4) an input capacitor, having one end connected to an unmarked end of said primary winding of said isolation transformer and second end of said input capacitor connected to a second end of said input inductor;

(5) an input switch with one end connected to said common input terminal and a second end of said input switch connected to said second end of said input inductor;

(6) an output switch with one end connected to said common output terminal and a second end of said output switch connected to said second end of said output inductor;

(7) a complementary output switch, having one end connected to said second end of said output inductor and a second end of said complementary output switch connected to an unmarked end of said secondary winding of said isolation transformer;

(8) a branch comprising a complementary input switch and an auxiliary capacitor connected in series, wherein one end of said branch is connected to dot-marked end of said primary winding of said isolation transformer and another end of said branch is connected to said unmarked end of said input inductor;

(9) switching time control means for providing a precise pattern of turning ON and turning OFF signals for said input switch, said complementary input switch, said output switch and said complementary output switch, with a referenced time interval $DT_S$ during which said input switch is turned ON and a complementary time interval $D'T_S=(1-D)T_S$ during which said input switch is turned OFF, where D is a variable and controllable duty ratio and D' is a complementary duty ratio within one complete switch operating cycle $T_S$;

wherein no current flows through said branch during said referenced time interval $DT_S$, and only AC current flows through said branch during said complementary time interval $D'T_S$;

wherein said input switch, said complementary input switch, said output switch, and said complementary output switch are semiconductor current bidirectional switching devices, capable of conducting the current in both directions while in an ON-state, and sustaining voltage in one direction, while in an OFF-state, and said semiconductor current bidirectional switching devices are each modeled as a parallel connection of an ideal switch, a parasitic body-diode and a parasitic capacitance;

wherein said primary winding and said secondary winding are tightly coupled for reduced leakage between said primary winding and said secondary winding;

wherein said isolation transformer with leakage inductance is modeled as a perfectly coupled transformer with no leakage with an effective leakage inductance connected in series with its primary winding;

wherein a DC-to-DC voltage conversion ratio of said isolated lossless switching converter depends linearly on said operating duty ratio D;

wherein turns ratio of said secondary winding to said primary winding of said isolation transformer provides additional scaling of DC-to-DC voltage conversion ratio of said isolated lossless switching converter;

wherein said switching time control means includes precise electronically controlling operation of said semiconductor current bidirectional switching devices whereby two transitions, first transition D to D' and second transition D' to D, are obtained during each successive switch operating cycle $T_S$ wherein said transition intervals are short compared to said switch operating cycle, and said switching time control means provides control signals for respective switches as follows:

said first transition D to D' is initiated by turning said input switch OFF and, when voltage on said complementary output switch is reduced to zero, said switching time control means provides control signal for complementary output switch to be turned ON at zero voltage for zero switching losses, and said first transition continues until the voltage on said complementary input switch reduces to zero, at which instant said switching time control means provides control signal for said complementary input switch to be also turned ON at zero voltage for zero switching losses, and said first transition continues until the current through the output switch is reduced to zero, making this the latest instant at which output switch must be turned OFF to complete said first transition D to D', and said second transition D' to D is initiated by first turning said output switch ON, intentionally before said complementary input switch is turned OFF, to boost the current in said leakage inductance by an additional magnitude which is inversely proportional to said leakage inductance, directly proportional to voltage difference between DC voltage of said auxiliary capacitor and DC voltage of said DC voltage source and directly proportional to this boost subinterval during which said output switch and said complementary input switch are both turned ON, and when said complementary input switch is turned OFF, the resonant discharge of parasitic capacitor across said input switch and simultaneous resonant charge of parasitic capacitor across said complementary input switch take place during this resonant subinterval in which the total resonant current is comprising three distinct current components, the first one a cosinusoidal resonant current component with said additional magnitude defined above, the second one a sinusoidal resonant current component whose magnitude is directly proportional to voltage difference between DC voltage of said auxiliary capacitor and DC voltage of said DC voltage source and inversely proportional to a characteristic impedance of resonant circuit which is equal to a square root of the ratio of said leakage inductance and capacitance of resonant capacitance equal to the sum of parasitic capacitors of said input switch and said complementary input switch, and the third one a cosinusoidal resonant current component whose magnitude is equal to initial current value in said leakage inductance at the instant when said output switch was turned ON, and at the instant when said parasitic capacitor of said input switch is fully discharged, said switching time control means provides a control signal for said input switch to be turned ON at zero voltage and with zero switching losses to complete said resonant subinterval, and said second transition continues with a current-reversal subinterval during which the input capacitor current is reversed from being equal to input inductor current to current flow in opposite direction with magnitude equal to a magnetizing current of said isolation transformer (same as a primary current of said isolation transformer during said referenced time interval $DT_S$) at which instant the current through the complementary output switch is reduced to zero making this the latest instant at which complementary output switch must be turned OFF to complete said second transition D' to D, wherein said resonant capacitance is significantly higher than capacitance of parasitic capacitors across said output switch and said complementary output switch, and whereby said isolation transformer provides a galvanic isolation between said input DC voltage source and said DC load, and whereby a lossless switching cycle is provided based on the precise pattern of the switch timing of said semiconductor current bidirectional switching devices by said switching time control means; during this lossless switching cycle, electrical charge is transferred between parasitic capacitors in a lossless manner, and during said second transition D' to D said complementary input switch and said output switch are kept simultaneously ON as long as needed for sufficient additional energy storage in said leakage inductance of said isolation transformer to increase the peak resonant current of said leakage inductance of said isolation transformer, just enough to enable complete discharge of said parasitic capacitor of said input switch to zero volts and complete said second transition D' to D with substantially reduced switching losses and voltage stress on said semiconductor switching devices and increased efficiency of said converter with reduced electromagnetic interference, and said lossless switching is especially effective for DC-to-DC conversion when said duty ratio D is well below 0.5 and said DC voltage source is very high as in rectified utility AC line voltage.

15. An isolated lossless switching converter as defined in claim 14, wherein said second transition D' to D is initiated by turning said complementary input switch OFF and simultaneously turning said output switch ON to start a resonant discharge of parasitic capacitor across said input switch and simultaneous resonant charge of a parasitic capacitor across said complementary input switch with a total resonant current comprising two distinct current components, said second one sinusoidal resonant current component and said third one cosinusoidal resonant current component, and, at the instant when a voltage of said parasitic capacitor of said input switch reaches the minimum value, said input switch is turned ON by said switching means at substantially reduced voltage and with substantially reduced switching losses completing said resonant subinterval and said second transition D' to D continues until the current through the complementary output switch is reduced to zero, making this the latest instant at which complementary output switch must be turned OFF to complete this current-reversal subinterval and said second transition D' to D, and whereby during said second transition D' to D energy already stored in said resonant inductor facilitates resonant discharge and voltage reduction of said parasitic capacitor of said input switch to complete said second transition D' to D with substantially reduced switching losses and voltage stress on said semiconductor switching devices and increased efficiency of said converter with reduced electromagnetic interference, and said lossless switching is especially effective for DC-to-DC conversion when said duty ratio D is in the middle of the operating range at and around 0.5, and said DC voltage source is very high as in rectified utility AC line voltage.

16. An isolated lossless switching converter as defined in claim 14, wherein said second transition D' to D is initiated by turning said complementary input switch OFF to start a linear discharge of said parasitic capacitor across said input switch, and, at any time before a voltage across said input switch drops to the level of said DC voltage source, said output switch is turned ON to force a resonant discharge of said parasitic capacitor across said input switch with a total resonant current comprising two distinct current components, said second one sinusoidal resonant current component with magnitude equal to voltage difference of said input switch voltage present at the instant when said output switch is turned ON and the DC voltage of said DC voltage source and said third one cosinusoidal resonant current component, and, at the instant when said voltage of said parasitic capacitor reaches the minimum value, said input switch is turned ON by said switching means at significantly reduced voltage and with significantly reduced switching losses completing said resonant subinterval and second transition D' to D continues until the current through said complementary output switch is reduced to zero making this the latest instant at which said complementary output switch must be turned OFF (could have been turned OFF any time before that instant since its body-diode was still conducting) to complete said current-reversal subinterval and said second transition D' to D, and whereby during said second transition D' to D of said complementary input switch and said output switch are both turned OFF providing said linear discharge followed by said resonance discharge for further voltage reduction of said parasitic capacitor across said input switch, and said input switch and said output switch are turned ON at reduced voltages to complete said second transition D' to D with substantially reduced switching losses and voltage stress on said semiconductor switching devices and increased efficiency of said converter with reduced electromagnetic interference, and said lossless switching is especially effective for DC-to-DC conversion when said duty ratio D is either in the middle of the operating range or at duty ratios higher than 0.5, and said DC voltage source is very high as in rectified utility AC line voltage.

17. An isolated lossless switching converter as defined in claim 14, wherein said second transition D' to D is initiated by turning said complementary input switch OFF to start a linear discharge of said parasitic capacitor across said input switch, and, when voltage of said input switch drops to a level of said DC voltage source, said output switch is turned ON at zero voltage with zero switching losses forcing a resonant discharge of said parasitic capacitor across said input switch with a resonant current comprising only said third one cosinusoidal resonant current component, and, at the instant when said voltage of said parasitic capacitor across said input switch reaches the minimum value, said input switch is turned ON by said switching time control means at a voltage lower than said DC voltage source level and with reduced switching losses completing said resonant subinterval and second transition D' to D continues until the current through the complementary output switch is reduced to zero making this the latest instant at which said complementary output switch must be turned OFF (could have been turned OFF any time before that instant since its body-diode was still conducting) to complete said current-reversal subinterval and said second transition D' to D, and whereby during said second transition D' to D said output switch is turned ON at zero voltage with zero switching losses and at the particular instant in time when its body-diode would naturally start to conduct, hence significantly reducing current conduction losses of said body-diode, and said input switch is turned ON at reduced voltage to complete said second transition D' to D with reduced switching losses and voltage stress on said semiconductor switching devices and increased efficiency of said converter with reduced electromagnetic interference, and said lossless switching is especially effective when the product of said magnitude of said third one cosinusoidal resonant current component and said characteristic impedance is equal to said DC voltage source in which case said input switch is turned ON at zero voltage resulting in zero switching losses on all four said semiconductor current bidirectional switching devices.

18. An isolated lossless switching converter as defined in claim 14, wherein said output switch and said complementary output switch are two-terminal current rectifier switches (diodes), which are in an ON or OFF state in response to said converter operating state and conditions caused by electronically controlled switching of said input and said complementary input switching devices;

wherein said switching time control means includes precise electronically controlling operation of said input switch and said complementary input switch whereby two transitions D to D' and D' to D are obtained during each successive switch operating cycle $T_S$, wherein said transition intervals are short compared to said switch operating cycle, and said switching time control means provides control signals for respective switches as follows:

said first transition D to D' is initiated by turning said input switch OFF and, when blocking voltage across said complementary output rectifier switch is reduced to zero, said complementary output rectifier switch starts to conduct, hence automatically is turned ON at zero voltage for zero switching losses, and said first transition continues until the voltage on said complementary input switch reduces to zero, at which instant said complementary input switch is turned ON by said switching time control means at zero voltage for zero switching losses while said output rectifier switch is turned OFF by reverse bias voltage applied by converter across said output rectifier switch, and wherein said second transition D' to D is initiated by turning said complementary input switch OFF to start linear discharge of said parasitic capacitor across said input switch, and, when a voltage across said input switch drops to the level of said DC voltage source, blocking voltage across said output rectifier switch is zero, hence said output rectifier switch is automatically turned ON with zero switching losses forcing a resonant discharge of said parasitic capacitor across said input switch with a resonant current comprising only of said third one cosinusoidal resonant current component, and, at the instant when said voltage of said parasitic capacitor across said input switch reaches the minimum value, said input switch is turned ON by said switching means at voltage reduced below said DC voltage source level and with reduced switching losses while said complementary output rectifier switch is by the blocking voltage automatically turned OFF to complete said second transition D' to D, and whereby control and drive circuitry for said output rectifier switch and said complementary output rectifier switch are obviated, thereby simplifying said converter's drive and control circuitry;

whereby during said second transition D' to D said output rectifier switch is automatically turned ON at zero voltage with zero switching losses, and said input switch is turned ON at reduced voltage to complete said second transition D' to D with reduced switching losses and voltage stress on said semiconductor devices and increased efficiency of said converter with reduced electromagnetic interference, and said lossless switching is especially effective when the product of said magnitude of said third one cosinusoidal resonant current component and said characteristic impedance is equal to said DC voltage source in which case said input switch is turned ON at zero voltage resulting in zero switching losses on two said semiconductor current bidirectional switching devices and two said two-terminal current rectifier switches (diodes).

19. An isolated lossless switching DC-to-DC converter for providing power from a DC voltage source connected between an input terminal and a common input terminal to a DC load connected between an output terminal and a common output terminal, said converter comprising:

(1) an input inductor connected at one end thereof to said input terminal;

(2) an output inductor connected at one end thereof to said output terminal;

(3) an isolation transformer with primary winding and secondary winding placed on a common magnetic core, and each winding having one dot-marked end and another unmarked end whereby any AC voltage applied to said primary winding of said isolation transformer induces AC voltage in said secondary winding of said isolation transformer so that two AC voltages are in phase at dot-marked ends of said primary and secondary windings of said isolation transformer, wherein said primary winding of said isolation transformer is connected at a dot-marked end thereof to said common input terminal and said secondary winding of said isolation transformer is connected at a dot-marked end thereof to said common output terminal;

(4) an input capacitor, having one end connected to an unmarked end of said primary winding of said isolation transformer and second end of said input capacitor connected to a second end of said input inductor;

(5) an input switch with one end connected to said common input terminal and a second end of said input switch connected to said second end of said input inductor;

(6) an output switch with one end connected to said common output terminal and a second end of said output switch connected to said second end of said output inductor;

(7) a complementary output switch, having one end connected to said second end of said output inductor and a second end of said complementary output switch connected to an unmarked end of said secondary winding of said isolation transformer;

(8) a branch comprising a complementary input switch and an auxiliary capacitor connected in series, wherein one end of said branch is connected to dot-marked end of said primary winding of said isolation transformer and another end of said branch is connected to said unmarked end of said input inductor;

(9) switching time control means for providing a precise pattern of turning ON and turning OFF signals for said input switch, said complementary input switch, said output switch and said complementary output switch, with a referenced time interval $DT_S$ during which said input switch is turned ON and a complementary time interval $D'T_S=(1-D)T_S$ during which said input switch is turned OFF, where D is a variable and controllable duty ratio and D' is a complementary duty ratio within one complete switch operating cycle $T_S$;

wherein no current flows through said branch during said referenced time interval $DT_S$, and only AC current flows through said branch during said complementary time interval $D'T_S$;

wherein said input switch, said complementary input switch, and said complementary output switch are semiconductor current bidirectional switching devices, capable of conducting the current in both directions while in an ON-state, and sustaining voltage in one direction, while in an OFF-state, and said semiconductor current bidirectional switching devices are modeled as comprising the parallel connection of an ideal switch, a parasitic body-diode and a parasitic capacitance;

wherein said output switch is a semiconductor voltage bidirectional switching device, capable of conducting the current while in an ON-state, and sustaining voltage in both directions, while in an OFF-state, and said semiconductor voltage bidirectional switching device is a composite switch whose model consists of the parallel connection of an ideal switch, and an equivalent parasitic capacitance;

wherein said primary winding and said secondary winding are tightly coupled for reduced leakage between said primary winding and said secondary winding;

wherein said isolation transformer with leakage inductance is modeled as a perfectly coupled transformer with no leakage with an effective leakage inductance connected in series with its primary winding;

wherein a DC-to-DC voltage conversion ratio of said isolated lossless switching converter depends linearly on said operating duty ratio D;

wherein turns ratio of said secondary winding to said primary winding of said isolation transformer provides additional scaling of DC-to-DC voltage conversion ratio of said isolated lossless switching converter;

wherein said switching time control means includes precise electronically controlling operation of said semiconductor current bidirectional and voltage bi-directional switching devices whereby two transitions, first transition D to D' and second transition D' to D, are obtained during each successive switch operating cycle $T_S$ wherein said transition intervals are short compared to said switch operating cycle, and said switching time control means provides control signals for respective switches as follows:

said first transition D to D' is initiated by turning said input switch OFF and, when voltage on said complementary output switch is reduced to zero, said switching time control means provides control signal for complementary output switch to be turned ON at zero voltage for zero switching losses, and said first transition continues until the voltage on said complementary input switch reduces to zero, at which instant said switching time control means provides control signal for said complementary input switch to be also turned ON at zero voltage for zero switching losses, and said first transition continues further until the current through the output switch is reduced to zero, making this the latest instant at which output switch must be turned OFF to complete said first transition D to D';

said second transition D' to D is initiated by turning said complementary input switch OFF to start linear discharge of said parasitic capacitor across said input switch, and, when voltage across said input switch drops to zero said input switch is turned ON by said switching time control means at zero voltage and with zero switching losses, and said output switch is by said switching time control means simultaneously turned ON with a voltage across said output switch equal to negative value of said DC voltage source, and said second transition continues with a current-reversal subinterval during which the input capacitor current is reversed from being equal to input inductor current to current flow in opposite direction with magnitude equal to middle inductor current at which instant the current through the complementary output switch is reduced to zero making this the latest instant at which complementary output switch must be turned OFF to complete said second transition D' to D;

wherein said resonant capacitance is significantly higher than capacitance of parasitic capacitors across said output switch and said complementary output switch, and whereby during said second transition D' to D said input switch is turned ON at zero voltage, hence substantially reducing switching losses and voltage stress on said semiconductor devices and increasing efficiency of said converter with reduced electromagnetic interference;

whereby a lossless switching cycle is provided based on the precise pattern of the switch timing of said semiconductor current bidirectional and voltage bi-directional switching devices by said switching time control means;

whereby the switching at zero voltage of the complementary input switch during D to D' transition and input switch during D' to D transition is achieved for any operating point, that is, for all input DC source voltage and for any DC load current from no load to full load.

20. An isolated lossless switching converter as defined in claim 19, wherein said second transition D' to D is initiated by turning said complementary input switch OFF to start linear discharge of said parasitic capacitor across said input switch, and, when voltage across said input switch drops to the level of one half of said DC voltage source, said input switch is turned ON by said switching time control means at substantially reduced voltage and with substantially reduced switching losses, and said output switch is by said switching time control means simultaneously turned ON at a voltage across said output switch equal to one half of said DC voltage source, and said second transition continues with a current-reversal subinterval during which the input capacitor current is reversed from being equal to input inductor current to current flow in opposite direction with magnitude equal to middle inductor current at which instant the current through the complementary output switch is reduced to zero making this the latest instant at which complementary output switch must be turned OFF to complete said second transition D' to D;

whereby during said second transition D' to D said input switch and said output switch are simultaneously turned ON at voltages equal in magnitude to one half of said DC voltage source, hence substantially reducing switching losses and voltage stress on said semiconductor devices and increasing efficiency of said isolated lossless switching converter with reduced electromagnetic interference.

21. Lossless switching converter as defined in claim 1, wherein said middle inductor comprises an autotransformer;

wherein a one end of a winding of said autotransformer is connected to said common input terminal and said common output terminal, a second end of said winding of said autotransformer is connected to said second end of said complementary output switch, and a tapped end of said winding of said autotransformer is connected to said one end of said resonant inductor;

wherein ratio of number of turns of said winding of said autotransformer to number of turns between said one end and said tapped end of said winding of said autotransformer provides additional scaling of DC-to-DC voltage conversion ratio of said converter.

22. Lossless switching converter as defined in claim 1, wherein said one end of said middle inductor winding is connected to said common output terminal;

wherein said one end of said input capacitor is connected to said common input terminal and said second end of said input capacitor is connected to said common output terminal, and wherein said second end of said resonant inductor winding is connected to said second end of said input inductor.

23. Lossless switching converter as defined in claim 8, wherein said middle inductor comprises an autotransformer;

wherein a one end of a winding of said autotransformer is connected to said common input terminal and said common output terminal, a second end of said winding of said autotransformer is connected to said second end of said complementary output switch, and a tapped end of said winding of said autotransformer is connected to said one end of said resonant inductor;

wherein ratio of number of turns of said winding of said autotransformer to number of turns between said one end and said tapped end of said winding of said autotransformer provides additional scaling of DC-to-DC voltage conversion ratio of said converter.

24. Lossless switching converter as defined in claim 8, wherein said one end of said middle inductor winding is connected to said common output terminal;

wherein said one end of said input capacitor is connected to said common input terminal and said second end of said input capacitor is connected to said common output terminal, and wherein said second end of said resonant inductor winding is connected to said second end of said input inductor.

25. An isolated lossless switching converter as defined in claim 14, wherein one end of said branch is connected to said dot-marked end of said primary winding of said isolation transformer and another end of said branch is connected to said unmarked end of said primary winding of said isolation transformer.

26. An isolated lossless switching converter as defined in claim 14, wherein one end of said branch is connected to said one end of said input inductor and another end of said branch is connected to said second end of said input inductor.

27. An isolated lossless switching converter as defined in claim 14, wherein one end of said branch is connected to said one end of said input inductor and another end of said branch is connected to said unmarked end of said primary winding of said isolation transformer.

28. An isolated lossless switching converter as defined in claim 14, wherein one end of said input capacitor is connected to said common input terminal;

wherein second end of said input capacitor is connected to said dot-marked end of said primary winding of said isolation transformer;

wherein said unmarked end of said primary winding of said isolation transformer is connected to said second end of said input inductor, and wherein one end of said branch is connected to said dot-marked end of said primary winding of said isolation transformer and another end of said branch is connected to said unmarked end of said primary winding of said isolation transformer.

29. An isolated lossless switching converter as defined in claim 14, wherein one end of said branch is connected to said unmarked end of said secondary winding of said isolation transformer and another end of said branch is connected to said output terminal.

30. An isolated lossless switching converter as defined in claim 14,
   wherein one end of said complementary output switch is connected to said common output terminal;
   wherein said dot-marked end of said secondary winding of said isolation transformer is connected to a second end of said complementary output switch;
   wherein said unmarked end of said secondary winding of said isolation transformer is connected to said second end of said output inductor, and
   wherein one end of said branch is connected to said unmarked end of said secondary winding of said isolation transformer and another end of said branch is connected to said dot-marked end of said secondary winding of said isolation transformer.

31. An isolated lossless switching converter as defined in claim 14,
   wherein said input switch, said complementary input switch, said output switch and said complementary output switch are MOSFET-like devices;
   wherein a gate of said output switch MOSFET-like device is connected to a drain of said complementary output switch MOSFET-like device, and a drain of said output switch MOSFET-like device is connected to a gate of said complementary output switch MOSFET-like device, wherein control and drive circuitry for said input switch MOSFET-like device and said complementary input switch MOSFET-like device are referred to said common input terminal;
   whereby said secondary winding of said isolation transformer provides a drive voltage for both said output switch MOSFET-like device and said complementary output switch MOSFET-like device, enabling self-driven operation of both said output switch MOSFET-like device and said complementary output switch MOSFET-like device with simplified control and drive circuitry isolated from said input DC voltage source; and
   whereby a complex signal processing circuitry required to transfer proper drive signals to said output switch MOSFET-like device and said complementary output switch MOSFET-like device through said galvanic isolation between said input DC voltage source and said DC load is obviated, thereby simplifying said converter drive and control circuitry.

32. An isolated lossless switching converter as defined in claim 14, further including two drive windings on a secondary side of said isolation transformer, connected in series and with a junction therebetween connected to said common output terminal;
   wherein said input switch, said complementary input switch, said output switch and said complementary output switch are MOSFET-like devices;
   wherein a dot-marked end of one drive winding is connected to a gate of said output switch MOSFET-like device;
   wherein an unmarked end of other drive winding is connected to a gate of said complementary output switch MOSFET-like device;
   wherein said two drive windings provide out-of-phase drive voltages to both said output switch MOSFET-like device and said complementary output switch MOSFET-like device for their self-driven operation with a control and drive circuitry galvanically isolated from said input DC voltage source;
   wherein said control and drive circuitry for said input switch MOSFET-like device and said complementary input switch MOSFET-like device are referred to said common input terminal,
   whereby a complex signal processing circuitry required to transfer proper drive signals to said output switch MOSFET-like device and said complementary output switch MOSFET-like device through said galvanic isolation between said input DC voltage source and said DC load is obviated, thereby simplifying said converter drive and control circuitry.

33. An isolated lossless switching converter as defined in claim 14, further including additional secondary windings and separate output circuits for separate DC load outputs;
   wherein said isolation transformer includes said additional secondary windings for said additional DC load outputs;
   wherein each of said separate output circuits have a configuration with connections identical to the configuration and connections of an output circuit of said isolated lossless switching converter;
   wherein each of said separate output circuits is connected between said additional secondary windings of said isolation transformer and said DC load outputs in an identical way as said output circuit of said isolated lossless switching converter is connected between said secondary winding of said isolation transformer and said output DC load;
   wherein said switching time control means provides a precise pattern of turning ON and turning OFF signals for said input switch, said complementary input switch, said output switch and each output switch of said separate output circuits, said complementary output switch and each complementary output switch of said separate output circuits, with a referenced time interval $DT_S$ during which said input switch is turned ON and a complementary time interval $D'T_S=(1-D)T_S$ during which said input switch is turned OFF, where D is a variable and controllable duty ratio and D' is a complementary duty ratio within one complete switch operating cycle $T_S$;
   wherein turns ratios of said additional secondary windings to said primary winding of said multiple-output isolation transformer provide additional scaling of DC-to-DC voltage conversion ratio of said converter for each said additional DC load respectively;
   whereby said multiple-output isolated transformer provides galvanic isolation between said input DC voltage source, said DC load, and said additional DC loads.

34. An isolated lossless switching converter as defined in claim 19,
   wherein one end of said branch is connected to said dot-marked end of said primary winding of said isolation transformer and another end of said branch is connected to said unmarked end of said primary winding of said isolation transformer.

35. An isolated lossless switching converter as defined in claim 19,
   wherein one end of said branch is connected to said one end of said input inductor and another end of said branch is connected to said second end of said input inductor.

36. An isolated lossless switching converter as defined in claim 19,
   wherein one end of said branch is connected to said one end of said input inductor and another end of said branch is connected to said unmarked end of said primary winding of said isolation transformer.

37. An isolated lossless switching converter as defined in claim 19,
   wherein one end of said input capacitor is connected to said common input terminal;
   wherein second end of said input capacitor is connected to said dot-marked end of said primary winding of said isolation transformer;
   wherein said unmarked end of said primary winding of said isolation transformer is connected to said second end of said input inductor, and
   wherein one end of said branch is connected to said dot-marked end of said primary winding of said isolation transformer and another end of said branch is connected to said unmarked end of said primary winding of said isolation transformer.

38. An isolated lossless switching converter as defined in claim 19,
   wherein one end of said branch is connected to said unmarked end of said secondary winding of said isolation transformer and another end of said branch is connected to said output terminal.

39. An isolated lossless switching converter as defined in claim 19,
   wherein one end of said complementary output switch is connected to said common output terminal;
   wherein said dot-marked end of said secondary winding of said isolation transformer is connected to a second end of said complementary output switch;
   wherein said unmarked end of said secondary winding of said isolation transformer is connected to said second end of said output inductor, and
   wherein one end of said branch is connected to said unmarked end of said secondary winding of said isolation transformer and another end of said branch is connected to said dot-marked end of said secondary winding of said isolation transformer.

40. An isolated lossless switching converter as defined in claim 19, further including two drive windings on a secondary side of said isolation transformer,
   wherein said input switch, said complementary input switch, and said complementary output switch are MOSFET-like devices;
   wherein said output switch is comprising two N-channel MOSFET-like devices having a source terminal of one said N-channel MOSFET-like device connected to a source terminal of another said N-channel MOSFET-like device (back-to-back connection) and gate terminals of said two N-channel MOSFET-like devices connected together;
   wherein a drain terminal of one said N-channel MOSFET-like device is connected to said common output terminal and a drain terminal of another said N-channel MOSFET-like device is connected to said second end of said output inductor winding;
   wherein a dot-marked end of one drive winding is connected to a common gate of said two N-channel MOSFET-like devices and an unmarked end of said one drive winding is connected a common source of said two N-channel MOSFET-like devices comprising said output switch;
   wherein an unmarked end of other drive winding is connected to a gate of said complementary output switch MOSFET-like device and a dot-marked end of said other drive winding is connected to a source of said complementary output switch MOSFET-like device;
   wherein said two drive windings provide out-of-phase drive voltages to both said output switch (comprising said two N-channel MOSFET-like devices) and said complementary output switch MOSFET-like device for their self-driven operation with a control and drive circuitry galvanically isolated from said input DC voltage source;
   wherein said control and drive circuitry for said input switch MOSFET-like device and said complementary input switch MOSFET-like device are referred to said common input terminal,
   hereby a complex signal processing circuitry required to transfer proper drive signals to said output switch MOSFET-like device and said complementary output switch MOSFET-like device through said galvanic isolation between said input DC voltage source and said DC load is obviated, thereby simplifying said converter drive and control circuitry;
   whereby said output switch is both voltage bidirectional and current bidirectional and operates as a four-quadrant switch with significantly reduced current conduction losses compared to two-quadrant voltage bidirectional switch implementation due to the low conduction losses of said two MOSFET-like devices.

41. An isolated lossless switching converter as defined in claim 19, further including additional secondary windings and separate output circuits for separate DC load outputs;
   wherein said isolation transformer includes said additional secondary windings for said additional DC load outputs;
   wherein each of said separate output circuits have a configuration with connections identical to the configuration and connections of an output circuit of said isolated lossless switching converter;
   wherein each of said separate output circuits is connected between said additional secondary windings of said isolation transformer and said DC load outputs in an identical way as said output circuit of said isolated lossless switching converter is connected between said secondary winding of said isolation transformer and said output DC load;
   wherein said switching time control means provides a precise pattern of turning ON and turning OFF signals for said input switch, said complementary input switch, said output switch and each output switch of said separate output circuits, said complementary output switch and each complementary output switch of said separate output circuits, with a referenced time interval $DT_S$ during which said input switch is turned ON and a complementary time interval $D'T_S=(1-D)T_S$ during which said input switch is turned OFF, where D is a variable and controllable duty ratio and D' is a complementary duty ratio within one complete switch operating cycle $T_S$;
   wherein turns ratios of said additional secondary windings to said primary winding of said multiple-output isolation transformer provide additional scaling of DC-to-DC voltage conversion ratio of said converter for each said additional DC load respectively;
   whereby said multiple-output isolated transformer provides galvanic isolation between said input DC voltage source, said DC load, and said additional DC loads.

42. Lossless switching converter as defined in claim 1, further including a small additional resonant capacitor connected in parallel with said complementary input switch to extend said resonant subinterval and reduce switching losses of said input switch caused by a short but finite turn-OFF time of said input switch.

43. Lossless switching converter as defined in claim 8, further including a small additional resonant capacitor connected in parallel with said input switch to extend said resonant subinterval and reduce switching losses of said input switch caused by a short but finite turn-OFF time of said input switch.

44. An isolated lossless switching converter as defined in claim 14, further including a small additional resonant capacitor connected in parallel with said input switch to extend said resonant subinterval and reduce switching losses of said input switch caused by a short but finite turn-OFF time of said input switch.

45. An isolated lossless switching converter as defined in claim 19, further including a small additional resonant capacitor connected in parallel with said complementary input switch to extend said resonant subinterval and reduce switching losses of said input switch caused by a short but finite turn-OFF time of said input switch.

46. An isolated lossless switching converter as defined in claim 18, further including a small auxiliary MOSFET transistor connected in parallel with said output rectifier switch,
   wherein said switching time control means includes precise electronically controlling operation of said input switch, said complementary input switch, and said auxiliary MOSFET switch, whereby two transitions D to D' and D' to D are obtained during each successive switch operating cycle $T_S$, wherein said transition intervals are short compared to said switch operating cycle, and said switching time control means provides control signals for respective switches as follows:
      said first transition D to D' is initiated by turning said input switch OFF and, when blocking voltage across said complementary output rectifier switch is reduced to zero, said complementary output rectifier switch starts to conduct, hence automatically is turned ON at zero voltage for zero switching losses, and said first transition continues until the voltage on said complementary input switch reduces to zero, at which instant said complementary input switch is turned ON by said switching time control means at zero voltage for zero switching losses while said output rectifier switch is turned OFF by reverse bias voltage applied by converter across said output rectifier switch, and
      said second transition D' to D is initiated by first turning said auxiliary MOSFET switch ON, intentionally before said complementary input switch is turned OFF, to boost the current in said leakage inductance by an additional magnitude which is inversely proportional to said leakage inductance, directly proportional to voltage difference between DC voltage of said auxiliary capacitor and DC voltage of said DC voltage source and directly proportional to this boost subinterval during which said auxiliary MOSFET switch and said complementary input switch are both turned ON, and when said complementary input switch is turned OFF, the resonant discharge of parasitic capacitor across said input switch and simultaneous resonant charge of parasitic capacitor across said complementary input switch take place during this resonant subinterval in which the total resonant current is comprising said three distinct resonant current components, and before end of said resonant subinterval, said output current rectifier switch is automatically turned ON by positive current and at the end of said resonant subinterval and when said parasitic capacitor of said input switch is fully discharged, said switching time control means provides simultaneous control signals for both said input switch to be turned at zero voltage and with zero switching losses and said auxiliary MOSFET transistor to be turned OFF to complete said resonant subinterval, and said second transition continues with a current-reversal subinterval during which the input capacitor current is reversed from being equal to input inductor current to current flow in opposite direction with magnitude equal to magnetizing current of said isolation transformer at which instant the current through said complementary output rectifier switch is reduced to zero hence it is naturally turned OFF to complete said second transition D' to D.

47. Lossless switching converter as defined in claim 7,
   wherein said switching time control means provides control signals for respective switches as follows:
      said first transition D to D' is initiated and completed by simultaneously turning OFF of said input switch and turning ON of said complementary input switch, at which instant said output current rectifier switch is automatically turned ON and said complementary output current rectifier switch is automatically turned OFF, and
      said second transition D' to D is initiated and completed by simultaneously turning ON of said input switch and turning OFF of said complementary input switch, at which instant said output current rectifier switch is automatically turned OFF and said complementary output current rectifier switch is automatically turned ON.

48. An isolated lossless switching converter as defined in claim 18,
   wherein said switching time control means provides control signals for respective switches as follows:
      said first transition D to D' is initiated and completed by simultaneously turning OFF of said input switch and turning ON of said complementary input switch, at which instant said output current rectifier switch is automatically turned ON and said complementary output current rectifier switch is automatically turned OFF, and
      said second transition D' to D is initiated and completed by simultaneously turning ON of said input switch and turning OFF of said complementary input switch, at which instant said output current rectifier switch is automatically turned OFF and said complementary output current rectifier switch is automatically turned ON.

49. An isolated lossless switching converter as defined in claim 18,
   wherein the magnitude of said third one cosinusoidal resonant component is made as high as needed by use of the proportionally increased magnetizing current of said isolation transformer to reduce the voltage on said parasitic capacitance of said input switch as low as desired;
   whereby said isolation transformer is reduced in size and weight.

50. Lossless switching converter as defined in claim 1,
   wherein said complementary output switch is a two-terminal current rectifier switch (diode), which is in an ON or OFF state in response to said converter operating state and conditions caused by electronically controlled switching of said input switch, said complementary input switch and said output switch;

whereby control and drive circuitry for said complementary output rectifier switch is obviated, thereby simplifying said converter's drive and control circuitry.

51. Lossless switching converter as defined in claim 8, wherein said complementary output switch is a two-terminal current rectifier switch (diode), which is in an ON or OFF state in response to said converter operating state and conditions caused by electronically controlled switching of said input switch, said complementary input switch and said output switch;

whereby control and drive circuitry for said complementary output rectifier switch is obviated, thereby simplifying said converter's drive and control circuitry.

52. An isolated lossless switching converter as defined in claim 14, wherein said complementary output switch is a two-terminal current rectifier switch (diode), which is in an ON or OFF state in response to said converter operating state and conditions caused by electronically controlled switching of said input switch, said complementary input switch and said output switch;

whereby control and drive circuitry for said complementary output rectifier switch is obviated, thereby simplifying said converter's drive and control circuitry.

53. An isolated lossless switching converter as defined in claim 19, wherein said complementary output switch is a two-terminal current rectifier switch (diode), which is in an ON or OFF state in response to said converter operating state and conditions caused by electronically controlled switching of said input switch, said complementary input switch and said output switch;

whereby control and drive circuitry for said complementary output rectifier switch is obviated, thereby simplifying said converter's drive and control circuitry.

\* \* \* \* \*